United States Patent
Friedlander et al.

(10) Patent No.: US 12,553,904 B2
(45) Date of Patent: Feb. 17, 2026

(54) METHODS OF DETECTING AND TREATING CEREBRAL ANEURYSMS

(71) Applicants: UNIVERSITY OF PITTSBURGH—OF THE COMMONWEALTH SYSTEM OF HIGHER EDUCATION, Pittsburgh, PA (US); UPMC, Pittsburgh, PA (US)

(72) Inventors: Robert Max Friedlander, Pittsburgh, PA (US); Michael Maurice McDowell, Pittsburgh, PA (US); Aditya M. Mittal, Pittsburgh, PA (US); Ali A. Alattar, Pittsburgh, PA (US); Kamil W. Nowicki, Pittsburgh, PA (US)

(73) Assignees: UNIVERSITY OF PITTSBURGH—OF THE COMMONWEALTH SYSTEM OF HIGHER EDUCATION, Pittsburgh, PA (US); UPMC, Pittsburgh, PA (US)

( * ) Notice: Subject to any disclaimer, the term of this patent is extended or adjusted under 35 U.S.C. 154(b) by 0 days.

(21) Appl. No.: 18/934,708

(22) Filed: Nov. 1, 2024

(65) Prior Publication Data

US 2025/0347700 A1  Nov. 13, 2025

Related U.S. Application Data

(60) Provisional application No. 63/672,439, filed on Jul. 17, 2024, provisional application No. 63/644,051, filed on May 8, 2024.

(51) Int. Cl.

| | | |
|---|---|---|
| G01N 33/53 | (2006.01) | |
| A61K 31/18 | (2006.01) | |
| A61K 31/4365 | (2006.01) | |
| A61K 45/06 | (2006.01) | |
| C07K 16/24 | (2006.01) | |
| G01N 33/68 | (2006.01) | |
| G16H 10/60 | (2018.01) | |
| G16H 50/20 | (2018.01) | |
| G16H 50/30 | (2018.01) | |

(52) U.S. Cl.
CPC ......... *G01N 33/6893* (2013.01); *A61K 31/18* (2013.01); *A61K 31/4365* (2013.01); *A61K 45/06* (2013.01); *C07K 16/24* (2013.01); *G01N 33/6869* (2013.01); *G16H 10/60* (2018.01); *G16H 50/20* (2018.01); *G16H 50/30* (2018.01); *G01N 2333/4703* (2013.01); *G01N 2333/4745* (2013.01); *G01N 2333/48* (2013.01); *G01N 2333/485* (2013.01); *G01N 2333/523* (2013.01); *G01N 2333/525* (2013.01); *G01N 2333/535* (2013.01); *G01N 2333/5412* (2013.01); *G01N 2333/5418* (2013.01); *G01N 2333/5421* (2013.01); *G01N 2333/5428* (2013.01); *G01N 2333/5431* (2013.01); *G01N 2333/5434* (2013.01); *G01N 2333/5443* (2013.01); *G01N 2333/575* (2013.01); *G01N 2333/70578* (2013.01); *G01N 2333/70596* (2013.01); *G01N 2333/912* (2013.01); *G01N 2800/329* (2013.01); *G01N 2800/50* (2013.01)

(58) Field of Classification Search
None
See application file for complete search history.

(56) References Cited

U.S. PATENT DOCUMENTS

| | | |
|---|---|---|
| 5,045,694 A | 9/1991 | Beavis et al. |
| 5,118,937 A | 6/1992 | Hillenkamp et al. |
| 2003/0077616 A1 | 4/2003 | Lomas |
| 2003/0134304 A1 | 7/2003 | Van der Greef et al. |
| 2003/0199001 A1 | 10/2003 | Pitt et al. |
| 2020/0199676 A1* | 6/2020 | Meng ............... G01N 33/5091 |
| 2022/0054463 A1* | 2/2022 | Friedlander .............. A61P 9/14 |
| 2022/0214359 A1* | 7/2022 | Nistal ................ A61B 5/02014 |

FOREIGN PATENT DOCUMENTS

| | | |
|---|---|---|
| WO | WO 2011/100271 A2 | 8/2011 |
| WO | WO 2014/184384 A1 | 11/2014 |

OTHER PUBLICATIONS

Van Der Vekiens et al., Human and equine cardiovascular endocrinology: beware to compare, Cardiovascular Endocrinology 2013, vol. 2, No. 4, pp. 67-76. (Year: 2013).*

Torzewski et al., Animal Models of C-Reactive Protein, Hindawl Publishing Corporation, Mediators of Inflammation, vol. 2014, Article ID 683598, 2014, pp. 1-7. (Year: 2014).*

Adli et al., "The CRISPR tool kit for genome editing and beyond," Nat Commun., 9(1):1911 (2018) 13 pgs.

Beighley et al., "Aneurysmal subarachnoid hemorrhage during pregnancy: a comprehensive and systematic review of the literature," Neurosurg Rev 44:2511-2522 (2021).

Bergman, "Ladder sequencing," Proteomics in Functional Genomics, 88:133-144 (2000).

Bozic et al., "The Murine Interleukin 8 Type B Receptor Homologue and Its Ligands—Expression and Biological Characterization," The Journal of Biological Chemistry 269(47):29355-29358 (1994).

(Continued)

*Primary Examiner* — Gary Counts
(74) *Attorney, Agent, or Firm* — Baker Botts L.L.P.

(57) ABSTRACT

The present disclosure provides a whole blood, protein-based diagnostic test for presence and evaluation of aneurysm status. Further, the present disclosure relates to methods of treating aneurysms.

18 Claims, 87 Drawing Sheets
(13 of 87 Drawing Sheet(s) Filed in Color)

(56) References Cited

OTHER PUBLICATIONS

Brown et al., "Unruptured intracranial aneurysms: epidemiology, natural history, management options, and familial screening," The Lancet Neurology 13:393-404 (2014).
Brummelkamp et al., "A System for Stable Expression of Short Interfering RNAs in Mammalian Cells," Science 296:550-553 (2002).
Chait et al., "Protein Ladder Sequencing," Science 262:89-92 (1993).
Chandra et al. "A Meta-Analysis of Rupture Risk for Intracranial Aneurysms 10 mm or Less in Size Selected for Conservative Management Without Repair," Front Neurol 12:743023 (2021) 13 pgs.
Elbashir et al., "Duplexes of 21-nucleotide RNAs mediate RNA interference in cultured mammalian cells," Nature 411:494-498 (2001).
Mittal et al., "Survival Benefit and Cost-Effectiveness of a Future Blood-Based Diagnostic Test to Detect Cerebral Aneurysm Formation," Stroke Vasc Interv Neurol. 4:e000876 (2024) 10 pgs.
Ge et al., "High-Dimensional Immune Profiling by Mass Cytometry Revealed the Circulating Immune Cell Landscape in Patients With Intracranial Aneurysm," Front Immunol 13:922000 (2022) 9 pgs.
Ghasemzadeh et al., "The CXCR½ ligand NAP-2 promotes directed intravascular leukocyte migration through platelet thrombi," Blood 121:4555-4566 (2013).
Haseloff et al., "Simple RNA enzymes with new and highly specific endoribonuclease activities," Nature, 334:585-591 (1988).
Hoh et al., "A Novel Murine Elastase Saccular Aneurysm Model for Studying Bone Marrow Progenitor-Derived Cell-Mediated Processes in Aneurysm Formation," Neurosurgery 66:544-550 (2010).
Hoh et al., "2023 Guideline for the Management of Patients With Aneurysmal Subarachnoid Hemorrhage: A Guideline From the American Heart Association/American Stroke Association," Stroke 54:e314-e370 (2023).
Hosaka et al., "Modified murine intracranial aneurysm model: aneurysm formation and rupture by elastase and hypertension," Journal of Neurointerventional Surgery 6:474-479 (2014).
Huang et al., "Circular RNA hsa_circ_0000690 as a potential biomarker for diagnosis and prognosis of intracranial aneurysm: Closely relating to the volume of hemorrhage," Brain and Behavior 13:e2929 (2023) 9 pgs.
Huesken et al., "Design of a genome-wide siRNA library using an artificial neural network," Nat. Biotechnol. 23(8):995-1001 (2005).
Huo et al., "Circulating activated platelets exacerbate atherosclerosis in mice deficient in apolipoprotein E," Nature Medicine 9:61-67 (2003).
Jagla et al., "Sequence characteristics of functional siRNAs," RNA 11:864-872 (2005).
Jefferies et al., "A catalytic 13-mer ribozyme," Nucleic Acid Res, 17(4):1371-1377 (1989).
Juvela et al., "Intracranial Aneurysm Parameters for Predicting a Future Subarachnoid Hemorrhage: A Long-Term Follow-up Study," Neurosurgery 81:432-440 (2017).
Kauskot et al., "Platelet Receptors," Handb Exp Pharmacol, 23-57 (2012).
Keedy, "An overview of intracranial aneurysms," MJM 9:141-146 (2006).
Nistal et al., "Elucidating a Proteomic Signature for the Detection of Intracerebral Aneurysms," Clinical Neuro 66(1):p. 51 (2019).
Keough et al., "A method for high-sensitivity peptide sequencing using postsource decay matrix-assisted laser desorption ionization mass spectrometry," Proc. Natl. Acad. Sci. USA 96:7131-7136 (1999).
Khanna et al., "Regulation of vascular permeability by macrophage-derived chemotactic factor produced in Japanese encephalitis," Immunology and Cell Biology 72:200-204 (1994).
Kim et al., "Three-dimensional model of the active site of the self-splicing rRNA precursor of *Tetrahymena*," Proc Natl Acad Sci USA, 84:8788-8792 (1987).
Koussounadis et al., "Relationship between differentially expressed mRNA and mRNA-protein correlations in a xenograft model system," Sci Rep 5:10775 (2015) 9 pgs.
Kuster et al., "Identifying proteins and post-translational modifications by mass spectrometry," Curr. Opin. Structural Biol. 8:393-400 (1998).
Leonard et al., "Neutrophil Recruitment by Intradermally Injected Neutrophil Attractant/Activation Protein-1," The Journal of Investigative Dermatology 96:690-694 (1991).
Lee et al., "Expression of small interfering RNAs targeted against HIV-1 rev transcripts in human cells," Nature Biotechnol. 19:500-505 (2002).
Li et al., "Single-cell MALDI: a new tool for direct peptide profiling," Tibtech 18:151-160 (2000).
Maeder et al., "Genome-editing Technologies for Gene and Cell Therapy," Mol Ther. 24(3):430-446 (2016).
Martinez et al., "Single-Cell Transcriptome Analysis of the Circle of Willis in a Mouse Cerebral Aneurysm Model," Stroke 53:2647-2657 (2022).
Mauler et al., "Platelet-neutrophil complex formation—a detailed in vitro analysis of murine and human blood samples," Journal of Leukocyte Biology 99:781-789 (2016).
Nowicki et al., "Novel High-Throughput In Vitro Model for Identifying Hemodynamic-Induced Inflammatory Mediators of Cerebral Aneurysm Formation," Hypertension 64:1306-1313 (2014).
Nowicki et al., "M1 macrophages are required for murine cerebral aneurysm formation," Journal of Neurointerventional Surgery 10:93-97 (2018).
Nowicki et al., "A Future Blood Test to Detect Cerebral Aneurysms," Cell Mol Neurobiol 43:2697-2711 (2023).
Pera et al., "Gene expression profiling of blood in ruptured intracranial aneurysms: in search of biomarkers," Journal Of Cerebral Blood Flow And Metabolism 33:1025-1031 (2013).
Poppenberg et al., "Epigenetic landscapes of intracranial aneurysm risk haplotypes implicate enhancer function of endothelial cells and fibroblasts in dysregulated gene expression," BMC Medical Genomics 14:162 (2021) 14 pgs.
Poppenberg et al., "Profiling of Circulating Gene Expression Reveals Molecular Signatures Associated with Intracranial Aneurysm Rupture Risk," Mol Diagn Ther 27:115-127 (2023).
Rowley et al., "Applications of Protein Mass Spectrometry in Cell Biology," Methods 20:383-397 (2000).
Sforza et al., "Hemodynamics of Cerebral Aneurysms," Annual Review of Fluid Mechanics 41:91-107 (2009).
Shabalina et al., "Computational models with thermodynamic and composition features improve siRNA design," BMC Bioinformatics 7:65 (2006) 16 pgs.
Shehata et al., "Long-term outcomes of flow diversion for unruptured intracranial aneurysms: a systematic review and meta-analysis," J Neurointerv Surg 15(9):898-902 (2023).
Smith et al., "Interleukin-8 induces neutrophil transendothelial migration," Immunology 72:65-72 (1991).
Tanoue et al., "Wall Shear Stress Distribution Inside Growing Cerebral Aneurysm," AJNR American Journal of Neuroradiology 32:1732-1737 (2011).
Towbin et al., "Electrophoretic transfer of proteins from polyacrylamide gels to nitrocellulose sheets: Procedure and some applications," Proc. Nat. Acad. Sci. 76:4350-4354 (1979).
Tutino et al., "Aberrant Whole Blood Gene Expression in the Lumen of Human Intracranial Aneurysms," Diagnostics 11:1442 (2021) 12 pgs.
Twitchell et al., "Analysis of cerebrovascular aneurysm treatment cost: retrospective cohort comparison of clipping, coiling, and flow diversion," Neurosurg Focus 44(5):E3 (2018) 7 pgs.
Vernooij et al., "Incidental Findings on Brain MRI in the General Population," New England Journal of Medicine 357:1821-1828 (2007).
Vlak et al., "Prevalence of unruptured intracranial aneurysms, with emphasis on sex, age, comorbidity, country, and time period: a systematic review and meta-analysis," The Lancet Neurology 10:626-636 (2011).
Wiebers et al., "Unruptured intracranial aneurysms: natural history, clinical outcome, and risks of surgical and endovascular treatment," Lancet 362:103-110 (2003).

(56) References Cited

OTHER PUBLICATIONS

Yue et al., "Interleukin-8 is chemotactic for vascular smooth muscle cells," European Journal of Pharmacology 240:81-84 (1993).
Yue et al., "Interleukin-8. A Mitogen and Chemoattractant for Vascular Smooth Muscle Cells," Circulation Research 75:1-7 (1994).
Zhang et al., "Increased Expression of NLRP3 Inflammasome in Wall of Ruptured and Unruptured Human Cerebral Aneurysms: Preliminary Results," Journal of Stroke and Cerebrovascular Diseases 24(5):972-979 (2015).

\* cited by examiner

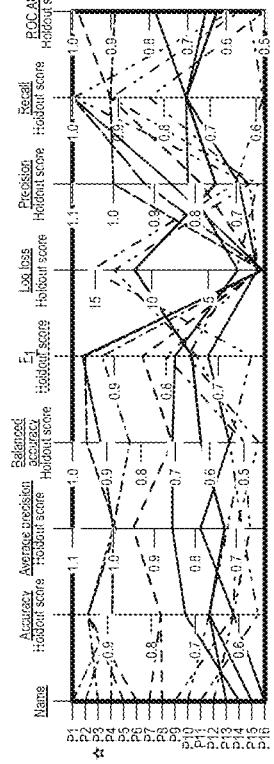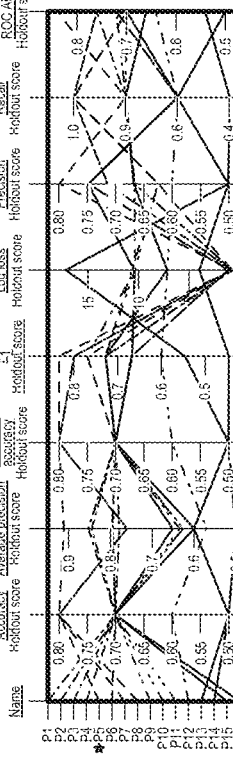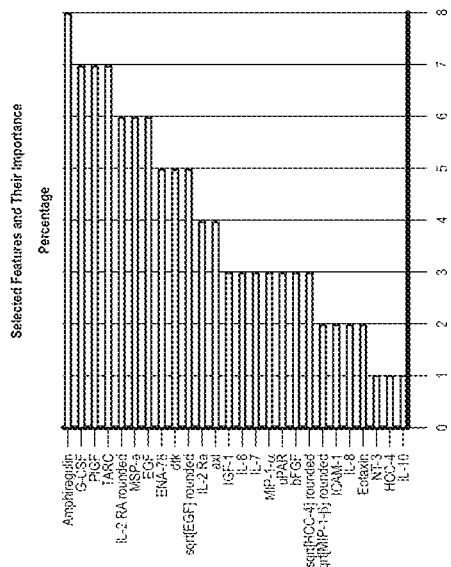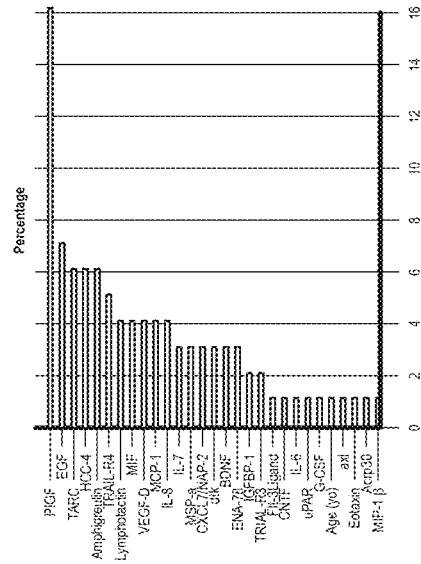
FIG. 8A
FIG. 8B

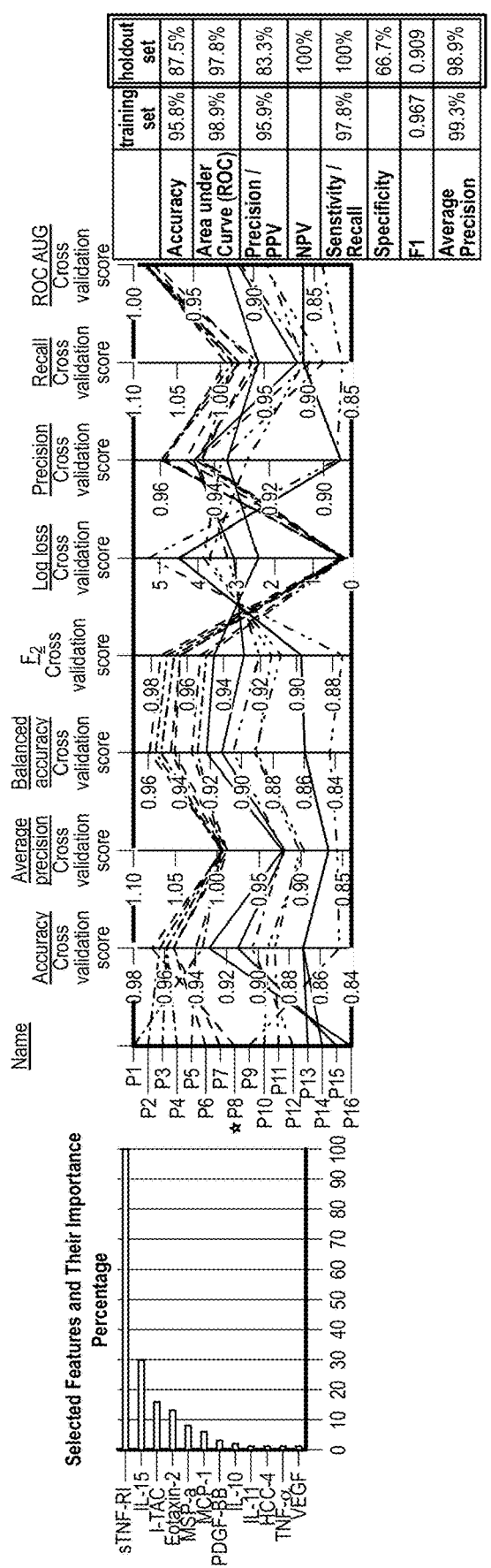
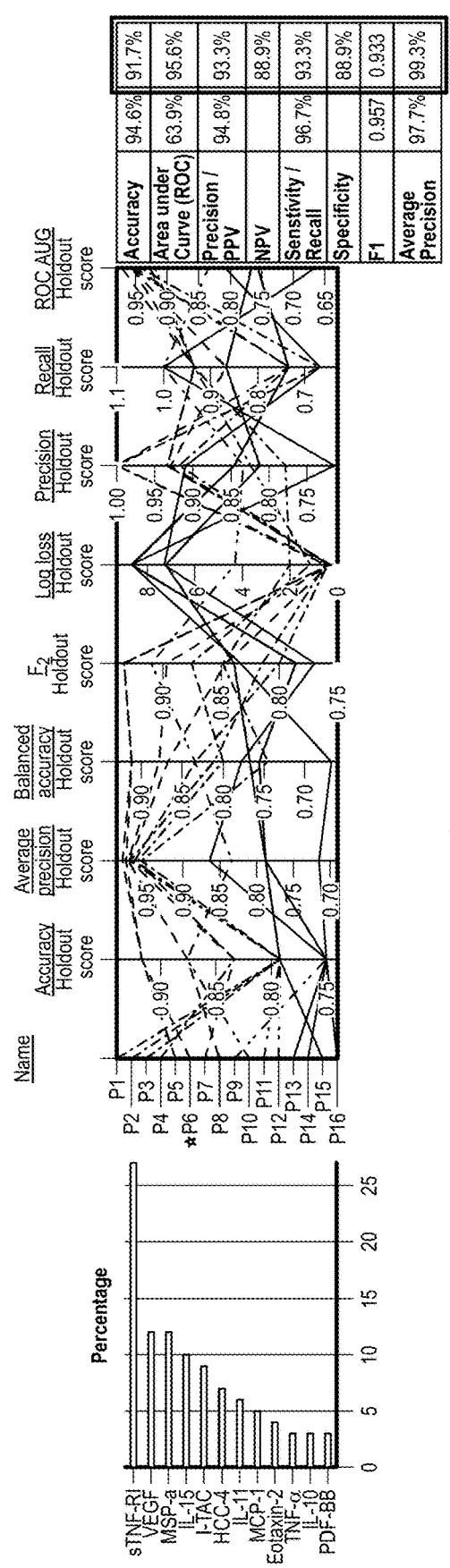
FIG. 14A
FIG. 14B

FIG. 17

METHODS OF DETECTING AND TREATING CEREBRAL ANEURYSMS

CROSS-REFERENCES TO RELATED APPLICATIONS

This application claims the benefit of priority to U.S. Provisional Patent Application No. 63/644,051, filed on May 8, 2024, and to U.S. Provisional Patent Application No. 63/672,439, filed on Jul. 17, 2024, the contents of each of which are incorporated herein by reference in their entirety and to each of which priority is claimed.

GRANT INFORMATION

This invention was made with government support under TR001857 awarded by the National Institutes of Health and under 1734751 awarded by National Science Foundation. The government has certain rights in the invention.

TECHNICAL FIELD

The present disclosure relates to methods, compositions, and kits for detecting aneurysms. In certain embodiments, the present disclosure further includes treating cerebral aneurysms in a subject. The present disclosure also relates to biomarkers for predicting and monitoring a subject's response to a treatment.

BACKGROUND OF THE INVENTION

Cerebral aneurysms are focal dilations of cerebral arteries that are present in 2-5% of the general population and disproportionately affect women. Almost 95% of these vascular lesions are sporadic while the remaining 5% can be attributed to familial, infectious, or traumatic causes. These lesions can rupture resulting in devastating subarachnoid hemorrhage leading to near 50% mortality and morbidity. One third of patients with subarachnoid hemorrhage have multiple aneurysms. About 20-40% of coiled aneurysms eventually recanalize requiring further surgery. Current research suggests that aneurysms form through a complex interaction of hemodynamic and inflammatory factors. Patients with aneurysms within the general population have aneurysms at vastly different stages of their disease process. Current and past efforts have failed to properly stratify patient samples at different stages of this inflammatory disease resulting in mixed samples and study results. Furthermore, most recent efforts have focused on RNA transcriptome, but RNA expression does not correlate with protein expression.

Cerebral aneurysms are typically discovered incidentally on advanced cranial imaging or when patients present with rupture. Development of medical therapies is impeded by lack of knowledge of aneurysm formation and the inability to detect them during early formation process. There currently is no blood test available to detect cerebral aneurysms in patients.

SUMMARY OF THE INVENTION

The present disclosure relates to methods, compositions, and kits for treating and detecting aneurysms including cerebral aneurysms.

In certain non-limiting embodiments, the present disclosure provides methods for treating a subject having or at risk of developing an aneurysm. In certain embodiments, the methods comprise a) measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; and b) administering an effective amount of an aneurysm inhibitor to the subject. In certain embodiments, an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has or is at risk of developing an aneurysm. In certain embodiments, a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm.

In certain non-limiting embodiments, the present disclosure provides methods for treating a subject having or at risk of having an aneurysm rupture. In certain embodiments, the methods comprise a) measuring, in a biological sample of the subject, an expression level of one or more biomarkers selected from MSP-a, IL-10, uPAR, Flt-3 Ligand, MIP-3 β (CCL19), or a combination thereof; and b) administering an effective amount of an aneurysm inhibitor to the subject. In certain embodiments, the subject is known to have or suspected to have an aneurysm. In certain embodiments, the methods comprise identifying the subject as having an aneurysm by the methods disclosed herein. In certain embodiments, an increased expression level of one or more biomarkers selected from MSP-a, IL-10, or uPAR relative to a second reference sample indicates that the subject has or is at risk of rupture of an aneurysm. In certain embodiments, a decreased expression level of Flt-3 Ligand and/or MIP-3 β (CCL19) relative to a second reference sample indicates that the subject has or is at risk of rupture of an aneurysm.

In certain non-limiting embodiments, the present disclosure provides methods for treating a subject having or at risk of having an unsecured aneurysm. In certain embodiments, the methods comprise a) measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof; and b) administering an effective amount of an aneurysm inhibitor to the subject. In certain embodiments, the subject is known to have or suspected to have an aneurysm. In certain embodiments, the methods comprise: a) identifying the subject as having an aneurysm by the methods disclosed herein. In certain embodiments, an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of an unsecured aneurysm. In certain embodiments, a decreased expression level of one or more biomarkers selected from IL-10, IL-15, PDGF-BB, TNF-α, HCC-4, or I-TAC (CXCL11) relative to a third reference sample indicates that the subject has or is at risk of an unsecured aneurysm.

In certain non-limiting embodiments, the present disclosure provides methods for treating a subject having an aneurysm, comprising: a) measuring, in a biological sample of the subject, an expression level of one or more biomarkers selected from IL-11, IL-12 p40, IL-17, Amphiregulin, or a combination thereof; b) identifying the subject as having an anterior aneurysm or posterior aneurysm; and c) administering an effective amount of an aneurysm inhibitor to the subject. In certain embodiments, the subject is known to have or suspected to have an aneurysm. In certain embodiments, the methods comprise identifying the subject as having an aneurysm by the methods disclosed herein. In certain embodiments, an expression level of one or more biomarkers selected from IL-11, IL-12 p40, IL-17, or Amphiregulin relative to a fourth reference sample indicates that the subject has an anterior aneurysm.

In certain non-limiting embodiments, the present disclosure provides method for treating a subject having or at risk of developing an aneurysm, the method comprising: a) measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; and b) administering an effective amount of an aneurysm inhibitor to the subject.

In certain embodiments, the methods further comprise measuring, in a biological sample of the subject, an expression level of one or more biomarkers selected from MSP-a, IL-10, uPAR, Flt-3 Ligand, MIP-3 β (CCL19), or a combination thereof. In certain embodiments, the methods further comprise measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof. In certain embodiments, the methods further comprise measuring, in a biological sample of the subject, an expression level of one or more biomarkers selected from IL-11, IL-12 p40, IL-17, Amphiregulin, or a combination thereof.

In certain embodiments, a) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has or is at risk of developing an aneurysm; b) an increased expression level of one or more biomarkers selected from MSP-a, IL-10, or uPAR relative to a second reference sample indicates that the subject has or is at risk of rupture of an aneurysm; c) an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of an unsecured aneurysm; and/or d) an expression level of one or more biomarkers selected from IL-11, IL-12 p40, IL-17, or Amphiregulin relative to a fourth reference sample indicates that the subject has an anterior aneurysm.

In certain embodiments, a) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; b) a decreased expression level of Flt-3 Ligand and/or MIP-3 β (CCL19) relative to a second reference sample indicates that the subject has or is at risk of rupture of an aneurysm; and/or c) a decreased expression level of one or more biomarkers selected from IL-10, IL-15, PDGF-BB, TNF-α, HCC-4, or I-TAC (CXCL11) relative to a third reference sample indicates that the subject has or is at risk of an unsecured aneurysm.

In certain embodiments, the aneurysm inhibitor is a platelet inhibitor. In certain embodiments, the platelet inhibitor is selected from the group consisting of a glycoprotein IIB/IIIA inhibitor, a CXCL7 inhibitor, a CXCR1/2 inhibitor, and a combination thereof. In certain embodiments, the glycoprotein IIB/IIIA inhibitor is clopidogrel, a salt thereof, or a derivative thereof. In certain embodiments, the CXCL7 inhibitor is an antibody anti-CXCL7. In certain embodiments, the CXCR1/2 inhibitor is reparixin, a salt thereof, or a derivative thereof. In certain embodiments, the methods further comprise administering a therapeutically effective amount of a secondary aneurysm inhibitor.

In certain non-limiting embodiments, the present disclosure provides a method for identifying a subject having or at risk of developing an aneurysm, the method comprising measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof. In certain embodiments, a) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has or is at risk of developing an aneurysm; and/or b) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm.

In certain non-limiting embodiments, the present disclosure provides method for identifying a subject having or at risk of having an aneurysm rupture, the method comprising measuring, in a biological sample of the subject, an expression level of one or more biomarkers selected from MSP-a, IL-10, uPAR, Flt-3 Ligand, MIP-3 β (CCL19), or a combination thereof. In certain embodiments, a) an increased expression level of one or more biomarkers selected from MSP-a, IL-10, or uPAR relative to a second reference sample indicates that the subject has or is at risk of rupture of an aneurysm; and/or b) a decreased expression level of Flt-3 Ligand and/or MIP-3 β (CCL19) relative to a second reference sample indicates that the subject has or is at risk of rupture of an aneurysm.

In certain non-limiting embodiments, the present disclosure provides method for identifying a subject having or at risk of having an unsecured aneurysm, the method comprising measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof. In certain embodiments, a) an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of rupture of an unsecured aneurysm; and/or b) a decreased expression level of one or more biomarkers selected from IL-10, IL-15, PDGF-BB, TNF-α, HCC-4, or I-TAC (CXCL11) relative to a third reference sample indicates that the subject has or is at risk of rupture of an unsecured aneurysm.

In certain non-limiting embodiments, the present disclosure provides method for identifying a subject having an anterior aneurysm, comprising measuring, in a biological sample of the subject, an expression level of one or more biomarkers selected from IL-11, IL-12 p40, IL-17, Amphiregulin, or a combination thereof. In certain embodiments, an expression level of one or more biomarkers selected from IL-11, IL-12 p40, IL-17, or Amphiregulin relative to a fourth reference sample indicates that the subject has an anterior aneurysm.

In certain non-limiting embodiments, the present disclosure provides method for identifying a subject having or at risk of having an aneurysm rupture, the method comprising:
  a) identifying the subject as having an aneurysm by measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has an aneurysm; and/or a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; and
  b) identifying the subject as having an aneurysm rupture by measuring, in a biological sample of the subject, an expression level of one or more biomarkers selected from MSP-a, IL-10, uPAR, Flt-3 Ligand, MIP-3 β (CCL19), or a combination thereof; wherein an increased expression level of one or more biomarkers selected from MSP-a, IL-10, or uPAR relative to a second reference sample indicates that the subject has rupture of an aneurysm; and/or a decreased expression level of Flt-3 Ligand and/or MIP-3 β (CCL19) relative to a second reference sample indicates that the subject has rupture of an aneurysm.

In certain non-limiting embodiments, the present disclosure provides method for identifying a subject having or at risk of having an unsecured aneurysm, the method comprising:
  a) identifying the subject as having an aneurysm by measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has an aneurysm; and/or a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; and
  b) identifying the subject as having an aneurysm rupture by measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof; wherein an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of an unsecured aneurysm; and/or a decreased expression level of one or more biomarkers selected from IL-10, IL-15, PDGF-BB, TNF-α, HCC-4, or I-TAC (CXCL11) relative to a third reference sample indicates that the subject has or is at risk of unsecured aneurysm.

In certain non-limiting embodiments, the present disclosure provides method for identifying a subject having an anterior aneurysm, comprising:
  a) identifying the subject as having an aneurysm by measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has an aneurysm; and/or a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; and
  b) identifying the subject as having an anterior aneurysm by measuring, in a biological sample of the subject, an expression level of one or more biomarkers selected from IL-11, IL-12 p40, IL-17, Amphiregulin, or a combination thereof, wherein an increased expression level of one or more biomarkers selected from IL-11, IL-12 p40, IL-17, or Amphiregulin relative to a fourth reference sample indicates that the subject has an aneurysm.

In certain embodiments, the aneurysm is a cerebral aneurysm. In certain embodiments, the biological sample is a blood sample, a serum sample, a plasma sample, or a cerebrospinal fluid sample. In certain embodiments, the biological sample is a blood sample.

In certain non-limiting embodiments, the present disclosure provides method of identifying a subject having or at risk of developing an aneurysm by one or more computing systems, comprising: a) receiving, from a client device via a user interface of a software executing on the client device, one or more inputs associated with the subject; b) determining, based on one or more models, one or more measures regarding aneurysm presence and aneurysm rupture, wherein the one or more measures comprise one or more of a first probability of the subject harboring an aneurysm, a second probability of a ruptured aneurysm in the subject, or a third probability of an aneurysm with impending rupture in the subject; and c) sending, to the client device via the user interface, instructions for presenting the one or more determined measures regarding aneurysm presence and aneurysm rupture.

In certain non-limiting embodiments, the present disclosure provides method of identifying a subject having or at risk of developing an unsecured aneurysm by one or more computing systems, comprising: a) receiving, from a client device via a user interface of a software executing on the client device, one or more inputs associated with the subject; b) determining, based on one or more models, one or more measures regarding aneurysm presence and aneurysm status, wherein the one or more measures comprise one or more of a first probability of the subject harboring an aneurysm, a second probability of a secured aneurysm in the subject, or a third probability of an unsecured aneurysm in the subject; and c) sending, to the client device via the user interface, instructions for presenting the one or more determined measures regarding aneurysm presence and aneurysm status.

In certain non-limiting embodiments, the present disclosure provides method of identifying a subject having or at risk of an anterior aneurysm by one or more computing systems, comprising: a) receiving, from a client device via a user interface of a software executing on the client device, one or more inputs associated with the subject; b) determining, based on one or more models, one or more measures regarding aneurysm presence and aneurysm location, wherein the one or more measures comprise one or more of a first probability of the subject harboring an aneurysm, a second probability of a posterior aneurysm in the subject, or a third probability of an anterior aneurysm in the subject; and c) sending, to the client device via the user interface, instructions for presenting the one or more determined measures regarding aneurysm presence and aneurysm location.

In certain embodiments, the one or more inputs comprise one or more of demographic information, a co-morbidity, an aneurysm size, an aneurysm status, an aneurysm location, or a biomarker. In certain embodiments, the one or more inputs comprise one or more biomarker selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof. In certain embodiments, the one or more inputs comprise one or more biomarker selected from MSP-a, IL-10, uPAR, Flt-3 Ligand, MIP-3 β (CCL19), or a combination thereof. In certain embodiments, the one or more inputs comprise one or more biomarker selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof. In certain embodiments, the one or more inputs comprise one or more biomarker selected from IL-11, IL-12 p40, IL-17, Amphiregulin, or a combination thereof. In certain embodiments, the user interface is operable for querying aneurysm records associated with a plurality of subjects. In certain embodiments, the one or more models are generated based on one or more of retrospective human biomarker data or sample stratification. In certain embodiments, the one or models are generated based on data collected from a plurality of subjects at one or more time periods. In certain embodiments, the user interface is operable for querying the one or more measures over a particular time period.

In certain non-limiting embodiments, the present disclosure provides one or more computer-readable non-transitory storage media embodying software that is operable when executed to: a) receive, from a client device via a user interface of a software executing on the client device, one or more inputs associated with the subject; b) determine, based on one or more models, one or more measures regarding aneurysm presence and aneurysm rupture, wherein the one or more measures comprise one or more of a first probability of the subject harboring an aneurysm, a second probability of a ruptured aneurysm in the subject, or a third probability of an aneurysm with impending rupture in the subject; and c) send, to the client device via the user interface, instructions for presenting the one or more determined measures regarding aneurysm presence and aneurysm rupture.

In certain non-limiting embodiments, the present disclosure provides one or more computer-readable non-transitory storage media embodying software that is operable when executed to: a) receive, from a client device via a user interface of a software executing on the client device, one or more inputs associated with the subject; b) determining, based on one or more models, one or more measures regarding aneurysm presence and aneurysm status, wherein the one or more measures comprise one or more of a first probability of the subject harboring an aneurysm, a second probability of a secured aneurysm in the subject, or a third probability of an unsecured aneurysm in the subject; and c) sending, to the client device via the user interface, instructions for presenting the one or more determined measures regarding aneurysm presence and aneurysm status.

In certain non-limiting embodiments, the present disclosure provides one or more computer-readable non-transitory storage media embodying software that is operable when executed to: a) receive, from a client device via a user interface of a software executing on the client device, one or more inputs associated with the subject; b) determining, based on one or more models, one or more measures regarding aneurysm presence and aneurysm location, wherein the one or more measures comprise one or more of a first probability of the subject harboring an aneurysm, a second probability of a posterior aneurysm in the subject, or a third probability of an anterior aneurysm in the subject; and c) sending, to the client device via the user interface, instructions for presenting the one or more determined measures regarding aneurysm presence and aneurysm location.

In certain embodiments, the one or more inputs comprise one or more of demographic information, a co-morbidity, an aneurysm size, an aneurysm status, an aneurysm location, or a biomarker. In certain embodiments, the one or more inputs comprise one or more biomarker selected from Eotaxin-1

(CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof. In certain embodiments, the one or more inputs comprise one or more biomarker selected from MSP-a, IL-10, uPAR, Flt-3 Ligand, MIP-3 β (CCL19), or a combination thereof. In certain embodiments, the one or more inputs comprise one or more biomarker selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof. In certain embodiments, the one or more inputs comprise one or more biomarker selected from IL-11, IL-12 p40, IL-17, Amphiregulin, or a combination thereof.

In certain embodiments, the user interface is operable for querying aneurysm records associated with a plurality of subjects. In certain embodiments, the one or more models are generated based on one or more of retrospective human biomarker data or sample stratification. In certain embodiments, the one or models are generated based on data collected from a plurality of subjects at one or more time periods. In certain embodiments, the user interface is operable for querying the one or more measures over a particular time period.

In certain non-limiting embodiments, the present disclosure provides a system comprising: one or more processors; and a non-transitory memory coupled to the processors comprising instructions executable by the processors, the processors operable when executing the instructions to: a) receive, from a client device via a user interface of a software executing on the client device, one or more inputs associated with the subject; b) determine, based on one or more models, one or more measures regarding aneurysm presence and aneurysm rupture, wherein the one or more measures comprise one or more of a first probability of the subject harboring an aneurysm, a second probability of an ruptured aneurysm in the subject, or a third probability of an aneurysm with impending rupture in the subject; and c) send, to the client device via the user interface, instructions for presenting the one or more determined measures regarding aneurysm presence and aneurysm rupture.

In certain non-limiting embodiments, the present disclosure provides a system comprising: one or more processors; and a non-transitory memory coupled to the processors comprising instructions executable by the processors, the processors operable when executing the instructions to: a) receive, from a client device via a user interface of a software executing on the client device, one or more inputs associated with the subject; b) determining, based on one or more models, one or more measures regarding aneurysm presence and aneurysm status, wherein the one or more measures comprise one or more of a first probability of the subject harboring an aneurysm, a second probability of a secured aneurysm in the subject, or a third probability of an unsecured aneurysm in the subject; and c) sending, to the client device via the user interface, instructions for presenting the one or more determined measures regarding aneurysm presence and aneurysm status.

In certain non-limiting embodiments, the present disclosure provides a system comprising: one or more processors; and a non-transitory memory coupled to the processors comprising instructions executable by the processors, the processors operable when executing the instructions to: a) receive, from a client device via a user interface of a software executing on the client device, one or more inputs associated with the subject; b) determining, based on one or more models, one or more measures regarding aneurysm presence and aneurysm location, wherein the one or more measures comprise one or more of a first probability of the subject harboring an aneurysm, a second probability of a posterior aneurysm in the subject, or a third probability of an anterior aneurysm in the subject; and c) sending, to the client device via the user interface, instructions for presenting the one or more determined measures regarding aneurysm presence and aneurysm location.

In certain embodiments, the one or more inputs comprise one or more of demographic information, a co-morbidity, an aneurysm size, an aneurysm status, an aneurysm location, or a biomarker. In certain embodiments, the one or more inputs comprise one or more biomarker selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof. In certain embodiments, the one or more inputs comprise one or more biomarker selected from MSP-a, IL-10, uPAR, Flt-3 Ligand, MIP-3 β (CCL19), or a combination thereof. In certain embodiments, the one or more inputs comprise one or more biomarker selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof. In certain embodiments, the one or more inputs comprise one or more biomarker selected from IL-11, IL-12 p40, IL-17, Amphiregulin, or a combination thereof.

In certain embodiments, the user interface is operable for querying aneurysm records associated with a plurality of subjects. In certain embodiments, the one or more models are generated based on one or more of retrospective human biomarker data or sample stratification. In certain embodiments, the one or models are generated based on data collected from a plurality of subjects at one or more time periods. In certain embodiments, the user interface is operable for querying the one or more measures over a particular time period.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A shows study population breakdown scheme (n=237). FIG. 2B shows analysis strategy. FIG. 2C shows relative heatmap representation of circulating 120 different protein cytokines grouped for control patients, unruptured aneurysms, and ruptured aneurysms with representative location at the Circle of Willis and baseline characteristics (total n=172, all values relative to average control). FIG. 2D shows cerebral aneurysm size and associated Hunt-Hess grade distribution for ruptured cerebral aneurysm patients. FIG. 2E shows principal component analysis showing sub-classification of circulating inflammatory profiles for cerebral aneurysm patients based on primarily expressed cytokines. FIG. 2F shows relative differences in protein cytokine expressions in unruptured and ruptured CA dome samples relative to STA control tissues (n=8).

FIG. 3A shows heatmap for 120 different circulating inflammatory cytokines for control patients (n=62), unruptured cerebral aneurysms patients (n=99) and ruptured aneurysm patients (n=11). Columns are arranged in increasing intensity. FIG. 3B shows relationship map and progress map (90% to 10% split, 10-fold cross-validation) from IBM Watson Studio for models obtained with machine learning for predicting cerebral aneurysm presence showing pipeline selection, feature transformation, and analysis scheme. FIG. 3C shows correlation matrices for the top cytokines selected for differentiation between aneurysm and control patients. FIGS. 3D-3G show receiver operator curves (ROC), 2-dimensional and 3-dimensional PCA graphs indicating group separation, and confusion matrices are shown for the top models derived on full data set (n=172) (FIG. 3D), age-matched data set (n=100 total) (FIG. 3E), model trained on age-matched data set (n=100) and deployed on full set (n=172) (FIG. 3F), and model trained on age-matched data set (n=100) and validated on bootstrapped data set (n=1000) (FIG. 3G). FIGS. 3H and 3I show diagnostic model performance in a secondary validation cohort that was obtained at a later date and a synthetic patient data set developed in IBM Watsonx. FIG. 3H shows diagnostic model performance in a secondary validation cohort, a completely separate patient data set (n=19), for predicting cerebral aneurysm presence in patients harboring an aneurysm (with predictions and confidence level of those predictions), in control patients without an aneurysm (with predictions and confidence level of those predictions, and a final confusion matrix with test characteristics (FIG. 3H). FIG. 3I shows diagnostic model performance in a synthetic patient data set (n=1000) for predicting cerebral aneurysm presence in patients harboring an aneurysm (with predictions and confidence level of those predictions), in control patients without an aneurysm (with predictions and confidence level of those predictions), and a final confusion matrix with test characteristics (FIG. 3I). FIG. 3J shows the protein-protein interaction network between the selected inflammatory cytokines used in this detection panel.

FIG. 4A shows heatmap for 120 different circulating inflammatory cytokines for unruptured cerebral aneurysms patients (n=99) and ruptured aneurysm patients (n=11). Columns are arranged by increasing intensity. FIG. 4B shows relationship map and progress map (90% to 10% split, 10-fold cross-validation) from IBM Watson Studio for models obtained with machine learning for predicting ruptured cerebral aneurysm presence showing pipeline selection, feature transformation, and analysis scheme. FIG. 4C shows correlation matrices for the top cytokines selected for differentiation between ruptured and unruptured aneurysm patients. FIGS. 4D and 4E show receiver operator curves (ROC), 2-dimensional and 3-dimensional PCA graphs indicating group separation, and confusion matrices are shown for the top models derived on bootstrapped data set (n=1100) (FIG. 4D), and trained on bootstrapped data set (n=1100) and validated on full data set (n=110) (FIG. 4E). Grey outputs indicate samples/arrays that were unreadable due to excess background (n=1). FIG. 4F shows diagnostic model performance in secondary validation cohort, a synthetic patient data set (n=1000), for predicting ruptured cerebral aneurysm status in those with ruptured aneurysms (with predictions and confidence level of those predictions), in unruptured cerebral aneurysm patients (with predictions and confidence level of those predictions), and a final confusion matrix with test characteristics (FIG. 4F). FIG. 4G shows the protein-protein interaction network between the selected inflammatory cytokines used in this detection panel.

FIG. 5A shows heatmap for 120 different circulating inflammatory cytokines for treated cerebral aneurysms patients with fully secured aneurysms (n=9) and treated cerebral aneurysm patients with aneurysm remnants or recurrences (n=15). Columns are arranged by increasing intensity. FIG. 5B shows relationship map and progress map (90% to 10% split, 10-fold cross-validation) from IBM Watson Studio for models obtained with machine learning for predicting secured vs unsecured aneurysm presence showing pipeline selection, feature transformation, and analysis scheme. FIG. 5C shows correlation matrices for the top cytokines selected for differentiation between unsecured and secured previously treated aneurysm patients. FIGS. 5D and 5E show receiver operator curves (ROC), 2-dimensional and 3-dimensional PCA graphs indicating group separation, and confusion matrices are shown for the top models derived on bootstrapped data set (n=240) (FIG. 5D), and trained on bootstrapped data set and validated on full data set (n=24) (FIG. 5E). FIGS. 5F and 5G show diagnostic model performance in a secondary validation cohort that was obtained at a later date and a synthetic patient data set developed in IBM Watsonx. FIG. 5F shows diagnostic model performance in a secondary validation cohort, a completely separate patient data set (n=3), for predicting unsecured cerebral aneurysm presence in patients with previously treated aneurysm (with predictions and confidence level of those predictions), in secured patients with successfully treated aneurysm (with predictions and confidence level of those predictions), and a final confusion matrix with test characteristics (FIG. 5F). FIG. 5G shows diagnostic model performance in a synthetic patient data set (n=1000) for predicting unsecured cerebral aneurysm presence in patients with previously treated aneurysm (with predictions and confidence level of those predictions), in secured patients with successfully treated aneurysm (with predictions and confidence level of those predictions), and a final confusion matrix with test characteristics (FIG. 5G). FIG. 5H shows the protein-protein interaction network between the selected inflammatory cytokines used in this detection panel.

FIG. 6A shows relative heatmap for 120 different circulating inflammatory cytokines for unruptured cerebral aneurysm patients stratified by aneurysm location (n=99). Columns are grouped by hierarchical clustering. FIG. 6B shows relationship map and progress map (90% to 10% split, 10-fold cross-validation) from IBM Watson Studio for models obtained with machine learning for predicting aneurysm location detection showing pipeline selection, feature transformation, and analysis scheme. FIGS. 6C and 6D show receiver operator curves (ROC), 2-dimensional and 3-dimensional PCA graphs indicating group separation, and confusion matrices are shown for the top models for predicting anterior vs posterior location derived on bootstrapped data set (n=1100) (FIG. 6C), and full data set (n=110) (FIG. 6D). FIGS. 6E and 6F show receiver operator curves (ROC), 2-dimensional and 3-dimensional PCA graphs indicating group separation, and confusion matrices are shown for the top models for predicting anterior vs posterior location derived on bootstrapped data set (n=1120) (FIG. 6E), and full data set (n=112) (FIG. 6F).

FIG. 7A shows murine intracranial aneurysm model. FIG. 7B shows cytokine array heatmap showing relative levels for 96 inflammatory cytokines for murine Circle of Willis at different time points (relative to controls). FIG. 7C shows 3-dimensional PCA graphs showing differences in cytokine expression at different time points. FIG. 7D shows ROC graph showing sensitivity and specificity for cytokine-based test developed using LASSO and cytokines outlined in previous panel. FIG. 7E shows approach attempted to develop a cytokine panel for detection of human cerebral aneurysm presence using murine cytokine data.

FIGS. 8A-8D illustrate selected features, developed pipelines and top model characteristics for predicting cerebral aneurysm presence. Panels showing selected features (cytokines, optimized features, engineered features, and age if selected), their importance, model characteristics developed for 16 different pipelines, and top model characteristics in both training and holdout sets for full data set (n=172) (FIG. 8A), age-matched data set (n=100 total) (FIG. 8B), model trained on age-matched data set (n=100) and deployed on full set (n=172) (FIG. 8C), and model trained on age-matched data set (n=100) and validated on bootstrapped data set (n=1000) (FIG. 8D).

FIGS. 14A and 14B show selected features, developed pipelines and top model characteristics for predicting secured vs unsecured cerebral aneurysm presence in previously treated patients. Panels showing selected features (cytokines, optimized features, engineered features, and age if selected), their importance, model characteristics developed for 16 different pipelines, and top model characteristics in both training and holdout sets for model derived from bootstrapped data set (n=240) (FIG. 14A), and trained on bootstrapped data set and validated on full data set (n=24) (FIG. 14B).

FIG. 17 shows companion App. Sample input and output screenshots of a developed companion app. In a clinical setting, patients or physicians would be able to track patient inflammatory profiles and outcomes which would allow for precision-guided medicine approach.

FIG. 19A shows secondary validation on a completely separate data set of n=24 patients with or without cerebral aneurysms, results in 91% sensitivity, 63% specificity, 77% PPV, 83% NPV at 80% confidence threshold. FIG. 19B shows secondary validation on data set n=5 patients with abdominal aortic aneurysms shows that the test is specific for cerebral aneurysms; e.g., it tends not to detect abdominal aortic aneurysms as false positives (false positive=only 1 out of 5 abdominal aortic aneurysm patients).

DETAILED DESCRIPTION

Figure 1:
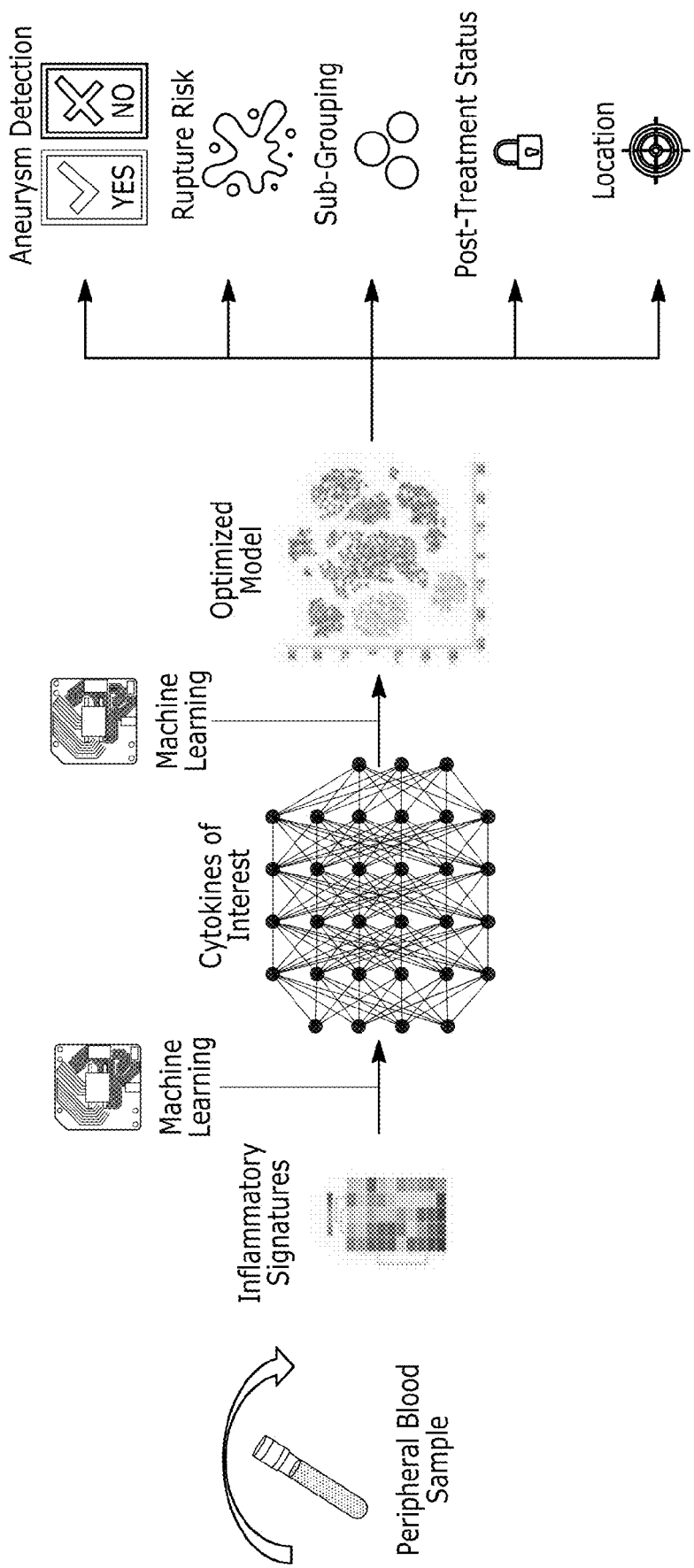
FIG. 1 shows a graphical representation of the presently disclosed subject matter. Models for detection of cerebral aneurysm presence were created using circulating inflammatory cytokine signatures, two-tiered optimization with machine learning, and age-matched and bootstrapped data sets. Additional features include rupture profile identification, inflammatory sub-grouping, post-treatment status, and location identification.

The present disclosure is based, in part, on the observation that the development of aneurysms (e.g., cerebral aneurysms) has a dynamic inflammatory profile that changes over time. The present disclosure shows that a forming or growing aneurysm possesses a specific profile because it experiences a dynamic inflammatory micro-environment. The present disclosure provides a whole blood, protein-based diagnostic test for presence of unruptured aneurysms and allows for tracking progression of unruptured, ruptured, and previously detected aneurysms to guide clinical decision making. Further, the present disclosure relates to methods of treating aneurysms.

The subject matter of the present disclosure is described with reference to the Figures. It should be understood that numerous specific details, relationships and methods are set forth in this Detailed Description, Examples, and accompanying Figures to provide a more complete understanding of the subject matter disclosed herein.

Non-limiting embodiments of the present disclosure are described by the present specification and Examples. For purpose of clarity and not by way of limitation, the detailed description is divided into the following subsections:
1. Definitions;
2. Biomarkers and Diagnostic Methods;
3. Web-based and/or Mobile-based Software;
4. Methods of Treatment;
5. Kits;
6. Exemplary Embodiments.

1. Definitions

The terms used in this specification generally have their ordinary meanings in the art, within the context of this disclosure and in the specific context where each term is used. Certain terms are discussed below, or elsewhere in the specification, to provide additional guidance to the practitioner in describing the compositions and methods of the disclosure and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open-ended terms.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of", and "consisting essentially of," the embodiments or elements presented herein, whether explicitly set forth or not.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

An "individual" or "subject" herein is a vertebrate, such as a human or non-human animal, for example, a mammal. Mammals include, but are not limited to, humans, non-human primates, farm animals, sport animals, rodents, and pets. Non-limiting examples of non-human animal subjects include rodents such as mice, rats, hamsters, and guinea pigs; rabbits; dogs; cats; sheep; pigs; goats; cattle; horses; and non-human primates such as apes and monkeys.

As used herein, the term "disease" refers to any condition or disorder that damages or interferes with the normal function of a cell, tissue, or organ.

An "effective amount" or "therapeutically effective amount" is an amount effective, at dosages and for periods of time necessary, that produces a desired effect, e.g., the desired therapeutic or prophylactic result. In certain embodiments, an effective amount can be formulated and/or administered in a single dose. In certain embodiments, an effective amount can be formulated and/or administered in a plurality of doses, for example, as part of a dosing regimen.

As used herein, the term "aneurysm" refers to a bulging, weak area in the wall of a blood vessel. An aneurysm can occur in any blood vessel, but most often develops in an artery rather than a vein. An aneurysm can be categorized by its location, shape, and cause. For example, an aneurysm may be found in many areas of the body, such as brain (cerebral aneurysm), aorta (aortic aneurysm), neck, intestines, kidney, spleen, legs.

As used herein, the term "watchful waiting" refers to an approach of treating a medical condition that involves a period of time to wait and watch for further symptoms (e.g., signs of disease) to develop, rather than immediate treatment such as surgery or administration of medication. During this time, repeated testing can be performed.

As used herein, the term "treating" or "treatment" refers to clinical intervention in an attempt to alter the disease course of the individual or cell being treated, and can be performed either for prophylaxis or during the course of clinical pathology. Therapeutic effects of treatment include, without limitation, preventing occurrence or recurrence of disease, alleviation of symptoms, diminishment of any direct or indirect pathological consequences of the disease, preventing aneurysms, decreasing the rate of disease progression, amelioration or palliation of the disease state, and remission or improved prognosis. By preventing progression of a disease or disorder, a treatment can prevent deterioration due to a disorder in an affected or diagnosed subject or a subject suspected of having the disorder, but also a treatment may prevent the onset of the disorder or a symptom of the disorder in a subject at risk for the disorder or suspected of having the disorder.

As used herein, the term "derivative" refers to a chemical compound with a similar core structure. For example, trichloromethane (chloroform) is a derivative of methane.

The term "enantiomers" refers to a pair of stereoisomers that are non-superimposable mirror images of each other. A 1:1 mixture of a pair of enantiomers is a "racemic" mixture or a racemate. The term is used to designate a racemic mixture where appropriate.

The term "enantiopure" refers to a sample that within the limits of detection consists of a single enantiomer.

The term "diastereoisomers" refers to stereoisomers that have at least two asymmetric atoms, but which are not mirror-images of each other. The absolute stereochemistry is specified according to the Cahn-Ingold-Prelog R—S system. When a compound is a pure enantiomer, the stereochemistry at each chiral carbon can be specified by either R or S. Resolved compounds whose absolute configuration is unknown can be designated (+) or (−) depending on the direction (dextro or levorotatory) in which they rotate plane polarized light at the wavelength of the sodium D line.

The term "isomers" refers to different compounds that have the same molecular formula but differ in arrangement and configuration of the atoms. Also, as used herein, the term "stereoisomer" refers to any of the various stereo isomeric configurations which can exist for a given compound of the presently disclosed subject matter and includes geometric isomers. It is understood that a substituent can be attached at a chiral center of a carbon atom. Also, as used herein, the term "constitutional isomers" refers to different compounds that have the same numbers of, and types of, atoms but the atoms are connected differently.

"Inhibitors" or "antagonists," as used herein, refer to modulating compounds that reduce, decrease, block, prevent, delay activation, inactivate, desensitize, or downregulate the biological activity and/or expression of a receptor or pathway of interest. The term "antagonist" includes full, partial, and neutral antagonists as well as inverse agonists.

The term "nucleic acid molecule" and "nucleotide sequence," as used herein, refers to a single or double-stranded covalently-linked sequence of nucleotides in which the 3' and 5' ends on each nucleotide are joined by phosphodiester bonds. The nucleic acid molecule can include deoxyribonucleotide bases or ribonucleotide bases, and can be manufactured synthetically in vitro or isolated from natural sources.

The terms "polypeptide," "peptide," "amino acid sequence" and "protein," used interchangeably herein, refer to a molecule formed from the linking of at least two amino acids. The link between one amino acid residue and the next is an amide bond and is sometimes referred to as a peptide bond. A polypeptide can be obtained by a suitable method known in the art, including isolation from natural sources, expression in a recombinant expression system, chemical synthesis, or enzymatic synthesis. The terms can apply to amino acid polymers in which one or more amino acid residue is an artificial chemical mimetic of a corresponding naturally occurring amino acid, as well as to naturally occurring amino acid polymers and non-naturally occurring amino acid polymers.

As used herein, the terms "primary data set" and "primary validation cohort" are interchangeably and refer to a set of data used initially to train and validate a model. In certain embodiments, the primary data is used to train and validate any of the models disclosed herein.

The terms "secondary data set" and "secondary validation cohort," used interchangeably herein, refer to a data set collected sequentially at a later date. In certain embodiments, the secondary data set was not previously seen by software, machine learning algorithms, or other programs.

The term "synthetic data" and "synthetic patients" can be used interchangeably and refer to computer-generated data used for either training or validation of models and predictions.

2. Biomarkers and Diagnostic Methods

Current clinical approach for patients suspected of having an aneurysm is based on a watchful waiting approach. For the initial diagnosis, imagining diagnostic tools such as DSA-angiogram or MRI can be used. Additional examinations, such as CT-angiogram or MRI, are then performed every 6 to 12 months until surgical treatment is needed. Further imagining-based analysis are then performed before and after the surgical treatment.

The present disclosure provides methods that can be used, with or without imaging-based examination (e.g., MRI), in a new clinical approach. FIG. 1 provides an exemplary outline of the methods disclosed herein. Once a patient is suspected of having an aneurysm, the methods disclosed herein are performed to determine whether the patient (a) has or is at risk of developing an aneurysm, (b) has or is at risk of aneurysm rupture, (c) has or is at risk of unsecured aneurysm, and/or (d) has an anterior aneurysm or a posterior aneurysm. The methods disclosed herein can be then performed every 3 to 6 months until the patient is ready for surgical treatment. Finally, the methods disclosed herein can be used in the post-operative phase (e.g., every 3 to 6 months after the surgery). It will be clear to the skilled in the art that the methods disclosed herein allow to a significant improvement of patient's clinical management and reduction of costs for analysis of the clinical status.

In certain embodiments, the present disclosure provides methods comprising measuring an expression level of one or more biomarkers in a sample. The one or more biomarkers encompassed by the present disclosure are described in the tables below.

TABLE 1

Aneurysm Detection Panel

| Abbreviation | Full Name | Function | Inflammatory Properties | Expression (vs control) |
|---|---|---|---|---|
| Aneurysm Detection Panel | | | | |
| Eotaxin-1 (CCL11) | Eotaxin-1 | Eotaxin-1 is a chemokine that selectively recruits eosinophils to sites of inflammation (PMID: 35690992). | Elevated plasma eotaxin in AAA patients (PMID: 27126477) Elevated serum CCL11 levels in rheumatoid arthritis (RA) patients (PMID: 33846499) CCL11 promotes cellular senescence via inflammatory pathways (PMID: 37860000) | Increased |
| TARC (CCL17) | Thymus and activation-regulated chemokine | TARC is a chemokine that induces cell movement and recruits white blood cells to sites of inflammation | CCL17 was found to mediate the proinflammatory actions of granulocyte macrophage colony-stimulating factor | Increased |

TABLE 1-continued

Aneurysm Detection Panel

| Abbreviation | Full Name | Function | Inflammatory Properties | Expression (vs control) |
|---|---|---|---|---|
| | | (PMID: 34009399). | (GM-CSF) in arthritis and pain models (PMID: 27525438) CCL17 reduced Treg cell expansion and increased IL-12 and IL-23 production in an intestinal inflammation murine model (PMID: 22057112) | |
| MSP-a | Macrophage Stimulating Protein | MSP is a cytokine that stimulates chemotaxis of peritoneal macrophages (PMID: 10549357). | MSP was found to increase liver inflammation in a non-alcoholic steatohepatitis model (PMID: 27685150) Inflammation in an ulcerative colitis model was reduced by upregulation of the MSP/RON pathway | Increased |
| BDNF | Brain-derived neurotrophic factor | BDNF is a neurotrophin that is vital for the growth and plasticisty of both excitatory and inhibitory synapses in the CNS, including glutamatergic, GABAergic, serotonergic, and dopaminergic synapses (PMID: 33096634). | BDNF administration reduced inflammation in microglia in a LPS-induced inflammation model (PMID: 37404293) BDNF decreases inflammation and apoptosis in a *Streptococcus pheumoniae* meningitis model (PMID: 28778220) BDNF activated astrocytes and microglia to increase production of inflammatory cytokines in a cyclophosphamide-induced cystitis model (PMID: 31931832) | Decreased |
| HCC-4 | Human beta (CC) chemokine-4 | A chemokine activity that promotes chemotaxis of monocytes and lymphocytes (PMID: 16226254) | HCC-4 promotes p38-a pro-inflammatory transcription factor-activation in human osteogenic sarcoma cells (PMID: 16226254) Tumor immunogenicity increased by HCC-4 (PMID: 10706711) | Increased |
| VEGF-D | Vascular endothelial growth factor-D | Protein that is key for the formation and remodeling of blood vessels (PMID: 37686121) | VEGF-D expression increased in AAA wall (PMID: 25968806) VEGF levels were higher in cerebral vasospasm patients following subarachnoid hemorrhage (PMID: 32678268) | Increased |

TABLE 1-continued

Aneurysm Detection Panel

| Abbreviation | Full Name | Function | Inflammatory Properties | Expression (vs control) |
|---|---|---|---|---|
| PLGF | Placental growth factor | An important growth factor for blood vessel formation, especially during embryogenesis (PMID: 35816445) | PLGF can lead to obesity-related inflammation (PMID: 29434073) PLGF activated pro-inflammatory cytokines following pericyte depletion (PMID: 28194443) Contributes to atherogenesis through vascular inflammation (PMID: 25788536) | Increased |
| CNTF | Ciliary neurotrophic factor | CNTF promotes survival of neurons by reducing tissue damage during inflammation (PMID: 28620096) | CNTF played a protective role in an inflammatory demyelinating CNS disease, countering the effects of pro-inflammatory cytokine TNF-alpha (PMID: 12042814) CNTF increased in obesity-patients' plasma and is linked with inflammation indices (PMD: 35585213) | Decreased |
| MCP-1 (CCL2) | Monocyte chemoattractant protein-1 | MCP-1 is an important chemokine that regulates migration of monocytes (PMID: 19441883) | Plays an important role in early cerebral aneurysm formation (PMID: 19164781) MCP-1 can promote aneurysmal healing and vascular repair through inflammatory cascades (PMID: 22007074) Mice with lower MCP-1 levels had decreased neuroinflammation (PMID: 18706086) | Increased |
| Amphiregulin | Amphiregulin | Amphiregulin is a growth factor that is important for host resistance and tolerance following inflammation (PMID: 25692699) | Deficiency of amphiregulin increased inflammation and leukocyte presence in a pulmonary hypertension model (PMID: 35732465) Amphiregulin increased inducible nitric oxide synthase (INOS) and cyclooxygenase-2 (COX-2) expression, driving inflammation in a hepatic tissue model | Increased |
| ENA-78 (CXCL5) | Epithelial neutrophil-activating protein 78 | ENA-78 is a chemokine that activates and recruits neutrophils (PMID: 9365115). | ENA-78 was activated by pro-inflammatory cytokines, leading to neutrophil recruitment in neuromyelitis optica patients (PMID: 27401736) Plasma levels of ENA-78 were significantly higher in endometriosis (a pathology thought | Increased |

TABLE 1-continued

Aneurysm Detection Panel

| Abbreviation | Full Name | Function | Inflammatory Properties | Expression (vs control) |
|---|---|---|---|---|
| | | | to be linked to inflammation) patients compared to controls (PMID: 35217683) | |
| Lymphotactin (XCL1) | Lymphotactin | Lymphotactin recruits T-cells and Natural Killer cells (PMID: 9632725). | Lymphotactin levels were significantly increased in cerebral arteries of mice with cerebral aneurysms (PMID: 25922506) Blocking lymphotactin improves periprosthetic osteolysis by decreasing inflammation (PMID: 32849609) XCL1 production was increased after exercise and promoted neuronal differentiation (PMID: 31413355) | Increased |
| IL-6 | Interleukin-6 | IL-6 has both pro- and anti-inflammatory properties and has a number of roles in the immune system such as differentiating T-cells, stimulating hematopoiesis, and stimulating acute phase responses (PMID: 25190079). | Cerebral aneurysm tissues have higher levels of IL-6 than temporal artery tissues (PMID: 31264696) Mice with cerebral aneurysms and increased microRNA MiR-21 have higher levels of IL-6, resulting in greater aneurysm rupture frequency (PMID: 32782712) IL-6 has anti-inflammatory properties by regulating the levels of other pro-inflammatory cytokines (PMID: 9435302) | Increased |
| TRAIL-R3 | Tumor Necrosis Factor-Related Apoptosis-Inducing Ligand Receptor 3 | TRAIL-R3 inhibits TRAIL-induced apoptosis by binding to TRAIL and preventing its activity (PMID: 14623878). | TRAIL mRNA production was induced by inflammatory cytokines and TRAIL protein showed toxicity in primary neurons (PMID: 24509861) Increased TRAIL-R3 was found in sputum leucocytes (PMID: 32482836) | Increased |
| Dtk (TYRO3) | Developmental Receptor Tyrosine Kinase | Dtk is important in the regulation of cell survival, migration, and stem cell differentiation (PMID: 30714403). | Knockdown of the TYRO3 gene in arthritic mice resulted in less synovial hyperplasia and bone damage (PMID: 23632195). TYRO3$^{-/-}$ mice showed decrease joint inflammation (PMID: 37537628) The TYRO3, Axl, and Mer family of receptor tyrosine | Increased |

TABLE 1-continued

Aneurysm Detection Panel

| Abbreviation | Full Name | Function | Inflammatory Properties | Expression (vs control) |
|---|---|---|---|---|
| | | | kinases modulate macrophage functions to have an anti-inflammatory effect (PMID: 30699285) | |
| IGFBP-1 | Insulin-Like Growth Factor Binding Protein 1 | IGFBP-1 regulates insulin-like growth factor activity and are important in metabolic modulation (PMID: 26064841). | Plasma IGFBP-1 levels can serve as a biomarker of AAA (PMID: 22325929) High levels of IGFBP-1 were associated with increased inflammatory proteins in preterm infants (PMID: 30685870) Localized Inflammation models show increased levels of serum IGFBP-1 (PMID: 18632293) | Increased |
| MIF | Macrophage Migration Inhibitory Factor | MIF regulates innate and acquired immunity and activates several signaling cascade pathways (PMID: 14502271) | Delayed cerebral ischemia was associated with increased levels of MIF in serum following aSAH (PMID: 36812451) Serum MIF levels were significantly elevated in aSAH patients (PID: 28823650) | Increased |
| IL-7 | Interleukin-7 | IL-7 maintains the homeostasis of several immune cell types, namely T-lymphocytes, B-lymphocytes, and natural killer cells (PMID: 34925323). | IL-7 levels were initially low and rose over time in SAH patients, with significant variations in outcomes (PMID: 31801576) Blocking IL-7 signaling pathways attenuates inflammation in an alopecia areata mice model (PMID: 33811067) | Decreased |
| Acrp30 (Adiponectin) | Adipocyte complement-related protein of 30 kDa | Acrp30 increases insulin sensitivity and has anti-inflammatory properties (PMID: 12007537). | Adiponectin administration decreases formation of AAA in hyperlipidemic mice (PMID: 24911638) High levels of Adiponectin were associated with increased inflammation severity in studies examining rheumatoid arthritis, chronic kidney disease, and inflammatory bowel disease (PMID: 32059381) | Decreased |
| IL-8 | Interleukin-8 | IL-8 attracts neutrophils to sites of inflammation (PMID: 8315568). | Heightened IL-8 levels are associated with sympathetic nervous system activity and systemic inflammation in a | Increased |

TABLE 1-continued

Aneurysm Detection Panel

| Abbreviation | Full Name | Function | Inflammatory Properties | Expression (vs control) |
|---|---|---|---|---|
| | | | SAH model (PMID: 19217831) IL-8 expression was increased in a rabbit SAH model (PMID: 17612593) Plasma levels of IL-8 were not significantly associated with clinical outcome in SAH patients (PMID: 31121365) | |
| EGF | Epidermal Growth Factor | EGF is a growth factor that plays a role in cell proliferation regulation (PMID: 7640657). | EGF decreased the levels of inflammatory cytokines in an inflammatory skin disease model (PMID: 29386833) EGF has anti-inflammatory effects in Lipopolysaccharide-induced inflammation models (PMID: 35198238) | Increased |
| MIP-1β (CCL4) | Macrophage Inflammatory Protein-1 β | MIP-1 β is key for the chemotaxis of many immune cell types (PMID: 12401480). | The CCL4 gene was positively correlated with cerebral aneurysms (PMID: 35250300) CCL4 promotes inflammatory signaling and causes damage in neurovascular tissues (PMID: 34755124) Low levels of MIP-1β in the serum were associated with more severe asthmatic responsiveness to mepolizumab (PMID: 32713920) | Decreased |
| uPAR | Urokinase Plasminogen Activator Surface Receptor | uPAR modulates protective immunity development and regulates cell migration, adhesion, and proliferation (PMID: 2484264). | uPAR expression is increased during inflammatory processes, such as leukocyte activation and differentiation (PMID: 20027185) Soluble uPAR is positively correlated with levels of circulating immune cells (PMID: 34925360) | Increased |
| CXCL7/NAP-2 | Chemokine (C—X—C Motif) Ligand 7/ Neutrophil Activating Peptide-2 | NAP-2 promotes neutrophil chemotaxis and activation (PMID: 1755378). | Thrombus bodies have increased production of NAP-2, helping recruit leukocytes to vascular injuries (PMID: 23550035) CXCL7 production by synovial macrophages were an early indicator of rheumatoid arthritis (PMID: 25858640) | Increased |

TABLE 1-continued

Aneurysm Detection Panel

| Abbreviation | Full Name | Function | Inflammatory Properties | Expression (vs control) |
|---|---|---|---|---|
| G-CSF | Granulocyte-Colony Stimulating Factor | G-CSF promotes the production of granulocytes and antigen-presenting cells (PMID: 26254266). | G-CSF increased infiltrating neutrophil levels and facilitate the rupture of cerebral aneurysms in a rat model (PMID: 33203959) G-CSF decreases production of IL-1, TNF-α, and IFN-γ, displaying anti-inflammatory properties (PMID: 9664164 | Increased |
| Axl | AXL Receptor Tyrosine Kinase | Axl helps regulate of cell survival, proliferation, motility, and the immunologic response (PMID: 33806258). | Inhibition of Axl led to attenuation of inflammation in an SAH model (PMID: 36324028) Axl was significantly increased in the plasma of ruptured cerebral aneurysm patients (PMID: 25885003) | Increased |
| Flt-3 Ligand | Fms-Like Tyrosine Kinase 3 Ligand | Flt-3 ligand promotes the differentiation and proliferation of dendritic cells (PMID: 12496473). | Flt-3 Ligand is protective in atherosclerosis (PMID: 22078798) The Flt-3 Ligand/CD135 axis was found to be more active in rheumatoid arthritis patients (PMID: 24314260) | Increased |
| TRAIL-R4 | Tumor Necrosis Factor-Related Apoptosis-Inducing Ligand Receptor 4 | TRAIL-R4 can bind TRAIL and prevent TRAIL-mediated apoptosis (PMID: 9430226). | TRAIL mRNA production was induced by inflammatory cytokines and TRAIL protein showed toxicity in primary neurons (PMID: 24509861) TRAIL-R4 increases inflammatory gene expression in endothelial cells (PMID: 12874246) | Increased |

TABLE 2

Rupture Risk/High-Risk Detection Panel

| Abbreviation | Full Name | Function | Inflammatory Properties | Expression (vs unruptured) |
|---|---|---|---|---|
| Rupture/High-Risk Profile Detection ||||| 
| Flt-3 Ligand | Fms-Like Tyrosine Kinase 3 Ligand | Flt-3 ligand promotes the differentiation and proliferation of dendritic cells (PMID: 12496473). | Flt-3 Ligand is protective in atherosclerosis (PMID: 22078798) The Flt-3 Ligand/CD135 axis was found to | Decreased |

TABLE 2-continued

Rupture Risk/High-Risk Detection Panel

| Abbreviation | Full Name | Function | Inflammatory Properties | Expression (vs unruptured) |
|---|---|---|---|---|
| | | | be more active in rheumatoid arthritis patients (PMID: 24314260) | |
| MSP-a | Macrophage Stimulating Protein | MSP is a cytokine that stimulates chemotaxis of peritoneal macrophages (PMID: 10549357). | MSP was found to increase liver inflammation in a non-alcoholic steatohepatitis model (PMID: 27685150) Inflammation in an ulcerative colitis model was reduced by upregulation of the MSP/RON pathway | Increased |
| IL-10 | Interleukin-10 | IL-10 is one of the most prevalent anti-inflammatory cytokines and is key to decrease the immune response of the host to pathogens (PMID: 22428854). | IL-10 levels were increased in unruptured intracranial aneurysms (PMID: 38709145) Aneurysm Wall Enhancement-a sign of aneurysm instability-is associated with decreased levels of IL-10 (PMID: 34245147) IL-10 treatment led to increased risk of AAA rupture in mice (PMID: 23908246) | Increased |
| MIP-3 β (CCL19) | Macrophage Inflammatory Protein-3 β | MIP-3 β attracts lymphocytes and dendritic cells to lymphoid tissues (PMID: 11155441). | There are heightened levels of CCL19 in the ruptured sites of coronary arteries in coronary artery disease patients (PMID: 25473269) CCL19 activates allergic airway inflammation through type 2 T-cell differentiation (PMID: 37956733) | Decreased |
| uPAR | Urokinase Plasminogen Activator Surface Receptor | uPAR modulates protective immunity development and regulates cell migration, adhesion, and proliferation (PMID: 2484264). | uPAR expression is increased during inflammatory processes, such as leukocyte activation and differentiation (PMID: 20027185) Soluble uPAR is positively correlated with levels of circulating immune cells (PMID: 34925360) | Increased |

TABLE 3

Unsecured vs Secured Aneurysm Detection Panel

| Abbreviation | Full Name | Function | Inflammatory Properties | Expression (vs secured) |
|---|---|---|---|---|
| Unsecured Aneurysm Profile Detection | | | | |
| Eotaxin-2 (CCL24) | Eotaxin-2 | Eotaxin-2 activates human eosinophils and basophils via CCR3 (PMID: 9182688). | Eotaxin levels were increased in the adventitial layer of the aortic wall in AAAs PMID: 27126477) Eotaxin-2 levels are heightened in Fibromyalgia patients' serum (PMID: 29861805) | Increased |
| IL-10 | Interleukin-10 | IL-10 is one of the most prevalent anti-inflammatory cytokines and is key to decrease the immune response of the host to pathogens (PMID: 22428854). | IL-10 levels were increased in unruptured intracranial aneurysms (PMID: 38709145) Aneurysm Wall Enhancement-a sign of aneurysm instability-is associated with decreased levels of IL-10 (PMID: 34245147) IL-10 treatment led to increased risk of AAA rupture in mice (PMID: 23908246) | Decreased |
| IL-15 | Interleukin-15 | IL-15 regulates tissue repair, activates natural killer cells, and dictates T-cell response (PMID: 27325459). | Heightened levels of IL-15 in serum are associated with the development of cerebral aneurysms (PMID: 35783134) IL-15 peaked in coordination with systematic inflammatory activity in aSAH patients (PMID: 28314864) | Decreased |
| MCP-1 (CCL2) | Monocyte chemoattractant protein-1 | MCP-1 is an important chemokine that regulates migration of monocytes (PMID: 19441883) | Plays an important role in early cerebral aneurysm formation (PMID: 19164781) MCP-1 can promote aneurysmal healing and vascular repair through inflammatory cascades (PMID: 22007074) Mice with lower MCP-1 levels had decreased neuroinflammation (PMID: 18706086) | Increased |

TABLE 3-continued

Unsecured vs Secured Aneurysm Detection Panel

| Abbreviation | Full Name | Function | Inflammatory Properties | Expression (vs secured) |
|---|---|---|---|---|
| PDGF-BB | Platelet-Derived Growth Factor BB | PDGF-BB promotes mitogenesis and angiogenesis, and is important for wound-healing (PMID: 28714058). | Saccular aneurysms uniquely expressed PDGF-B in rats compared to healthy carotid arteries (PMID: 18489818) SAH patients with "poor outcomes" had significantly higher levels of PDGF-BB (PMID: 27903205) | Decreased |
| TNF-α | Tumor Necrosis Factor Alpha | TNF-α is a potent pro-inflammatory cytokine that is involved in systemic inflammation and often leads cells to necrosis or apoptosis (PMID: 10891884). | TNF-α knockout mice had significantly lower rates of cerebral aneurysm formation in mice (PMID: 24739142) TNF-α is thought to play a key role in cerebral aneurysm pathology through endothelial injury, recruitment of macrophages, and other inflammatory functions (PMID: 24323710) | Decreased |
| HCC-4 | Human beta (CC) chemokine-4 | A chemokine activity that promotes chemotaxis of monocytes and lymphocytes (PMID: 16226254) | HCC-4 promotes p38-a pro-inflammatory transcription factor-activation in human osteogenic sarcoma cells (PMID: 16226254) Tumor immunogenicity increased by HCC-4 (PMID: 10706711) | Decreased |
| IL-11 | Interleukin-11 | IL-11 has anti-inflammatory effects and can decrease levels of pro-inflammatory cytokines and molecules such as TNF-α (PMID: 9548510). | IL-11 demonstrates anti-inflammatory properties in murine collagen-induced arthritis (PMID: 9767454) IL-11 was found to promote proinflammatory fibroblast activation in several tissues including human kidney, lung, and skin fibroblast cultures (PMID: 36012165) | Increased |
| I-TAC (CXCL11) | Interferon-Inducible T-cell Alpha Chemoattractant | I-TAC is a chemoattractant for T-cells and helps their migration during immune responses | Elevated levels of CXCL11 and other pro-inflammatory cytokines were measured in the CSF of aSAH patients (PMID: | Decreased |

TABLE 3-continued

Unsecured vs Secured Aneurysm Detection Panel

| Abbreviation | Full Name | Function | Inflammatory Properties | Expression (vs secured) |
|---|---|---|---|---|
| | | (PMID: 9625760). | 31858408) CXCL11 was found to be a biomarker of pulmonary inflammation (PMID: 33137121) | |
| MSP-a | Macrophage Stimulating Protein | MSP is a cytokine that stimulates chemotaxis of peritoneal macrophages (PMID: 10549357). | MSP was found to increase liver inflammation in a non-alcoholic steatohepatitis model (PMID: 27685150) Inflammation in an ulcerative colitis model was reduced by upregulation of the MSP/RON pathway | Increased |
| sTNF-RI | Soluble Tumor Necrosis Factor Receptor I | sTNF-RI is a soluble form of TNF-RI that binds to TNF-alpha and can modulate inflammation (PMID: 36946374). | Asthma patients demonstrated higher levels of sTNF-RI compared to controls (PMID: 34112152) Serum levels of sTNF-RI were early indicators of the inflammatory response following surgical trauma (PMID: 124025162) | Increased |
| VEGF | Vascular Endothelial Growth Factor | VEGF is one of the most prominent signaling proteins in angiogenesis (PMID: 22866201). | VEGF levels were increased in unruptured intracranial aneruysms (PMID: 38709145) VEGF levels were increased in the aneurysm wall tissues of aneurysm patients (PMID: 32355516) VEGF inhibition was found to attenuate vasospasm and apoptosis following aSAH in a rat model (PMID: 33356024) | Increased |

TABLE 4

Anterior vs Posterior Location Detection Panel

| Abbreviation | Full Name | Function | Inflammatory Properties | Expression (vs anterior) |
|---|---|---|---|---|
| | | Anterior vs Posterior Location Profile Detection | | |
| IL-11 | Interleukin-11 | IL-11 has anti-inflammatory effects and can | IL-11 demonstrates anti-inflammatory properties in | Increased |

TABLE 4-continued

Anterior vs Posterior Location Detection Panel

| Abbreviation | Full Name | Function | Inflammatory Properties | Expression (vs anterior) |
|---|---|---|---|---|
| | | decrease levels of pro-inflammatory cytokines and molecules such as TNF-α (PMID: 9548510). | murine collagen-induced arthritis (PMID: 9767454) IL-11 was found to promote proinflammatory fibroblast activation in several tissues including human kidney, lung, and skin fibroblast cultures (PMID: 36012165) | |
| IL-12 p40 | Interleukin-12 | IL-12 regulates both innate and adaptive responses with mostly pro-inflammatory functions (PMID: 12563297) | IL-12 accelerates atherosclerosis in animal models (PMID: 10073981) IL-12 is a pro-inflammatory cytokines that bridges innate and adaptive immunity (PMID: 7612223) | Increased |
| IL-17 | Interleukin-17 | IL-17 is a critical cytokine that can orchestrate neutrophil-specific and acute phase responses (PMID: 26252407) | IL-17 promotes cerebral aneurysm rupture in estrogen deficiency mouse model (PMID: 29654199) IL-17 is a potent pro-inflammatory cytokine (PMID: 28316374) | Increased |
| Amphiregulin | Amphiregulin | Amphiregulin is a growth factor that is important for host resistance and tolerance following inflammation (PMID: 25692699) | Deficiency of amphiregulin increased inflammation and leukocyte presence in a pulmonary hypertension model (PMID: 35732465) Amphiregulin increased inducible nitric oxide synthase (iNOS) and cyclooxygenase-2 (COX-2) expression, driving inflammation in a hepatic tissue model | Increased |

As used herein, the term "biological sample" or "sample" refers to any sample of biological material obtained from a subject, e.g., a human subject, including a biological fluid, e.g., blood, plasma, serum, urine, sputum, spinal fluid, pleural fluid, nipple aspirates, lymph fluid, fluid of the respiratory, intestinal, and genitourinary tracts, tear fluid, saliva, breast milk, fluid from the lymphatic system, semen, cerebrospinal fluid, intra-organ system fluid, ascitic fluid, cyst fluid, amniotic fluid, bronchoalveolar fluid, biliary fluid, or any combinations thereof. In certain embodiments, the biological sample is a blood sample. In certain embodiments, the biological sample is a plasma sample. In certain embodiments, the biological sample is a serum sample. In certain embodiments, the biological sample is a cerebrospinal fluid sample.

Any suitable methods known in the art for measuring protein levels can be used with the presently disclosed methods. These methods include, but are not limited to, mass spectrometry techniques, 1-D or 2-D gel-based analysis systems, chromatography, enzyme linked immunosorbent assays (ELISAs), flow cytometry, radioimmunoassays (RIA), enzyme immunoassays (EIA), Western Blotting, immunoprecipitation, and immunohistochemistry. These methods use antibodies, or antibody equivalents, to detect protein. Antibody arrays or protein chips can also be employed.

ELISA and RIA procedures can be conducted such that a protein standard is labeled (with a radioisotope such as $^{125}$I or $^{35}$S, or an assayable enzyme, such as horseradish peroxidase or alkaline phosphatase), and, together with the unlabeled sample, brought into contact with the corresponding antibody, whereon a second antibody is used to bind the first, and radioactivity or the immobilized enzyme assayed (competitive assay). Alternatively, the protein can react with the corresponding immobilized antibody, radioisotope, or enzyme-labeled anti-marker antibody is allowed to react with the system, and radioactivity or the enzyme assayed (ELISA-sandwich assay). Other conventional methods can also be employed as suitable.

The above techniques can be conducted essentially as a "one-step" or "two-step" assay. A "one-step" assay involves contacting antigen with immobilized antibody and, without washing, contacting the mixture with labeled antibody. A "two-step" assay involves washing before contacting, the mixture with labeled antibody. Other conventional methods can also be employed as suitable.

In certain embodiments, the detection of a biomarker from a biological sample includes contacting the sample with an antibody or variant (e.g., fragment) thereof which selectively binds the biomarker, and detecting whether the antibody or variant thereof is bound to the sample. The method can further include contacting the sample with a second antibody, e.g., a labeled antibody. The method can further include one or more washing, e.g., to remove one or more reagents.

It can be desirable to immobilize one component of the assay system on a support, thereby allowing other components of the system to be brought into contact with the component and readily removed without laborious and time-consuming labor. It is possible for a second phase to be immobilized away from the first, but one phase is usually sufficient.

It is possible to immobilize the enzyme itself on a support, but if solid-phase enzyme is required, then this is generally best achieved by binding to antibody and affixing the antibody to a support, models, and systems for which are well-known in the art. Simple polyethylene can provide a suitable support.

Enzymes employable for labeling are not particularly limited but can be selected from the members of the oxidase group, for example. These catalyze the production of hydrogen peroxide by reaction with their substrates, and glucose oxidase is often used for its good stability, case of availability and cheapness, as well as the ready availability of its substrate (glucose). Activity of the oxidase can be assayed by measuring the concentration of hydrogen peroxide formed after reaction of the enzyme-labeled antibody with the substrate under controlled conditions well-known in the art.

Other techniques can be used to detect a protein marker according to a practitioner's preference based upon the present disclosure. One such technique is Western blotting (Towbin et al., Proc. Nat. Acad. Sci. 76:4350 (1979)), wherein a suitably treated sample is run on an SDS-PAGE gel before being transferred to a solid support, such as a nitrocellulose filter. Antibodies (unlabeled) are then brought into contact with the support and assayed by a secondary immunological reagent, such as labeled protein A or anti-immunoglobulin (suitable labels including $^{125}$I, horseradish peroxidase, and alkaline phosphatase). Chromatographic detection can also be used.

Other machine or auto imaging systems can also be used to measure immunostaining results for the marker. As used herein, "quantitative" immunohistochemistry refers to an automated method of scanning and scoring samples that have undergone immunohistochemistry, to identify and quantitate the presence of a specified marker, such as an antigen or other protein. The score given to the sample is a numerical representation of the intensity of the immunohistochemical staining of the sample and represents the amount of target marker present in the sample. As used herein, Optical Density (OD) is a numerical score that represents intensity of staining. As used herein, semi-quantitative immunohistochemistry refers to scoring of immunohistochemical results by human eye, where a trained operator ranks results numerically (e.g., as 1, 2 or 3).

Various automated sample processing, scanning, and analysis systems suitable for use with immunohistochemistry are available in the art. Such systems can include automated staining (see, e.g., the Benchmark system, Ventana Medical Systems, Inc.) and microscopic scanning, computerized image analysis, serial section comparison (to control for variation in the orientation and size of a sample), digital report generation, and archiving and tracking of samples (such as slides on which tissue sections are placed). Cellular imaging systems are commercially available that combine conventional light microscopes with digital image processing systems to perform quantitative analysis on cells and tissues, including immunostained samples.

Antibodies against biomarkers can also be used for imaging purposes, for example, to detect the presence of any of the biomarkers disclosed herein in a sample obtained from a recipient's blood. Suitable labels include radioisotopes, iodine ($^{125}$I, $^{121}$I), carbon ($^{14}$C), sulfur ($^{35}$S), tritium ($^{3}$H), indium ($^{112}$In), and technetium ($^{99}$mTc), fluorescent labels, such as fluorescein, rhodamine, and biotin. Immunoenzymatic interactions can be visualized using different enzymes such as peroxidase, alkaline phosphatase, or different chromogens such as DAB, AEC, or Fast Red.

Antibodies for use in the present disclosure include any antibody, whether natural or synthetic, full length or a fragment thereof, monoclonal, or polyclonal, that binds sufficiently strongly and specifically to the marker to be detected. An antibody can have a $K_d$ of at most about $10^{-6}$M, $10^{-7}$M, $10^{-8}$M, $10^{-9}$M, $10^{-10}$M, $10^{-11}$M, $10^{-12}$M. The phrase "specifically binds" refers to binding of, for example, an antibody to an epitope or antigen or antigenic determinant in such a manner that binding can be displaced or competed with a second preparation of identical or similar epitope, antigen, or antigenic determinant.

Antibodies and derivatives thereof that can be used encompasses polyclonal or monoclonal antibodies, chimeric, human, humanized, primatized (CDR-grafted), veneered or single-chain antibodies, phase produced antibodies (e.g., from phage display libraries), as well as functional binding fragments, of antibodies. For example, antibody fragments capable of binding to a marker, or portions thereof, including, but not limited to Fv, Fab, Fab' and F(ab')2 fragments can be used. Such fragments can be produced by enzymatic cleavage or by recombinant techniques. For example, papain or pepsin cleavage can generate Fab or F(ab')2 fragments, respectively. Other proteases with the requisite substrate specificity can also be used to generate Fab or F(ab')2 fragments. Antibodies can also be produced in a variety of truncated forms using antibody genes in which one or more stop codons have been introduced upstream of the natural stop site. For example, a chimeric gene encoding a F(ab')2 heavy chain portion can be designed to include DNA sequences encoding the CH, domain and hinge region of the heavy chain. In certain embodiments, the antibodies can be conjugated to quantum dots.

In addition, a biomarker can be detected using Mass Spectrometry such as MALDI/TOF (time-of-flight), SELDI/TOF, liquid chromatography-mass spectrometry (LC-MS), gas chromatography-mass spectrometry (GC-MS), high performance liquid chromatography-mass spectrometry (HPLC-MS), capillary electrophoresis-mass spectrometry, nuclear magnetic resonance spectrometry, or tandem mass spectrometry (e.g., MS/MS, MS/MS/MS, ESI-MS/MS, etc.). See, for example, U.S. Patent Application Nos: 2003/0199001, 2003/0134304, 2003/0077616, which are herein incorporated by reference.

Mass spectrometry methods are well known in the art and have been used to detect biomolecules, such as proteins (see, e.g., Li et al. (2000) Tibtech 18:151-160; Rowley et al. (2000) Methods 20:383-397; and Kuster and Mann (1998) Curr. Opin. Structural Biol. 8:393-400). Further, mass spectrometric techniques have been developed that permit at least partial de novo sequencing of isolated proteins. Chait et al., Science 262:89-92 (1993); Keough et al., Proc. Natl. Acad. Sci. USA. 96:7131-6 (1999); reviewed in Bergman, EXS 88:133-44 (2000).

In certain embodiments, a gas phase ion spectrophotometer can be used. In other embodiments, laser-desorption/ionization mass spectrometry is used to analyze the sample. Modem laser desorption/ionization mass spectrometry ("LDI-MS") can be practiced in two main variations: matrix assisted laser desorption/ionization ("MALDI") mass spectrometry and surface-enhanced laser desorption/ionization ("SELDI"). In MALDI, the analyte is mixed with a solution containing a matrix, and a drop of the liquid is placed on the surface of a substrate. The matrix solution then co-crystallizes with the biological molecules. The substrate is inserted into the mass spectrometer. Laser energy is directed to the substrate surface where it desorbs and ionizes the biological molecules without significantly fragmenting them. However, MALDI has limitations as an analytical tool. It does not provide means for fractionating the sample, and the matrix material can interfere with detection, especially for low molecular weight analytes. See, e.g., U.S. Pat. No. 5,118,937 (Hillenkamp et al.), and U.S. Pat. No. 5,045,694 (Beavis & Chait).

For additional information regarding mass spectrometers, see, e.g., Principles of Instrumental Analysis, 3rd edition. Skoog, Saunders College Publishing, Philadelphia, 1985; and Kirk-Othmer Encyclopedia of Chemical Technology, 4th ed. Vol. 15 (John Wiley & Sons, New York 1995), pp. 1071-1094.

Detection of the presence of a marker or other substances can involve detection of signal intensity. This, in turn, can reflect the quantity and character of a polypeptide bound to the substrate. For example, in certain embodiments, the signal strength of peak values from spectra of a first sample and a second sample can be compared (e.g., visually, by computer analysis etc.), to determine the relative amounts of a particular marker. Software programs such as the Biomarker Wizard program (Ciphergen Biosystems, Inc., Fremont, Calif.) can be used to aid in analyzing mass spectra. The mass spectrometers and their techniques are well known to those of skill in the art.

Any person skilled in the art understands, the components of a mass spectrometer (e.g., desorption source, mass analyzer, detect, etc.) and varied sample preparations can be combined with other suitable components or preparations described herein, or to those known in the art. For example, in certain embodiments, a control sample can contain heavy atoms (e.g., $^{13}C$) thereby permitting the test sample to be mixed with the known control sample in the same mass spectrometry run.

In certain embodiments, a laser desorption time-of-flight (TOF) mass spectrometer is used. In laser desorption mass spectrometry, a substrate with a bound marker is introduced into an inlet system. The marker is desorbed and ionized into the gas phase by laser from the ionization source. The ions generated are collected by an ion optic assembly, and then in a time-of-flight mass analyzer, ions are accelerated through a short high voltage field and let drift into a high vacuum chamber. At the far end of the high vacuum chamber, the accelerated ions strike a sensitive detector surface at a different time. Since the time-of-flight is a function of the mass of the ions, the elapsed time between ion formation and ion detector impact can be used to identify the presence or absence of molecules of specific mass to charge ratio.

2.1. Methods for Identifying a Subject Having an Aneurysm.

In certain embodiments, the present disclosure provides methods for identifying a subject having an aneurysm. In certain embodiments, the present disclosure also provides methods for identifying a subject at risk of developing an aneurysm.

In certain embodiments, the methods include measuring an expression level of a Eotaxin-1 (CCL11) biomarker. In certain embodiments, an increased expression level of a Eotaxin-1 (CCL11) biomarker relative to a first reference sample indicates that the subject has or is at risk of developing an aneurysm.

In certain embodiments, the methods include measuring an expression level of a TARC (CCL17) biomarker. In certain embodiments, an increased expression level of a TARC (CCL17) biomarker relative to a first reference sample indicates that the subject has or is at risk of developing an aneurysm.

In certain embodiments, the methods include measuring an expression level of an MSP-a biomarker. In certain embodiments, an increased expression level of an MSP-a biomarker relative to a first reference sample indicates that the subject has or is at risk of developing an aneurysm.

In certain embodiments, the methods include measuring an expression level of an HCC-4 biomarker. In certain embodiments, an increased expression level of an HCC-4 biomarker relative to a first reference sample indicates that the subject has or is at risk of developing an aneurysm.

In certain embodiments, the methods include measuring an expression level of a VEGF-D biomarker. In certain embodiments, an increased expression level of a VEGF-D biomarker relative to a first reference sample indicates that the subject has or is at risk of developing an aneurysm.

In certain embodiments, the methods include measuring an expression level of a PLGF biomarker. In certain embodiments, an increased expression level of a PLGF biomarker relative to a first reference sample indicates that the subject has or is at risk of developing an aneurysm.

In certain embodiments, the methods include measuring an expression level of a MCP-1 (CCL2) biomarker. In certain embodiments, an increased expression level of a MCP-1 biomarker relative to a first reference sample indicates that the subject has or is at risk of developing an aneurysm.

In certain embodiments, the methods include measuring an expression level of a Amphiregulin biomarker. In certain embodiments, an increased expression level of a Amphiregulin biomarker relative to a first reference sample indicates that the subject has or is at risk of developing an aneurysm.

In certain embodiments, the methods include measuring an expression level of a ENA-78 (CXCL5) biomarker. In certain embodiments, an increased expression level of a ENA-78 (CXCL5) biomarker relative to a first reference sample indicates that the subject has or is at risk of developing an aneurysm.

In certain embodiments, the methods include measuring an expression level of a Lymphotactin (XCL1) biomarker. In certain embodiments, an increased expression level of a Lymphotactin (XCL1) biomarker relative to a first reference sample indicates that the subject has or is at risk of developing an aneurysm.

In certain embodiments, the methods include measuring an expression level of an IL-6 biomarker. In certain embodiments, an increased expression level of an IL-6 biomarker relative to a first reference sample indicates that the subject has or is at risk of developing an aneurysm.

In certain embodiments, the methods include measuring an expression level of a TRAIL-R3 biomarker. In certain embodiments, an increased expression level of a TRAIL-R3 biomarker relative to a first reference sample indicates that the subject has or is at risk of developing an aneurysm.

In certain embodiments, the methods include measuring an expression level of a Dtk (TYRO3) biomarker. In certain embodiments, an increased expression level of a Dtk (TYRO3) biomarker relative to a first reference sample indicates that the subject has or is at risk of developing an aneurysm.

In certain embodiments, the methods include measuring an expression level of an IGFBP-1 biomarker. In certain embodiments, an increased expression level of an IGFBP-1 biomarker relative to a first reference sample indicates that the subject has or is at risk of developing an aneurysm.

In certain embodiments, the methods include measuring an expression level of a MIF biomarker. In certain embodiments, an increased expression level of a MIF biomarker relative to a first reference sample indicates that the subject has or is at risk of developing an aneurysm.

In certain embodiments, the methods include measuring an expression level of an IL-8 biomarker. In certain embodiments, an increased expression level of an IL-8 biomarker relative to a first reference sample indicates that the subject has or is at risk of developing an aneurysm.

In certain embodiments, the methods include measuring an expression level of a EGF biomarker. In certain embodiments, an increased expression level of a EGF biomarker relative to a first reference sample indicates that the subject has or is at risk of developing an aneurysm.

In certain embodiments, the methods include measuring an expression level of a uPAR biomarker. In certain embodiments, an increased expression level of a uPAR biomarker relative to a first reference sample indicates that the subject has or is at risk of developing an aneurysm.

In certain embodiments, the methods include measuring an expression level of a CXCL7/NAP-2 biomarker. In certain embodiments, an increased expression level of a CXCL7/NAP-2 biomarker relative to a first reference sample indicates that the subject has or is at risk of developing an aneurysm.

In certain embodiments, the methods include measuring an expression level of a G-CSF biomarker. In certain embodiments, an increased expression level of a G-CSF biomarker relative to a first reference sample indicates that the subject has or is at risk of developing an aneurysm.

In certain embodiments, the methods include measuring an expression level of an Axl biomarker. In certain embodiments, an increased expression level of an Axl biomarker relative to a first reference sample indicates that the subject has or is at risk of developing an aneurysm.

In certain embodiments, the methods include measuring an expression level of a Flt-3 Ligand biomarker. In certain embodiments, an increased expression level of a Flt-3 Ligand biomarker relative to a first reference sample indicates that the subject has or is at risk of developing an aneurysm.

In certain embodiments, the methods include measuring an expression level of a TRAIL-R4 biomarker. In certain embodiments, an increased expression level of a TRAIL-R4 biomarker relative to a first reference sample indicates that the subject has or is at risk of developing an aneurysm.

In certain embodiments, the methods include measuring an expression level of a BDNF biomarker. In certain embodiments, a decreased expression level of a BDNF biomarker relative to a first reference sample indicates that the subject has or is at risk of developing an aneurysm.

In certain embodiments, the methods include measuring an expression level of a CNTF biomarker. In certain embodiments, a decreased expression level of a CNTF biomarker relative to a first reference sample indicates that the subject has or is at risk of developing an aneurysm.

In certain embodiments, the methods include measuring an expression level of an IL-7 biomarker. In certain embodiments, a decreased expression level of an IL-7 biomarker relative to a first reference sample indicates that the subject has or is at risk of developing an aneurysm.

In certain embodiments, the methods include measuring an expression level of a Acrp30 (Adiponectin) biomarker. In certain embodiments, a decreased expression level of a Acrp30 (Adiponectin) biomarker relative to a first reference sample indicates that the subject has or is at risk of developing an aneurysm.

In certain embodiments, the methods include measuring an expression level of a MIP-1β (CCL4) biomarker. In certain embodiments, a decreased expression level of a MIP-1β (CCL4) biomarker relative to a first reference sample indicates that the subject has or is at risk of developing an aneurysm.

As used herein, the term "first reference sample" refers to a control for a biomarker that is to be detected in a biological sample of a subject without aneurysm. In certain embodiments, a reference sample can be the level of a biomarker detected in a healthy individual that has never had an aneurysm. In certain embodiments, a reference sample can be the level of a biomarker detected in a cohort of healthy individuals that have never had an aneurysm. In certain embodiments, the first reference sample can be a predetermined level of a biomarker that indicates the absence of an aneurysm in a subject.

In certain embodiments, the methods further include measuring an expression level of one of more biomarkers. In certain embodiments, the one or more biomarkers are selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof.

In certain embodiments, an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, or a combination thereof relative to a first reference sample indicates that the subject has or is at risk of developing an aneurysm. In certain embodiments, a decreased expression level of one or more biomarkers selected from BDNF, CNTF, IL-7, Acrp30 (Adiponectin), MIP-1β (CCL4), or a combination thereof relative to a first reference sample indicates that the subject has or is at risk of developing an aneurysm. In certain embodiments, (a) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, or a combination thereof relative to a first reference sample indicates that the subject has or is at risk of developing an aneurysm; and (b) a decreased expression level of one or more biomarkers selected from BDNF, CNTF, IL-7, Acrp30 (Adiponectin), MIP-1β (CCL4), or a combination thereof relative to a first reference sample indicates that the subject has or is at risk of developing an aneurysm.

2.2. Methods for Identifying a Subject Having an Aneurysm Rupture

In certain embodiments, the present disclosure provides methods for identifying a subject having an aneurysm rupture. In certain embodiments, the present disclosure also provides methods for identifying a subject at risk of aneurysm rupture.

In certain embodiments, the methods include measuring an expression level of an MSP-a biomarker. In certain embodiments, an increased expression level of an MSP-a biomarker relative to a second reference sample indicates that the subject has or is at risk of rupture of an aneurysm.

In certain embodiments, the methods include measuring an expression level of an IL-10 biomarker. In certain embodiments, an increased expression level of an IL-10 biomarker relative to a second reference sample indicates that the subject has or is at risk of rupture of an aneurysm.

In certain embodiments, the methods include measuring an expression level of a uPAR biomarker. In certain embodiments, an increased expression level of a uPAR biomarker relative to a second reference sample indicates that the subject has or is at risk of rupture of an aneurysm.

In certain embodiments, the methods include measuring an expression level of a Flt-3 Ligand biomarker. In certain embodiments, a decreased expression level of a Flt-3 Ligand biomarker relative to a second reference sample indicates that the subject has or is at risk of rupture of an aneurysm.

In certain embodiments, the methods include measuring an expression level of a MIP-3 β (CCL19) biomarker. In certain embodiments, a decreased expression level of a MIP-3 β (CCL19) biomarker relative to a second reference sample indicates that the subject has or is at risk of rupture of an aneurysm.

As used herein, the term "second reference sample" refers to a control for a biomarker that is to be detected in a biological sample of a subject that has an unruptured aneurysm. In certain embodiments, a second reference sample can be the level of a biomarker detected in a cohort of individuals that have an unruptured aneurysm. In certain embodiments, the second reference sample can be a predetermined level of a biomarker that indicates the presence of an unruptured aneurysm in a subject.

In certain embodiments, the methods further include measuring an expression level of one of more biomarkers. In certain embodiments, the one or more biomarkers are selected from MSP-a, IL-10, uPAR, Flt-3 Ligand, MIP-3 β (CCL19), or a combination thereof.

In certain embodiments, an increased expression level of one or more biomarkers selected from MSP-a, IL-10, uPAR, or a combination thereof relative to a second reference sample indicates that the subject has or is at risk of rupture of an aneurysm. In certain embodiments, a decreased expression level of one or more biomarkers selected from Flt-3 Ligand, MIP-3 β (CCL19), or a combination thereof relative to a second reference sample indicates that the subject has or is at risk of rupture of an aneurysm. In certain embodiments, (a) an increased expression level of one or more biomarkers selected from MSP-a, IL-10, uPAR, or a combination thereof relative to a second reference sample indicates that the subject has or is at risk of rupture of an aneurysm; and (b) a decreased expression level of one or more biomarkers selected from Flt-3 Ligand, MIP-3 β (CCL19), or a combination thereof relative to a second reference sample indicates that the subject has or is at risk of rupture of an aneurysm.

2.3. Methods for Identifying a Subject Having an Unsecured Aneurysm

In certain embodiments, the present disclosure provides methods for identifying a subject having an unsecured aneurysm. In certain embodiments, the present disclosure also provides methods for identifying a subject at risk of unsecured aneurysm.

In certain embodiments, the methods include measuring an expression level of an Eotaxin-2 (CCL24) biomarker. In certain embodiments, an increased expression level of an Eotaxin-2 (CCL24) biomarker relative to a third reference sample indicates that the subject has or is at risk of unsecured aneurysm.

In certain embodiments, the methods include measuring an expression level of an MCP-1 biomarker. In certain embodiments, an increased expression level of an MCP-1 biomarker relative to a third reference sample indicates that the subject has or is at risk of unsecured aneurysm.

In certain embodiments, the methods include measuring an expression level of an IL-11 biomarker. In certain embodiments, an increased expression level of an IL-11 biomarker relative to a third reference sample indicates that the subject has or is at risk of unsecured aneurysm.

In certain embodiments, the methods include measuring an expression level of an MSP-a biomarker. In certain embodiments, an increased expression level of an MSP-a biomarker relative to a third reference sample indicates that the subject has or is at risk of unsecured aneurysm.

In certain embodiments, the methods include measuring an expression level of an sTNF-RI biomarker. In certain embodiments, an increased expression level of an sTNF-RI biomarker relative to a third reference sample indicates that the subject has or is at risk of unsecured aneurysm.

In certain embodiments, the methods include measuring an expression level of a VEGF biomarker. In certain embodiments, an increased expression level of a VEGF biomarker relative to a third reference sample indicates that the subject has or is at risk of unsecured aneurysm.

In certain embodiments, the methods include measuring an expression level of an IL-10 biomarker. In certain embodiments, a decreased expression level of an IL-10 biomarker relative to a third reference sample indicates that the subject has or is at risk of unsecured aneurysm.

In certain embodiments, the methods include measuring an expression level of an IL-15 biomarker. In certain embodiments, a decreased expression level of an IL-15 biomarker relative to a third reference sample indicates that the subject has or is at risk of unsecured aneurysm.

In certain embodiments, the methods include measuring an expression level of a PDGF-BB biomarker. In certain embodiments, a decreased expression level of a PDGF-BB biomarker relative to a third reference sample indicates that the subject has or is at risk of unsecured aneurysm.

In certain embodiments, the methods include measuring an expression level of a TNF-α biomarker. In certain embodiments, a decreased expression level of a TNF-α biomarker relative to a third reference sample indicates that the subject has or is at risk of unsecured aneurysm.

In certain embodiments, the methods include measuring an expression level of an HCC-4 biomarker. In certain embodiments, a decreased expression level of an HCC-4 biomarker relative to a third reference sample indicates that the subject has or is at risk of unsecured aneurysm.

In certain embodiments, the methods include measuring an expression level of a I-TAC (CXCL11) biomarker. In certain embodiments, a decreased expression level of a I-TAC (CXCL11) biomarker relative to a third reference sample indicates that the subject has or is at risk of unsecured aneurysm.

As used herein, the term "third reference sample" refers to a control for a biomarker that is to be detected in a biological sample of a subject that has a secured aneurysm. In certain embodiments, a third reference sample can be the level of a biomarker detected in a cohort of individuals that have a secured aneurysm. In certain embodiments, the third reference sample can be a predetermined level of a biomarker that indicates the presence of a secured aneurysm in a subject.

In certain embodiments, the methods further include measuring an expression level of one of more biomarkers. In certain embodiments, the one or more biomarkers are selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof.

In certain embodiments, an increased expression level of one or more biomarkers selected from Eotaxin-2 (CCL24), MCP-1 (CCL2), IL-11, MSP-a, sTNF-RI, VEGF, or a combination thereof relative to a third reference sample indicates that the subject has or is at risk of unsecured aneurysm. In certain embodiments, a decreased expression level of one or more biomarkers selected from IL-10, IL-15, PDGF-BB, TNF-α, HCC-4, I-TAC (CXCL11), or a combination thereof relative to a second reference sample indicates that the subject has or is at risk of unsecured aneurysm. In certain embodiments, (a) an increased expression level of one or more biomarkers selected from Eotaxin-2 (CCL24), MCP-1 (CCL2), IL-11, MSP-a, sTNF-RI, VEGF, or a combination thereof relative to a second reference sample indicates that the subject has or is at risk of unsecured aneurysm; and (b) a decreased expression level of one or more biomarkers selected from IL-10, IL-15, PDGF-BB, TNF-α, HCC-4, I-TAC (CXCL11), or a combination thereof relative to a second reference sample indicates that the subject has or is at risk of unsecured aneurysm.

2.4. Methods for Identifying a Subject Having an Anterior Aneurysm

In certain embodiments, the present disclosure provides methods for identifying a subject having an anterior aneurysm. In certain embodiments, the present disclosure also provides methods for identifying a subject at risk of anterior aneurysm.

In certain embodiments, the methods include measuring an expression level of an IL-11 biomarker. In certain embodiments, an increased expression level of an IL-11 biomarker relative to a fourth reference sample indicates that the subject has or is at risk of anterior aneurysm.

In certain embodiments, the methods include measuring an expression level of an IL-12 p40 biomarker. In certain embodiments, an increased expression level of an IL-12 p40 biomarker relative to a fourth reference sample indicates that the subject has or is at risk of anterior aneurysm.

In certain embodiments, the methods include measuring an expression level of an IL-17 biomarker. In certain embodiments, an increased expression level of an IL-17 biomarker relative to a fourth reference sample indicates that the subject has or is at risk of anterior aneurysm.

In certain embodiments, the methods include measuring an expression level of an Amphiregulin biomarker. In certain embodiments, an increased expression level of an Amphiregulin biomarker relative to a fourth reference sample indicates that the subject has or is at risk of anterior aneurysm.

As used herein, the term "fourth reference sample" refers to a control for a biomarker that is to be detected in a biological sample of a subject that has a posterior aneurysm. In certain embodiments, a fourth reference sample can be the level of a biomarker detected in a cohort of individuals that have a posterior aneurysm. In certain embodiments, the fourth reference sample can be a predetermined level of a biomarker that indicates the presence of a posterior aneurysm in a subject.

A "posterior aneurysm" is a cerebral aneurysm anatomically located in the posterior circulation of the brain. Posterior circulation aneurysms arise from the vertebral artery, basilar artery, or any of their branches. An "anterior aneurysm" is a cerebral aneurysm anatomically located in the anterior circulation of the brain. Anterior circulation aneurysms arise from the internal carotid artery or any of its branches.

In certain embodiments, the methods further include measuring an expression level of one of more biomarkers. In certain embodiments, the one or more biomarkers are selected from IL-11, IL-12 p40, IL-17, Amphiregulin, or a combination thereof.

In certain embodiments, an increased expression level of one or more biomarkers selected from IL-11, IL-12 p40, IL-17, Amphiregulin, or a combination thereof relative to a fourth reference sample indicates that the subject has or is at risk of unsecured aneurysm.

3. Web-based and/or Mobile-based Software

In certain embodiments, the present disclosure provides a web-based and/or mobile-based software to properly assign risk stratification and need for surgery for patients with known cerebral aneurysms. The software can be implemented by one or more statistical packages (e.g., R statistical package). The software leverages one or more of biomarkers (e.g., disclosed in Section 2), patient demographics, and co-morbidities to properly assign (a) presence or risk of developing an aneurysm, (b) presence or risk of aneurysm rupture, (c) presence or risk of unsecured aneurysm, and/or (d) presence of an anterior aneurysm or a posterior aneurysm on individual basis.

Figure 17:
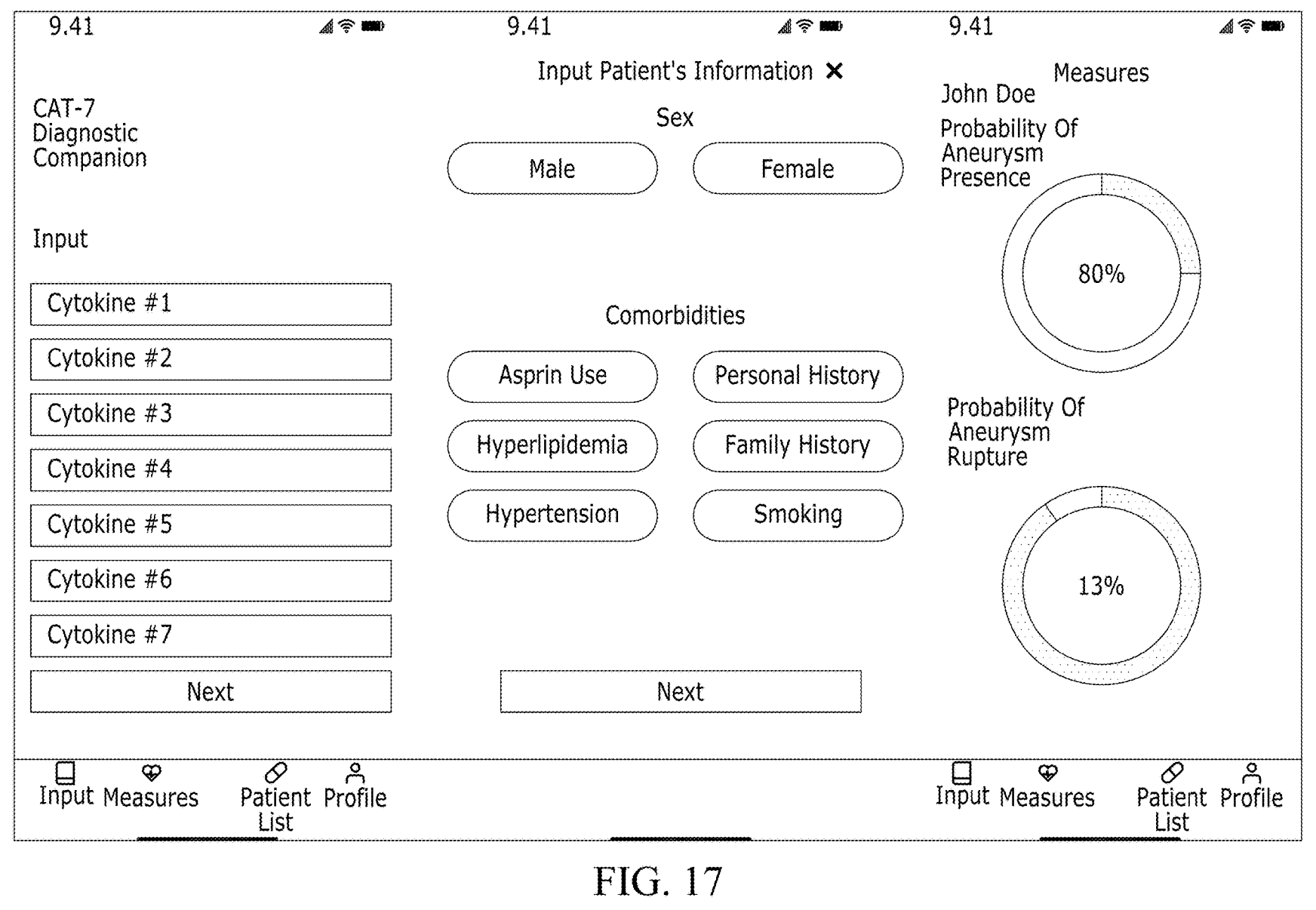

FIG. 17 shows a user interface of the software for inputting biomarkers associated with the patient. A user, e.g., a practitioner, can select the "input" function displayed at the bottom of the user interface to start the inputting process. As an example and not by way of limitation, the inputting process may start with inputting one or more cytokines, as shown in FIG. 17. The user can input one or more biomarkers selected Acrp30 (Adiponectin), Amphiregulin, Axl, BDNF, CNTF, CXCL7/NAP-2, Dtk (TYRO3), EGF, ENA-78 (CXCL5), Eotaxin-1 (CCL11), Eotaxin-2 (CCL24), Flt-3 Ligand, G-CSF, HCC-4, IGFBP-1, IL-10, IL-11, IL-12 p40, IL-15, IL-17, IL-6, IL-7, IL-8, I-TAC (CXCL11), Lymphotactin (XCL1), MCP-1 (CCL2), MIF, MIP-1β (CCL4), MIP-3 β (CCL19), MSP-a, PDGF-BB, PLGF, STNF-RI, TARC (CCL17), TNF-α, TRAIL-R3, TRAIL-R4, uPAR, VEGF, VEGF-D, or any combination thereof. The user can select the "measure" function displayed at the bottom of the user interface to get various measures associated with aneurysm status of a patient (e.g., presence/absence, anterior/posterior, rupture, secured, etc.). The user can select the "patient list" function displayed at the bottom of the user interface to see the patients whom the user has a record of within the software. The user can additionally select the "profile" function displayed at the bottom of the user interface to see the user's profile registered with the software (e.g., settings). After inputting the biomarkers, the user can select "next" for inputting additional information of the patient.

FIG. 17 shows an exemplary user interface of the software for inputting the patient's information. The user can input the patient's additional information such as sex and comorbidities, as shown in FIG. 17. For example, the user selected the patient's sex as male. As another example, the user selected the patient's comorbidities including use of medications (e.g., aspirin), family history, and hypertension. After inputting such additional information, the user can select "next" for inputting more information.

A user interface of the software can be used for inputting the patient's additional information. For example, the user can input the patient's white blood cells count (WBC), platelet count, and neutrophil/lymphocyte ratio. After inputting all the required information, the user can enter them by selecting "enter."

Once the required information is entered into the software, the software can determine various measures for the patients regarding aneurysm status. For example, the software can determine (a) presence or risk of developing an aneurysm, (b) presence or risk of aneurysm rupture, (c) presence or risk of unsecured aneurysm, and/or (d) presence of an anterior aneurysm or a posterior aneurysm. In certain embodiments, the software uses a diagnostic test to determine the probability of a patient harboring an aneurysm as well as their risk of potential catastrophic rupture.

Although the present disclosure describes using particular models to determine probabilities of aneurysm presence and aneurysm rupture in particular manners, this disclosure contemplates using any suitable model to determine probabilities of aneurysm presence and aneurysm rupture in any suitable manner. As an example and not by way of limitation, the model may be a machine-learning model based on one or more of a convolutional neural network, a support vector machine (SVM), or a regression model. The machine-learning model may be trained based on training data collected from a plurality of subjects (e.g., patients). The training data may comprise information (e.g., cytokines) associated with the subjects and corresponding indications of aneurysm presence and/or aneurysm rupture. As a result, when inputting a new subject's information to the machine-learning model, the machine-learning model is able to predict the probabilities of aneurysm presence and aneurysm rupture for the new subject.

In certain embodiments, one or more computer systems perform one or more steps of one or more methods described or illustrated herein. In certain embodiments, one or more computer systems provide functionality described or illustrated herein. In certain embodiments, software running on one or more computer systems performs one or more steps of one or more methods described or illustrated herein or provides functionality described or illustrated herein. Herein, reference to a computer system may encompass a computing device, and vice versa, where appropriate. Moreover, reference to a computer system can encompass one or more computer systems, where appropriate.

This disclosure contemplates any suitable number of computer systems. This disclosure contemplates computer system taking any suitable physical form. As example and not by way of limitation, computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system may include one or more computer systems; be unitary or distributed; span multiple locations; span multiple machines; span multiple data centers; or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

In certain embodiments, a processor includes hardware for executing instructions, such as those making up a computer program. As an example and not by way of limitation, to execute instructions, a processor may retrieve (or fetch) the instructions from an internal register, an internal cache, a memory, or a storage; decode and execute them; and then write one or more results to an internal register, an internal cache, a memory, or a storage. In certain embodiments, a processor may include one or more internal caches for data, instructions, or addresses. This disclosure contemplates a processor including any suitable number of any suitable internal caches, where appropriate. As an example and not by way of limitation, a processor may include one or more instruction caches, one or more data caches, and one or more translation lookaside buffers (TLBs). Instructions in the instruction caches may be copies of instructions in a memory or a storage, and the instruction caches may speed up retrieval of those instructions by a processor. Data in the data caches may be copies of data in a memory or a storage for instructions executing at a processor to operate on; the results of previous instructions executed at a processor for access by subsequent instructions executing at a processor or for writing to a memory or a storage; or other suitable data. The data caches may speed up read or write operations by processor. The TLBs may speed up virtual-address translation for processor. In particular embodiments, processor may include one or more internal registers for data, instructions, or addresses. This disclosure contemplates processor including any suitable number of any suitable internal registers, where appropriate. Where appropriate, processor may include one or more arithmetic logic units (ALUs); be a multi-core processor; or include one or more processors. Although this disclosure describes and illustrates a particular processor, this disclosure contemplates any suitable processor.

In particular embodiments, memory includes main memory for storing instructions for processor to execute or data for processor to operate on. As an example and not by way of limitation, computer system may load instructions from storage or another source (such as, for example, another computer system) to memory. Processor may then load the instructions from memory to an internal register or internal cache. To execute the instructions, processor may retrieve the instructions from the internal register or internal cache and decode them. During or after execution of the instructions, processor may write one or more results (which may be intermediate or final results) to the internal register or internal cache. Processor may then write one or more of those results to memory. In particular embodiments, processor executes only instructions in one or more internal registers or internal caches or in memory (as opposed to storage or elsewhere) and operates only on data in one or more internal registers or internal caches or in memory (as opposed to storage or elsewhere). One or more memory buses (which may each include an address bus and a data bus) may couple processor to memory. Bus may include one or more memory buses, as described below. In particular embodiments, one or more memory management units (MMUs) reside between processor and memory and facilitate accesses to memory requested by processor. In particular embodiments, memory includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory may include one or more memories, where appropriate. Although this disclosure describes and illustrates particular memory, this disclosure contemplates any suitable memory.

In particular embodiments, storage includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage may include one or more storage control units facilitating communication between processor and storage, where appropriate. Where appropriate, storage may include one or more storages. Although this disclosure describes and illustrates particular storage, this disclosure contemplates any suitable storage.

In particular embodiments, I/O interface includes hardware, software, or both, providing one or more interfaces for communication between computer system and one or more I/O devices. Computer system may include one or more of these I/O devices, where appropriate. One or more of these I/O devices may enable communication between a person and computer system. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces for them. Where appropriate, I/O interface may include one or more device or software drivers enabling processor to drive one or more of these I/O devices. I/O interface may include one or more I/O interfaces, where appropriate. Although this disclosure describes and illustrates a particular I/O interface, this disclosure contemplates any suitable I/O interface.

In particular embodiments, communication interface includes hardware, software, or both providing one or more interfaces for communication (such as, for example, packet-based communication) between computer system and one or more other computer systems or one or more networks. As an example and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, computer system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system may include any suitable communication interface for any of these networks, where appropriate. Communication interface may include one or more communication interfaces, where appropriate. Although this disclosure describes and illustrates a particular communication interface, this disclosure contemplates any suitable communication interface.

In particular embodiments, bus includes hardware, software, or both coupling components of computer system to each other. As an example and not by way of limitation, bus may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate

4. Methods of Treatment

The present disclosure relates to methods for preventing and/or treating an aneurysm in a subject.

Aneurysms are excessive localized enlargements of an artery caused by a weakening of the artery wall. The balloon-like bulges have an increased risk of rupture as they increase in size, besides being a potential site for thrombosis and the eventual formation of an embolism. Aneurysms may be the result of a hereditary condition or a later acquired disease. Three particularly lethal types of aneurysms upon rupture are abdominal aortic aneurysm (AAA), thoracic aortic aneurysm (TAA), and cerebral aneurysm (CA). The present disclosure provides methods for preventing and/or treating a cerebral aneurysm.

Cerebral aneurysms (CA) affect about 5 percent of the population and occur when the wall of a blood vessel in the brain becomes weakened and bulges or balloons out. Pre-rupture treatments are generally limited to surgical clipping or endovascular coiling or a flow diverter can be used to seal off an unruptured brain aneurysm and help prevent a future rupture. However, in some unruptured aneurysms, the known risks of the procedures may outweigh the potential benefit.

Cerebral aneurysms are usually found at the base of the brain just inside the skull, in an area called the subarachnoid space. Rupture of these cerebral aneurysms results in bleeding into the space around the brain and is often referred to as subarachnoid hemorrhage (SAH). This kind of hemorrhage can lead to a stroke, coma, and/or death.

Initially, the dysfunctional endothelium secretes neutrophil chemoattractants such as IL-8/CXCL1. Platelets adhere to damaged endothelium, aggregate, and secrete CXCL7 attracting neutrophils via CXCR1/2. The increase in endothelial COX-2 products with the co-current decrease in nitric oxide leads to pro-inflammatory smooth muscle cells, which also attracts macrophages via MCP-1. Neutrophils cause a shift in macrophage phenotype from pro-wound healing M2 phenotype towards pro-inflammatory M1 phenotype. This results in local tissue destruction, aneurysm formation, progression, and eventual rupture. The therapy with GPIIb/IIIa antagonists prevents platelet aggregation, CXCL7 release, and neutrophil infiltration. CXCR1/2 antagonists would allow for a more downstream blockade of effects resulting from platelet activation as well as endothelial cell activation.

In certain non-limiting embodiments, the present disclosure provides for a method of preventing and/or treating aneurysms in a subject. For example, but not by way of limitation, the present disclosure provides a method for preventing and/or treating a cerebral aneurysm in a subject. In certain embodiments, the method can include administering a therapeutically effective amount of an aneurysm inhibitor to the subject.

An "aneurysm inhibitor," as used herein, can be any molecule, compound, chemical, or composition that has an anti-aneurysm effect and is provided and/or administered in addition to the platelet inhibitors described herein. Aneurysm inhibitors include, but are not limited to, platelet inhibitors, anti-inflammatory, anti-NF-κB inhibitors, calcium channel blockers, protease inhibitors, metalloproteinase inhibitors, mast cell degranulation inhibitors, free radical scavengers, and mineralocorticoid receptor antagonists. Non-limiting examples of secondary aneurysm inhibitors include simvastatin, pravastatin, pitavastatin, valsartan, candesartan, olmesartan, nifedipine, imidapril, ibudilast, celecoxib, tranilast, fasudil, eplerenone, tetracycline, and aspirin. In certain embodiments, the aneurysm inhibitor can be aspirin.

In certain embodiments, administration of the aneurysm inhibitor to the subject has an anti-aneurysm effect or therapeutic benefit. An "anti-aneurysm effect" or "therapeutic benefit" as used herein, refers to one or more of a reduction in aggregate platelet, a reduction in development of an aneurysm, a reduction of growth of an aneurysm, and/or a reduction of rupture of an aneurysm.

In certain embodiments, administration of the aneurysm inhibitor inhibits the development, growth, and/or rupture of an aneurysm in a subject. In certain embodiments, the subject was known to have an aneurysm prior to treatment. In certain non-limiting embodiments, the subject was not known to have an aneurysm prior to treatment.

In certain embodiments, the present disclosure provides methods for reducing the risk of a subject that had an aneurysm from developing new aneurysms, which can include administering a therapeutically effective amount of an aneurysm inhibitor to the subject.

In certain non-limiting embodiments, the present disclosure provides for a method of preventing the growth and rupture of aneurysms, e.g., cerebral aneurysms, in a subject. In certain embodiments, the method includes administering a therapeutically effective amount of an aneurysm inhibitor to the subject. In certain embodiments, preventing an aneurysm includes inhibiting and/or preventing the aggregation of platelets in the endothelium of a subject.

In certain embodiments, an aneurysm inhibitor can be administered to a subject at a dose of about 0.05 mg/kg to about 100 mg/kg. In certain embodiments, a subject can be administered up to about 2,000 mg of the aneurysm inhibitor in a single dose or as a total daily dose. For example, but not by way of limitation, a subject can be administered up to about 1,950 mg, up to about 1,900 mg, up to about 1,850 mg, up to about 1,800 mg, up to about 1,750 mg, up to about 1,700 mg, up to about 1,650 mg, up to about 1,600 mg, up to about 1,550 mg, up to about 1,500 mg, up to about 1,450 mg, up to about 1,400 mg, up to about 1,350 mg, up to about 1,300 mg, up to about 1,250 mg, up to about 1,200 mg, up to about 1,150 mg, up to about 1,100 mg, up to about 1,050 mg, up to about 1,000 mg, up to about 950 mg, up to about 900 mg, up to about 850 mg, up to about 800 mg, up to about 750 mg, up to about 700 mg, up to about 650 mg, up to about 600 mg, up to about 550 mg, up to about 500 mg, up to about 450 mg, up to about 400 mg, up to about 350 mg, up to about 300 mg, up to about 250 mg, up to about 200 mg, up to about 150 mg, up to about 100 mg, up to about 50 mg or up to about 25 mg of the aneurysm inhibitor in a single dose or as a total daily dose. In certain embodiments, the subject can be administered from about 50 to about 1,000 mg of the aneurysm inhibitor in a single dose or a total daily dose. In certain embodiments, a subject can be administered about 1,000 mg of the aneurysm inhibitor, e.g., clopidogrel, in a single dose or as a total daily dose. In certain embodiments, a subject can be administered about 25 mg or more of the aneurysm inhibitor, e.g., clopidogrel, in a single dose or as a total daily dose. In certain embodiments, a subject can be administered about 1,000 mg of the aneurysm inhibitor, e.g., reparixin, in a single dose or as a total daily dose. In certain embodiments, a subject can be administered about 25 mg or more of the aneurysm inhibitor, e.g., reparixin, in a single dose or as a total daily dose.

It is to be understood that, for any particular subject, specific dosage regimes should be adjusted over time according to the individual need and the professional judgment of the person administering or supervising the administration of the aneurysm inhibitor. For example, the dosage of the aneurysm inhibitor can be increased if the lower dose does not provide sufficient activity in the treatment of a disease or condition described herein (e.g., cerebral aneurysm). Alternatively, the dosage of the composition can be decreased if the disease (e.g., cerebral aneurysm) is reduced, no longer detectable, or eliminated.

In certain embodiments, the aneurysm inhibitor can be administered once a day, twice a day, once a week, twice a week, three times a week, four times a week, five times a week, six times a week, once every two weeks, once a month, twice a month, once every other month or once every third month. In certain embodiments, the aneurysm inhibitor can be administered twice a week. In certain embodiments, the aneurysm inhibitor can be administered once a week. In certain embodiments, the aneurysm inhibitor can be administered two times a week for about four weeks and then administered once a week for the remaining duration of the treatment. In certain embodiments, a subject can be administered up to about 1,000 mg of the aneurysm inhibitor in a single dose or as a total daily dose two times a week.

In certain embodiments, the period of treatment can be at least one day, at least one week, at least one month, at least two months, at least three months, at least four months, at least five months, or at least six months. In certain embodiments, the aneurysm inhibitor can be administered until the aneurysm is no longer detectable.

In certain embodiments, the aneurysm inhibitor can be administered to a subject by any route known in the art. In certain embodiments, the aneurysm inhibitor can be administered parenterally. In certain embodiments, the aneurysm inhibitor can be administered orally, intravenously, intraarterially, intrathecally, intranasally, subcutaneously, intramuscularly, and rectally. In certain embodiments, the aneurysm inhibitor can be administered intrathecally. For example, but not by way of limitation, the present disclosure provides methods for the prevention and/or treatment of aneurysm in a subject, e.g., having cerebral aneurysm, by intrathecal administration of an aneurysm inhibitor.

In certain embodiments, one or more aneurysm inhibitors can be used alone or in combination with one or more secondary aneurysm inhibitors. For example, but not by way of limitation, methods of the present disclosure can include administering one or more aneurysm inhibitors. "In combination with," as used herein, means that the aneurysm inhibitor and a secondary aneurysm inhibitor are administered to a subject as part of a treatment regimen or plan. In certain embodiments, being used in combination does not require that the aneurysm inhibitor and the secondary aneurysm inhibitor are physically combined prior to administration, administered by the same route or that they be administered over the same time frame.

In certain non-limiting embodiments, the present disclosure further provides pharmaceutical formulations of aneurysm inhibitors for therapeutic use. In certain embodiments, the pharmaceutical formulation includes an aneurysm inhibitor and a pharmaceutically acceptable carrier. "Pharmaceutically acceptable," as used herein, includes any carrier which does not interfere with the effectiveness of the biological activity of the active ingredients, e.g., aneurysm inhibitor, and that is not toxic to the patient to whom it is administered. Non-limiting examples of suitable pharmaceutical carriers include phosphate-buffered saline solutions, water, emulsions, such as oil/water emulsions, various types of wetting agents, and sterile solutions. Additional non-limiting examples of pharmaceutically acceptable carriers can include gels, bioabsorbable matrix materials, implantation elements containing the inhibitor, and/or any other suitable vehicle, delivery, or dispensing means or material. Such carriers can be formulated by conventional methods and can be administered to the subject.

In certain embodiments, the pharmaceutical formulations of the present disclosure include stereoisomers, enantiomers, diastereomers, or racemates of the aneurysm inhibitors. The aneurysm inhibitors disclosed herein can contain one or more asymmetric centers and can thus give rise to enantiomers, diastereomers, and other stereoisomeric forms that can be defined, in terms of absolute stereochemistry, as (R)- or(S)-. In certain embodiments, the pharmaceutical formulation of the present disclosure includes all possible isomers, including racemic mixtures, optically pure forms, and intermediate mixtures. Optically active (R)- and(S)-isomers can be prepared using chiral synthons or chiral reagents or resolved using conventional techniques. If the aneurysm inhibitor contains a double bond, the substituent can be E or Z configuration. If the compound contains a disubstituted cycloalkyl, the cycloalkyl substituent can have a cis- or trans-configuration. All tautomeric forms are also intended to be included.

In certain embodiments, the pharmaceutical formulations of the present disclosure can be formulated using pharmaceutically acceptable carriers well known in the art that are suitable for parenteral administration, e.g., intravenous administration, intraarterial administration, intrathecal administration, intranasal administration, intramuscular administration, subcutaneous administration, and intracisternal administration. In certain embodiments, the pharmaceutical formulation is formulated for intrathecal administration. For example, but not by way of limitation, the pharmaceutical formulation can be formulated as solutions, suspensions, or emulsions.

In certain non-limiting embodiments, the pharmaceutical formulations of the present disclosure can be formulated using pharmaceutically acceptable carriers well known in the art that are suitable for oral administration. Such carriers enable the pharmaceutical compositions to be formulated as tablets, pills, capsules, liquids, gels, syrups, slurries, suspensions, and the like, for oral ingestion by a patient to be treated. In certain embodiments, the pharmaceutical formulation can be a solid dosage form.

In certain embodiments, the pharmaceutical formulation can be formulated to release the aneurysm inhibitor immediately upon administration. Alternatively, the pharmaceutical formulation can be formulated to release the aneurysm inhibitor at any predetermined time or time period after administration. Such types of compositions are generally known as controlled release formulations, which include (i) formulations that create substantially constant concentrations of the aneurysm inhibitor within the subject over an extended period of time; (ii) formulations that after a predetermined lag time create substantially constant concentrations of the aneurysm inhibitor within the subject over an extended period of time; (iii) formulations that sustain the aneurysm inhibitor's action during a predetermined time period by maintaining a relatively constant, effective level of the aneurysm inhibitor in the body with concomitant minimization of undesirable side effects; (iv) formulations that localize action of aneurysm inhibitor, e.g., spatial placement of a controlled release composition adjacent to or in the disease, e.g., endothelial cells, platelet cells; (v) formulations that achieve convenience of dosing, e.g., administering the composition once per week or once every two weeks; and (vi) formulations that target the action of the aneurysm inhibitor by using carriers or chemical derivatives to deliver the aneurysm inhibitor to a particular target cell type or a particular target tissue type. In certain embodiments, controlled release is obtained by appropriate selection of various formulation parameters and ingredients, including, e.g., various types of controlled release compositions and coatings. For example, but not by way of limitation, the aneurysm inhibitor can be formulated with appropriate excipients into a pharmaceutical formulation that, upon administration, releases the aneurysm inhibitor in a controlled manner, e.g., oil solutions, suspensions, emulsions, microcapsules, molecular complexes, microspheres, nanoparticles, patches, and liposomes.

In certain embodiments, the pharmaceutical formulations suitable for use in the present disclosure can include formulations where the aneurysm inhibitors are contained in a therapeutically effective amount. A "therapeutically effective amount" refers to an amount that is able to prevent and/or reduce the development, growth, and rupture of an aneurysm. The therapeutically effective amount of an active ingredient can vary depending on the active ingredient, e.g., aneurysm inhibitor, formulation used, the anatomical location of the aneurysm and its severity, and the age, weight, etc., of the subject to be treated. In certain embodiments, a patient can receive a therapeutically effective amount of an aneurysm inhibitor as a single dose or multiple administrations of two or more doses, which can depend on the dosage and frequency as required and tolerated by the patient. In certain embodiments, the provided methods involve administering the compositions at effective amounts, e.g., therapeutically effective amounts.

In certain non-limiting embodiments, the present disclosure provides a method of treating a subject having an aneurysm that includes diagnosing aneurysm in the subject and then treating the subject with an aneurysm inhibitor. In certain embodiments, the method for diagnosing aneurysms includes determining the levels of a biomarker, as disclosed in Section 2 above.

In certain embodiments, the method for diagnosing aneurysms includes performing magnetic resonance imaging (MRI) of the brain or abdomen, magnetic resonance angiography (MRA), computed tomography angiography scan (CTA scan), angiogram, or cerebrospinal fluid test. Additional methods for diagnosing aneurysm are disclosed in Calero and Illig, *Semin Vasc Surg*. 2016; 29(1-2):3-17, the contents of which are incorporated by reference herein.

4.1. Platelet Inhibitors

In certain embodiments, the present disclosure provides methods for preventing and/or treating an aneurysm in a subject by inhibiting the platelet activation and aggregation in the subject. In certain embodiments, the aneurysm inhibitor is a platelet inhibitor. A platelet inhibitor can be a molecule, e.g., chemical compound, that inhibits the process of platelet formation. A platelet inhibitor can be a molecule, e.g., chemical compound, that inhibits the process of platelet activation. A platelet inhibitor can be a molecule, e.g., chemical compound, that inhibits thrombus formation. A platelet inhibitor can reversibly or irreversibly inhibit the process involved in platelet activation resulting in decreased tendency of platelets to adhere to one another and to damaged blood vessels' endothelium.

Non-limiting examples of platelet inhibitors for use in the present disclosure include irreversible cyclooxygenase inhibitors (e.g., aspirin), adenosine diphosphate (ADP) receptor inhibitors (e.g., ticlopidine), phosphodiesterase inhibitors (e.g., vorapaxar), inhibitors of glycoprotein IIB/IIIA (e.g., abciximab), adenosine reuptake inhibitors, thromboxane inhibitors, thromboxane synthase inhibitors, thromboxane receptor antagonists, terutroban, salts thereof, or derivatives thereof. Additional examples of platelet inhibitors for use in the present disclosure include, without any limitation, interfering ribonucleic acids (e.g., siRNA, shRNA), antibodies, aptamers, or peptidomimetics.

In certain embodiments, the platelet inhibitor for use in the present disclosure is an inhibitor of glycoprotein IIB/IIIA (GPIIB/IIIA). GPIIB/IIIA is a receptor on the platelet surface that undergoes a conformational change upon activation of the platelet allowing it to bind plasma fibrinogen. Because multiple GPIIB/IIIA molecules from different platelets can bind the same fibrinogen molecule, this facilitates platelet aggregation at sites of vascular injury. By preventing the GPIIB/IIIA molecule from interacting with fibrinogen these inhibitors consequently interfere with the process of platelet aggregation.

Non-limiting examples of inhibitors of glycoprotein IIB/IIIA for use in the present disclosure include abciximab, eptifibatide, tirofiban, lefradafiban, fredabin, lamifiban, clopidogrel, orbofiban, roxifiban, sibrafiban, xemilofiban, ticlopidine, ticagrelor, prasugrel, LM-609, resveratrol, ferric cation, levothyroxine, YM-57029, YM128, a non-peptide mimetic of the tetrapeptide RGDF, a peptide mimetic of the tetrapeptide RGDF, salts thereof, or derivatives thereof. In certain embodiments, the inhibitor of glycoprotein IIB/IIIA is clopidogrel, a salt thereof or a derivative thereof.

In certain embodiments, the inhibitor of glycoprotein IIB/IIIA has the following formula:

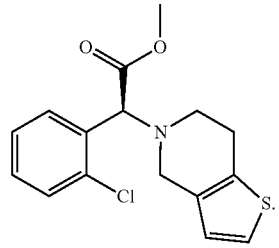 [SMILES: COC(=O)[C@H](c1ccccc1Cl)N1CCc2sccc2C1]

In certain embodiments, the platelet inhibitor for use in the present disclosure inhibits the platelet-driven CXCL7-CXCR1/2 pathway. CXCL7 is a small cytokine belonging to the chemokine family and binds CXCR1 and CXCR2 receptors. CXCL7 exerts its function by activating the CXCR1 and/or CXCR2 and binding sulfated glycosaminoglycans (GAGs) that regulate receptor activity and is released by platelets upon their activation. Upon activation, both CXCR1 and CXCR2 transfer the signal into the cell which results in platelet dysfunction and aneurysm growth. By preventing the interaction of CXCL7 with its receptors and by inhibiting the activity of the CXCR1 and/or CXCR2, these inhibitors consequently interfere with the process of aneurysm development and growth.

In certain embodiments, the platelet inhibitor for use in the present disclosure is an inhibitor of the chemokine (C-X-C motif) ligand 7 (CXCL7). In certain embodiments, the inhibitor of CXCL7 is ethanesulfonic acid. In certain embodiments, the inhibitor of CXCL7 is an antibody anti-CXCL7, or a fragment thereof. In certain embodiments, the antibody can be monoclonal. In certain embodiments, the antibody can be polyclonal. In certain embodiments, the antibody can be humanized. Non-limiting examples of antibodies anti-CXCL7 are disclosed in International Patent Application Nos. PCT/US2011/024123 and PCT/EP2014/060201, which are incorporated herein by reference in their entireties.

In certain embodiments, the platelet inhibitor for use in the present disclosure is an inhibitor of the C-X-C chemokine receptor type 1 (CXCR1). In certain embodiments, the platelet inhibitor for use in the present disclosure is an inhibitor of the C-X-C chemokine receptor type 2 (CXCR2). In certain embodiments, the platelet inhibitor for use in the present disclosure is an inhibitor of CXCR1 and CXCR2. Non-limiting examples of inhibitors of CXCR1 and CXCR2 for use in the present disclosure include SX-682, AZD5069, AZD8797, QBM076, reparixin, SCH-527123, danirixin, navarixin, ladarixin, SB225002, nicotinamide N-oxide, UNBS5162, CXCR2-IN-1, SRT3109, SCH563705, SRT3190, SB265610, elubrixin, SB332235, carydalmine, salts thereof or derivatives thereof. In certain embodiments, the inhibitor of CXCR1 and CXCR2 is reparixin, a salt thereof, or a derivative thereof. In certain embodiments, the inhibitor of CXCR1 and CXCR2 has the following formula:

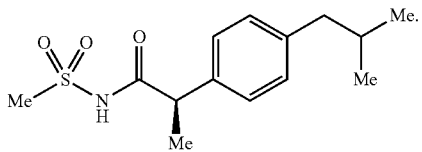 [SMILES: CC(C)Cc1ccc([C@@H](C)C(=O)NS(C)(=O)=O)cc1]

In certain embodiments, the platelet inhibitor for use in the present disclosure is a nucleic acid targeting a protein regulating the platelet-driven CXCL7-CXCR1/2 pathway. In certain embodiments, the nucleic acid targets CXCL7. In certain embodiments, the nucleic acid targets CXCR1 receptor. In certain embodiments, the nucleic acid targets CXCR2 receptor. Non-limiting examples of nucleic acids for use in the present disclosure include siRNAs and shRNAs. siRNA molecules are polynucleotides that are generally about 20 to about 25 nucleotides long and are designed to bind specific RNA sequence (e.g., CXCR1 mRNA or CXCR2 mRNA). siRNAs silence gene expression in a sequence-specific manner, binding to a target RNA (e.g., an RNA having the complementary sequence) and causing the RNA to be degraded by endoribonucleases. siRNA molecules able to inhibit the expression of the CXCR1 or CXCR2 can be produced by suitable methods. There are several algorithms that can be used to design siRNA molecules that bind the sequence of a gene of interest (see e.g., Huesken et al., *Nat. Biotechnol.* 23:995-1001; Jagla et al., *RNA* 11:864-872, 2005; Shabalinea, BMC Bioinformatics 7:65, 2005). Additionally or alternatively, expression vectors expressing siRNA or shRNA can be used (see e.g., Brummelkamp, *Science* 296:550-553, 2002; Lee et al., *Nature Biotechnol.* 20:500-505, 2002; Elbashir et al., *Nature* 411:494-498, 2001).

In certain embodiments, the platelet inhibitor for use in the present disclosure is a ribozyme that inhibits the expression of CXCR1 and/or CXCR2. Ribozymes are RNA molecules possessing enzymatic activity. One class of ribozymes is capable of repeatedly cleaving other separate RNA molecules into two or more pieces in a nucleotide base sequence specific manner (see Kim et al., *Proc Natl Acad Sci USA,* 84:8788 (1987); Haseloff & Gerlach, *Nature,* 334:585 (1988); and Jefferies et al., *Nucleic Acid Res,* 17:1371 (1989). Such ribozymes typically have two functional domains: a catalytic domain and a binding sequence that guides the binding of ribozymes to a target RNA through complementary base-pairing. Once a specifically-designed ribozyme is bound to a target mRNA, it enzymatically cleaves the target mRNA, reducing its stability and destroying its ability to directly translate an encoded protein. Methods for selecting a ribozyme target sequence and designing and making ribozymes are generally known in the art.

In certain embodiments, the platelet inhibitor for use in the present disclosure is a gene-editing system that inhibits the expression of CXCR1 and/or CXCR2. Non-limiting examples of gene-editing systems for use in the present disclosure include transcription activator-like effector nucleases (TALENs), zinc-finger nucleases, meganuclease, clustered regularly interspaced short palindromic repeat-associated proteins (CRISPR/Cas9), DNA-repair proteins, DNA-modification proteins, and DNA methyltransferases. Details on the gene-editing systems for use in the present disclosure can be found in Adli et al., *Nat Commun.* 2018 May 15; 9(1):1911 and Macder & Gersbach, *Mol Ther.* 2016 March; 24(3):430-46, the content of each of which is incorporated by reference in its entirety.

5. Kits

The present disclosure further provides kits for diagnosing an aneurysm. The present disclosure further provides for diagnosing the rupture of an aneurysm. In certain embodiments, the kits are configured for detecting a level of a biomarker, e.g., using a detector. Non-limiting exemplary of said biomarkers and methods can be found in Section 2.

Non-limiting examples of detectors that can be used with the presently disclosed kits include antibodies for immuno-detection of the biomarker to be identified, oligonucleotide primers suitable for polymerase chain reaction (PCR), or nucleic acid sequencing; nucleic acid probes suitable for in situ hybridization or fluorescent in situ hybridization.

The present disclosure provides kits for treating a subject having or suspected to have an aneurysm. In certain embodiments, the kits include an effective amount of an aneurysm inhibitor or a pharmaceutical composition including said inhibitor in unit dosage form. Non-limiting exemplary of said aneurysm inhibitors and methods of use can be found in Section 3. In certain embodiments, the kits include a sterile container that contains the agents or the genetic engineering system; such containers can be boxes, ampules, bottles, vials, tubes, bags, pouches, blister-packs, or other suitable container forms known in the art. Such containers can be made of plastic, glass, laminated paper, metal foil, or other materials suitable for holding medicaments.

In certain embodiments, the kits include instructions for administering an aneurysm inhibitor to a subject having or suspected to have an aneurysm. The instructions can include information about the use of the aneurysm inhibitor or pharmaceutical composition for treating the aneurysm. In certain embodiments, the instructions include at least one of the following: description of the aneurysm inhibitor; dosage schedule and administration for treating the aneurysm; precautions; warnings; indications; counter-indications; over dosage information; adverse reactions; animal pharmacology; clinical studies; and/or references. The instructions can be printed directly on the container (when present), or as a label applied to the container, or as a separate sheet, pamphlet, card, or folder supplied in or with the container.

In certain embodiments, the kit further includes instructions or supporting material that describe the use of the kit to diagnose an aneurysm and/or reference to a website or publication describing the same. In certain embodiments, the kit further includes instructions or supporting material that describe the use of the kit to diagnose the risk of rupture of an aneurysm and/or reference to a website or publication describing the same.

6. Exemplary Embodiments

In certain non-limiting embodiments, the present disclosure related to a method for treating a subject having or at risk of developing an aneurysm, the method comprising: (a) measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; and (b) administering an effective amount of an aneurysm inhibitor to the subject.

In certain non-limiting embodiments of the methods disclosed herein, an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has or is at risk of developing an aneurysm.

In certain non-limiting embodiments of the methods disclosed herein, a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm.

In certain non-limiting embodiments, the present disclosure related to a method for treating a subject having or at risk of having an aneurysm rupture, the method comprising: (a) measuring, in a biological sample of the subject, an expression level of one or more biomarkers selected from MSP-a, IL-10, uPAR, Flt-3 Ligand, MIP-3 β (CCL19), or a combination thereof; and (b) administering an effective amount of an aneurysm inhibitor to the subject.

In certain non-limiting embodiments of the methods disclosed herein, the subject is known to have or suspected to have an aneurysm.

In certain non-limiting embodiments, the present disclosure related to a method for treating a subject having or at risk of having an aneurysm rupture, the method comprising: (a) identifying the subject as having an aneurysm by the method of any one of embodiments 1-3; (b) measuring, in a biological sample of the subject, an expression level of one or more biomarkers selected from MSP-a, IL-10, uPAR, Flt-3 Ligand, MIP-3 β (CCL19), or a combination thereof; and (c) administering an effective amount of an aneurysm inhibitor to the subject.

In certain non-limiting embodiments of the methods disclosed herein, an increased expression level of one or more biomarkers selected from MSP-a, IL-10, or uPAR relative to a second reference sample indicates that the subject has or is at risk of rupture of an aneurysm.

In certain non-limiting embodiments of the methods disclosed herein, a decreased expression level of Flt-3 Ligand and/or MIP-3 β (CCL19) relative to a second reference sample indicates that the subject has or is at risk of rupture of an aneurysm.

In certain non-limiting embodiments, the present disclosure related to a method for treating a subject having or at risk of having an unsecured aneurysm, the method comprising: (a) measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof; and (b) administering an effective amount of an aneurysm inhibitor to the subject.

In certain non-limiting embodiments of the methods disclosed herein, the subject is known to have or suspected to have an aneurysm.

In certain non-limiting embodiments, the present disclosure related to a method for treating a subject having or at risk of having an unsecured aneurysm, the method comprising: (a) identifying the subject as having an aneurysm by the method of any one of embodiments 1-3; (b) measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof; and (c) administering an effective amount of an aneurysm inhibitor to the subject.

In certain non-limiting embodiments of the methods disclosed herein, an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of an unsecured aneurysm.

In certain non-limiting embodiments of the methods disclosed herein, a decreased expression level of one or more biomarkers selected from IL-10, IL-15, PDGF-BB, TNF-α, HCC-4, or I-TAC (CXCL11) relative to a third reference sample indicates that the subject has or is at risk of an unsecured aneurysm.

In certain non-limiting embodiments, the present disclosure related to a method for treating a subject having an aneurysm, comprising: (a) measuring, in a biological sample of the subject, an expression level of one or more biomarkers selected from IL-11, IL-12 p40, IL-17, Amphiregulin, or a combination thereof; (b) identifying the subject as having an anterior aneurysm or posterior aneurysm; and (c) administering an effective amount of an aneurysm inhibitor to the subject.

In certain non-limiting embodiments of the methods disclosed herein, the subject is known to have or suspected to have an aneurysm.

In certain non-limiting embodiments, the present disclosure related to a method for treating a subject having an aneurysm, comprising: (a) identifying the subject as having an aneurysm by the method of any one of embodiments 1-3. (b) measuring, in a biological sample of the subject, an expression level of one or more biomarkers selected from IL-11, IL-12 p40, IL-17, Amphiregulin, or a combination thereof; (c) identifying the subject as having an anterior aneurysm or posterior aneurysm; (d) administering an effective amount of an aneurysm inhibitor to the subject.

In certain non-limiting embodiments of the methods disclosed herein, an expression level of one or more biomarkers selected from IL-11, IL-12 p40, IL-17, or Amphiregulin relative to a fourth reference sample indicates that the subject has an anterior aneurysm.

In certain non-limiting embodiments, the present disclosure related to a method for treating a subject having or at risk of developing an aneurysm, the method comprising: (a) measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; and (b) administering an effective amount of an aneurysm inhibitor to the subject.

In certain non-limiting embodiments of the methods disclosed herein, the method further comprises measuring, in a biological sample of the subject, an expression level of one or more biomarkers selected from MSP-a, IL-10, uPAR, Flt-3 Ligand, MIP-3 β (CCL19), or a combination thereof.

In certain non-limiting embodiments of the methods disclosed herein, the method further comprises measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof.

In certain non-limiting embodiments of the methods disclosed herein, the method further comprises measuring, in a biological sample of the subject, an expression level of one or more biomarkers selected from IL-11, IL-12 p40, IL-17, Amphiregulin, or a combination thereof.

In certain non-limiting embodiments of the methods disclosed herein, (a) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has or is at risk of developing an aneurysm; (b) an increased expression level of one or more biomarkers selected from MSP-a, IL-10, or uPAR relative to a second reference sample indicates that the subject has or is at risk of rupture of an aneurysm; (c) an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of an unsecured aneurysm; and/or (d) an expression level of one or more biomarkers selected from IL-11, IL-12 p40, IL-17, or Amphiregulin relative to a fourth reference sample indicates that the subject has an anterior aneurysm.

In certain non-limiting embodiments of the methods disclosed herein, (a) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; (b) a decreased expression level of Flt-3 Ligand and/or MIP-3 β (CCL19) relative to a second reference sample indicates that the subject has or is at risk of rupture of an aneurysm; and/or (c) a decreased expression level of one or more biomarkers selected from IL-10, IL-15, PDGF-BB, TNF-α, HCC-4, or I-TAC (CXCL11) relative to a third reference sample indicates that the subject has or is at risk of an unsecured aneurysm.

In certain non-limiting embodiments of the methods disclosed herein, the aneurysm inhibitor is a platelet inhibitor.

In certain non-limiting embodiments of the methods disclosed herein, the platelet inhibitor is selected from the group consisting of a glycoprotein IIB/IIIA inhibitor, a CXCL7 inhibitor, a CXCR1/2 inhibitor, and a combination thereof.

In certain non-limiting embodiments of the methods disclosed herein, the glycoprotein IIB/IIIA inhibitor is clopidogrel, a salt thereof, or a derivative thereof.

In certain non-limiting embodiments of the methods disclosed herein, the CXCL7 inhibitor is an antibody anti-CXCL7.

In certain non-limiting embodiments of the methods disclosed herein, the CXCR1/2 inhibitor is reparixin, a salt thereof, or a derivative thereof.

In certain non-limiting embodiments of the methods disclosed herein, the method further comprises administering a therapeutically effective amount of a secondary aneurysm inhibitor.

In certain non-limiting embodiments, the present disclosure related to a method for identifying a subject having or at risk of developing an aneurysm, the method comprising measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein (a) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has or is at risk of developing an aneurysm; and/or (b) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm.

In certain non-limiting embodiments, the present disclosure related to a method for identifying a subject having or at risk of having an aneurysm rupture, the method comprising measuring, in a biological sample of the subject, an expression level of one or more biomarkers selected from MSP-a, IL-10, uPAR, Flt-3 Ligand, MIP-3 β (CCL19), or a combination thereof; wherein (a) an increased expression level of one or more biomarkers selected from MSP-a, IL-10, or uPAR relative to a second reference sample indicates that the subject has or is at risk of rupture of an aneurysm; and/or (b) a decreased expression level of Flt-3 Ligand and/or MIP-3 β (CCL19) relative to a second reference sample indicates that the subject has or is at risk of rupture of an aneurysm.

In certain non-limiting embodiments, the present disclosure related to a method for identifying a subject having or at risk of having an unsecured aneurysm, the method comprising measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof; wherein (a) an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of rupture of an unsecured aneurysm; and/or (b) a decreased expression level of one or more biomarkers selected from IL-10, IL-15, PDGF-BB, TNF-α, HCC-4, or I-TAC (CXCL11) relative to a third reference sample indicates that the subject has or is at risk of rupture of an unsecured aneurysm.

In certain non-limiting embodiments, the present disclosure related to a method for identifying a subject having an anterior aneurysm, comprising measuring, in a biological sample of the subject, an expression level of one or more biomarkers selected from IL-11, IL-12 p40, IL-17, Amphiregulin, or a combination thereof; wherein an expression level of one or more biomarkers selected from IL-11, IL-12 p40, IL-17, or Amphiregulin relative to a fourth reference sample indicates that the subject has an anterior aneurysm.

In certain non-limiting embodiments, the present disclosure related to a method for identifying a subject having or at risk of having an aneurysm rupture, the method comprising: (a) identifying the subject as having an aneurysm by measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein (i) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has an aneurysm; and/or (ii) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; and (b) identifying the subject as having an aneurysm rupture by measuring, in a biological sample of the subject, an expression level of one or more biomarkers selected from MSP-a, IL-10, uPAR, Flt-3 Ligand, MIP-3 β (CCL19), or a combination thereof; wherein (i) an increased expression level of one or more biomarkers selected from MSP-a, IL-10, or uPAR relative to a second reference sample indicates that the subject has rupture of an aneurysm; and/or (ii) a decreased expression level of Flt-3 Ligand and/or MIP-3 β (CCL19) relative to a second reference sample indicates that the subject has rupture of an aneurysm.

In certain non-limiting embodiments, the present disclosure related to a method for identifying a subject having or at risk of having an unsecured aneurysm, the method comprising: (a) identifying the subject as having an aneurysm by measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein (i) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has an aneurysm; and/or (ii) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; and (b) identifying the subject as having an aneurysm rupture by measuring, in a biological sample of the subject, an expression level of one or more biomarkers selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof; wherein (i) an increased expression level of one or more biomarkers selected from Eotaxin-2 (CCL24), MCP-1 (CCL2), IL-11, MSP-a, sTNF-RI, or VEGF relative to a third reference sample indicates that the subject has or is at risk of an unsecured aneurysm; and/or (ii) a decreased expression level of one or more biomarkers selected from IL-10, IL-15, PDGF-BB, TNF-α, HCC-4, or I-TAC (CXCL11) relative to a third reference sample indicates that the subject has or is at risk of unsecured aneurysm.

In certain non-limiting embodiments, the present disclosure related to a method for identifying a subject having an anterior aneurysm, comprising: (a) identifying the subject as having an aneurysm by measuring, in a biological sample of the subject, an expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof; wherein (i) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to a first reference sample indicates that the subject has an aneurysm; and/or (ii) a decreased expression level of one or more biomarkers selected from BDNF, CNTF, IL-7, Acrp30 (Adiponectin), or MIP-1β (CCL4) relative to a first reference sample indicates that the subject has or is at risk of developing an aneurysm; and (b) identifying the subject as having an anterior aneurysm by measuring, in a biological sample of the subject, an expression level of one or more biomarkers selected from IL-11, IL-12 p40, IL-17, Amphiregulin, or a combination thereof, wherein an increased expression level of one or more biomarkers selected from IL-11, IL-12 p40, IL-17, or Amphiregulin relative to a fourth reference sample indicates that the subject has an aneurysm.

In certain non-limiting embodiments of the methods disclosed herein, the aneurysm is a cerebral aneurysm.

In certain non-limiting embodiments of the methods disclosed herein, the biological sample is a blood sample, a serum sample, a plasma sample, or a cerebrospinal fluid sample.

In certain non-limiting embodiments of the methods disclosed herein, the biological sample is a blood sample.

In certain non-limiting embodiments, the present disclosure related to a method of identifying a subject having or at risk of developing an aneurysm by one or more computing systems, comprising: (a) receiving, from a client device via a user interface of a software executing on the client device, one or more inputs associated with the subject; (b) determining, based on one or more models, one or more measures regarding aneurysm presence and aneurysm rupture, wherein the one or more measures comprise one or more of a first probability of the subject harboring an aneurysm, a second probability of a ruptured aneurysm in the subject, or a third probability of an aneurysm with impending rupture in the subject; and (c) sending, to the client device via the user interface, instructions for presenting the one or more determined measures regarding aneurysm presence and aneurysm rupture.

In certain non-limiting embodiments, the present disclosure related to a method of identifying a subject having or at risk of developing an unsecured aneurysm by one or more computing systems, comprising: (a) receiving, from a client device via a user interface of a software executing on the client device, one or more inputs associated with the subject; (b) determining, based on one or more models, one or more measures regarding aneurysm presence and aneurysm status, wherein the one or more measures comprise one or more of a first probability of the subject harboring an aneurysm, a second probability of a secured aneurysm in the subject, or a third probability of an unsecured aneurysm in the subject; and (c) sending, to the client device via the user interface, instructions for presenting the one or more determined measures regarding aneurysm presence and aneurysm status.

In certain non-limiting embodiments, the present disclosure related to a method of identifying a subject having or at risk of an anterior aneurysm by one or more computing systems, comprising: (a) receiving, from a client device via a user interface of a software executing on the client device, one or more inputs associated with the subject; (b) determining, based on one or more models, one or more measures regarding aneurysm presence and aneurysm location, wherein the one or more measures comprise one or more of a first probability of the subject harboring an aneurysm, a second probability of a posterior aneurysm in the subject, or a third probability of an anterior aneurysm in the subject; and (c) sending, to the client device via the user interface, instructions for presenting the one or more determined measures regarding aneurysm presence and aneurysm location.

In certain non-limiting embodiments of the methods disclosed herein, the one or more inputs comprise one or more of demographic information, a co-morbidity, an aneurysm size, an aneurysm status, an aneurysm location, or a biomarker.

In certain non-limiting embodiments of the methods disclosed herein, the one or more inputs comprise one or more biomarker selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof.

In certain non-limiting embodiments of the methods disclosed herein, the one or more inputs comprise one or more biomarker selected from MSP-a, IL-10, uPAR, Flt-3 Ligand, MIP-3 β (CCL19), or a combination thereof.

In certain non-limiting embodiments of the methods disclosed herein, the one or more inputs comprise one or more biomarker selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof.

In certain non-limiting embodiments of the methods disclosed herein, the one or more inputs comprise one or more biomarker selected from IL-11, IL-12 p40, IL-17, Amphiregulin, or a combination thereof.

In certain non-limiting embodiments of the methods disclosed herein, the user interface is operable for querying aneurysm records associated with a plurality of subjects.

In certain non-limiting embodiments of the methods disclosed herein, the one or more models are generated based on one or more of retrospective human biomarker data or sample stratification.

In certain non-limiting embodiments of the methods disclosed herein, the one or models are generated based on data collected from a plurality of subjects at one or more time periods.

In certain non-limiting embodiments of the methods disclosed herein, the user interface is operable for querying the one or more measures over a particular time period.

In certain non-limiting embodiments, the present disclosure related to one or more computer-readable non-transitory storage media embodying software that is operable when executed to: (a) receive, from a client device via a user interface of a software executing on the client device, one or more inputs associated with the subject; (b) determine, based on one or more models, one or more measures regarding aneurysm presence and aneurysm rupture, wherein the one or more measures comprise one or more of a first probability of the subject harboring an aneurysm, a second probability of a ruptured aneurysm in the subject, or a third probability of an aneurysm with impending rupture in the subject; and (c) send, to the client device via the user interface, instructions for presenting the one or more determined measures regarding aneurysm presence and aneurysm rupture.

In certain non-limiting embodiments, the present disclosure related to one or more computer-readable non-transitory storage media embodying software that is operable when executed to: (a) receive, from a client device via a user interface of a software executing on the client device, one or more inputs associated with the subject; (b) determining, based on one or more models, one or more measures regarding aneurysm presence and aneurysm status, wherein the one or more measures comprise one or more of a first probability of the subject harboring an aneurysm, a second probability of a secured aneurysm in the subject, or a third probability of an unsecured aneurysm in the subject; and (c) sending, to the client device via the user interface, instructions for presenting the one or more determined measures regarding aneurysm presence and aneurysm status.

In certain non-limiting embodiments, the present disclosure related to one or more computer-readable non-transitory storage media embodying software that is operable when executed to: (a) receive, from a client device via a user interface of a software executing on the client device, one or more inputs associated with the subject; (b) determining, based on one or more models, one or more measures regarding aneurysm presence and aneurysm location, wherein the one or more measures comprise one or more of a first probability of the subject harboring an aneurysm, a second probability of a posterior aneurysm in the subject, or a third probability of an anterior aneurysm in the subject; and (c) sending, to the client device via the user interface, instructions for presenting the one or more determined measures regarding aneurysm presence and aneurysm location.

In certain non-limiting embodiments of the media disclosed herein, the one or more inputs comprise one or more of demographic information, a co-morbidity, an aneurysm size, an aneurysm status, an aneurysm location, or a biomarker.

In certain non-limiting embodiments of the media disclosed herein, the one or more inputs comprise one or more biomarker selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof.

In certain non-limiting embodiments of the media disclosed herein, the one or more inputs comprise one or more biomarker selected from MSP-a, IL-10, uPAR, Flt-3 Ligand, MIP-3 β (CCL19), or a combination thereof.

In certain non-limiting embodiments of the media disclosed herein, the one or more inputs comprise one or more biomarker selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof.

In certain non-limiting embodiments of the media disclosed herein, the one or more inputs comprise one or more biomarker selected from IL-11, IL-12 p40, IL-17, Amphiregulin, or a combination thereof.

In certain non-limiting embodiments of the media disclosed herein, the user interface is operable for querying aneurysm records associated with a plurality of subjects.

In certain non-limiting embodiments of the media disclosed herein, the one or more models are generated based on one or more of retrospective human biomarker data or sample stratification.

In certain non-limiting embodiments of the media disclosed herein, the one or models are generated based on data collected from a plurality of subjects at one or more time periods.

In certain non-limiting embodiments of the media disclosed herein, the user interface is operable for querying the one or more measures over a particular time period.

In certain non-limiting embodiments, the present disclosure related to a system comprising: one or more processors; and a non-transitory memory coupled to the processors comprising instructions executable by the processors, the processors operable when executing the instructions to: (a) receive, from a client device via a user interface of a software executing on the client device, one or more inputs associated with the subject; (b) determine, based on one or more models, one or more measures regarding aneurysm presence and aneurysm rupture, wherein the one or more measures comprise one or more of a first probability of the subject harboring an aneurysm, a second probability of an ruptured aneurysm in the subject, or a third probability of an aneurysm with impending rupture in the subject; and (c) send, to the client device via the user interface, instructions for presenting the one or more determined measures regarding aneurysm presence and aneurysm rupture.

In certain non-limiting embodiments, the present disclosure related to a system comprising: one or more processors; and a non-transitory memory coupled to the processors comprising instructions executable by the processors, the processors operable when executing the instructions to: (a) receive, from a client device via a user interface of a software executing on the client device, one or more inputs associated with the subject; (b) determining, based on one or more models, one or more measures regarding aneurysm presence and aneurysm status, wherein the one or more measures comprise one or more of a first probability of the subject harboring an aneurysm, a second probability of a secured aneurysm in the subject, or a third probability of an unsecured aneurysm in the subject; and (c) sending, to the client device via the user interface, instructions for presenting the one or more determined measures regarding aneurysm presence and aneurysm status.

In certain non-limiting embodiments, the present disclosure related to a system comprising: one or more processors; and a non-transitory memory coupled to the processors comprising instructions executable by the processors, the processors operable when executing the instructions to: (a) receive, from a client device via a user interface of a software executing on the client device, one or more inputs associated with the subject; (b) determining, based on one or more models, one or more measures regarding aneurysm presence and aneurysm location, wherein the one or more measures comprise one or more of a first probability of the subject harboring an aneurysm, a second probability of a posterior aneurysm in the subject, or a third probability of an anterior aneurysm in the subject; and (c) sending, to the client device via the user interface, instructions for presenting the one or more determined measures regarding aneurysm presence and aneurysm location.

In certain non-limiting embodiments of the system disclosed herein, the one or more inputs comprise one or more of demographic information, a co-morbidity, an aneurysm size, an aneurysm status, an aneurysm location, or a biomarker.

In certain non-limiting embodiments of the system disclosed herein, the one or more inputs comprise one or more biomarker selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, TRAIL-R4, BDNF, CNTF, IL-7, Acrp30 (Adiponectin), MIP-1β (CCL4), or a combination thereof.

In certain non-limiting embodiments of the system disclosed herein, the one or more inputs comprise one or more biomarker selected from MSP-a, IL-10, uPAR, Flt-3 Ligand, MIP-3 β (CCL19), or a combination thereof.

In certain non-limiting embodiments of the system disclosed herein, the one or more inputs comprise one or more biomarker selected from Eotaxin-2 (CCL24), MCP-1 (CCL2), IL-11, MSP-a, sTNF-RI, VEGF, IL-10, IL-15, PDGF-BB, TNF-α, HCC-4, I-TAC (CXCL11), or a combination thereof.

In certain non-limiting embodiments of the system disclosed herein, the one or more inputs comprise one or more biomarker selected from IL-11, IL-12 p40, IL-17, Amphiregulin, or a combination thereof.

In certain non-limiting embodiments of the system disclosed herein, the user interface is operable for querying aneurysm records associated with a plurality of subjects.

In certain non-limiting embodiments of the system disclosed herein, the one or more models are generated based on one or more of retrospective human biomarker data or sample stratification.

In certain non-limiting embodiments of the system disclosed herein, the one or models are generated based on data collected from a plurality of subjects at one or more time periods.

In certain non-limiting embodiments of the system disclosed herein, the user interface is operable for querying the one or more measures over a particular time period.

EXAMPLES

The presently disclosed subject matter will be better understood by reference to the following Examples, which are provided as exemplary of the invention, and not by way of limitation.

Example 1

Cerebral aneurysms affect 2-5% of the population and are believed to result due to a hemodynamic inflammatory process. In this example, dynamic circulating inflammatory profiles in patients with unruptured and ruptured cerebral aneurysms are leveraged to identify signature profiles in these pathologies. These circulating inflammatory signatures can be reliably differentiated from control patients using a mini-proteomic panel. Here, it is showed that inflammatory cytokine profiles correlate with patient outcome in a setting of rupture. Lastly, the present example shows evidence for differences in inflammatory profiles of patients with secured and unsecured cerebral aneurysms.

Introduction

Cerebral aneurysm (CA) development is a hemodynamic inflammatory process with considerable morbidity and mortality with higher prevalence in women and minorities.[1-3] CAs are focal dilations of cerebral arteries that are present in 2-5% of the general population and disproportionately affect women. Almost 95% of these vascular lesions are sporadic while the remaining 5% can be attributed to familial, infectious or traumatic causes.[4] These lesions can rupture resulting in devastating subarachnoid hemorrhage causing up to 50% mortality and morbidity. One third of patients with subarachnoid hemorrhage have multiple aneurysms. Current management relies on incidental discovery as almost 90% of aneurysms are asymptomatic and not detected until rupture or unrelated advanced cranial imaging is performed.[5] Despite significant advances in surgical management of these lesions, no blood-based test to detect CA formation exists. A simple blood test abrogating the need for frequent advanced imaging would help guide therapy and allow for treatment before rupture.

The present example addresses three major problems in diagnosing and treating cerebral aneurysms: (a) a single biomarker is not specific enough to detect cerebral aneurysms; (b) formation of cerebral aneurysms is a progressive disease with a dynamic inflammatory profile; and (c) human samples of uncertain chronicity or timing of the disease process have resulted in mixed data sets in the past.

Methods

Animals. All animal experimentation was performed under the Institutional Animal Care and Use Committee-approved protocols.

Mouse Intracranial Aneurysm Model. Murine intracranial aneurysms were created in female 8-12 week-old C57BL/6 mice (Charles River Laboratories, Wilmington, MA) using a method described previously.[6] Briefly, the left common carotid artery and the right renal artery were ligated to induce hypertension. One week later, an Alzet micro-osmotic pump model 1004 (DURECT Corp, Cupertino, CA) was implanted subdermally to deliver Angiotensin II (Bachem AG, Switzerland) at 1000 ng/kg/min; and 10 uL of 0.8% porcine elastase (Worthington Biochemical Corp, Lakewood, NJ) in normal saline was injected into the right basal cistern using stereotactic coordinates: 1.2 mm rostral of bregma, 0.7 mm lateral of midline and 5.3 mm ventral of the dorsal aspect of the skull. The animals were fed a hypertensive diet with 8% NaCl and 0.12% BAPN (TE-KLAD). Intracranial aneurysms then developed over the following 2 weeks. PBS-treated animals received 10 mL injection of phosphate buffered saline subcutaneously every two days. Control surgery animals represented controls that had performed surgeries but did not develop aneurysms. Murine carotid aneurysms were created in female 8-12 week-old C57BL/6 mice (Charles River Laboratories, Wilmington, MA) using a method described previously.[7]

Human Aneurysm Dome and Superficial Temporal Artery Specimens. Collection of human CA dome, associated superficial temporal artery specimens, and peripheral blood specimens was performed under the IRB-approved protocol and stored in patient de-identified biobank. Patients gave written informed IRB research consent. All aneurysm and artery specimens were harvested from living patients at the time of craniotomy and aneurysm clipping surgery. Artery specimens were immediately placed in RNAlater stabilization solution (Invitrogen), flash frozen at −20° C., transferred to −80° C. for 24 hrs, and then finally stored frozen in liquid nitrogen. Blood samples were immediately placed in purple-top collection tube with 10.8 mg $K_2$EDTA, transferred to −80° C. for up to 7 days, and then finally stored frozen in liquid nitrogen.

Human Peripheral Blood Specimens. Collection of human peripheral blood specimens from patients with CAs (ruptured or unruptured) as well as control patients (chiari, meningioma, abdominal aortic aneurysm, angiographically-negative SAH) was performed under the IRB-approved protocols and stored in patient de-identified biobank. Patients gave written informed IRB research consent. In case where patients were unable to provide immediate consent due to decreased level of consciousness, IRB consent was obtained from family member(s), and then the patients were re-consented at a later time once they regained capacity. All peripheral blood samples were obtained at the time of diagnostic subtraction angiography or their relevant surgery. Blood samples were immediately placed in purple-top collection tube with 10.8 mg $K_2$EDTA, transferred to −80° C. for up to 7 days, and then finally stored frozen in liquid nitrogen.

Mouse Cytokine Arrays. Raybiotech cytokine arrays C1000 (AAM-CYT-1000, Raybiotech, Peachtree Corners, GA) were used to analyze 96 cytokines in aneurysm-induced cerebral vasculature at 2 and 3 weeks (n=3 each) and compared with control animals that did not develop aneurysms (n=2). Similar approach was used to analyze 96 cytokines in the carotid aneurysm model (n=3).

Human Cytokine Arrays. Raybiotech cytokine arrays C1000 (AAH-CYT-1000, Raybiotech, Peachtree Corners, GA) were used to analyze 120 cytokines in duplicate in peripheral blood from a total of n=196 patients including n=101 unruptured aneurysms (n=2 arrays were excluded due to poor quality), n=12 ruptured aneurysms (n=1 array was excluded due to poor quality), n=62 controls, n=9 treated and secured aneurysms, and n=15 treated aneurysms with angiographic remnants. In addition, paired samples in this cohort included peripheral blood sample from aneurysm patients undergoing clipping surgery (n=8), associated aneurysmal dome tissue (n=8), and control superficial temporal arteries (n=4).

Statistical Analysis and Predictive Model Building. Initial demographic and clinical data collection, statistical analysis and raw data analysis was performed (KWN, AMM) and then de-identified data was used for modeling and testing (KWN, AAA). Visualization of heatmaps was done using Morpheus (Broad Institute). Propensity score-matching for select age-matched patient samples was performed in R statistical package (R Foundation for Statistical Computing, Vienna, Austria) (SB). Modeling and predictive test building was performed using AutoAI machine learning suite in IBM Watson Studio in Cloud Pak for Data v4.8.5 (IBM, Armonk, NY, USA). Data was split into 90% training and 10% verification cohorts. Ten-fold k-cross validation was used with 28 vectors per column, and the following fixed settings: initial model tuning iterations: 10, feature engineering iterations: 30, and final model tuning iterations: 25. Decision tree classifier, snap decision classifier, snap boosting machine classifier, and XGboost classifier were selected for pipeline derivation. Four pipelines were then generated for each classifier with or without feature optimization, feature engineering, or hyper-parameter optimization. All computation was done on IBM Cloud environment with 8 CPUs and 32 GB of RAM. Correlation matrix, principal component analysis (PCA) and k-means clustering visualization was performed using Origin Pro statistical package (OriginLab Corporation, Northampton, MA, USA).

Bootstrapping. Since a sample size of at least n=100 is required for optimal machine learning, bootstrapping was used for some analyses (as indicated). First, bootstrap resampling (Origin Pro) with 95% confidence interval was performed to generate a ten-times larger data set of sample means, standard errors and confidence intervals. Then, cytokine values were generated randomly within one- or two-standard deviations around the mean for each sample mean (as indicated). These generated sets were then used for machine learning optimization (as indicated).

Predictive Models for Cerebral Aneurysm Detection Primary Training and Validation. First, in a tier-one analysis, predictive models were generated for cerebral aneurysm detection using all 120 cytokines (n=172 patients, no age-matching, no bootstrapping). Top three pipelines with models that did not include all cytokines were then selected for a tier-two analysis in the same data set. This was done as AutoAI in IBM Watson Studio limits the number of iterations that can be performed in a single analysis. This resulted in a smaller feature selection of cytokines and greater accuracy (n=172 patients, no age-matching, no bootstrapping). Inclusion of age as a variable led to its selection with 70% importance. Therefore, features selected from the top three pipelines were used to derive models in an age-matched data set (n=100 patients, n=50 for aneurysm and control groups each). This was done to avoid using cytokines that could be associated with age-related differences. Then, these age-matched-derived selected cytokines and features were used in a tier-three analysis for deployment on both full and bootstrapped data sets. Previously treated aneurysms were excluded from this analysis.

Predictive Models for Cerebral Aneurysm Detection Secondary Validation. For the secondary verification of the developed aneurysm detection model, a separate cohort of n=24 patients (n=14 with aneurysms, n=10 control patients) was used. The top model developed in primary training-validation was locked and deployed online, and secondary cohort data was used as input to predict aneurysm presence and verified against clinical data.

Predictive Models for Ruptured Aneurysm Detection, Unsecured Aneurysm Detection, and Location Prediction. First, in a tier-one analysis, feature selection was performed on respective bootstrapped data sets. Then, in a tier-two analysis, top features were selected for training on a bootstrapped data set and validated in a full patient data set. Again, this was done as AutoAI in IBM Watson Studio limits the number of iterations that can be performed in a single analysis. Previously treated aneurysms were excluded from these analyses except when used to build models for unsecured vs secured aneurysm prediction.

Mobile Application. Provisional companion application for future patient demographic and clinical data tracking was built using FIGMA (Figma, San Francisco, CA) (AMM).

Results

Figure 7A:
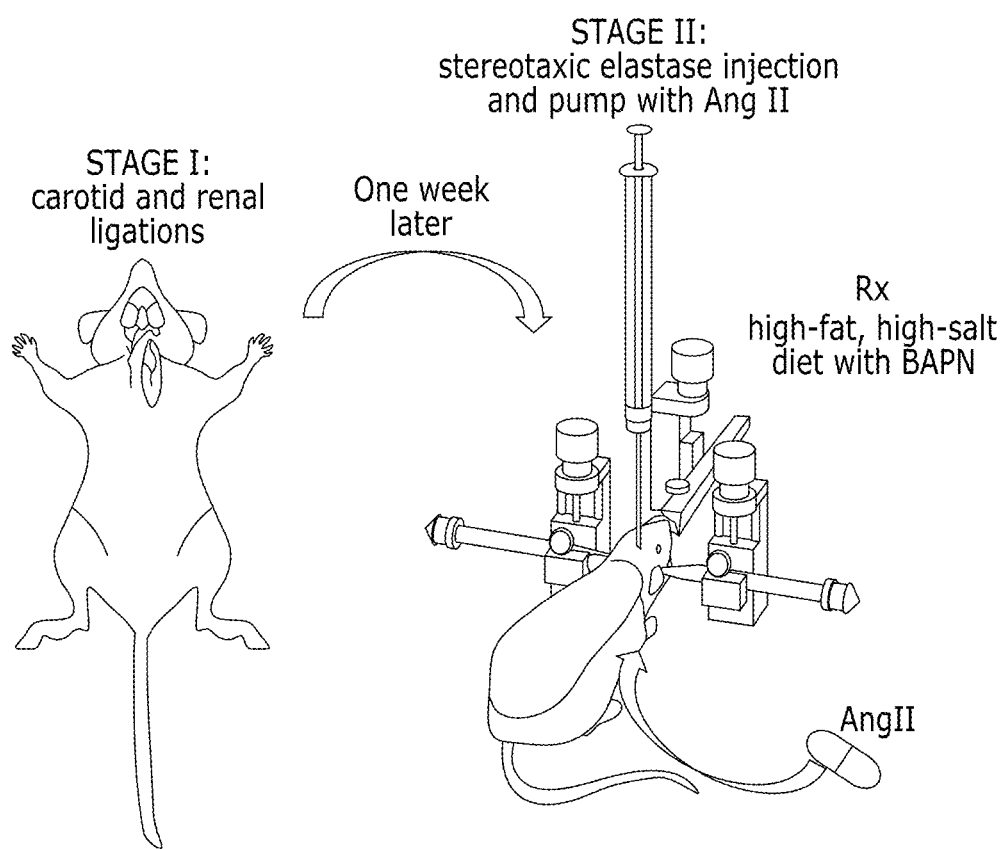
FIGS. 7A-7E illustrate temporal dynamics in the circulating inflammatory profiles in murine intracranial aneurysm model.
Figure 7B:
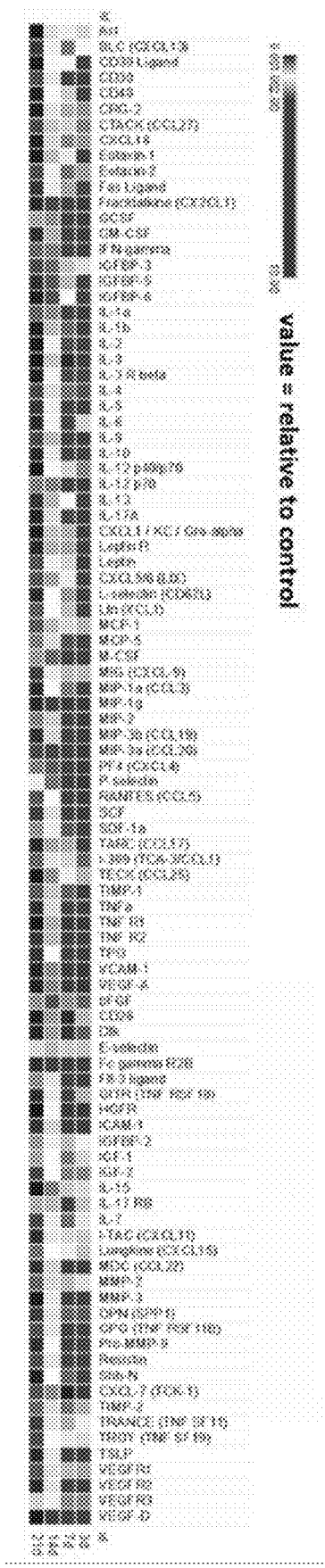
Figure 7C:
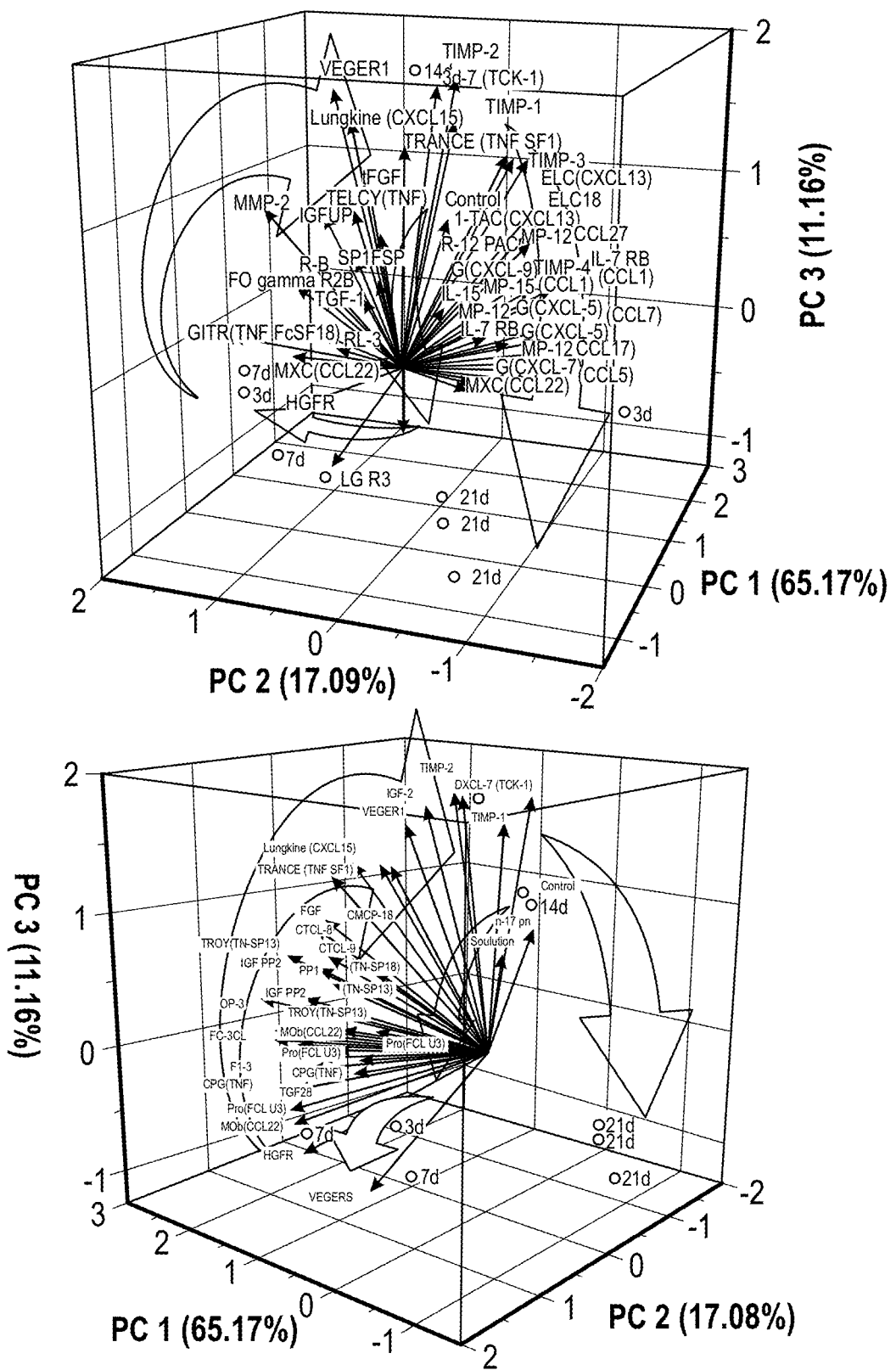

Murine Cytokine Arrays—Temporal Analysis and Comparison. Semi-quantitative analysis of 96 different cytokines using Raybiotech arrays showed differential inflammatory protein expression as early as 3 days post-induction with persistent elevation at 2 weeks and gradual decline of most cytokines at 3 weeks (FIGS. 7A-7C). Progressively increasing cytokine expression was noted for CXCL7, IL-17, and NF-kB pathway across all early timepoints. Levels of IL-8 murine homologue CXCL1, monokine induced by gamma (MIG) and macrophage inflammatory protein (MIP) families had robust response at 2 weeks that then declined at 3 weeks.

Figure 7D:
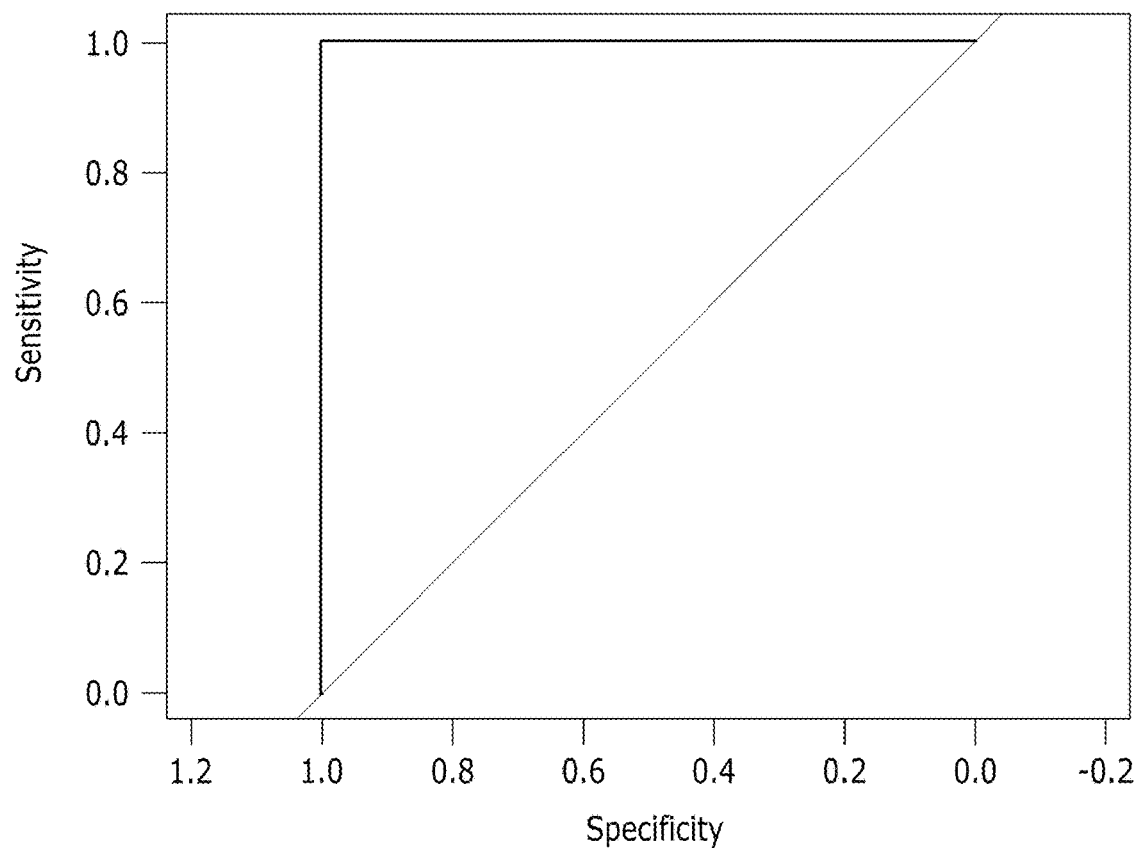
Figure 7E:
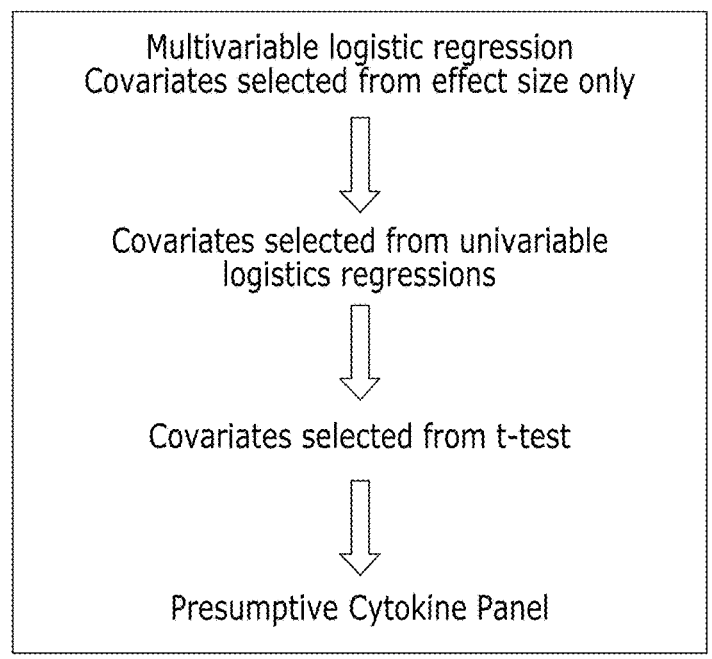

Murine Cytokine Arrays—Inflammatory Profile "Fingerprint" Modeling. Inflammatory profile "fingerprint" signatures for murine CAs at 2 and 3 weeks were created (FIGS. 7B and 7C) to obtain most differentially expressed cytokines via either absolute level or ratio. Two models for each analysis were then created by "Effects size" or "Logistic Regression" approach. Then, these models were used to predict presence of CA in known murine samples in a blinded fashion. Before feeding data into the models for prediction, samples were de-identified resulting in a test with 100% sensitivity and 100% specificity (FIG. 7D). This approach was then attempted to develop a 5-cytokine presumptive human-equivalent mini-cytokine panel as a diagnostic test to detect CA formation (FIG. 7E). Direct application of this model to human samples resulted in a model with poor group discrimination. Further development of a human-equivalent predictive model using murine data was not attempted due to requirement for larger animal sample set without any guarantee of success with this approach.

Human Study Enrollment. Full inclusion and exclusion criteria are available in Table 5. Additional demographic characteristics are available in Tables 6-8.

TABLE 5

Human Study Enrollment Criteria.

| | | Aneurysmal Population | Non-Aneurysmal Population (control I) | Non-Aneurysmal Population (control II) | Abdominal or Thoracic Aneurysm Population (control III) |
|---|---|---|---|---|---|
| Inclusion | | Age 18-80 Intent to undergo cerebral angiogram and/or | Age 18-80 Intent to undergo cerebral angiogram and/or | Age 18-80 Intent to undergo intra-cranial extra- | Age 18-80 Intent to undergo angiography or |

TABLE 5-continued

Human Study Enrollment Criteria.

| | Aneurysmal Population | Non-Aneurysmal Population (control I) | Non-Aneurysmal Population (control II) | Abdominal or Thoracic Aneurysm Population (control III) |
|---|---|---|---|---|
| | Intent to undergo surgical procedure to treat cerebral aneurysm (coil/pipeline/WEB/clipping/bypass/etc.) | Intent to undergo cerebral angiogram to rule out vascular lesion (worst headache of life, subarachnoid hemorrhage, prior known cerebral vascular lesion) | axial tumor resection and/or Intent to undergo chiari decompression | surgery to diagnose or treat an abdominal or thoracic aortic aneurysm |
| Exclusion | 1. Active wide-spread malignancy or medical condition which in the opinion of the investigator would compromise analysis. 2. Neurodegenerative disease (including but not limited to Parkinson's disease, Huntington's disease, Alzheimer's disease, Dementia) 3. Debilitating Neuropsychiatric disease (including but not limited to Schizophrenia and Bipolar Disorder; Depression is permissible) 4. Chronic Immunosuppressive state (HIV/AIDS, Transplant patient, Lupus, Rheumatoid Arthritis, or medications that might result in such state) 5. Pregnancy | | | |

TABLE 6

Secured and Unsecured Aneurysm Patient Demographics and Characteristics.

| Variable | Secured Aneurysm Patients | Unsecured Aneurysm Patients | p-value |
|---|---|---|---|
| Total Patients, n | 9 | 15 | |
| Age, median (Interquartile Range) | 58 +/− 9.5 | 61 +/− 8 | 0.40 |
| Female Sex, n (%) | 8 (89%) | 14 (93%) | >0.99 |
| Hypertension, n (%) | 7 (78%) | 11 (73%) | >0.99 |
| Diabetes, n (%) | 3 (33%) | 0 (0%) | 0.0415 |
| Coronary Artery Disease, n (%) | 0 (0%) | 0 (0%) | >0.99 |
| Current or Former Smoker, n (%) | 8 (89%) | 11 (73%) | 0.62 |
| Aspirin Use, n (%) | 9 (100%) | 11 (73%) | 0.26 |
| Plavix Use, n (%) | 4 (44%) | 6 (40%) | >0.99 |
| Size in maximum dimension (mm) at time of treatment, median (Interquartile Range) | 6.0 +/− 2.2 | 6.5 +/− 3.6 | 0.59 |
| Size in maximum dimension (mm) of recurrence, median (Interquartile Range) | 0 +/− 0 | 2.0 +/− 1.2 | <0.0001 |
| Time since treatment (mo) | 26 +/− 15.5 | 30 +/− 14.5 | 0.23 |
| Posterior circulation, n (%) | 2 (22%) | 5 (33%) | 0.67 |
| Clipped, n (%) | 2 (22%) | 4 (27%) | >0.99 |
| Bypass, n (%) | 2 (22%) | 1 (0.067%) | 0.53 |
| Coiled, n (%) | 4 (44%) | 4 (27%) | 0.41 |
| Flow diverter, n (%) | 6 (67%) | 8 (53%) | 0.68 |
| Intra-saccular device, n (%) | 0 (0%) | 2 (13%) | 0.51 |
| Combined open/endo, n (%) | 1 (11%) | 2 (13%) | >0.99 |

TABLE 7

Study Patient Demographics and Characteristics. Baseline demographics and aneurysm characteristics of patients with unruptured and ruptured angiographically confirmed aneurysms and control patients.

| Variable | Cerebral Aneurysm Patients | Control Patients | p-value |
|---|---|---|---|
| Total Patients, n | 110 | 62 | |
| Age, median (Interquartile Range) | 60 +/− 14.75 | 46 +/− 24.25 | 3.719E−9 |
| Female Sex, n (%) | 80 (72.7%) | 47 (75.8%) | 0.984 |
| Hypertension, n (%) | 56 (50.9%) | 26 (41.9%) | 0.3415 |
| Diabetes, n (%) | 14 (12.7%) | 3 (4.8%) | 0.2258 |
| Coronary Artery Disease, n (%) | 5 (4.5%) | 3 (4.8%) | 0.961 |
| Current or Former Smoker, n (%) | 28 (25.4%) | 21 (33.9%) | 0.231 |

TABLE 7-continued

Study Patient Demographics and Characteristics. Baseline demographics and aneurysm characteristics of patients with unruptured and ruptured angiographically confirmed aneurysms and control patients.

| Variable | Cerebral Aneurysm Patients | Control Patients | p-value |
|---|---|---|---|
| Aspirin Use, n (%) | 39 (35.4%) | 30 (48.3%) | 0.275 |
| Plavix Use, n (%) | 17 (15.4%) | 10 (16.1%) | 0.899 |
| Size in maximum dimension (mm), median (Interquartile Range) | 5.2 +/− 3.45 | N/A | N/A |
| Ruptured Aneurysms, n (%) | 11 (10%) | N/A | N/A |

TABLE 8

Control Patient Demographics and Characteristics. Baseline demographics and characteristics of control patients with Chiari malformation, meningioma, metastatic disease, GBM, or angiographically-negative subarachnoid hemorrhage.

| Variable | CM-1 | meningioma | brain mets | GBM | SAH |
|---|---|---|---|---|---|
| Total Patients, n | 38 | 19 | 3 | 4 | 8 |
| Age, median (Interquartile Range) | 50 (7) | 59.5 (21.25) | 61 (11) | 61 (18.5) | 56 (7.25) |
| Female Sex, n (%) | 25 (75.76%) | 12 (75%) | 1 (20%) | 4 (57.14%) | 8 (100%) |
| Hypertension, n (%) | 18 (54.55%) | 10 (62.5%) | N/A | N/A | 2 (20%) |
| Diabetes, n (%) | 2 (6.06%) | 0 (0%) | N/A | N/A | 0 (0%) |
| Coronary Artery Disease, n (%) | 2 (6.06%) | 0 (0%) | N/A | N/A | 0 (0%) |
| Current or Former Smoker, n (%) | 14 (42.42%) | 12 (63%) | 3 (60%) | 3 (42.9%) | 0 (0%) |
| Aspirin Use, n (%) | 6 (18.18%) | 0 (0%) | 0 (0%) | 0 (0%) | 3 (37.5%) |
| Plavix Use, n (%) | 2 (6.06%) | 0 (0%) | 0 (0%) | 0 (0%) | 0 (0%) |

Figure 2A:
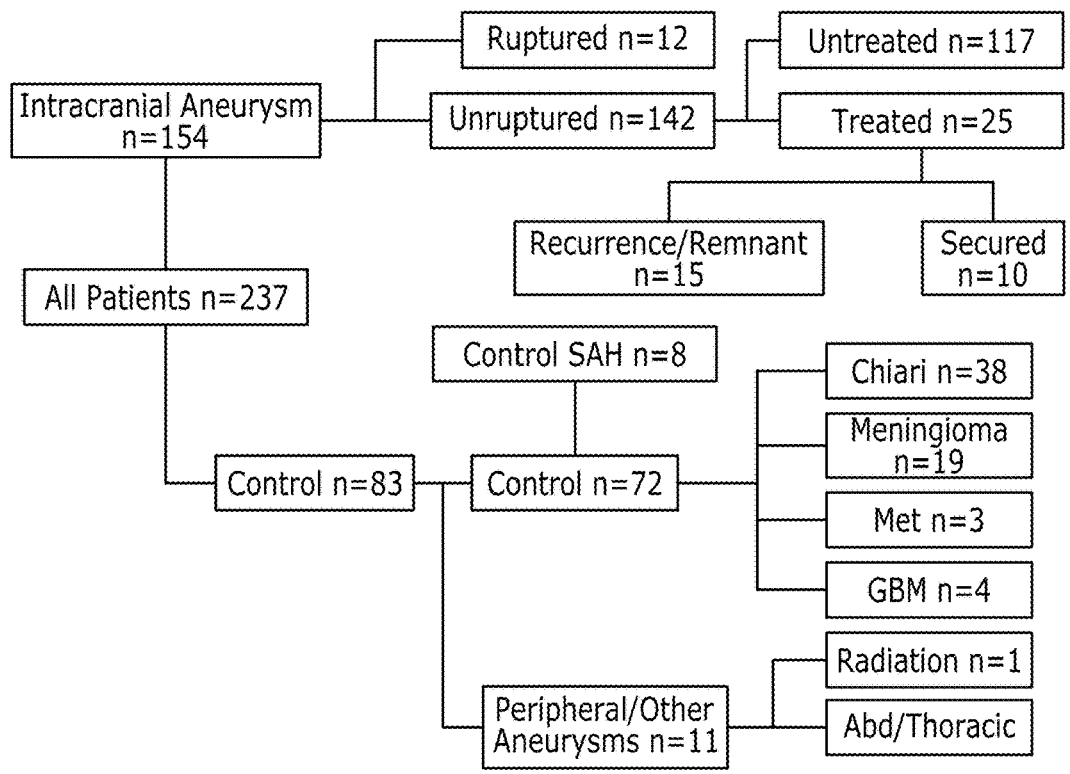
FIGS. 2A-2F illustrate circulating proteomic inflammatory profiles in patients with unruptured and ruptured cerebral aneurysms, and control patients.
Figure 2B:
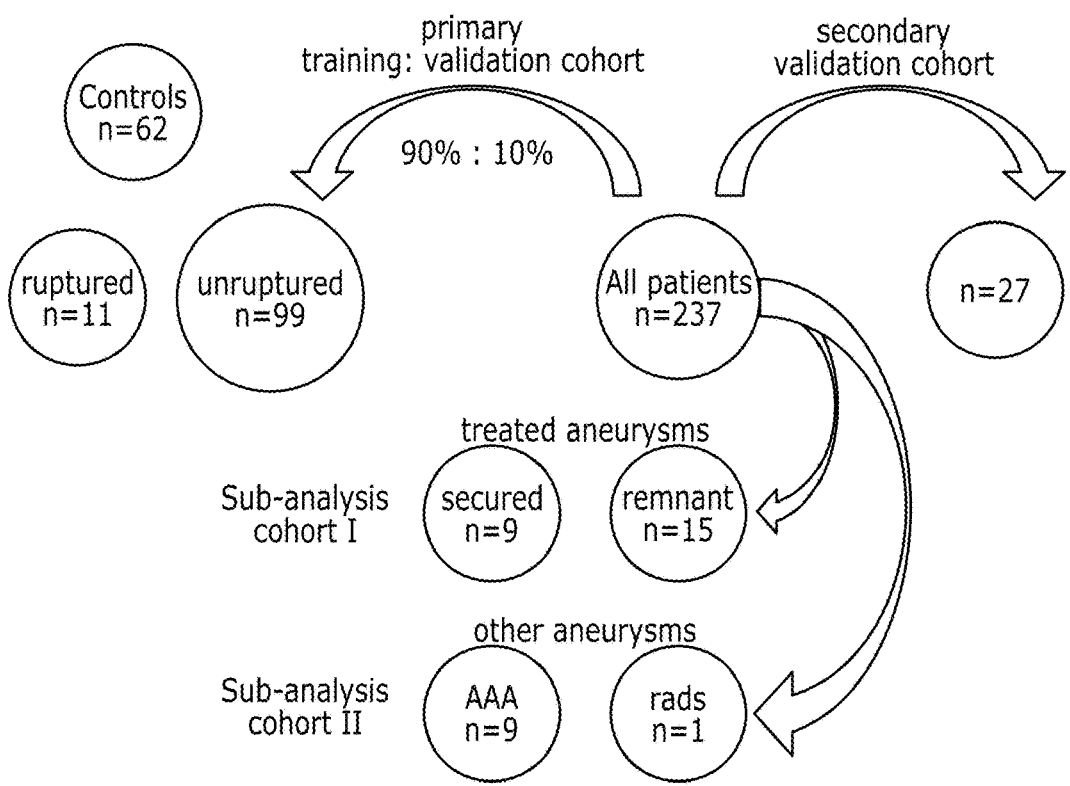

A total of n=237 patients were enrolled into the study including n=154 patients with CAs (n=12 ruptured, n=10 treated and secured, n=15 treated but with remnant), n=83 control patients including n=38 patients with chiari malformation, n=19 meningiomas, n=8 patients with angiographically-negative SAH of which n=3 were otherwise healthy patients with remote SAH in the past, n=10 abdominal aortic aneurysms and n=1 radiation-induced intracranial aneurysm (FIG. 2A). In addition, cytokine inflammatory data for n=3 intracranial metastasis patients, n=4 patients with GBM was provided for model training under IRB protocol #PRO19080321 (POZ). All control patients had high-fidelity cranial imaging performed such as CTA or MRI/MRA as part of their clinical management. Samples were then split into 90%-10% training-validation cohort, secondary validation cohort, and sub-analysis as shown in FIG. 2B.

Figure 2C:
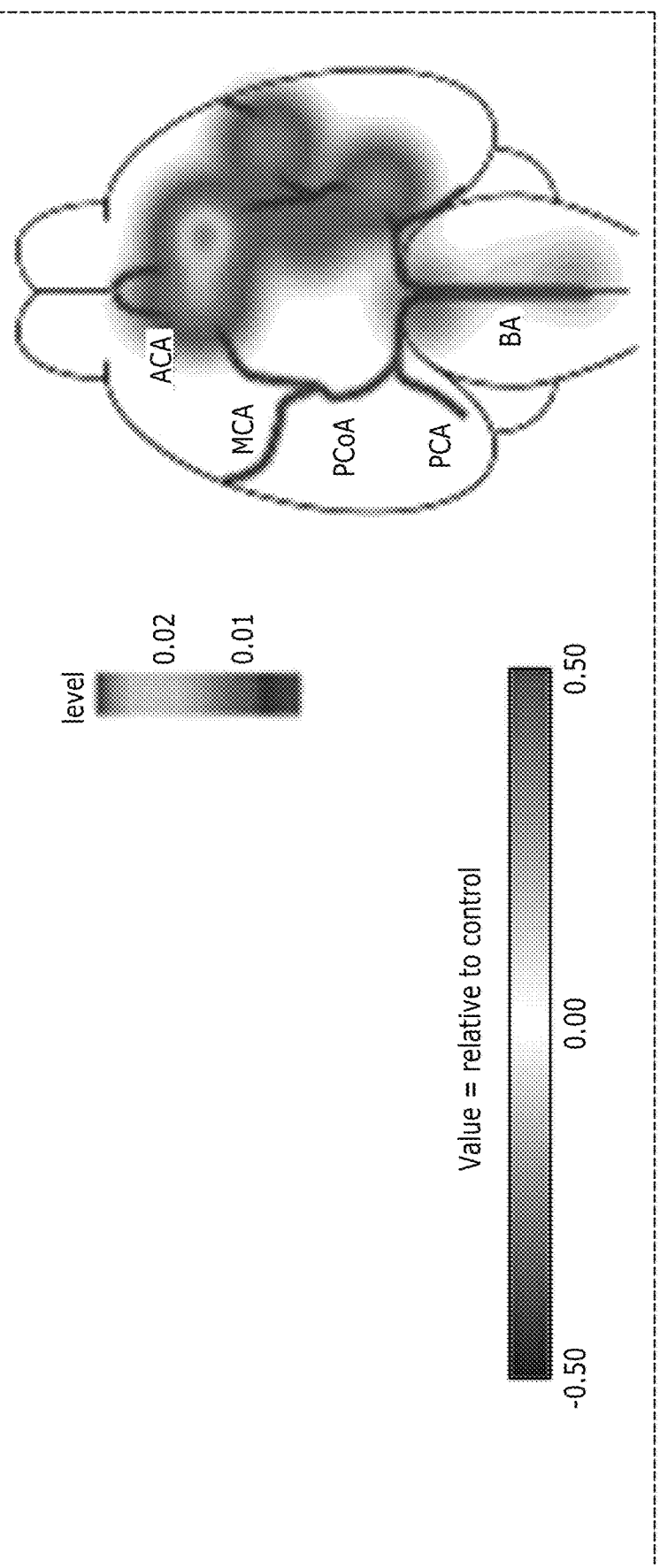
Figure 2C:
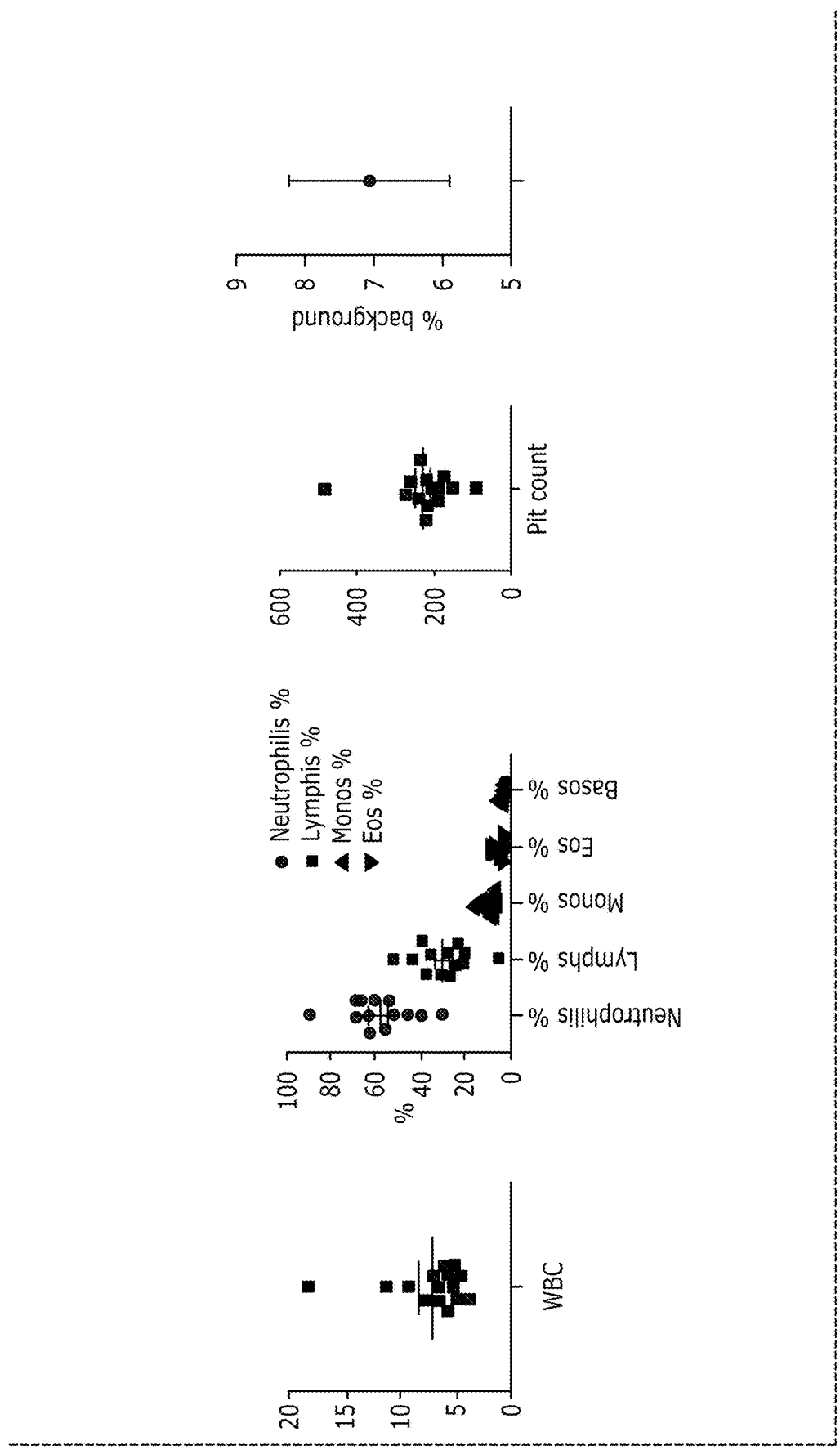
Figure 2C:
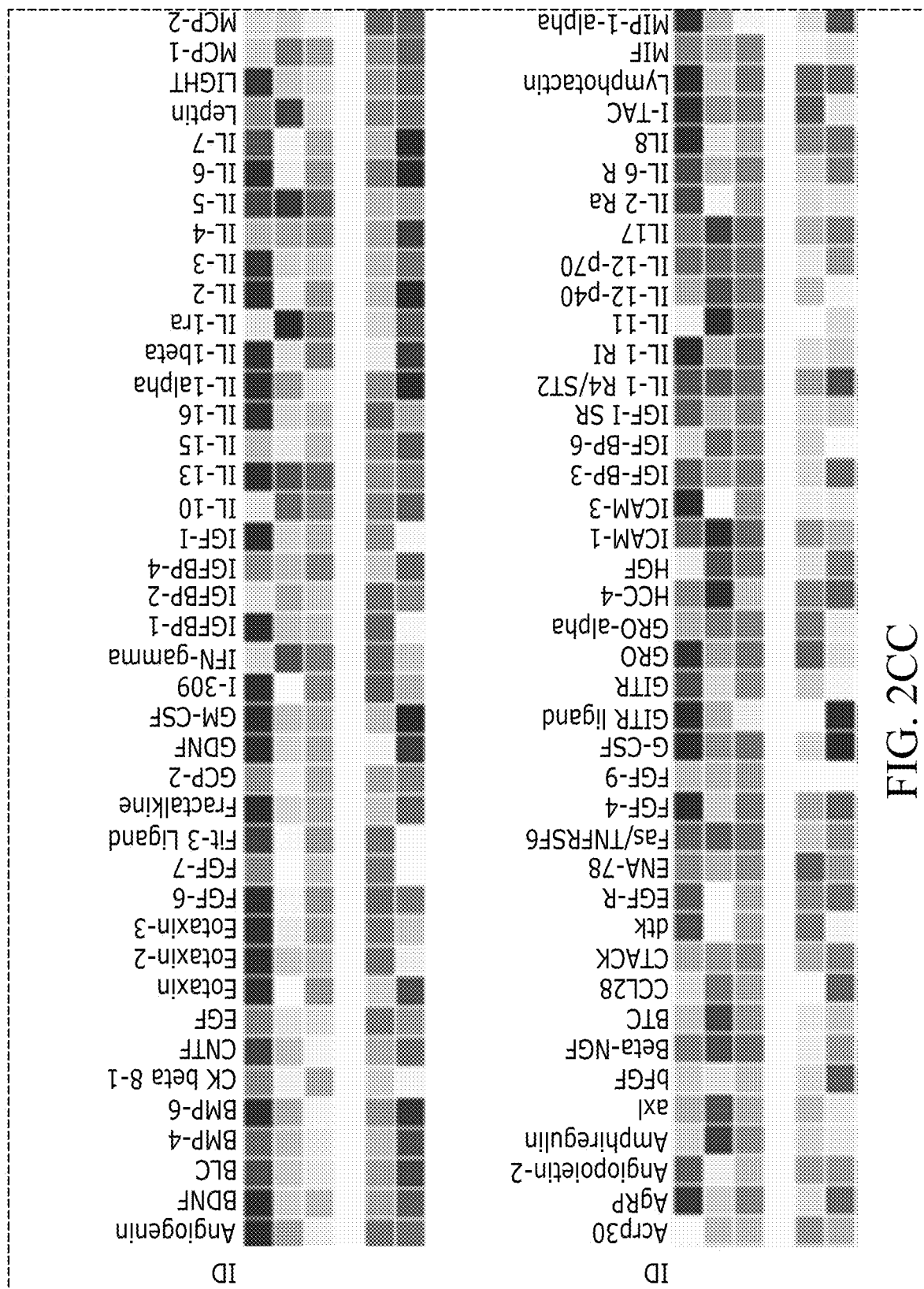
Figure 2C:
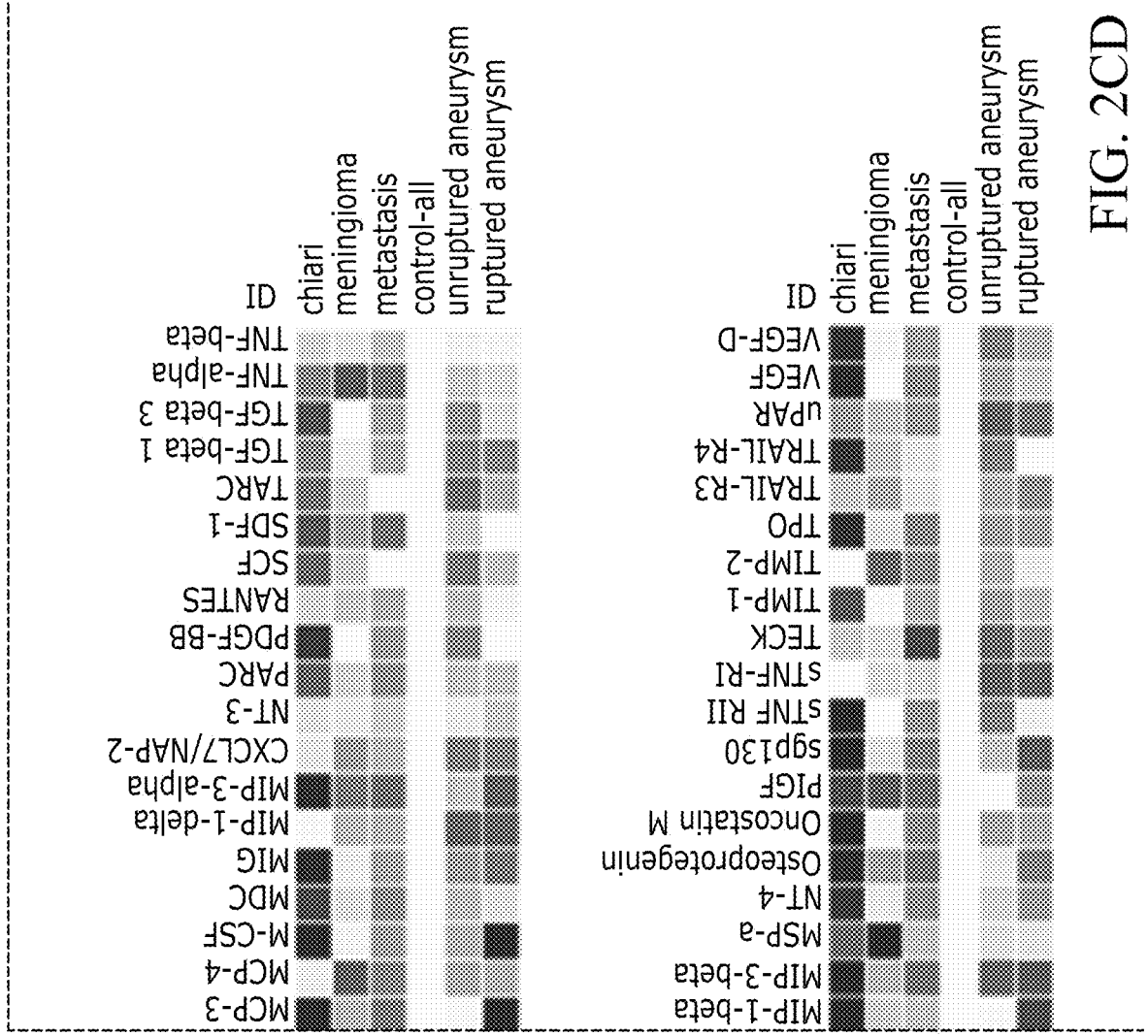

Human Cerebral Aneurysm Dome Tissue Bank Analysis. Location of aneurysms within Circle of Willis from the IRB-approved, de-identified cerebral aneurysm human tissue bank did not show any unusual patterns (n=19, paired human aneurysm dome, STA tissue, and venous blood samples 12 female, 7 male, 2 ruptured, 17 unruptured, 9 smokers, 4 non-smokers, 6 unknown status) (FIG. 2C). Analysis of peripheral blood samples from patients with aneurysms also did not show any unusual patterns.

Figure 2D:
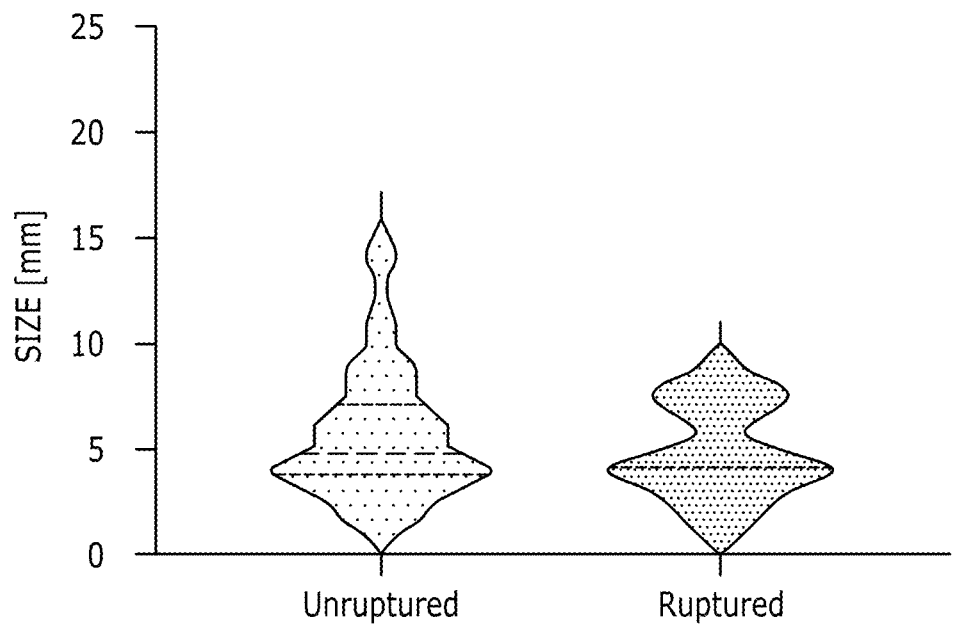
Figure 2D:
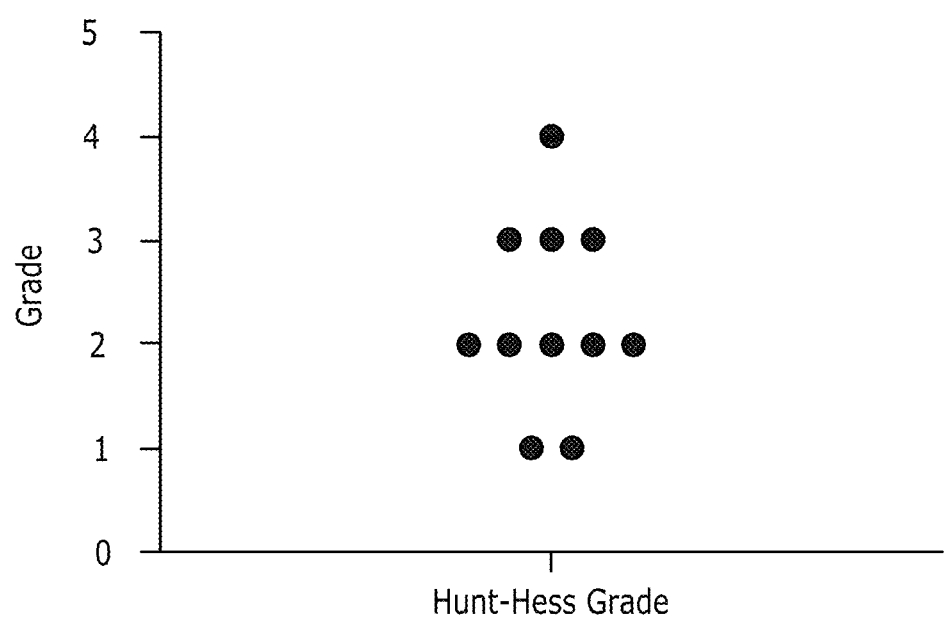
Figure 2E:
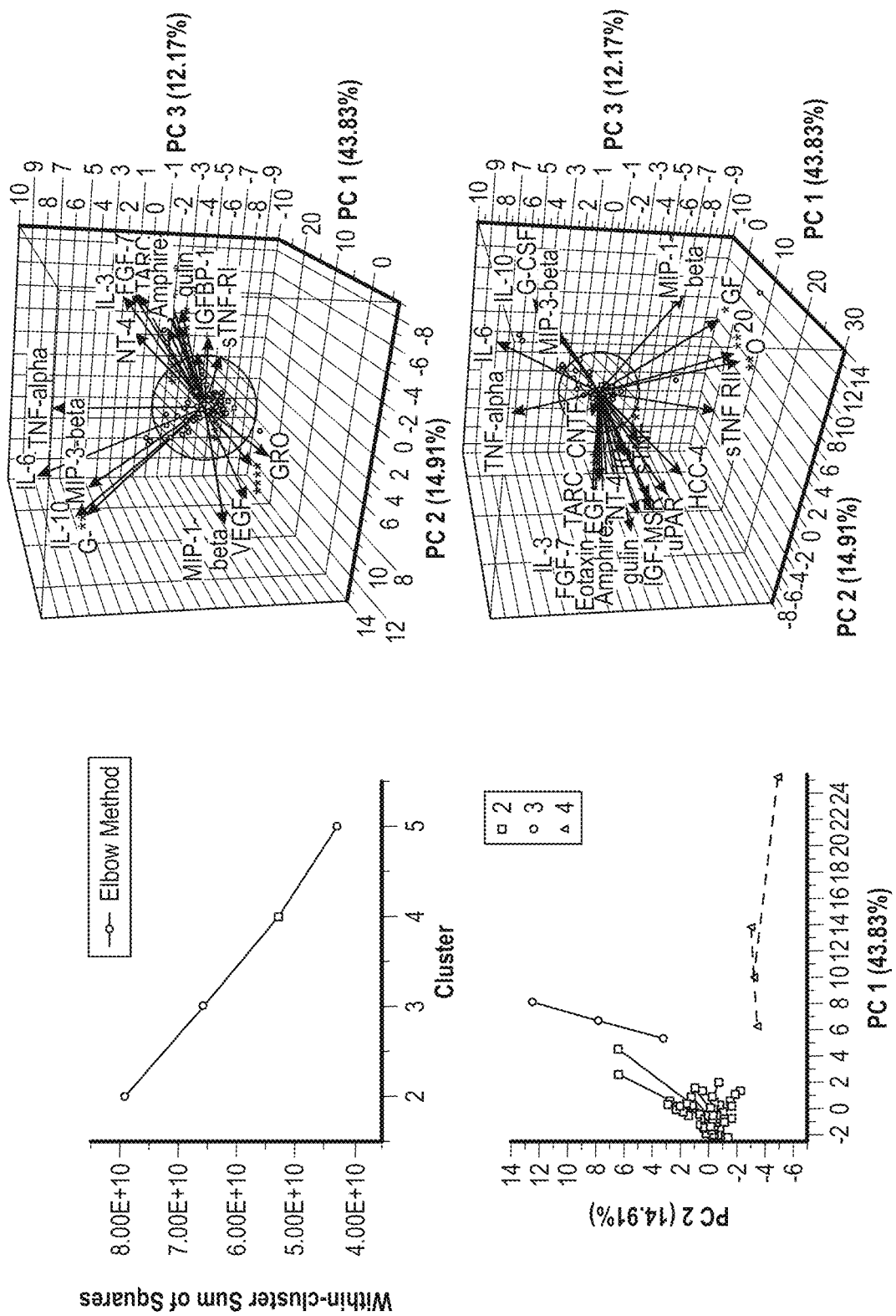
Figure 2F:
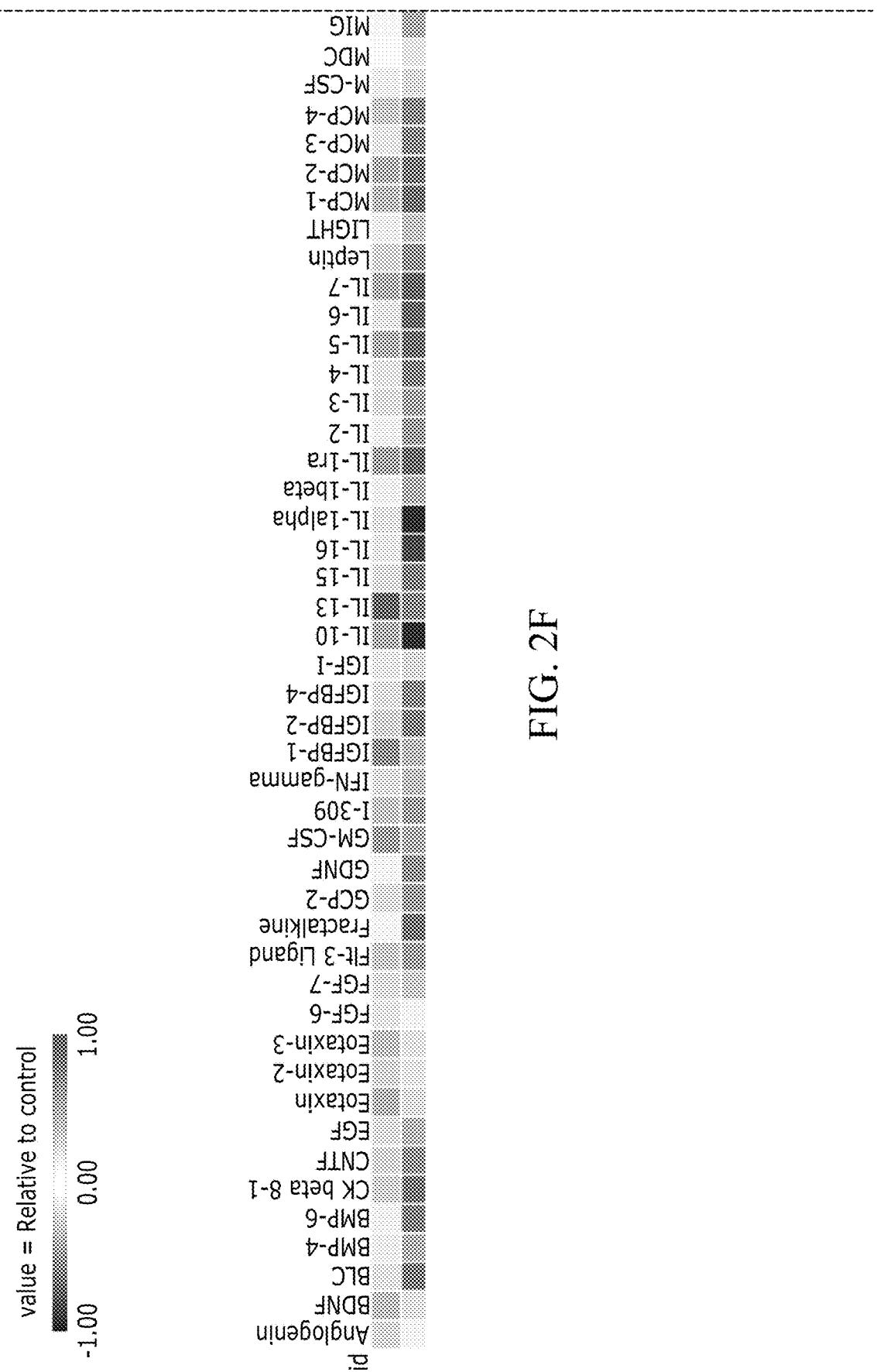
Figure 2F:
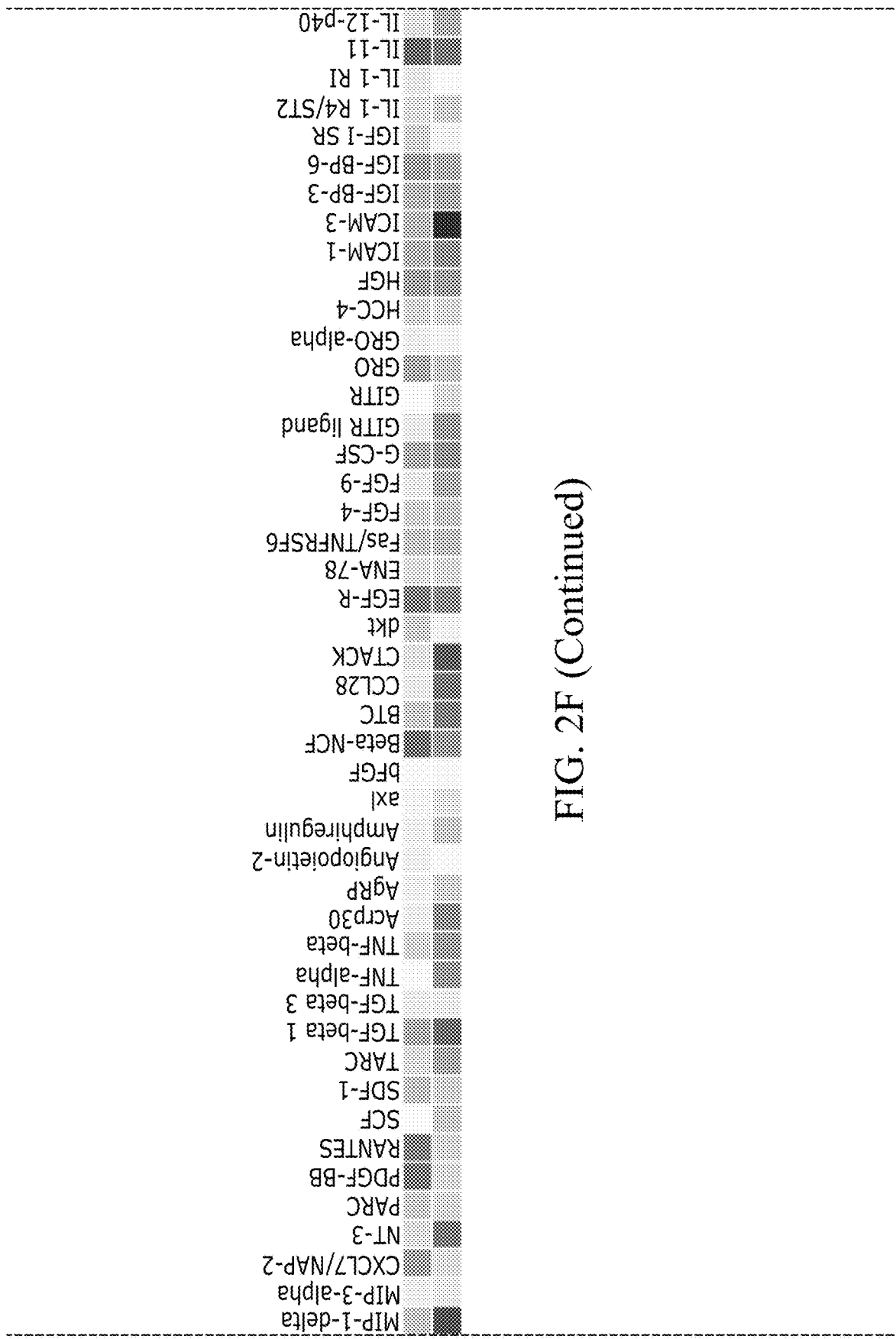
Figure 2F:
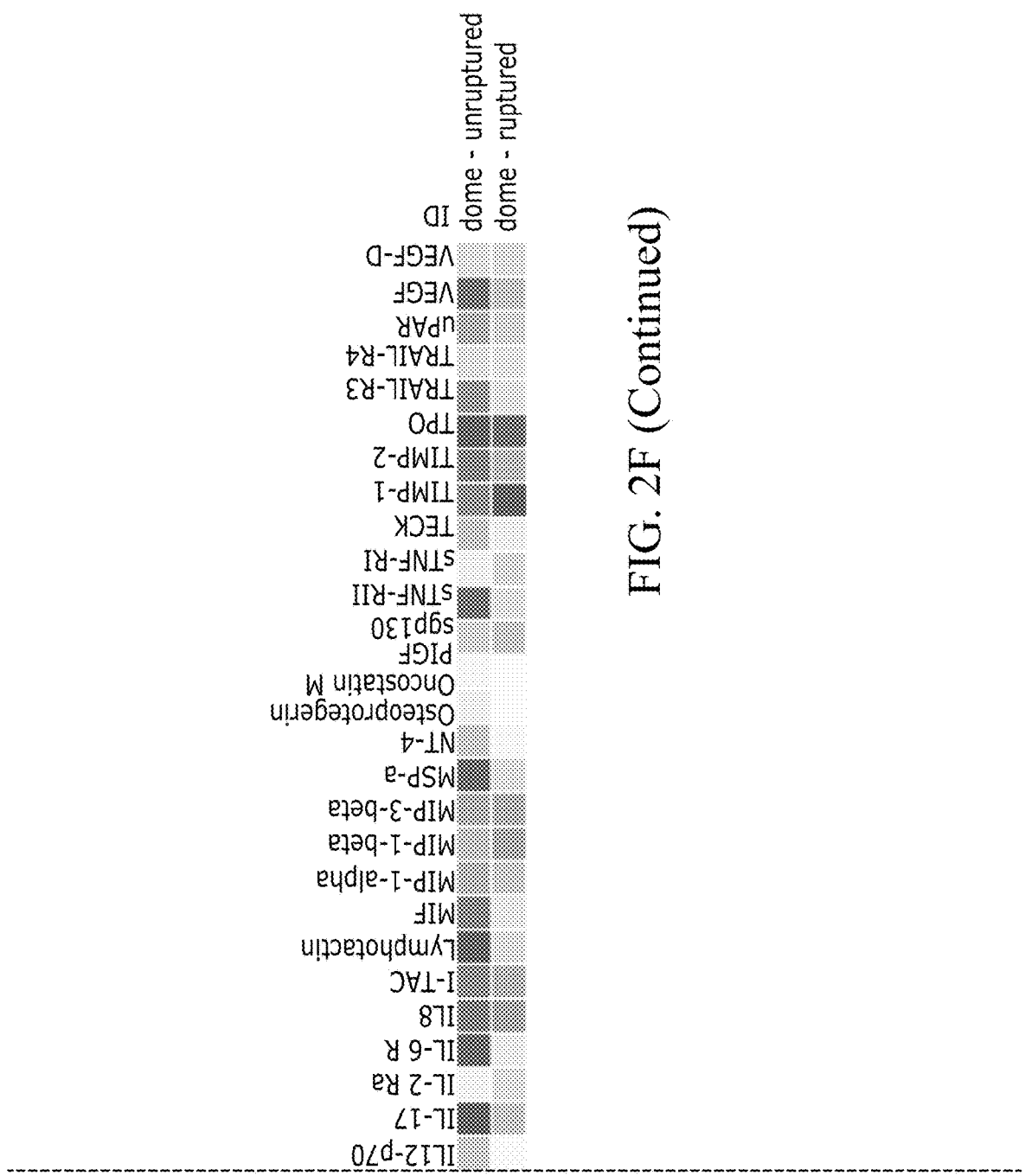

Human Aneurysm and Peripheral Blood Cytokine Profiles. Analysis using semi-quantitative Raybiotech arrays showed that several cytokines of interest out of a panel of 120 cytokines were consistently and differentially increased in peripheral blood samples of patients with CAs especially ruptured CAs when compared to controls (FIG. 2C). Average CA location heatmap is shown in sub-panel in FIG. 2C (no laterality). CA size for both unruptured and ruptured aneurysms and Hunt-Hess grade are shown in FIG. 2D. PCA showed that there are several sub-groups of inflammatory profiles within CA population that are primarily mediated via either IL-, MIP-, or TNF-cytokine families as well as other specific cytokines (FIG. 2E). Most differentially expressed cytokines were in families related to monocyte and macrophage activation, neutrophil and platelet activation, endothelial distress, neutrophil chemotaxis, and macrophage polarization (FIG. 2C). Meanwhile, aneurysm dome tissue samples showed generalized overall increased expression of almost all inflammatory markers (FIG. 2F).

Figure 3A:
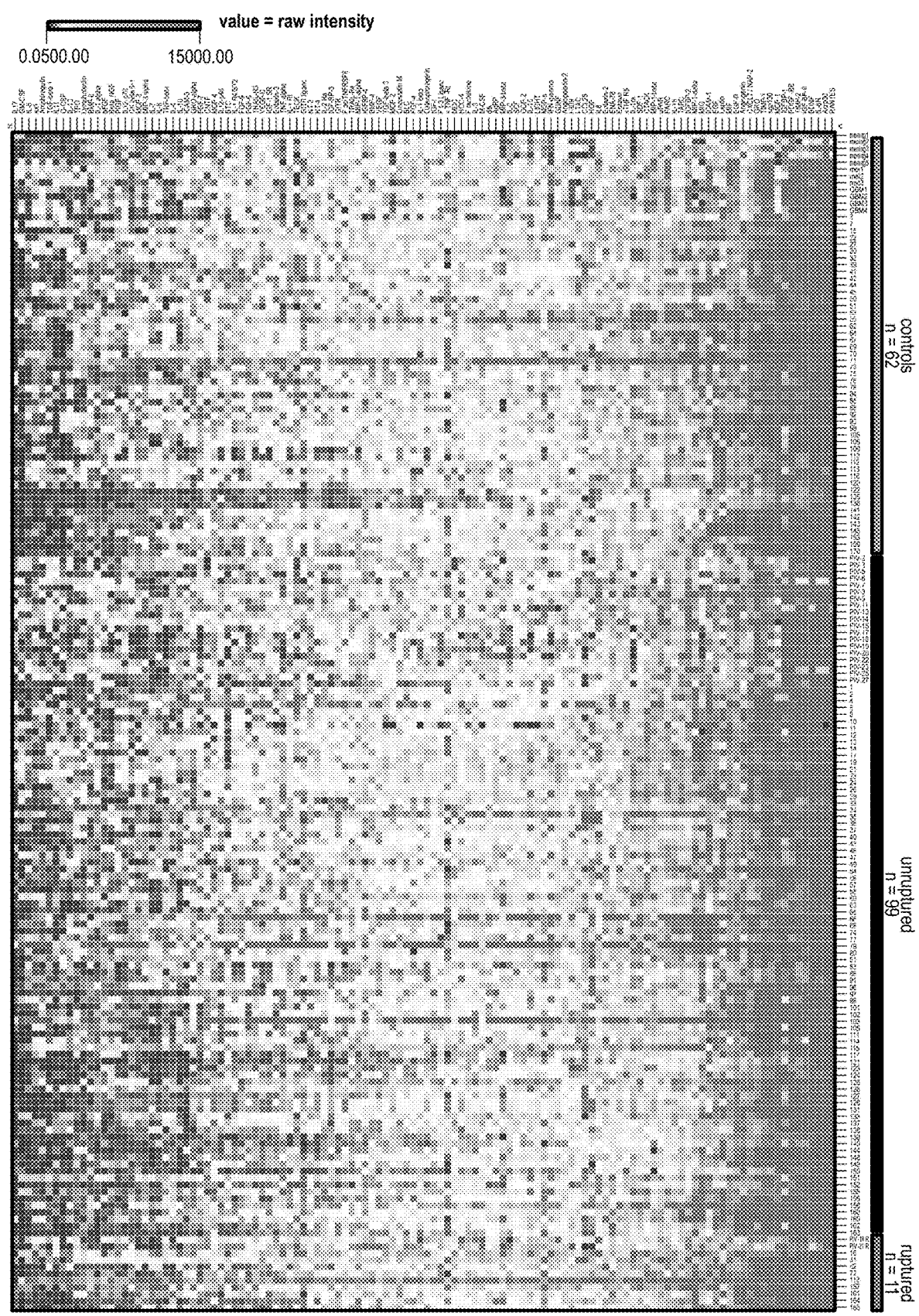
FIGS. 3A-3J illustrate the association between inflammatory cytokines and cerebral aneurysm presence in controls and patients with unruptured and ruptured cerebral aneurysms.
Figure 3B:
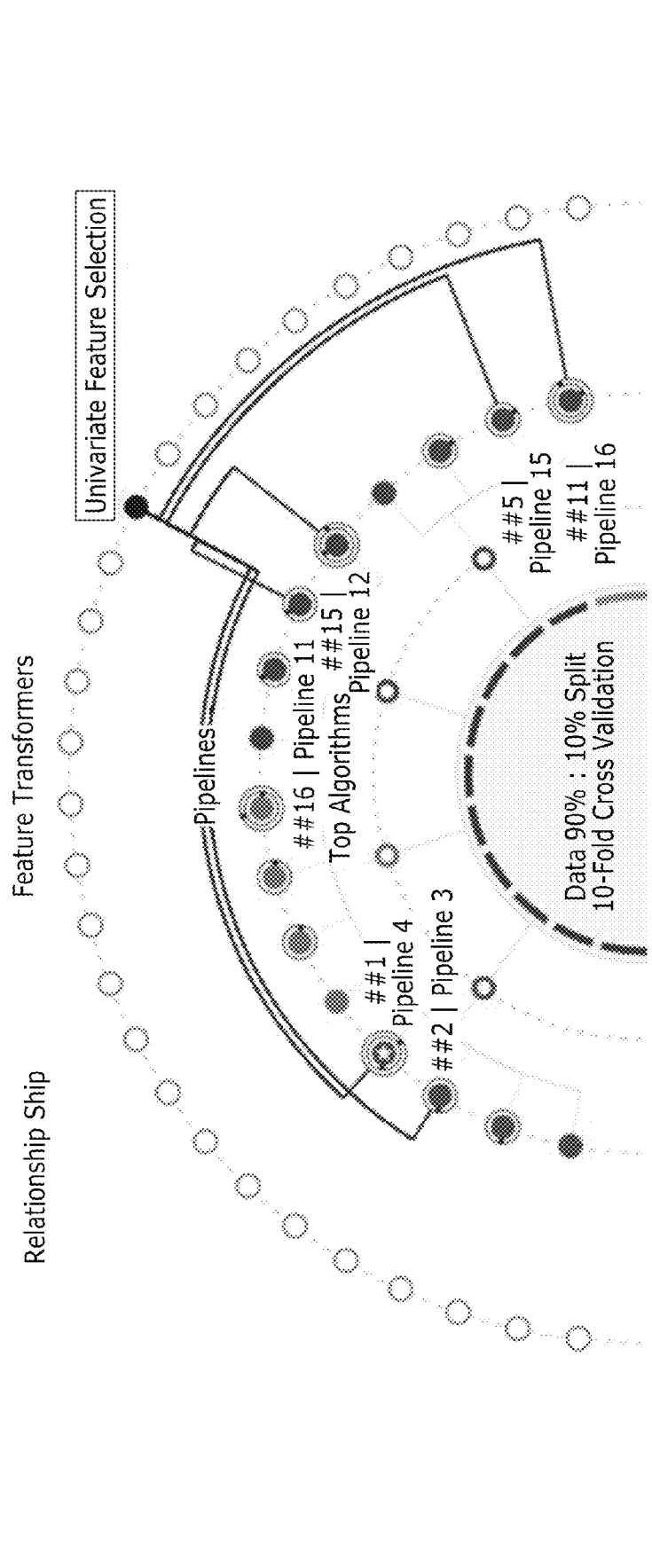
Figure 3C:
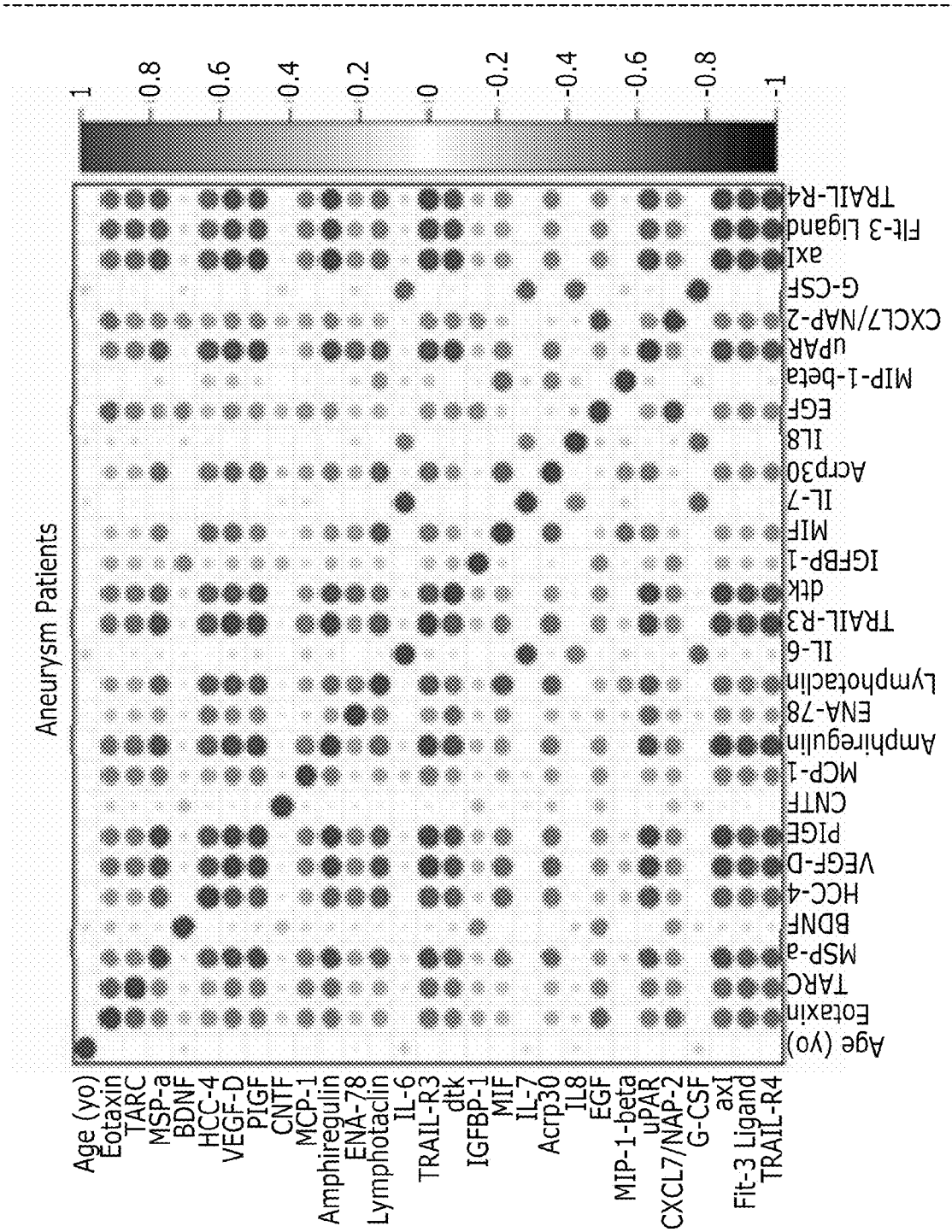
Figure 3C:
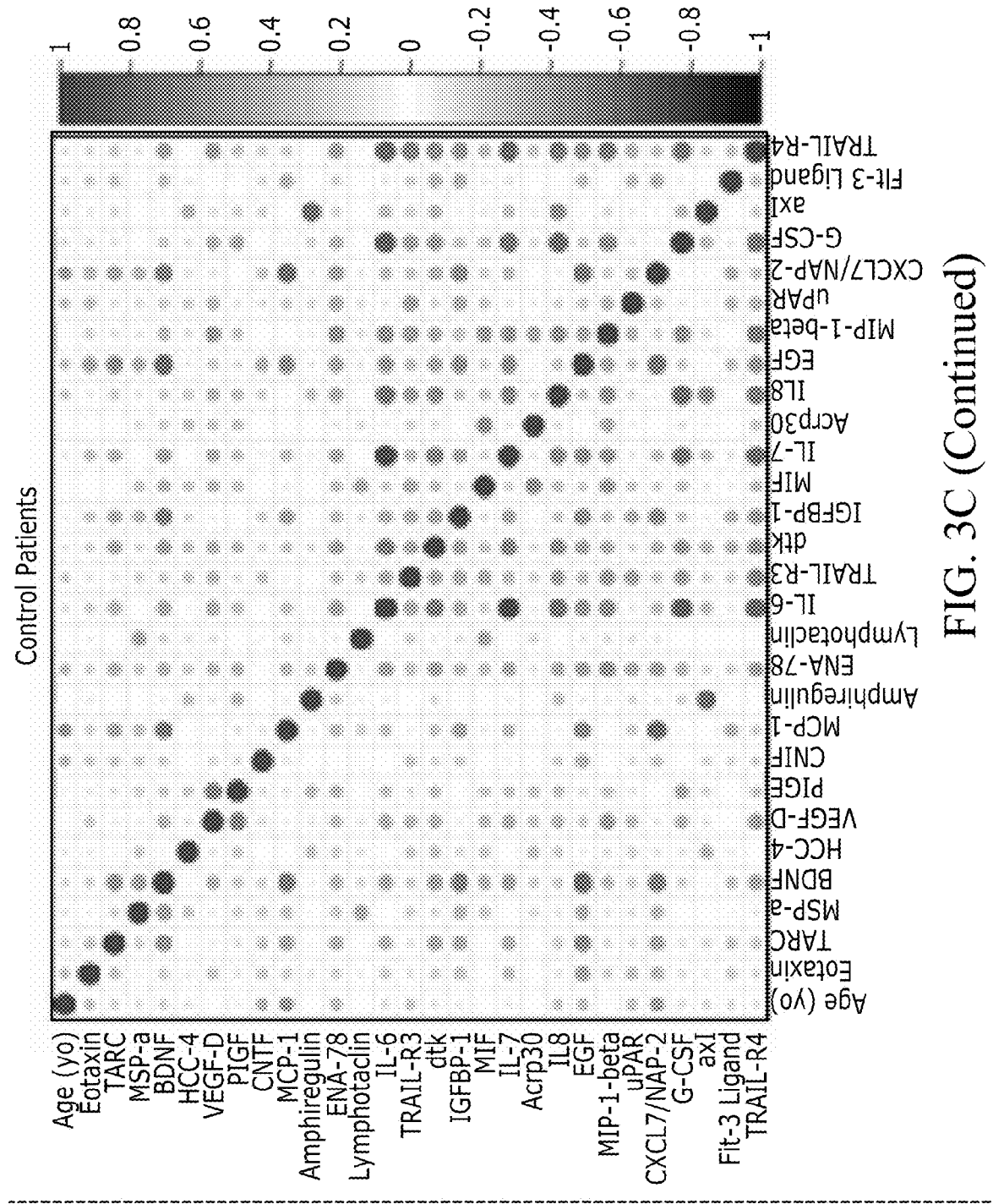
Figure 3D:
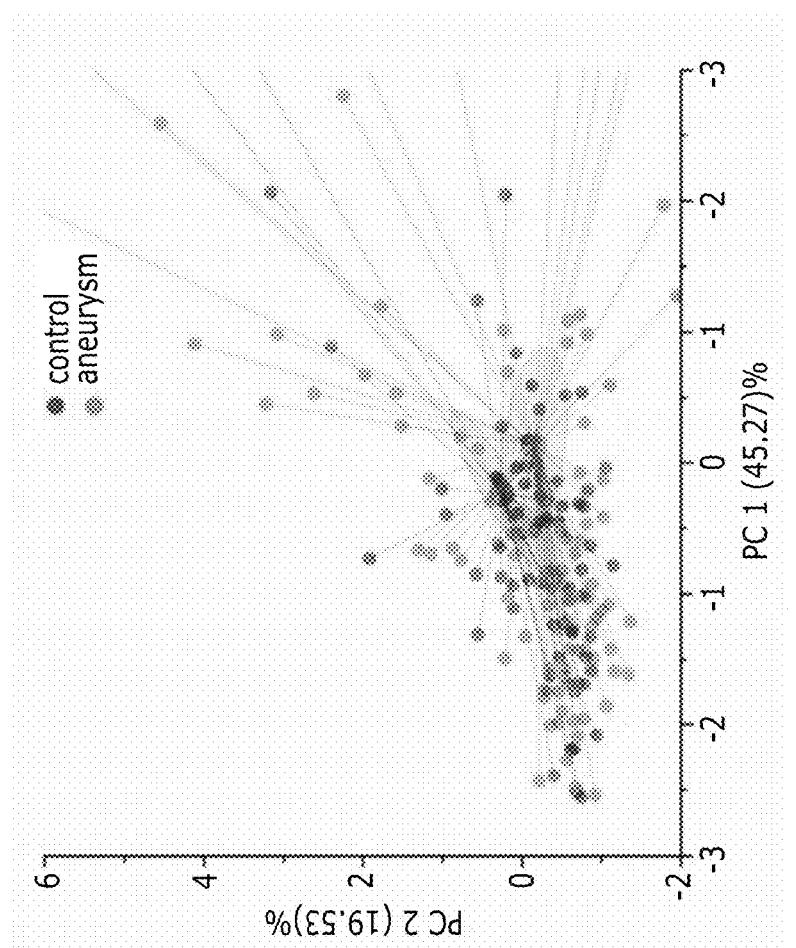
Figure 3D:
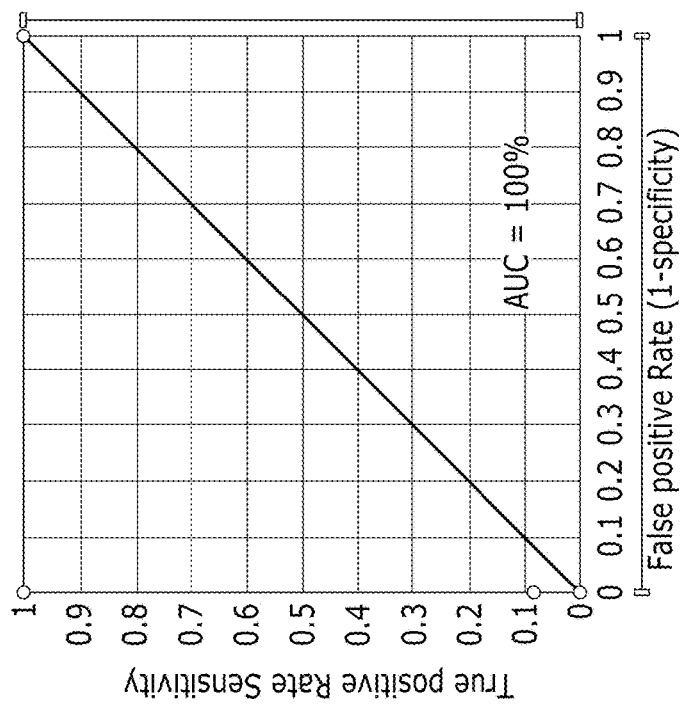
Figure 3D:
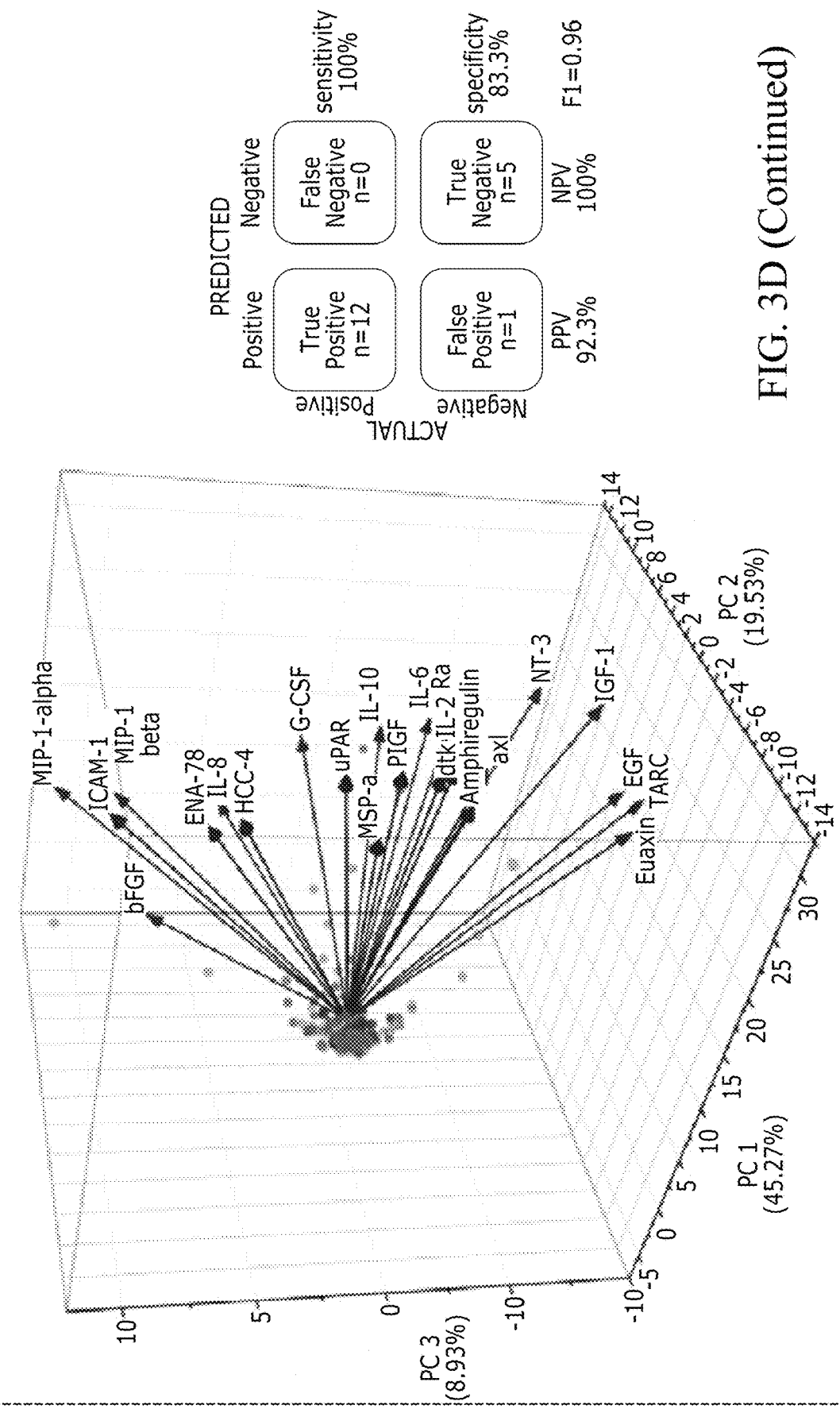
Figure 3E:
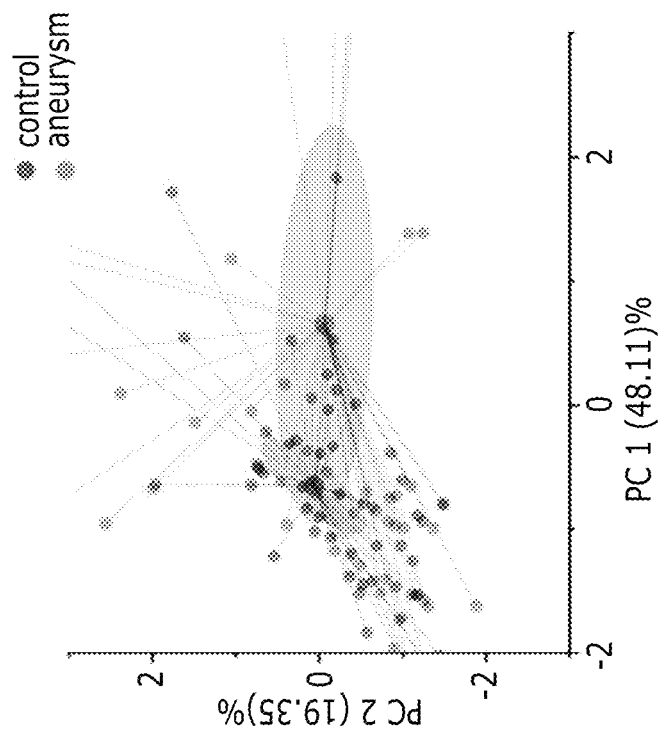
Figure 3E:
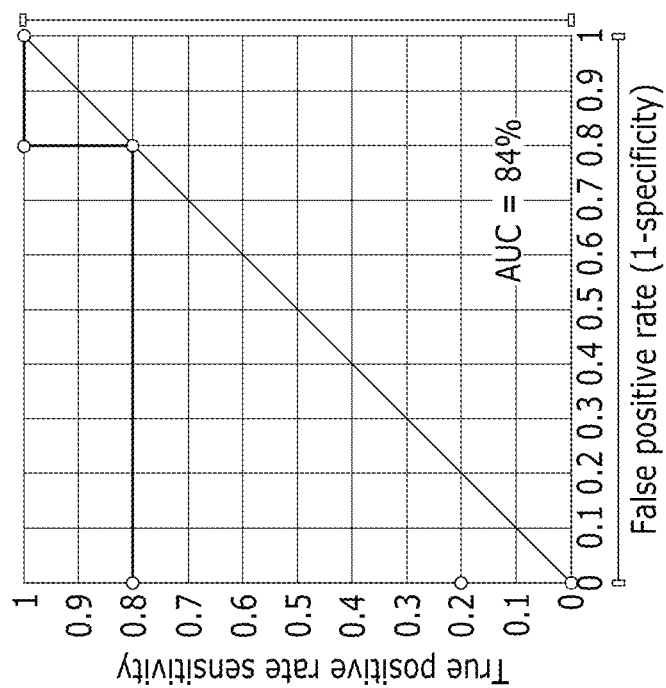
Figure 3E:
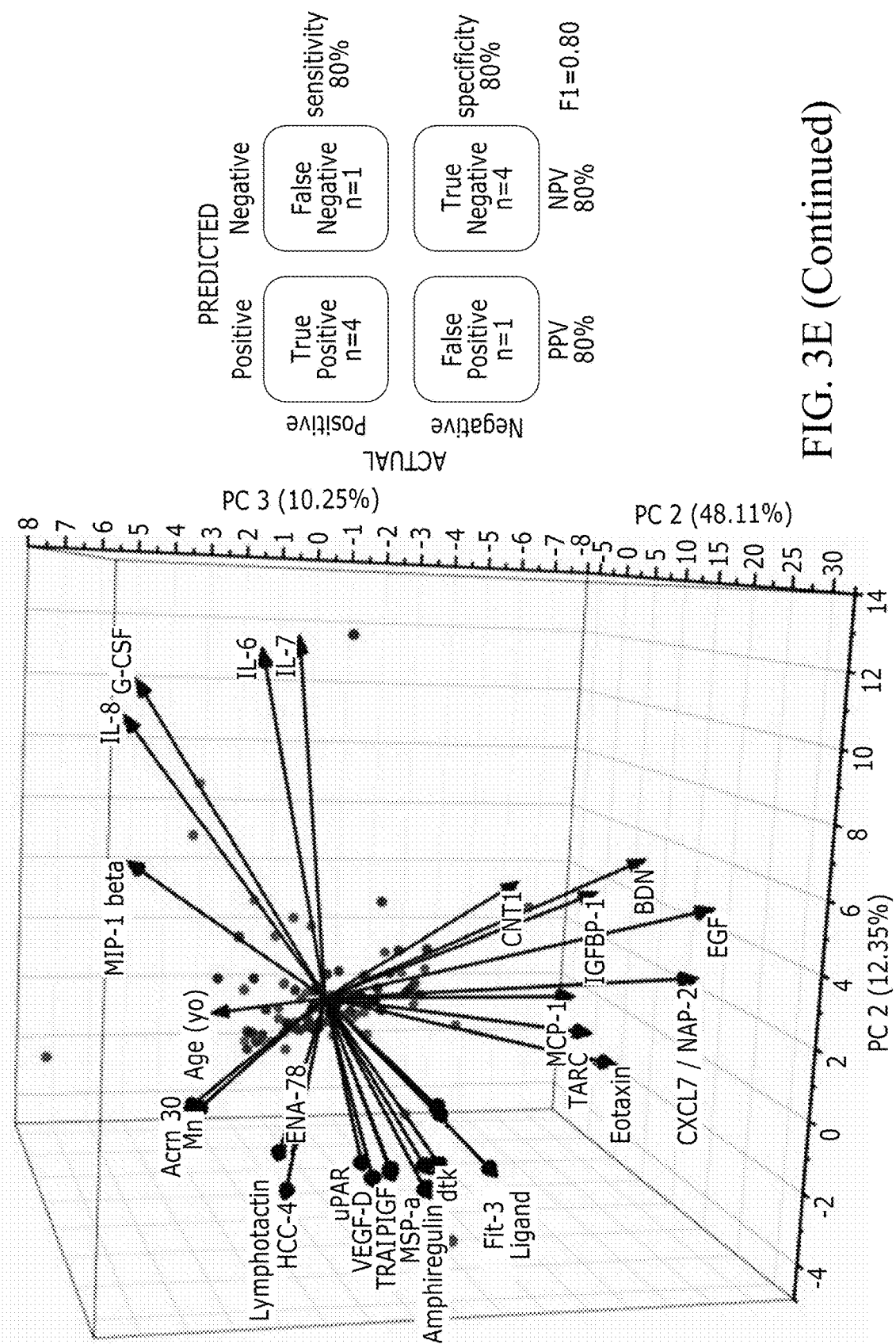
Figure 3F:
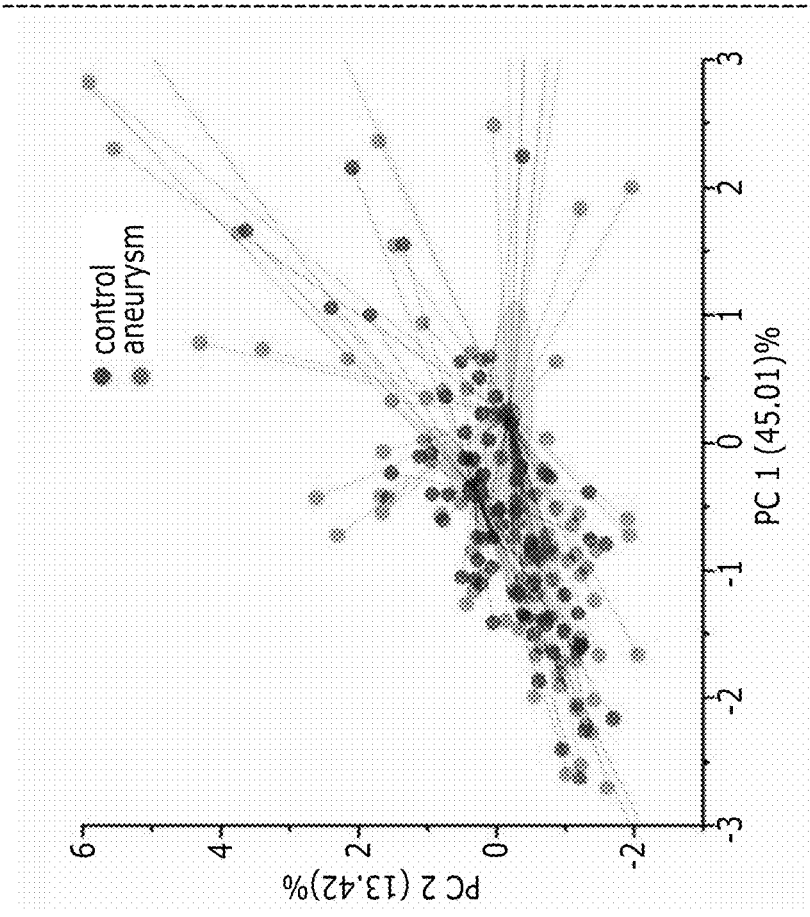
Figure 3F:
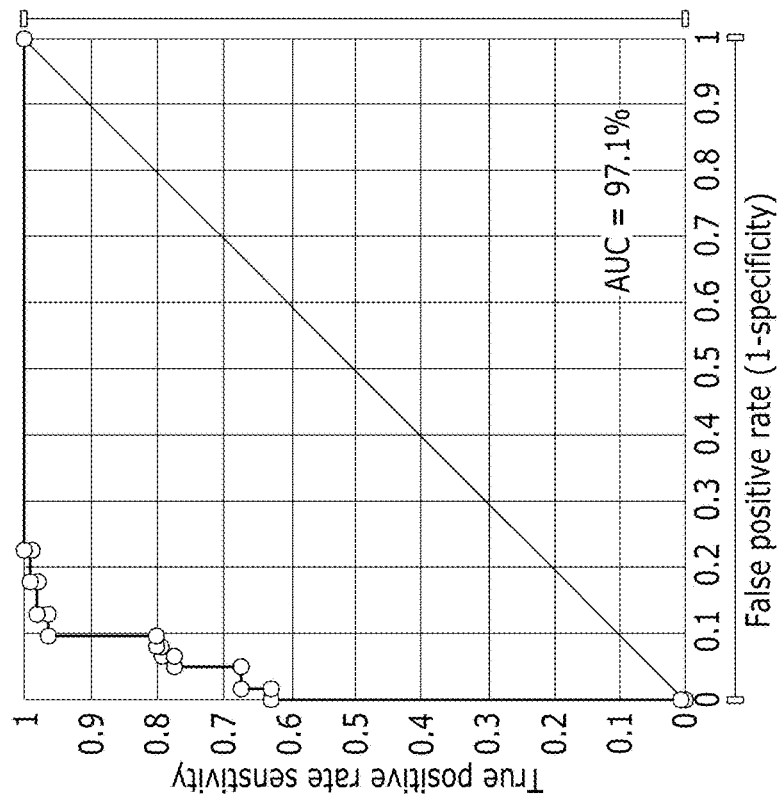
Figure 3F:
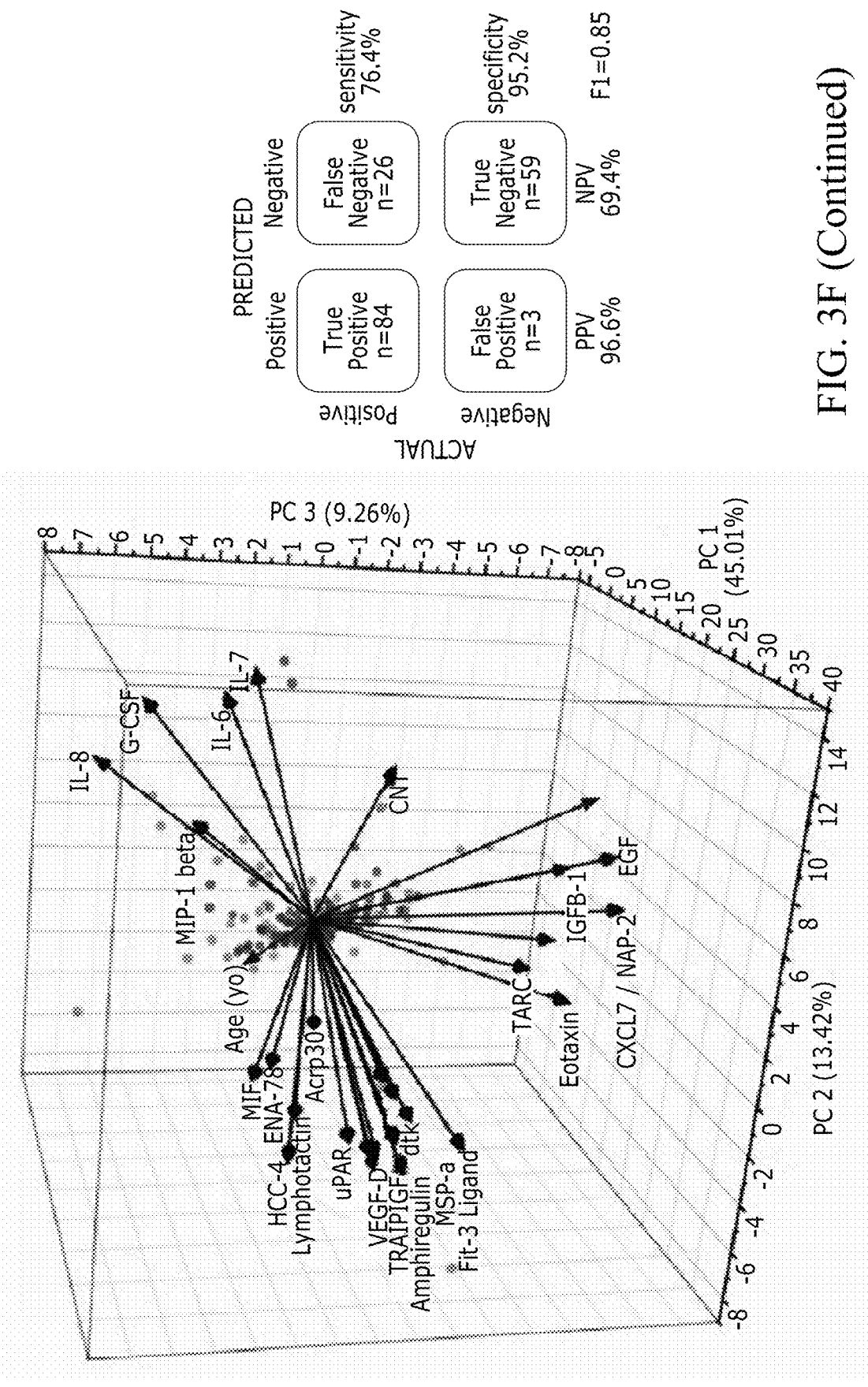
Figure 3G:
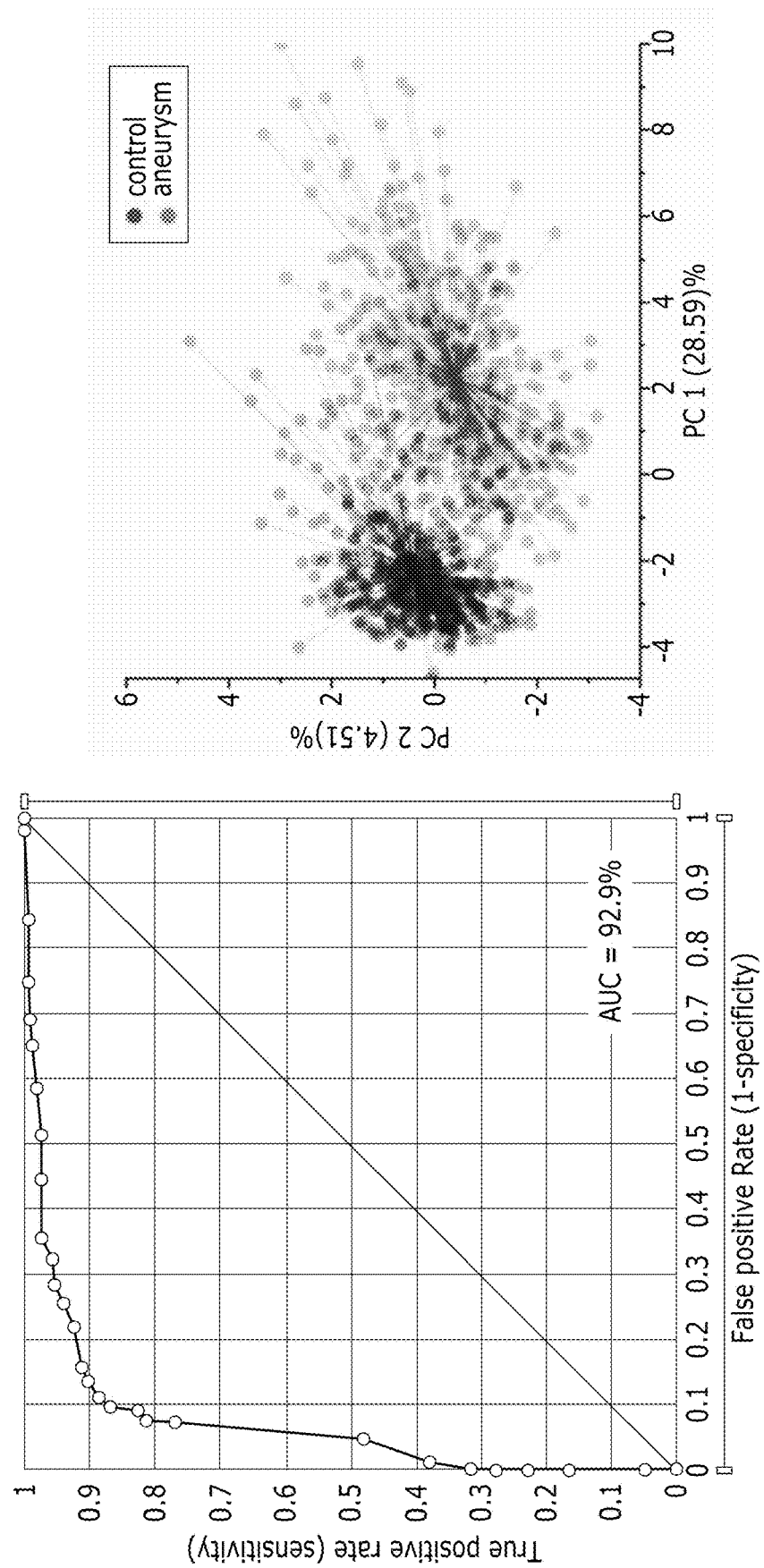
Figure 3G:
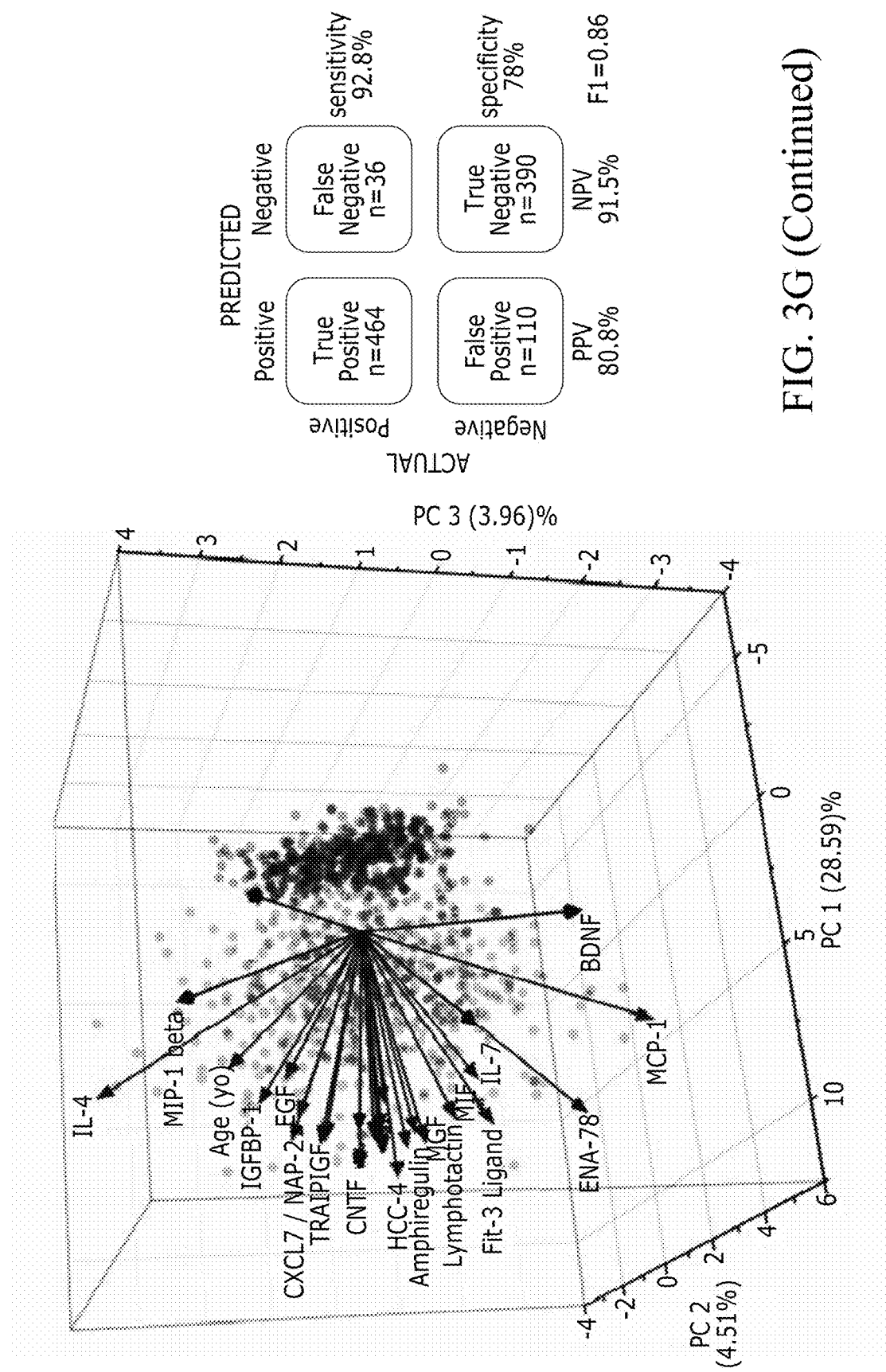
Figure 8C:
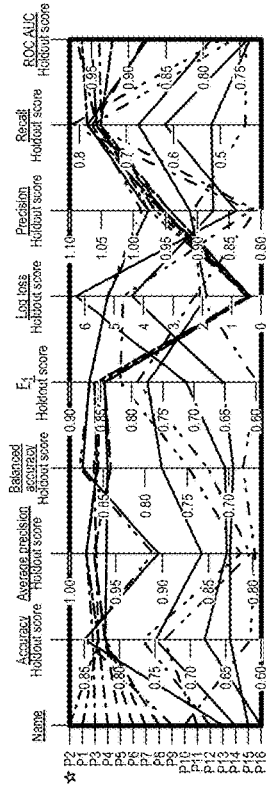
Figure 8C:
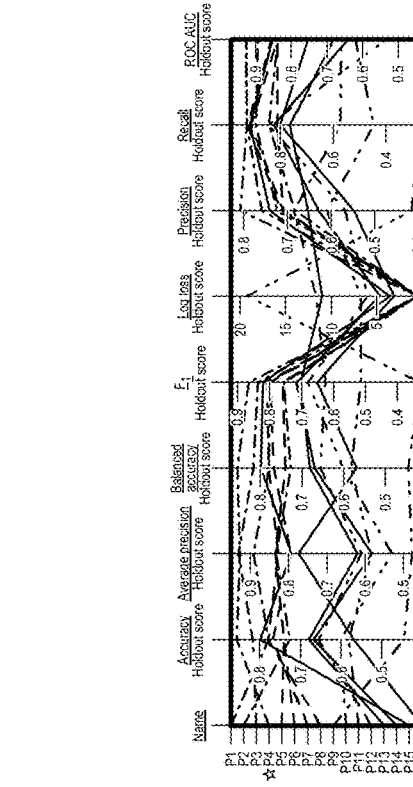
Figure 8D:
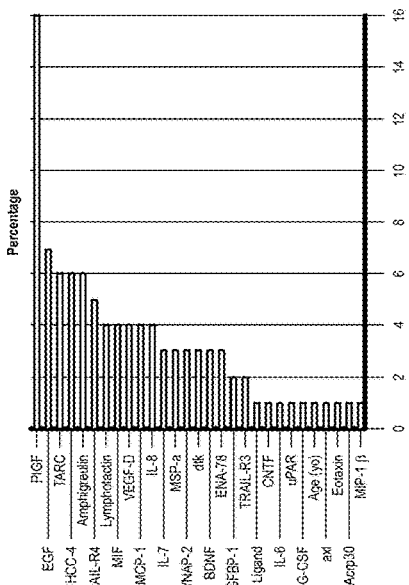
Figure 8D:
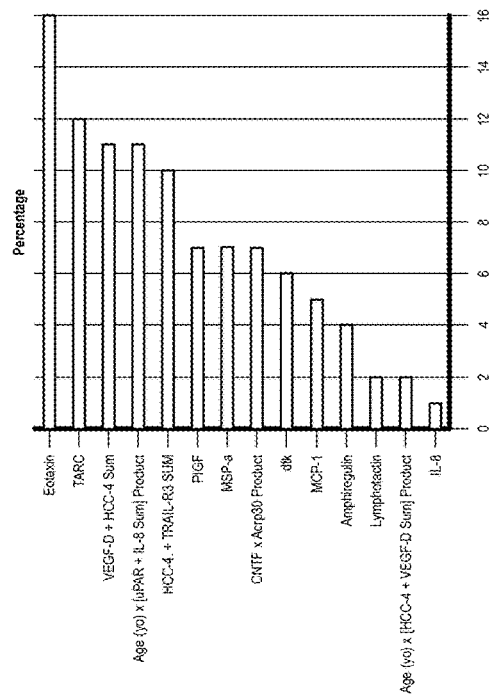
Figure 9:
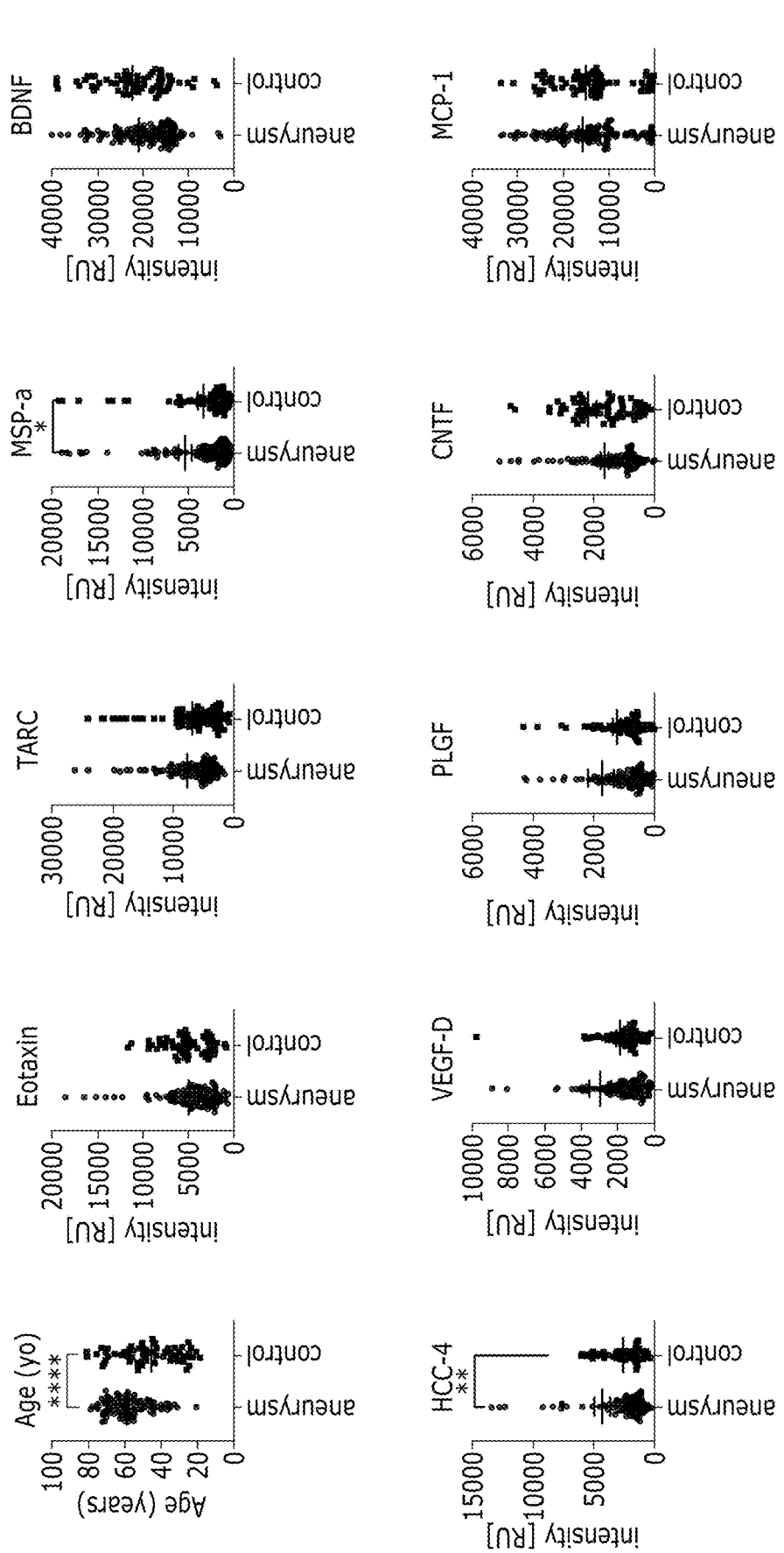
FIG. 9 shows differences in age and cytokine level intensities for selected features in the full data set (no age-matching).
Figure 9:
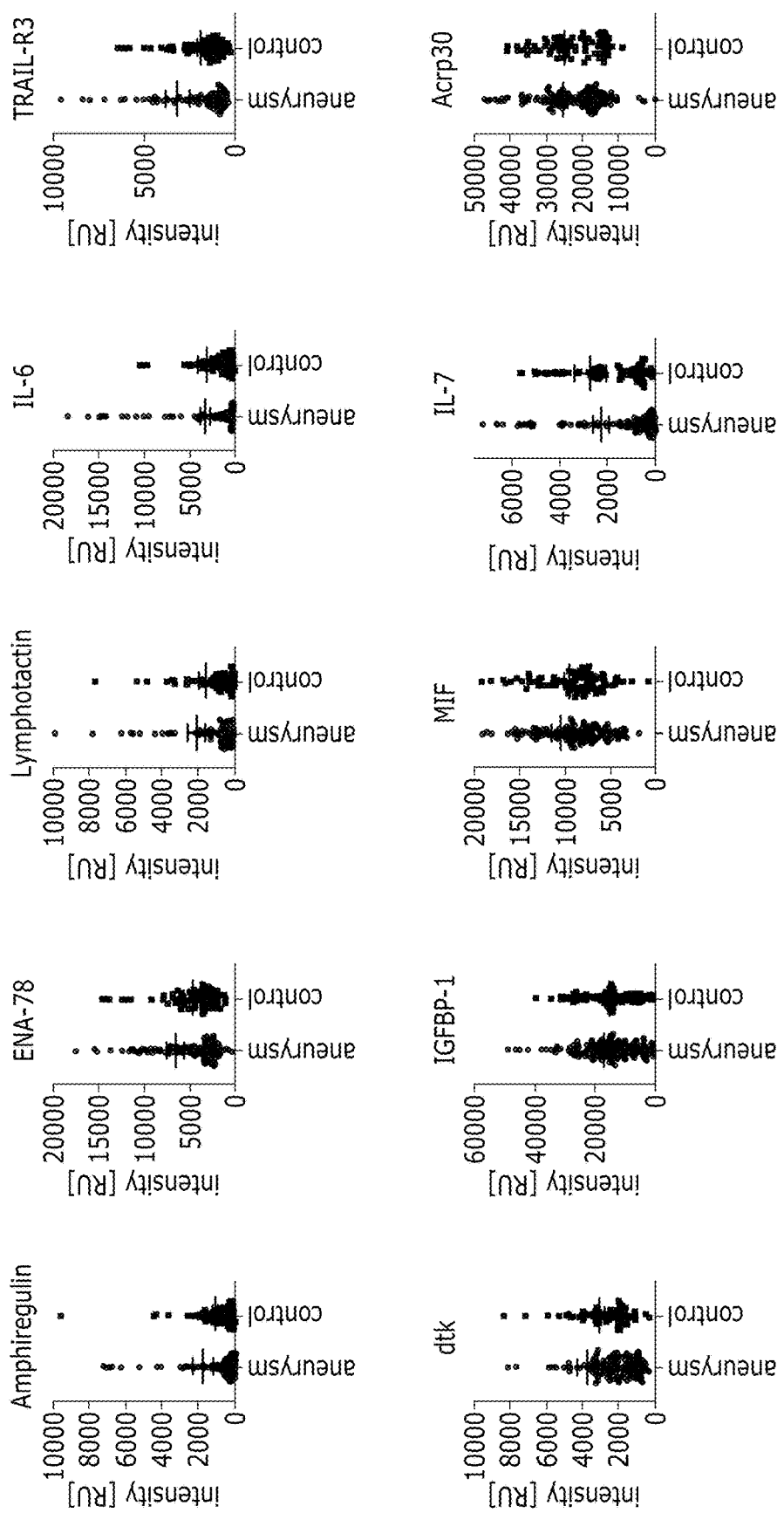
Figure 9:
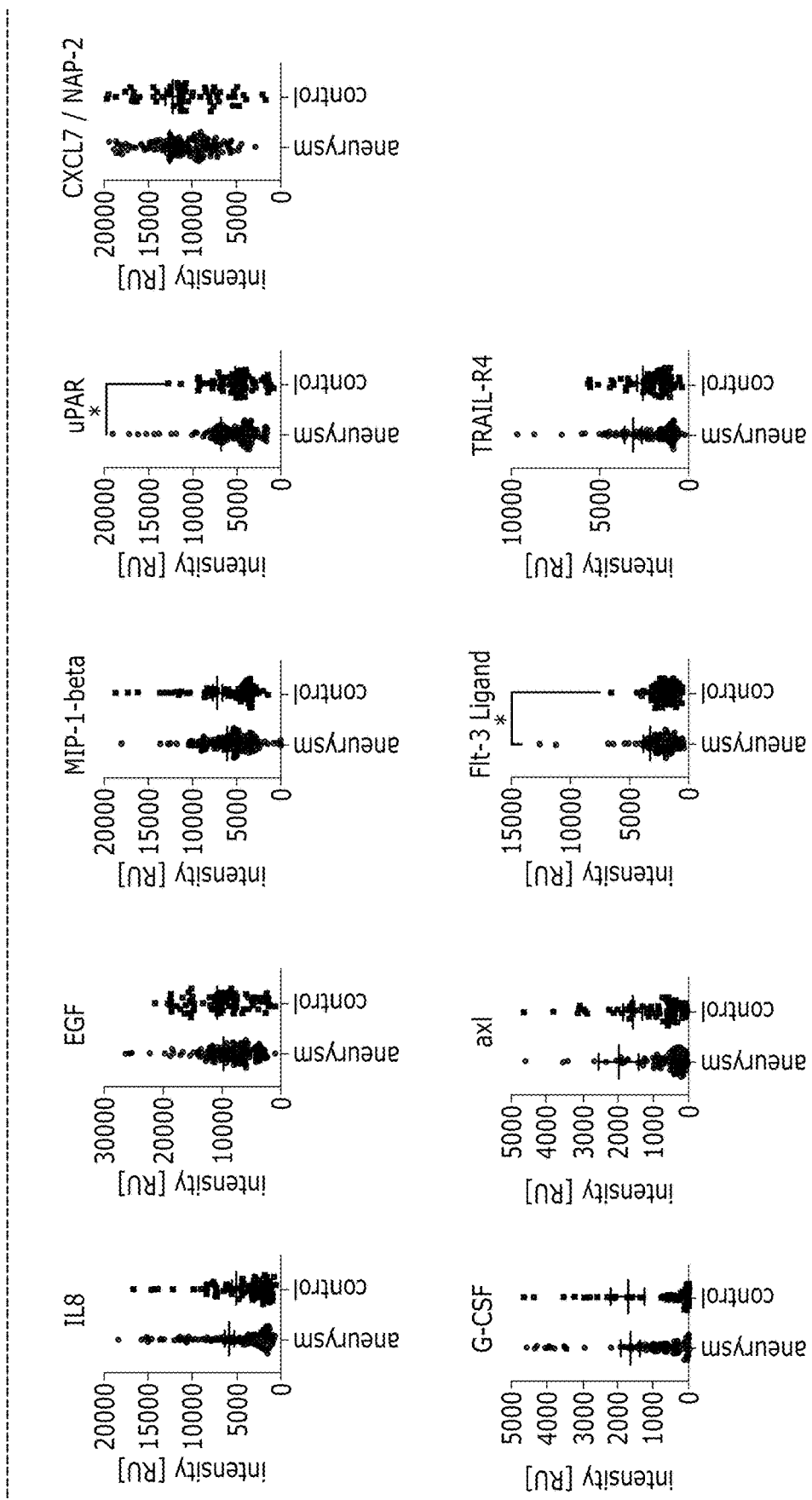
Figure 10:
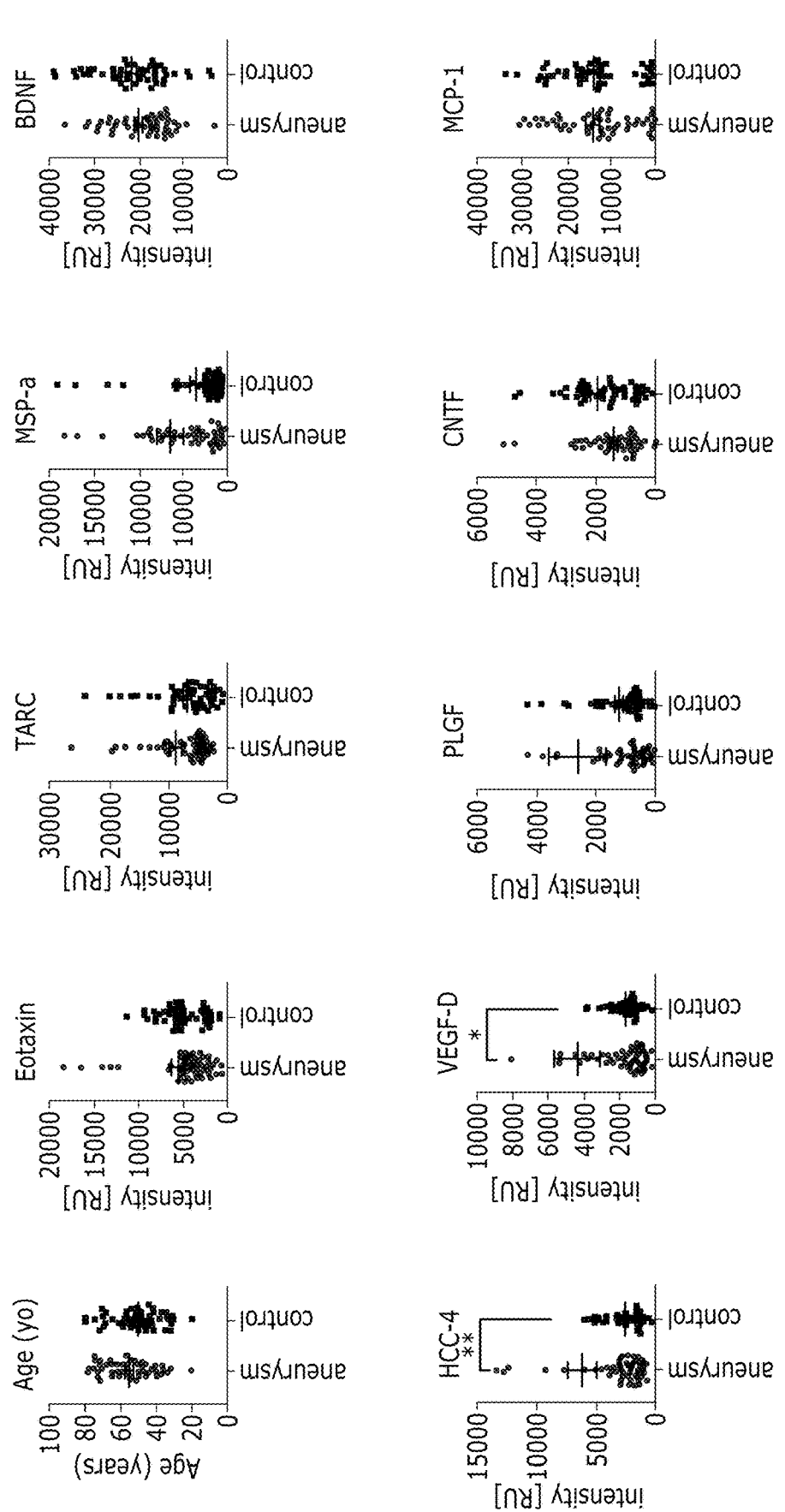
FIG. 10 shows differences in age and cytokine level intensities for selected features in the age-matched set.
Figure 10:
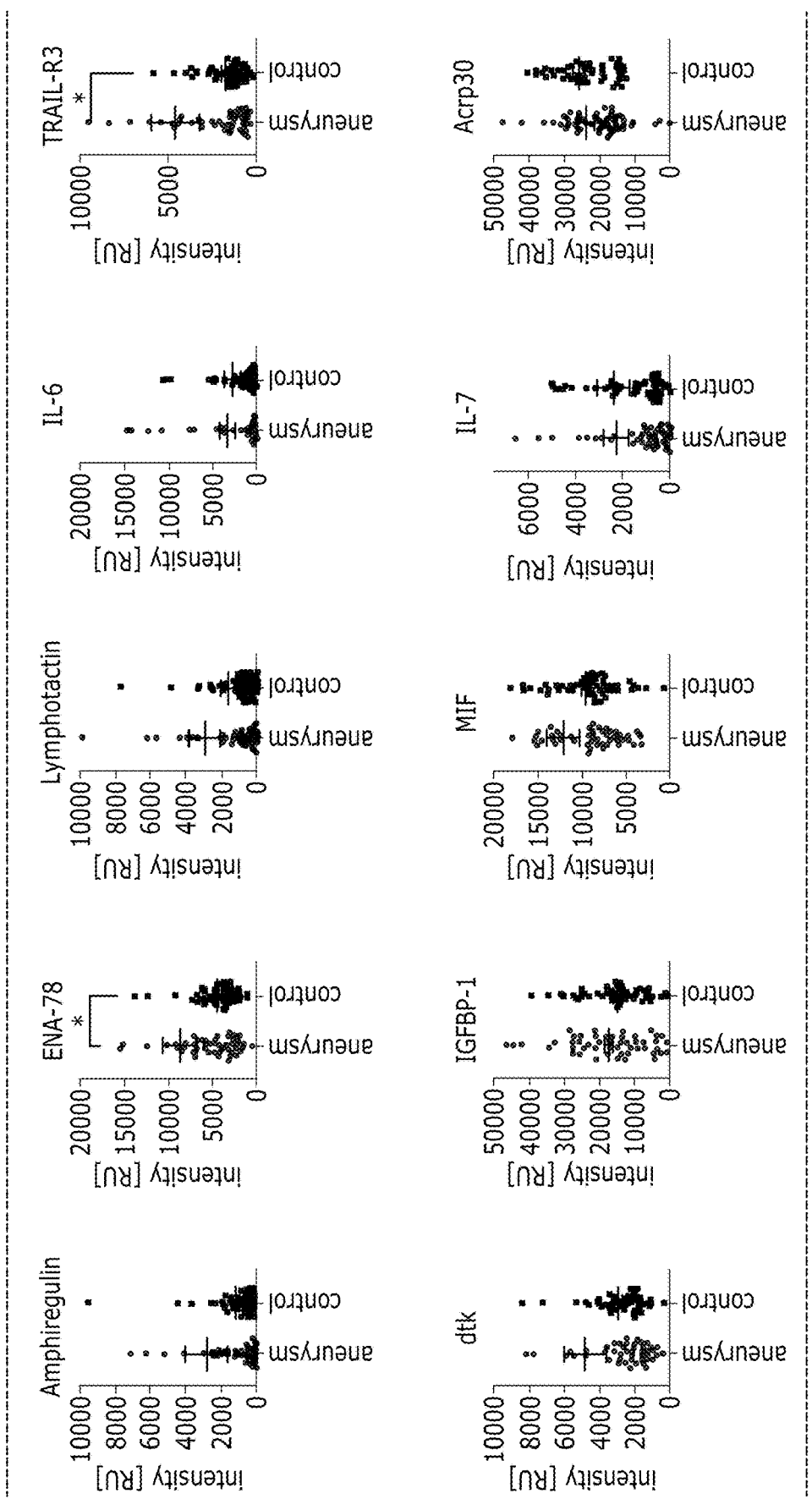
Figure 10:
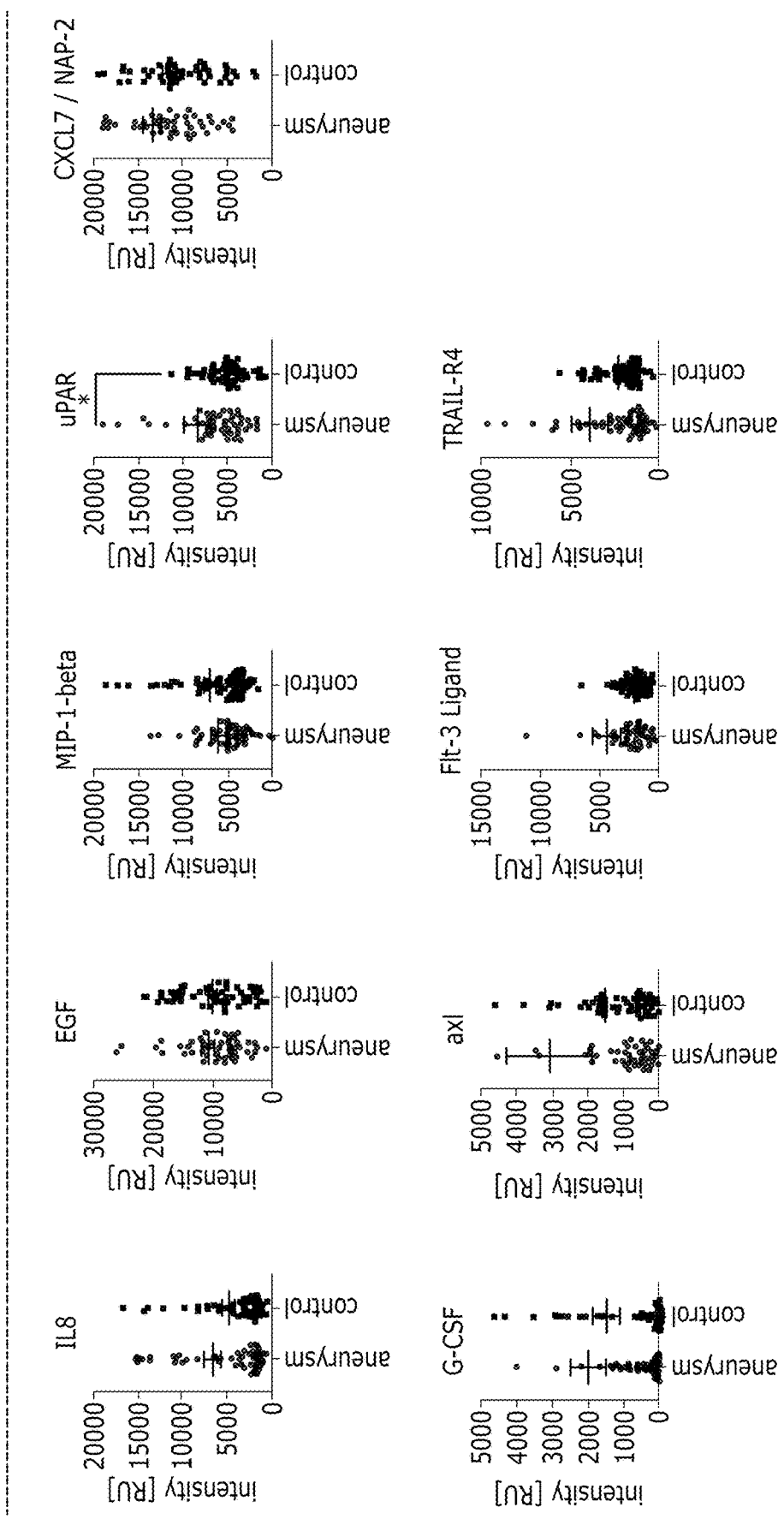

Human Cytokine Arrays—Differentiating between cerebral aneurysm inflammatory profiles and control patient profiles. A total of n=172 patients were included in this primary analysis. FIG. 3A shows relative heatmaps for 120 different circulating inflammatory cytokines for control patients (n=62), previously treated aneurysms (n=24), unruptured CAs patients (n=99) and ruptured aneurysm patients (n=11). Next, predictive models were created using AutoAI machine learning suite in IBM Watson Studio. FIG. 3B shows relationship map and progress map (90% to 10% split, 10-fold cross-validation) for models for predicting cerebral aneurysm presence with pipeline selection, feature transformation, and analysis scheme. FIG. 3C shows correlation matrices with top cytokines and features selected. FIG. 3D shows receiver operator curve (ROC) for validation cohort (90% to 10% split) for CA presence detection model using the full data set (n=172, no age-matching) results in a test based on 26 features with AUC of 100%. Group discrimination based on PCA analysis and confusion matrix are also shown in FIG. 3D. Model characteristics are shown in FIG. 8A. Due to concern for age-mismatch between positive and negative groups and selection of age-associated cytokines, a model in an age-matched analysis (n=100 patients, 90%: 10% training-validation split) was derived. FIG. 3E shows ROC, PCA analysis, and confusion matrix for age-matched analysis which resulted in a test based on 29 features (including age) and AUC of 84%, sensitivity of 80%, and specificity of 80%. Model characteristics are shown in FIG. 8B. Using the same selected features, the model was then trained on age-matched set and deployed it on full data set (n=172) resulting in ROC with AUC of 97.1%. Model characteristics are shown in FIG. 8C. Again, using the same selected features the model was then trained on age-matched set (n=100) and deployed it on bootstrapped data set (n=1000) resulting in ROC with AUC of 92.9%. Model characteristics are shown in FIG. 8D. Differences in age and cytokine level intensities between positive and negative groups for both non-age-matched and age-matched cohorts are shown in FIGS. 9 and 10, respectively.

Figure 3H:
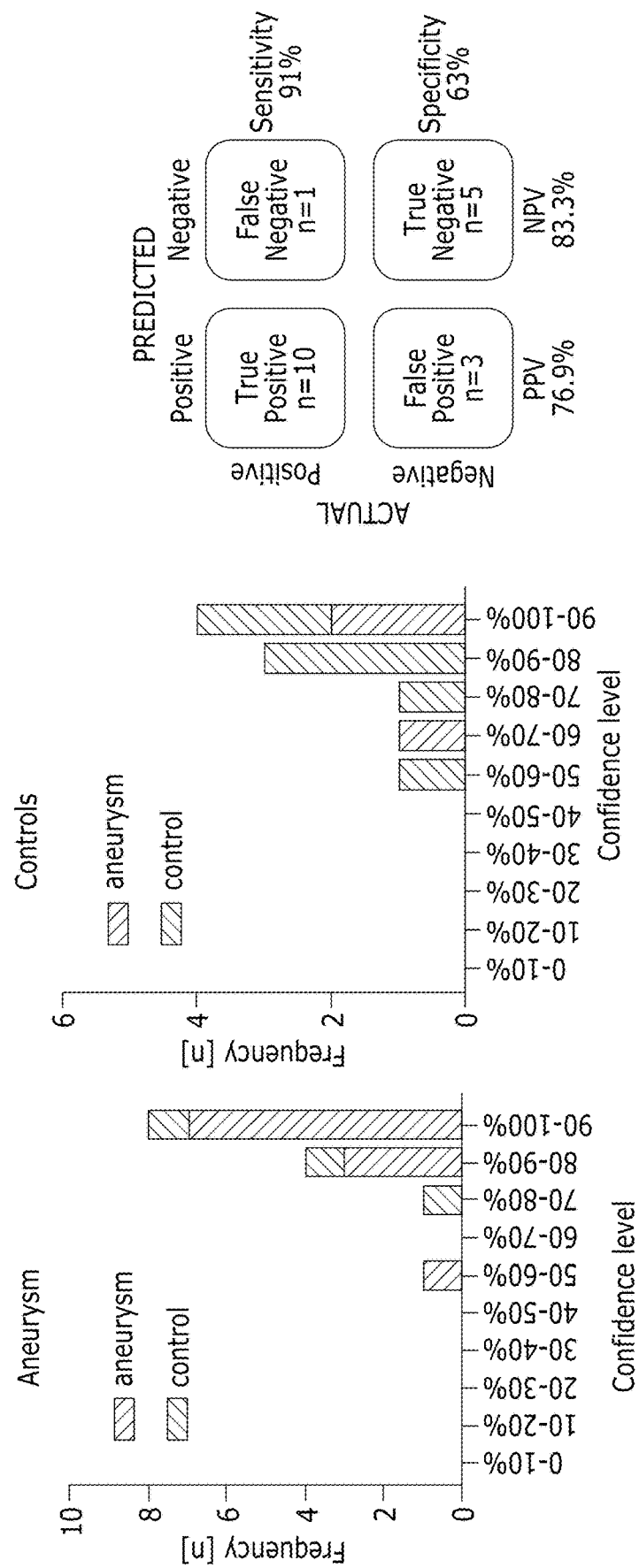
Figure 3I:
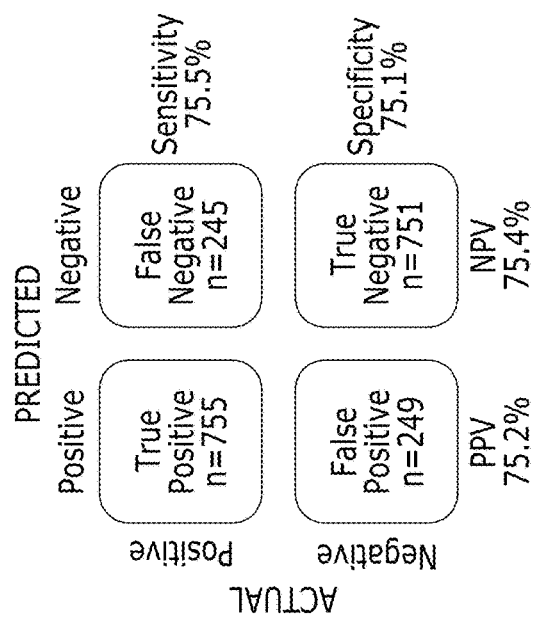
Figure 3I:
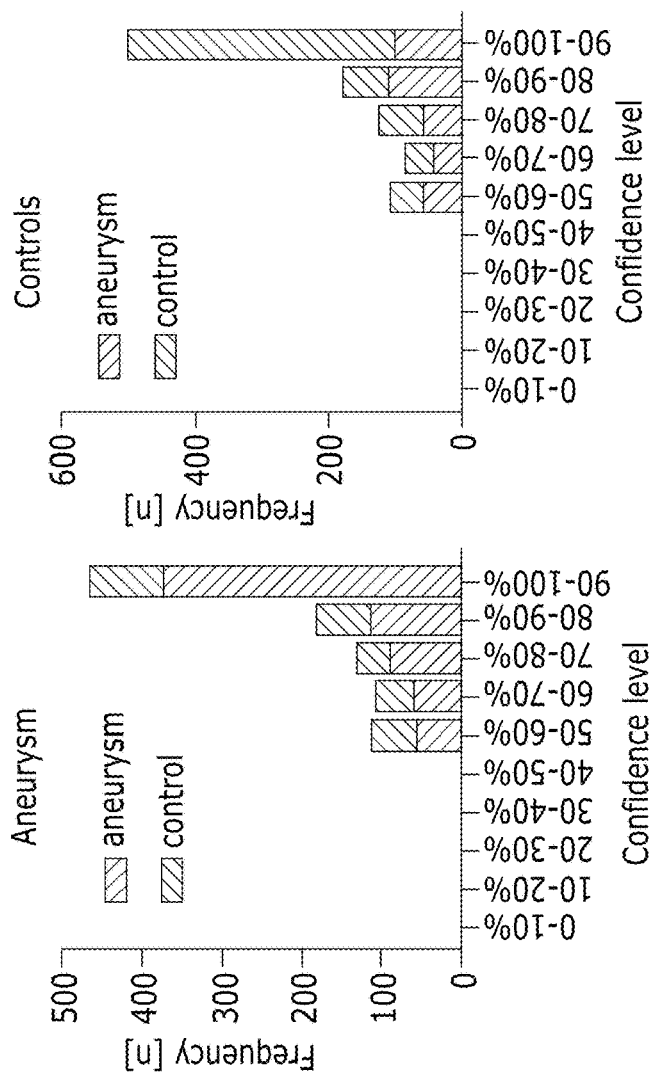
Figure 3J:
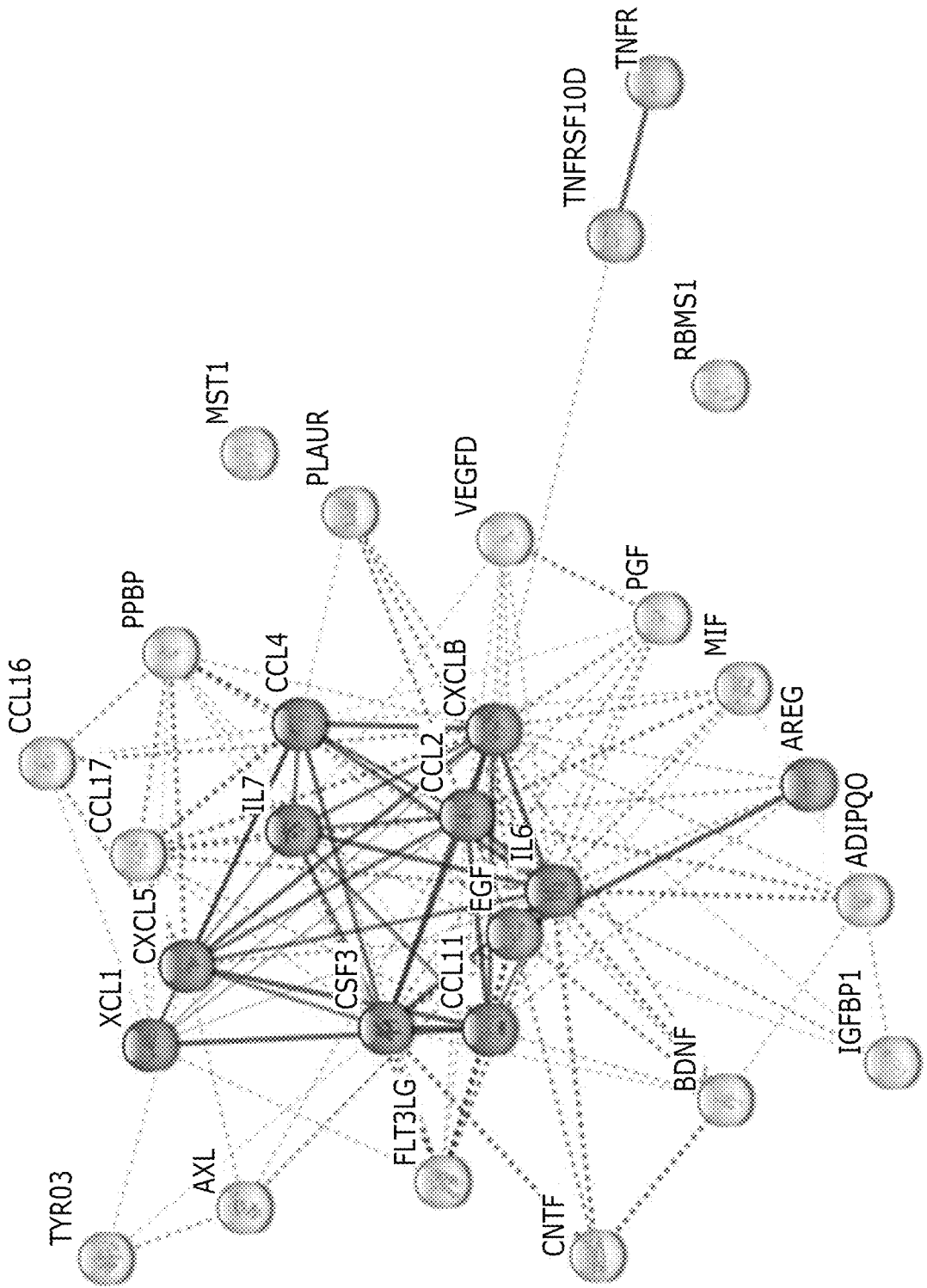

Next, diagnostic model performance in a secondary validation cohort that was obtained at a later date and a synthetic patient data set was developed in IBM Watsonx. As seen in FIGS. 3H-3J, diagnostic model performance was evaluated in a secondary validation cohort, a completely separate patient data set (n=19), for predicting cerebral aneurysm presence in patients harboring an aneurysm (with predictions and confidence level of those predictions), in control patients without an aneurysm (with predictions and confidence level of those predictions), and a final confusion matrix with test characteristics (FIG. 3H). Diagnostic model performance was also determined in a synthetic patient data set (n=1000) for predicting cerebral aneurysm presence in patients harboring an aneurysm (with predictions and confidence level of those predictions), in control patients without an aneurysm (with predictions and confidence level of those predictions), and a final confusion matrix with test characteristics (FIG. 3I).

Figure 11:
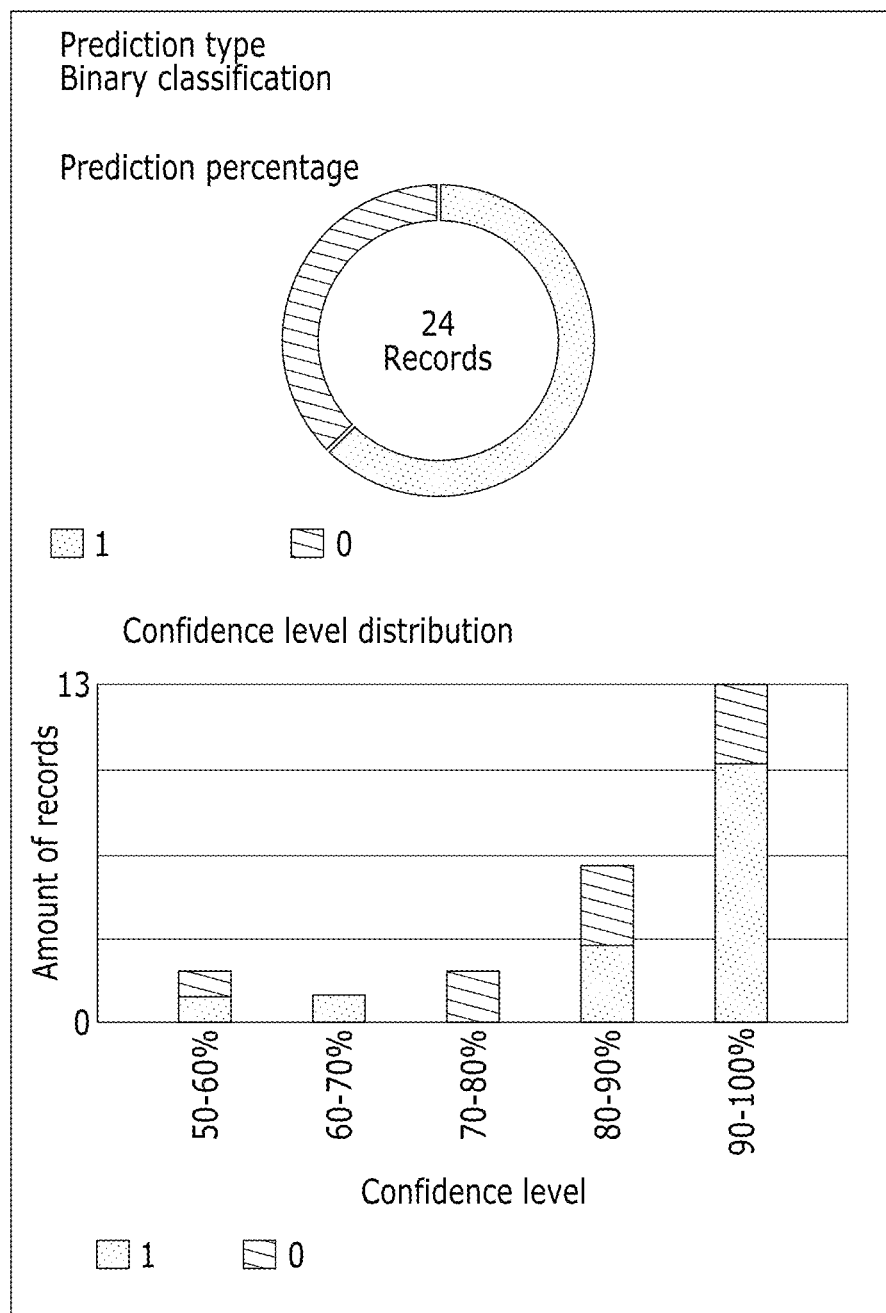
FIG. 11 shows secondary verification of top predictive model for aneurysm detection. For secondary verification at 80% confidence threshold resulted in predictions with 91% sensitivity, 63% specificity, 77% positive predictive value, 83% negative predictive value for n=19 samples, with n=5 samples below 80% confidence threshold in a total sample of n=24 patients (n=14 with aneurysms, n=10 control patients).

Predictive Models for Cerebral Aneurysm Detection—Secondary Validation. Secondary verification of top predictive model on n=24 patients (n=14 with aneurysms, n=10 control patients) at 80% confidence threshold resulted in predictions with 91% sensitivity, 63% specificity, 77% positive predictive value, 83% negative predictive value for n=19 samples, with n=5 samples below 80% confidence threshold (FIG. 11).

Figure 4A:
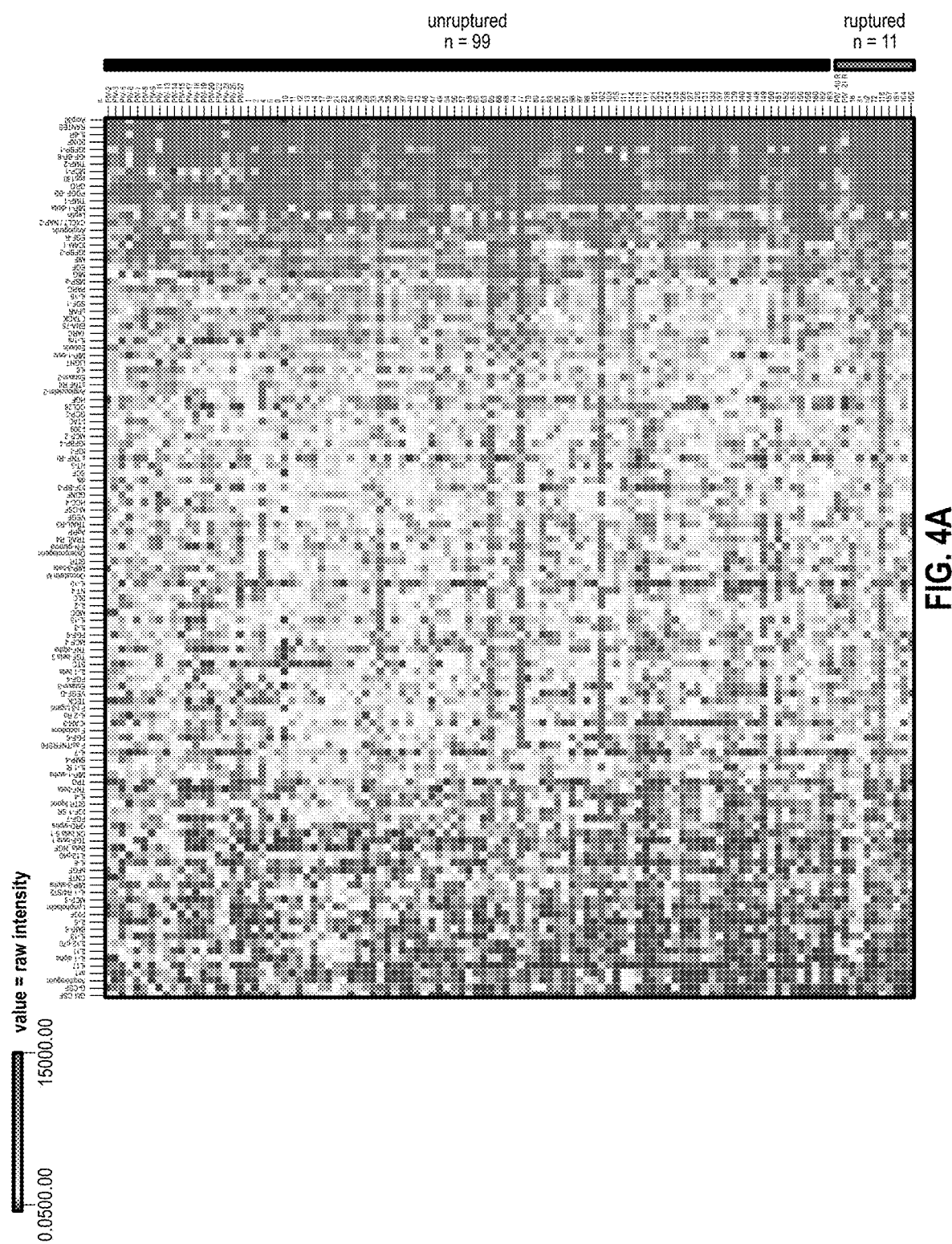
FIGS. 4A-4G illustrate association between inflammatory cytokines in unruptured vs ruptured cerebral aneurysms.
Figure 4B:
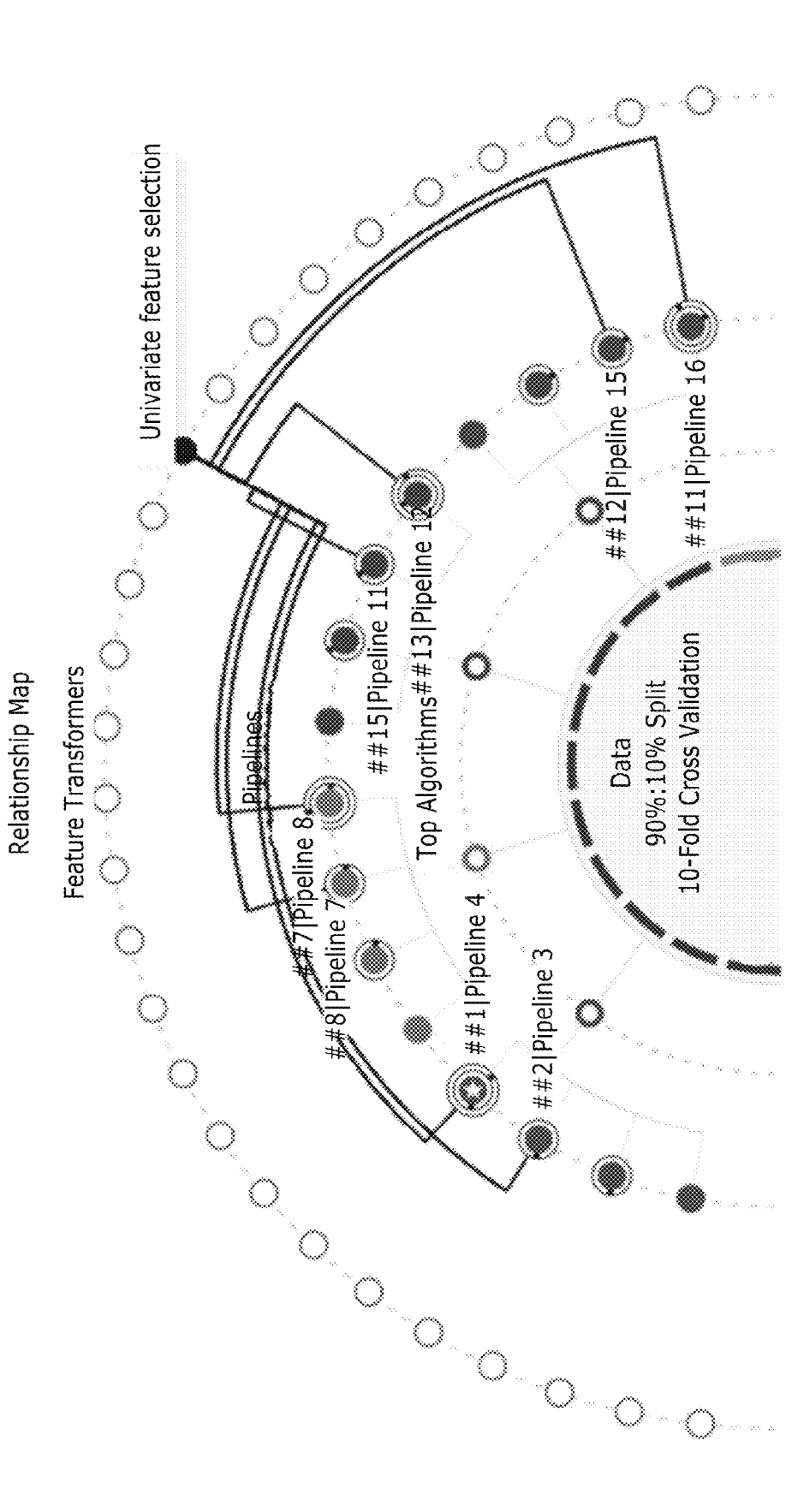
Figure 4B:
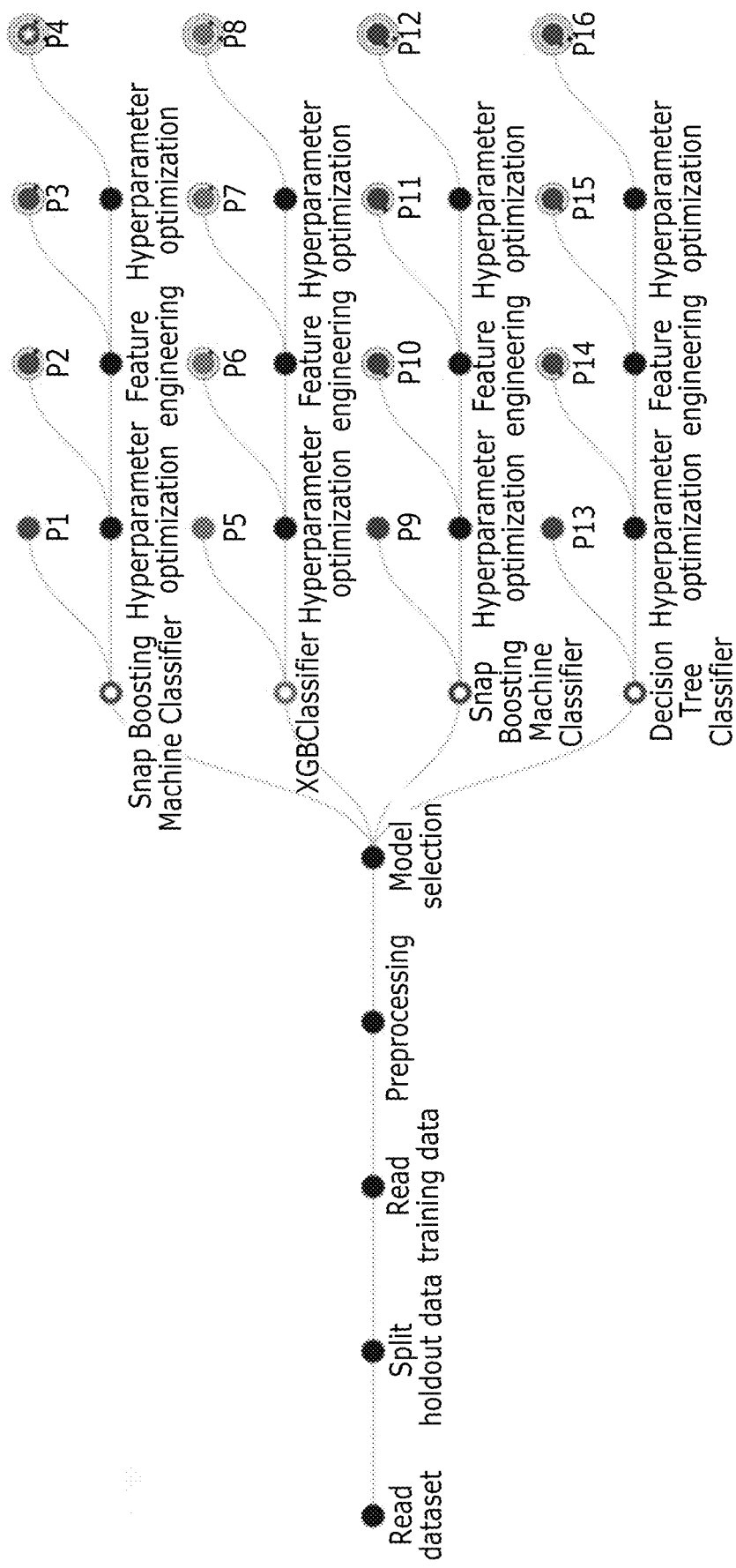
Figure 4C:
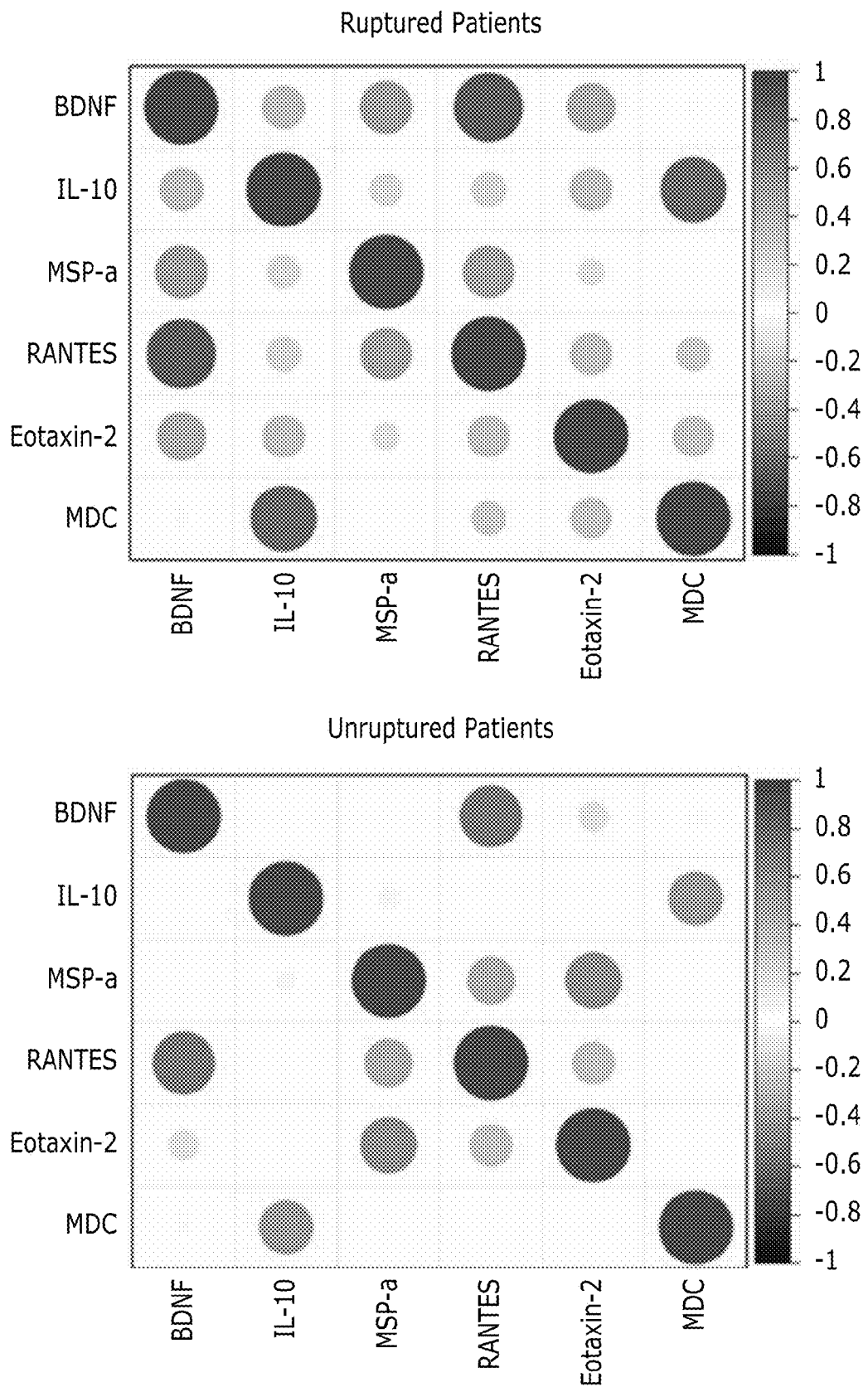
Figure 4D:
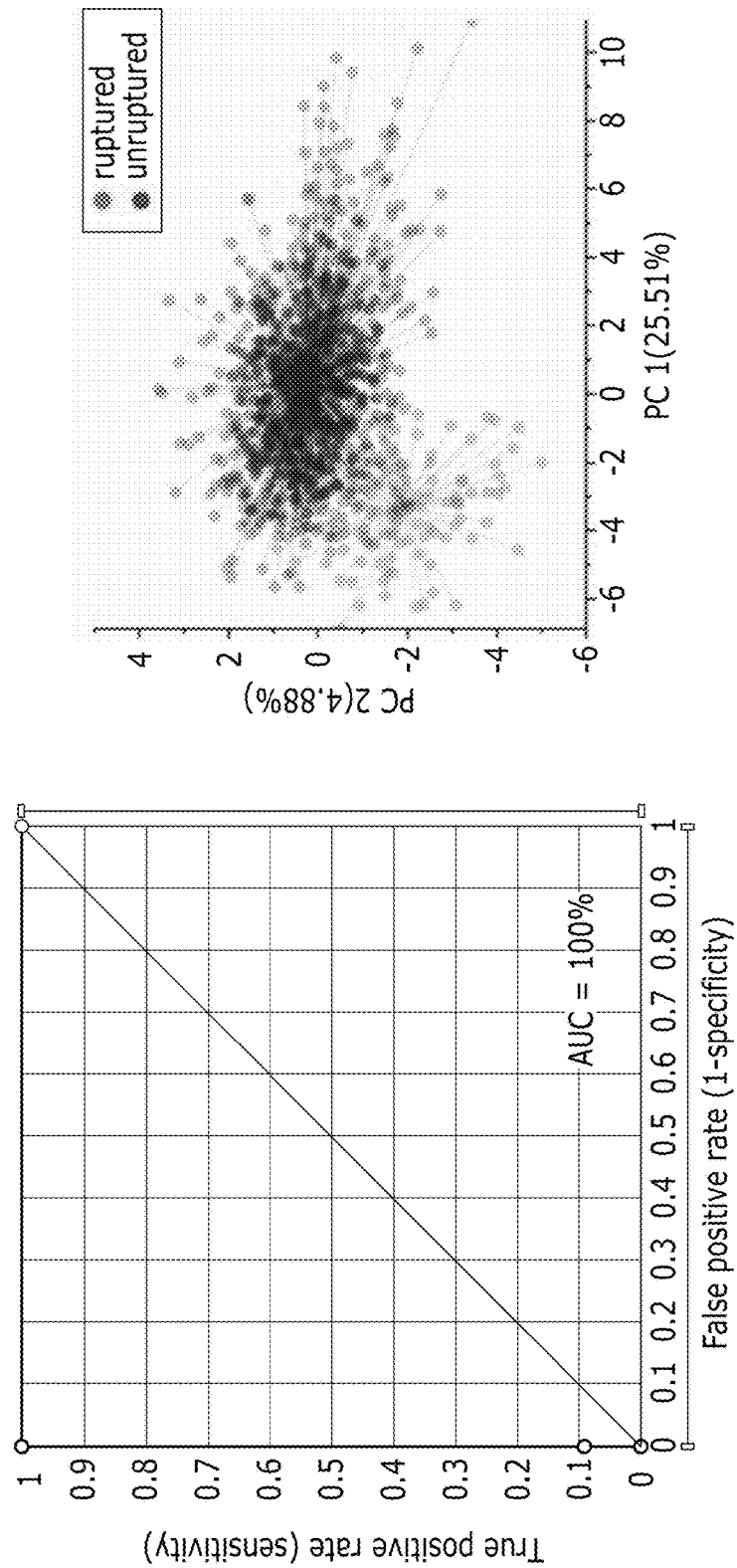
Figure 4D:
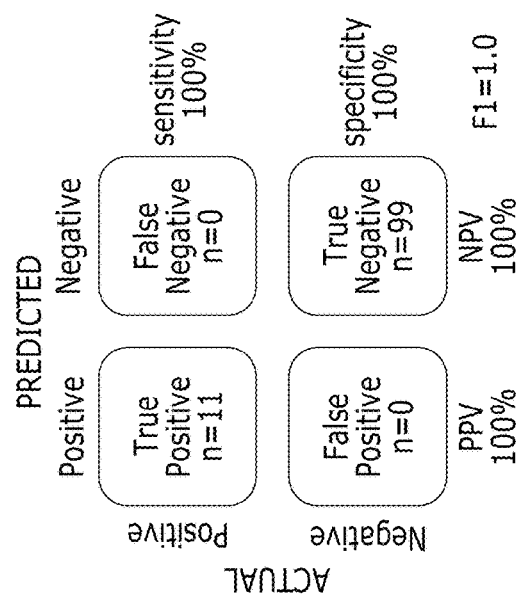
Figure 4D:
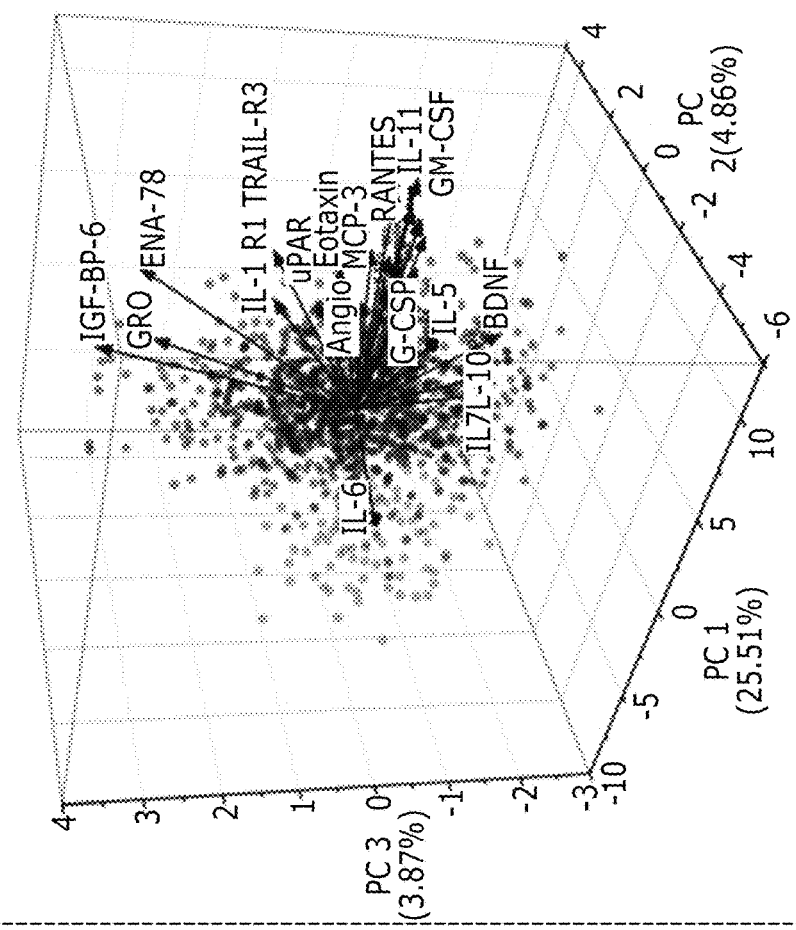
Figure 4E:
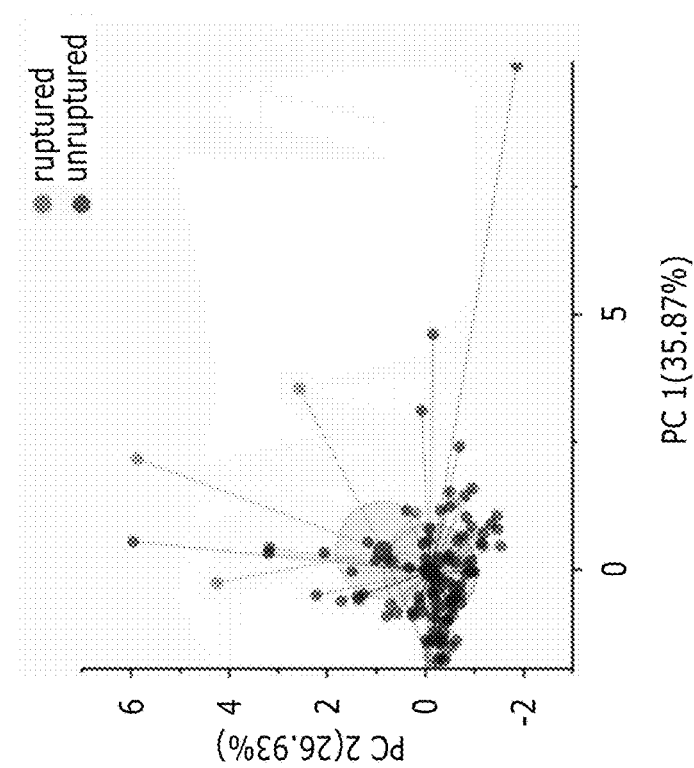
Figure 4E:
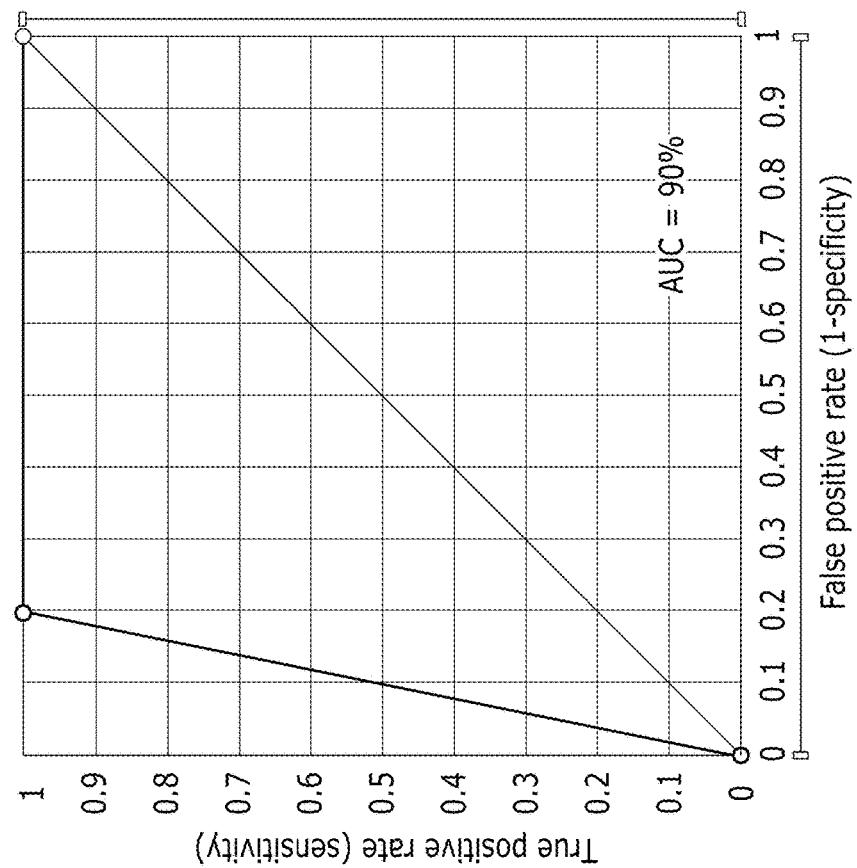
Figure 4E:
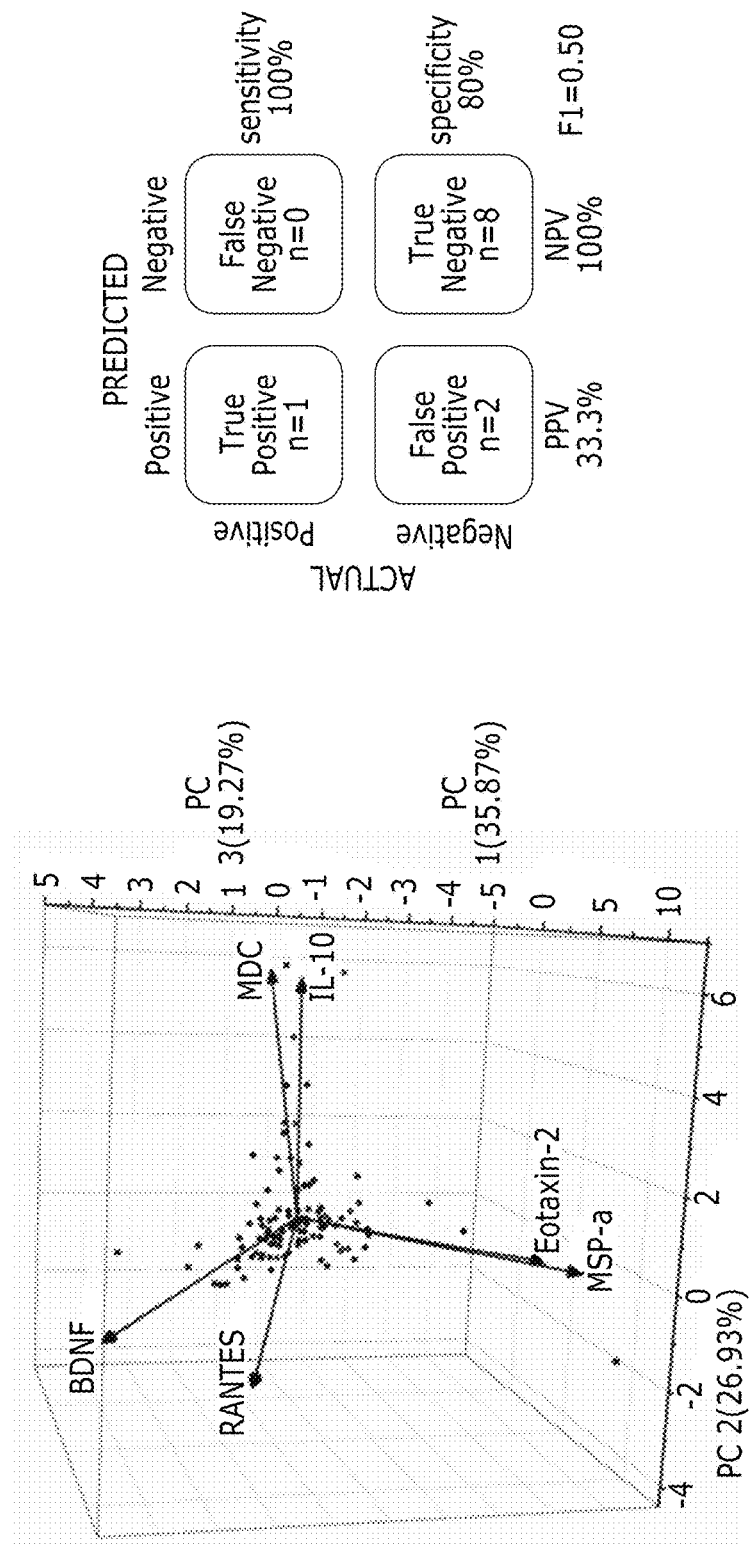
Figure 12A:
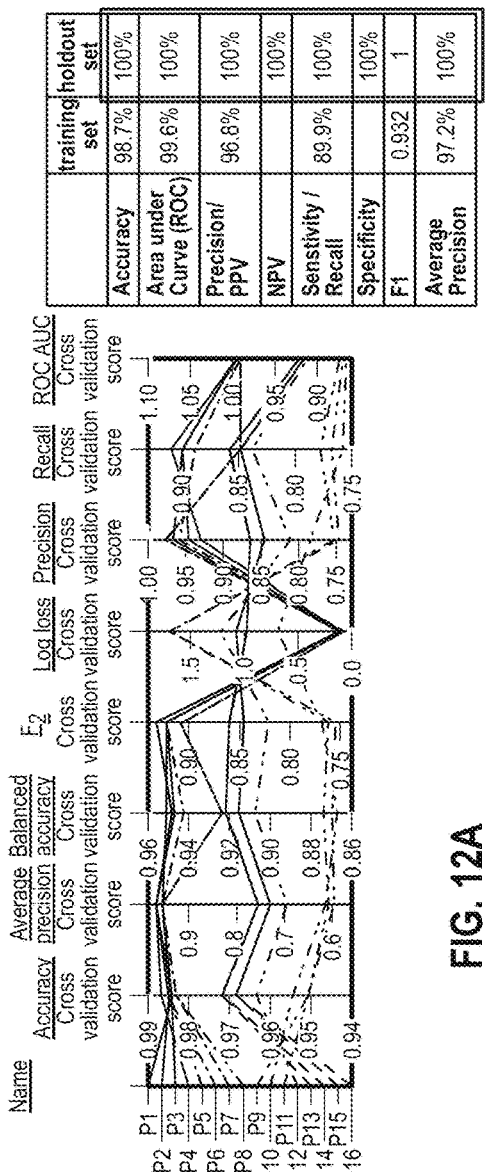
FIGS. 12A and 12B show selected features, developed pipelines and top model characteristics for predicting cerebral rupture presence. Panels showing selected features (cytokines, optimized features, engineered features, and age if selected), their importance, model characteristics developed for 16 different pipelines, and top model characteristics in both training and holdout sets for model trained and validated on bootstrapped data set (n=1100) (FIG. 12A), and trained on bootstrapped data set (n=1100) and validated on full data set (n=110) (FIG. 12B).
Figure 12B:
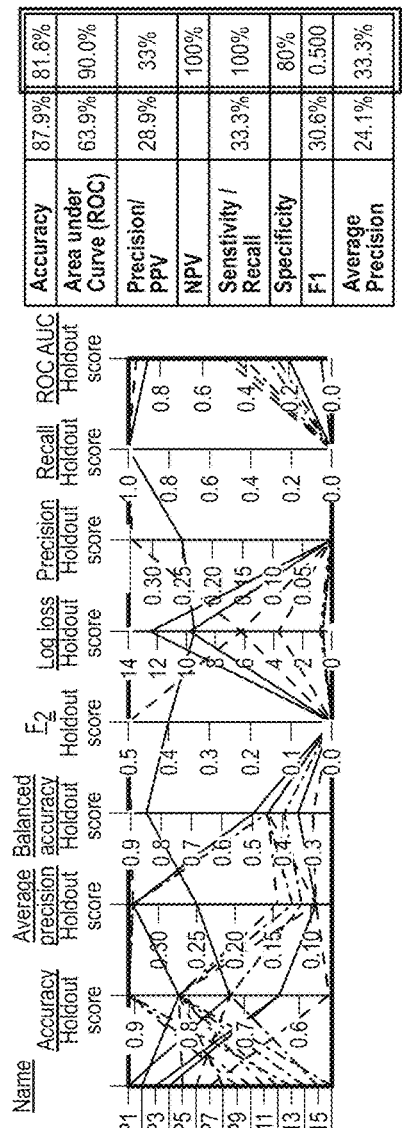
Figure 13:
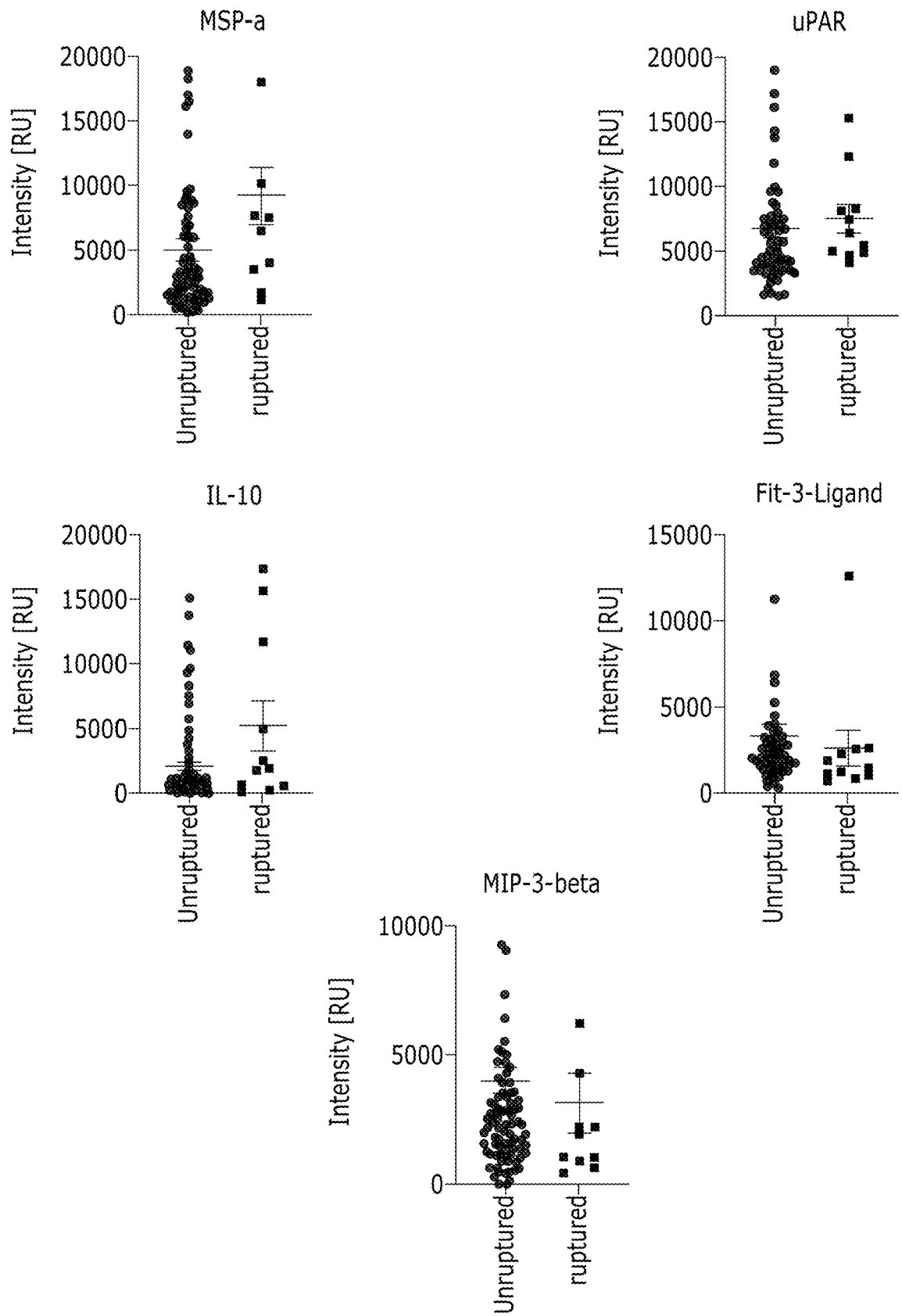
FIG. 13 shows differences in age and cytokine level intensities for selected features in unruptured vs ruptured aneurysm patient cohorts.

Human Cytokine Arrays—Differentiating between ruptured and unruptured cerebral aneurysm inflammatory profiles. A total of n=110 patients were included in this analysis. FIG. 4A shows relative heatmap for 120 different circulating inflammatory cytokines for unruptured CAs patients (n=99) and ruptured aneurysm patients (n=11). Predictive models were created using AutoAI in IBM Watson Studio. An initial attempt was made to develop predictive models without using bootstrapping, but model characteristics were poor requiring use of resampling to improve feature selection first. FIG. 4B shows relationship map and progress map (90% to 10% split, 10-fold cross-validation) for models for predicting ruptured cerebral aneurysm presence with pipeline selection, feature transformation, and analysis scheme. FIG. 4C shows correlation matrices with the top selected features. FIG. 4D shows ROC, PCA analysis, and confusion matrix for validation cohort (90% to 10% split) in a bootstrapped data set (n=1100) for ruptured CA profile detection model results in a test with validation AUC 100%. Next, FIG. 4E shows ROC, PCA analysis and confusion matrix for differentiating unruptured vs ruptured inflammatory profiles after optimization on bootstrapped data set for training (n=1100) and validated on full set (n=110) results in a model with AUC 90%, F1-score 0.50, 100% sensitivity and 80% specificity. Model characteristics and features selected are shown in FIGS. 12A and 12B. Differences in cytokine level intensities between unruptured and ruptured groups are shown in FIG. 13.

Figure 4F:
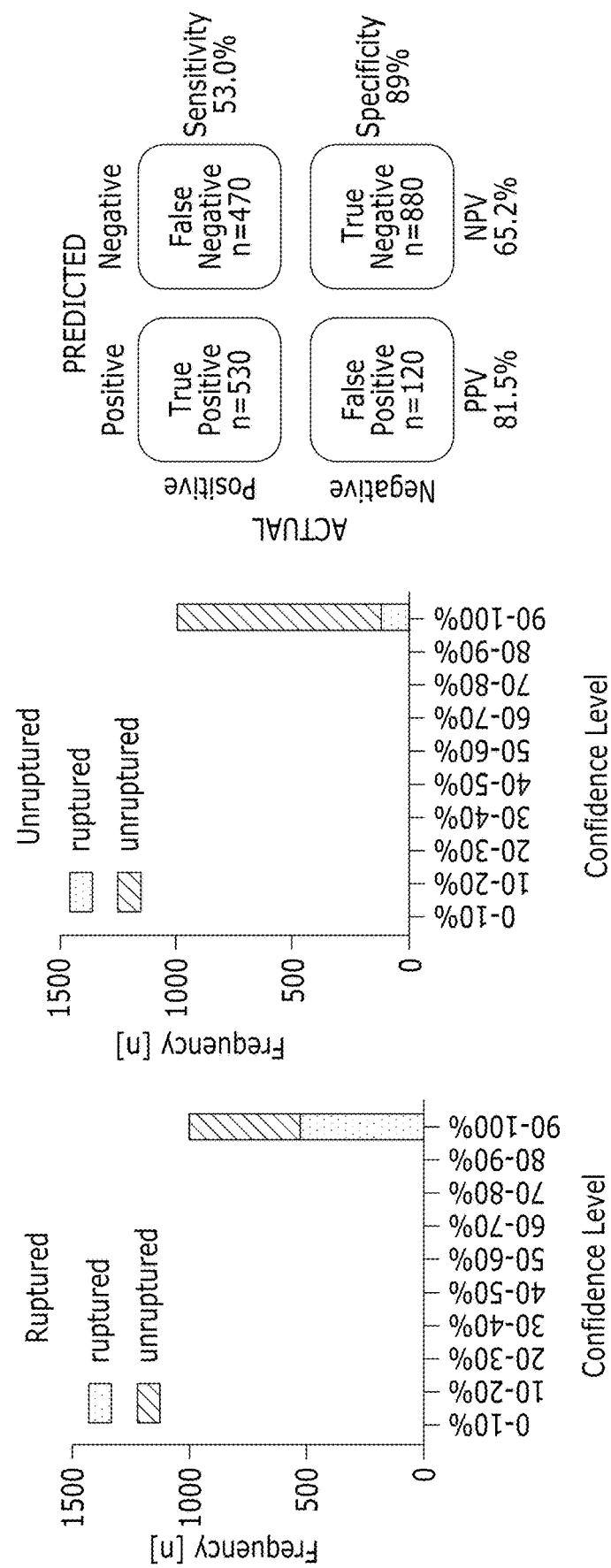
Figure 4G:
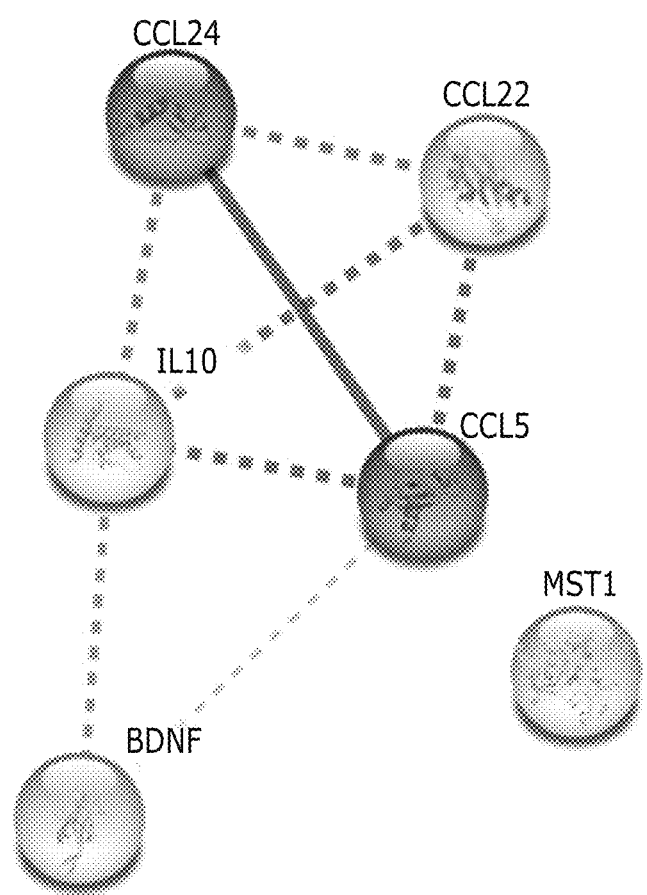

Further, diagnostic model performance was assessed in secondary validation cohort, a synthetic patient data set (n=1000), for predicting ruptured cerebral aneurysm status in those with ruptured aneurysms (with predictions and confidence level of those predictions), in unruptured cerebral aneurysm patients (with predictions and confidence level of those predictions), and a final confusion matrix with test characteristics (FIG. 4F).

Figure 5A:
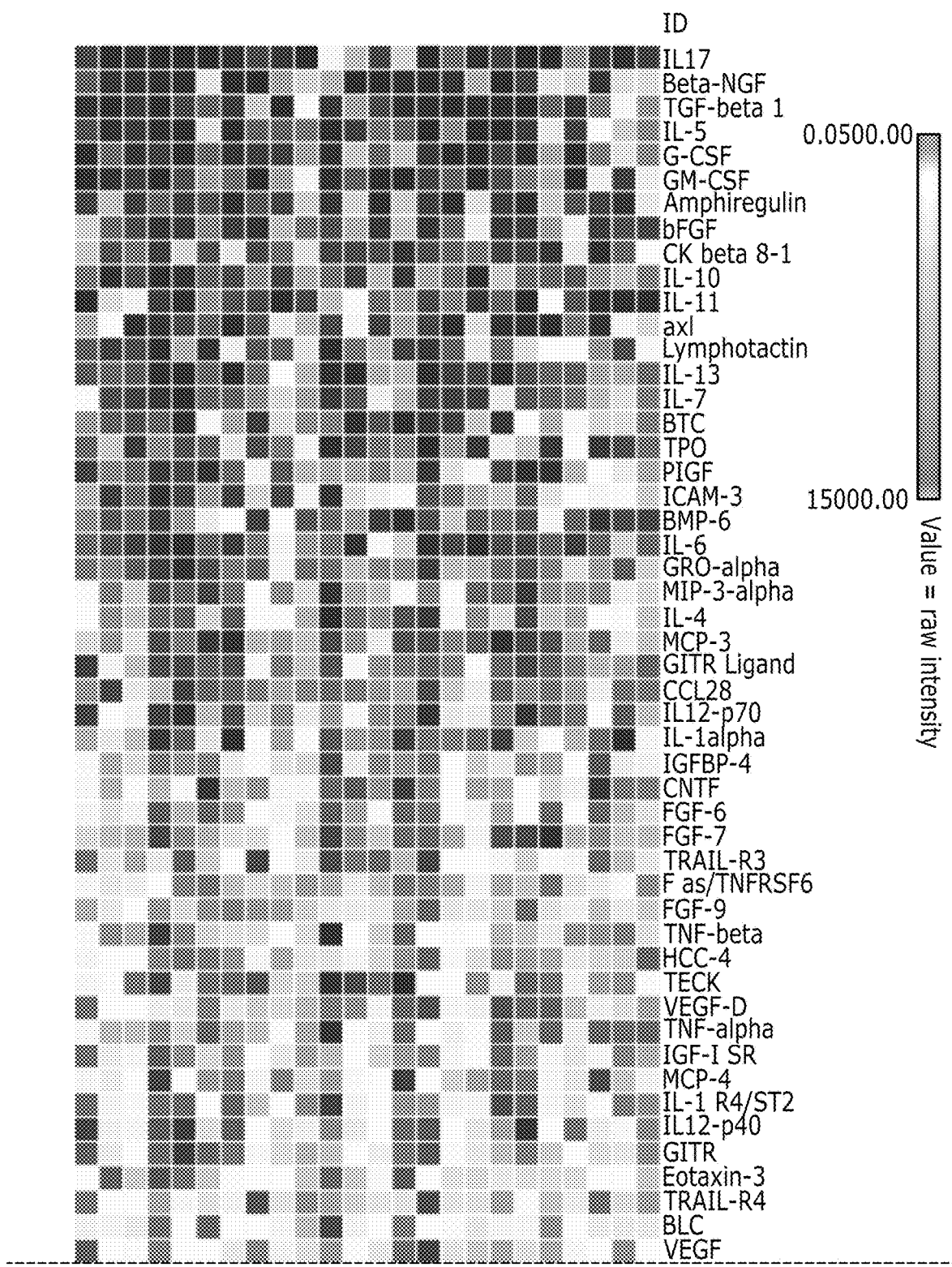
FIGS. 5A-5H illustrate association between inflammatory cytokines in treated and secured vs treated and unsecured cerebral aneurysms.
Figure 5A:
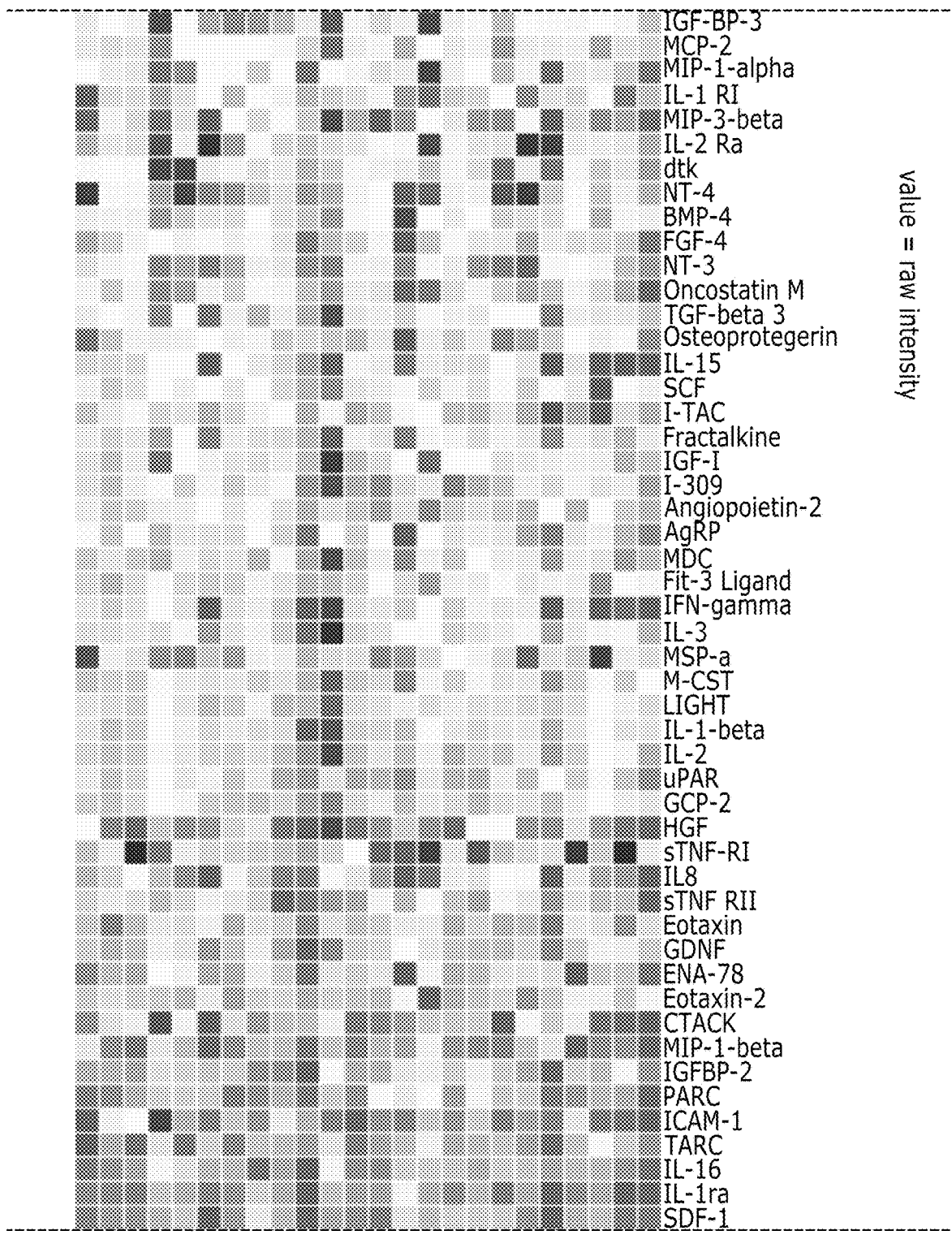
Figure 5A:
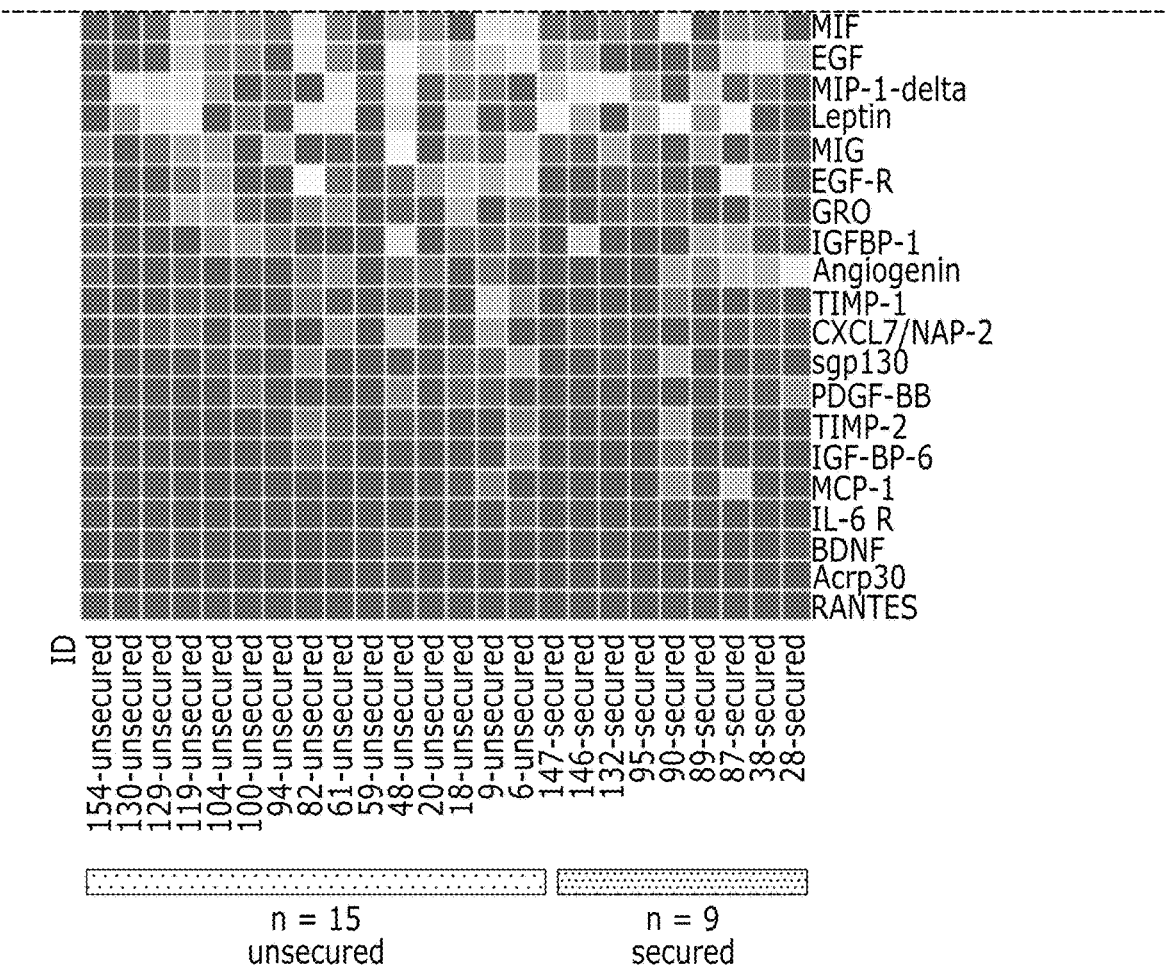
Figure 5B:
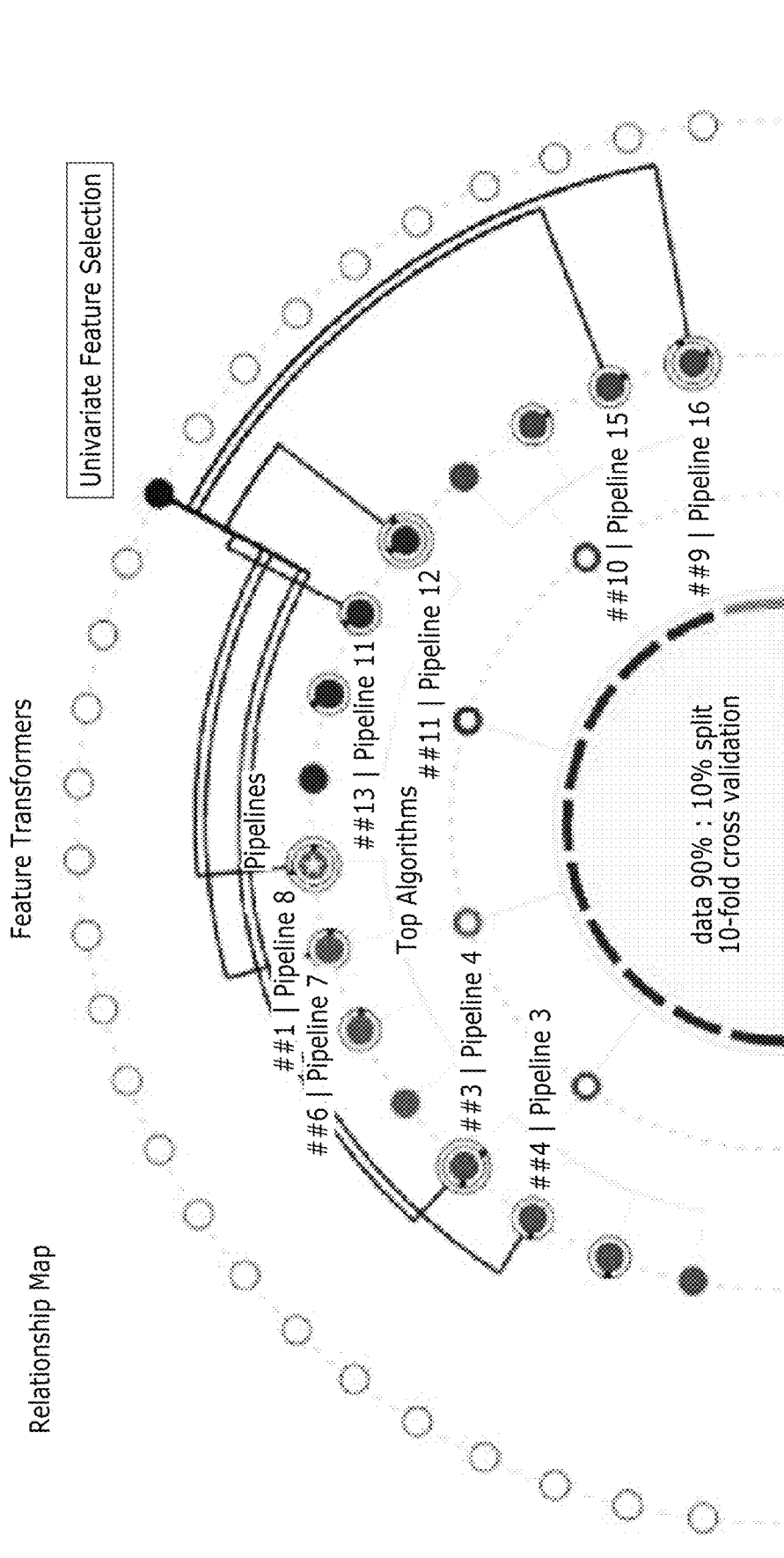
Figure 5B:
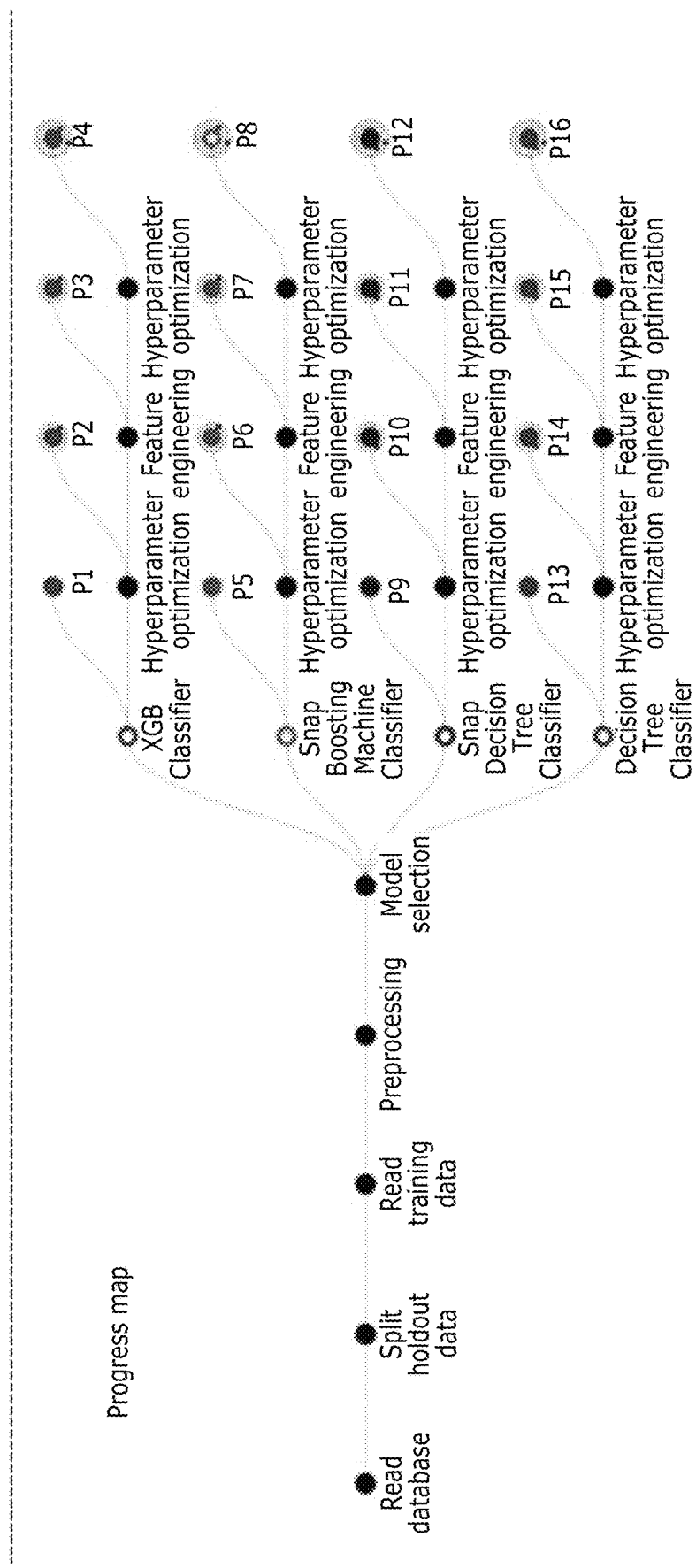
Figure 5C:
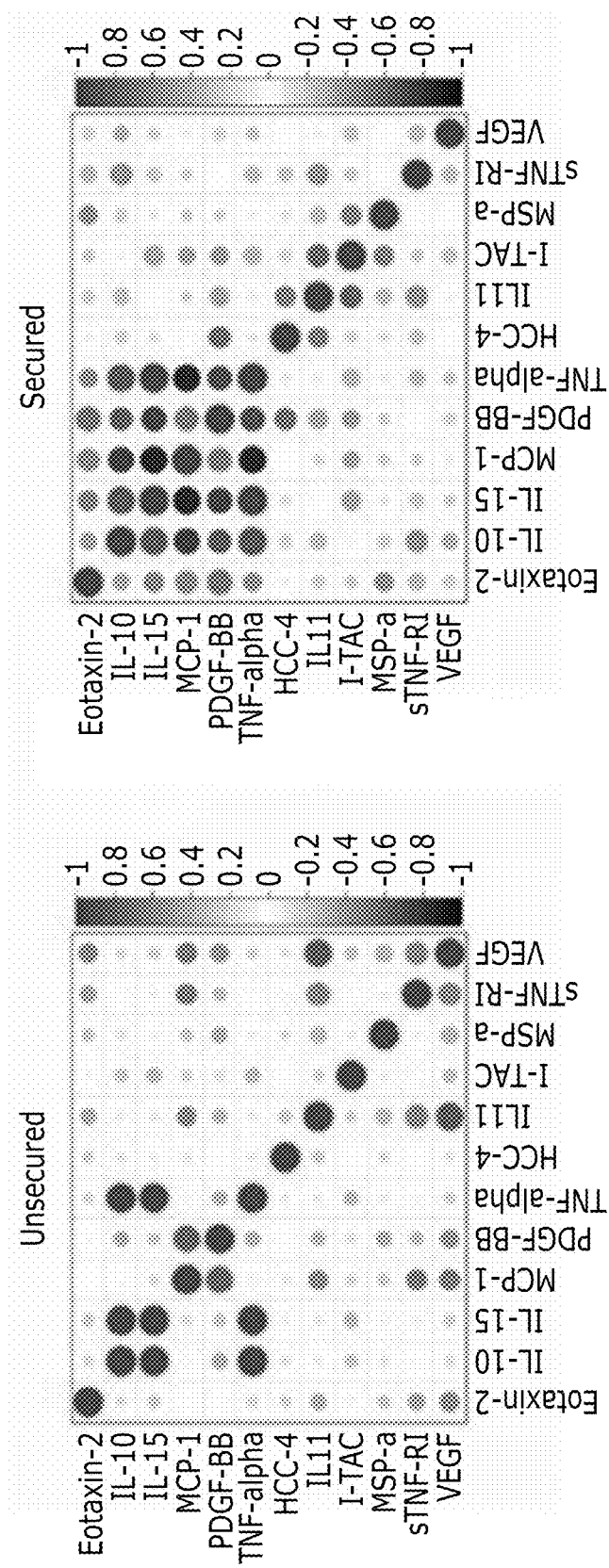
Figure 5D:
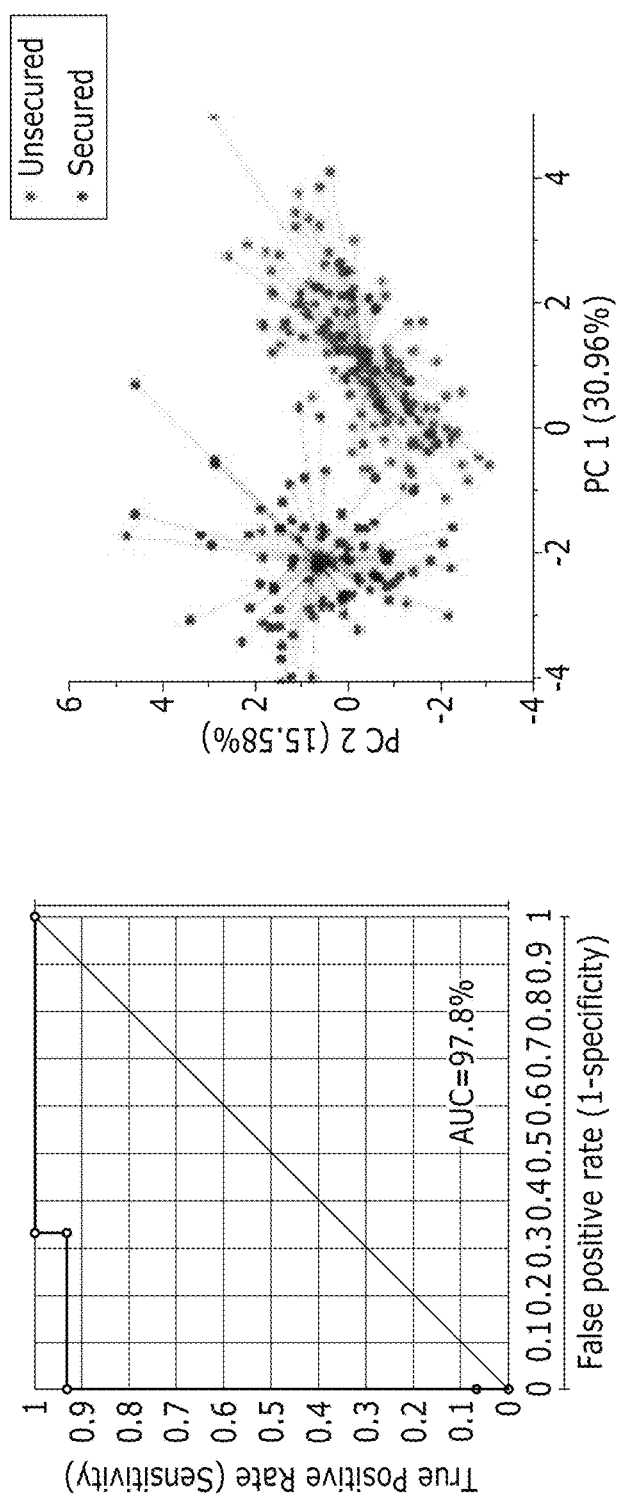
Figure 5D:
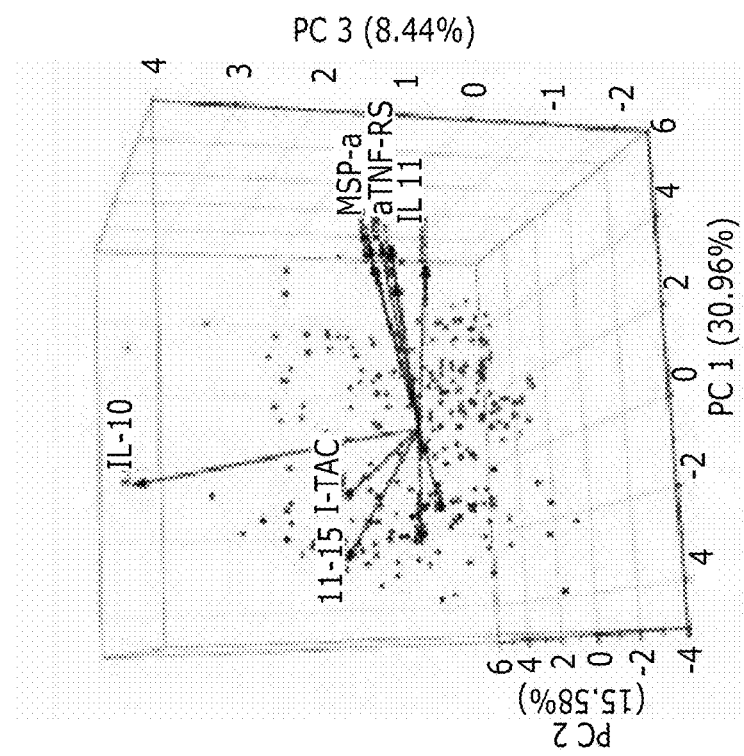
Figure 5E:
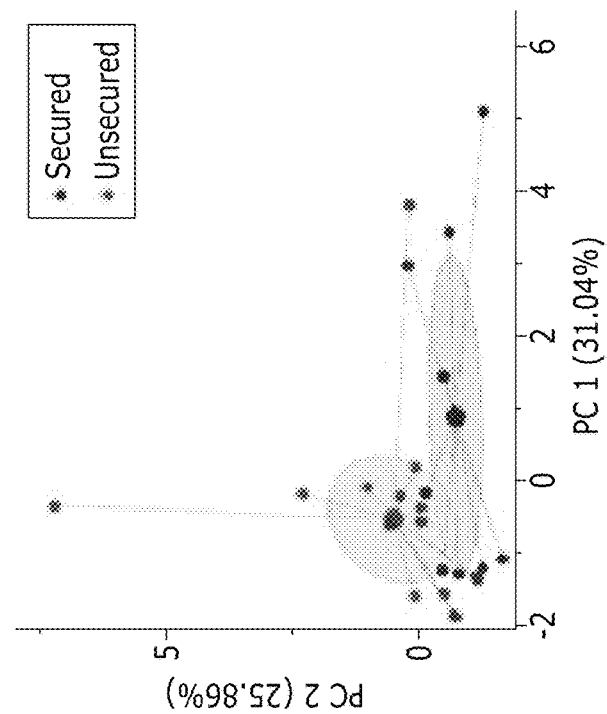
Figure 5E:
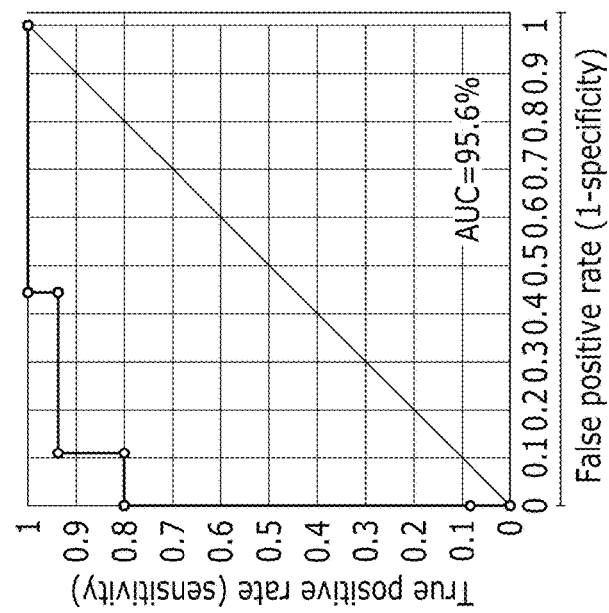
Figure 5E:
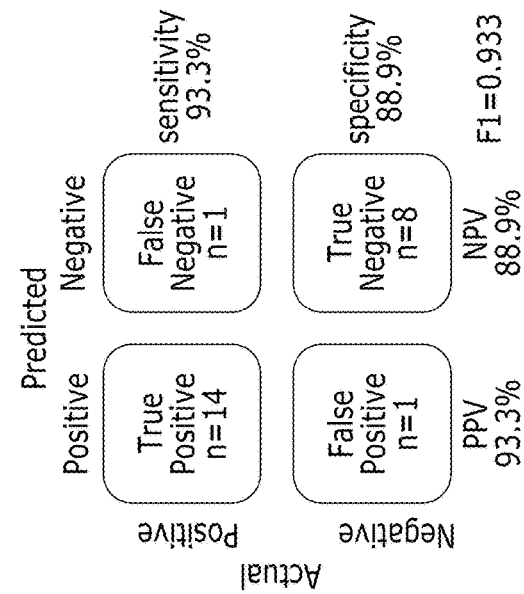
Figure 5E:
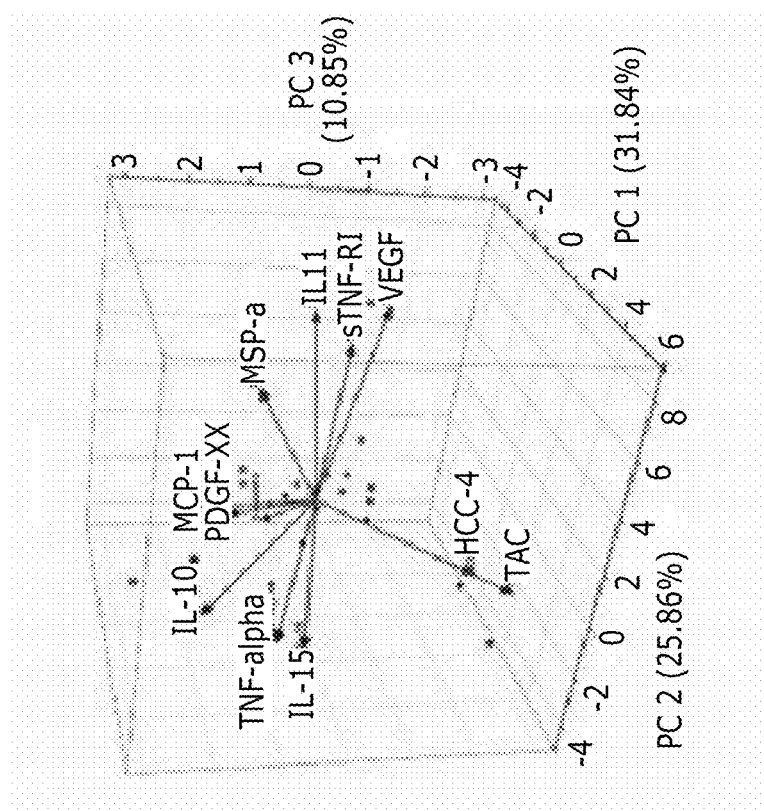
Figure 15:
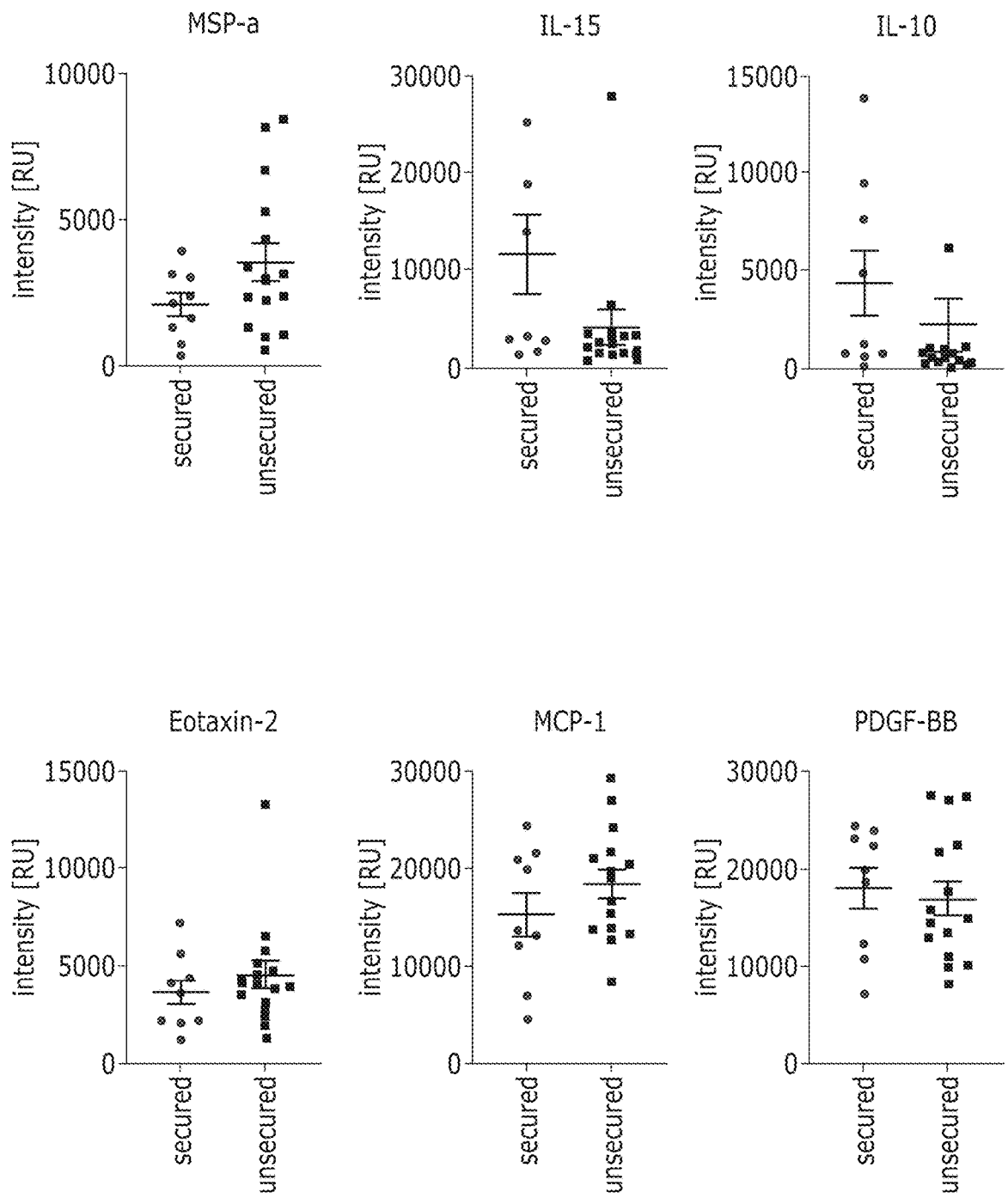
FIG. 15 shows differences in age and cytokine level intensities for selected features in secured vs unsecured aneurysm patient cohorts.
Figure 15:
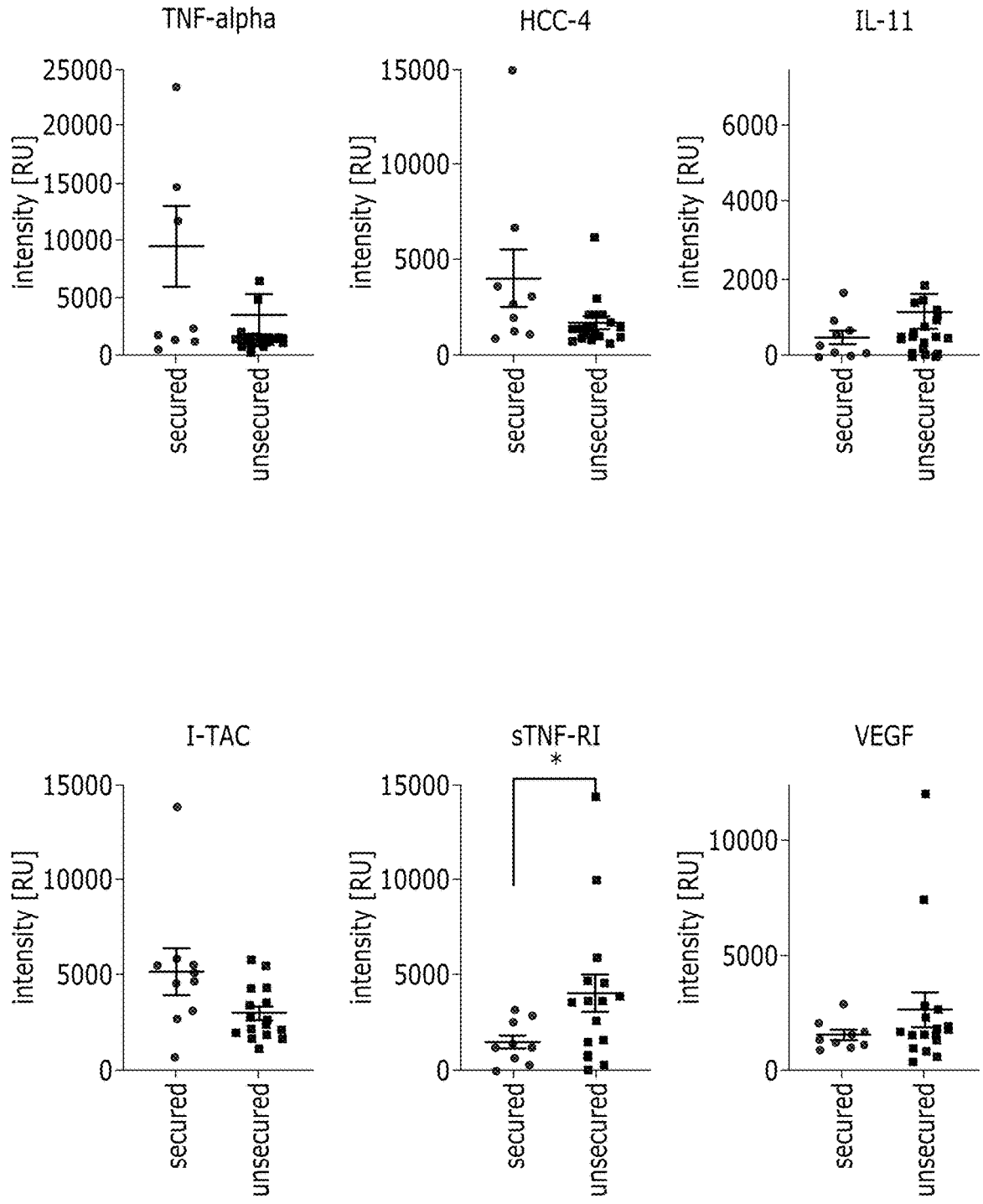

Human Cytokine Arrays—Differentiating between secured aneurysms and aneurysm remnants in previously treated CA patient cohort. A total of n=24 patients were included in this analysis. FIG. 5A shows relative heatmaps for 120 different circulating inflammatory cytokines for treated CAs patients with fully secured aneurysms (n=9) and treated CA patients with aneurysm remnants or recurrences (n=15). An initial attempt was made to develop predictive models without using bootstrapping, but model characteristics were poor requiring use of resampling to identify feature selection first. FIG. 5B shows relationship map and progress map (90% to 10% split, 10-fold cross-validation) for models for predicting unsecured cerebral aneurysm presence with pipeline selection, feature transformation, and analysis scheme. FIG. 5C shows correlation matrices with the top selected features. FIG. 5D shows ROC, PCA analysis, and confusion matrix for validation cohort (90% to 10% split) in a bootstrapped data set (n=240) for unsecured CA profile detection model results in a test with validation AUC 97.8%. Next, FIG. 5E shows ROC, PCA analysis and confusion matrix for differentiating unsecured vs secured profiles after optimization on bootstrapped data set for training (n=240) and validated on full set (n=24) results in a model with AUC 95.6%, F1-score 0.933, 93.3% sensitivity and specificity of 88.9%. Model characteristics and features selected are shown in FIGS. 14A and 14B. Differences in cytokine level intensities between secured and unsecured groups are shown in FIG. 15.

Figure 5F:
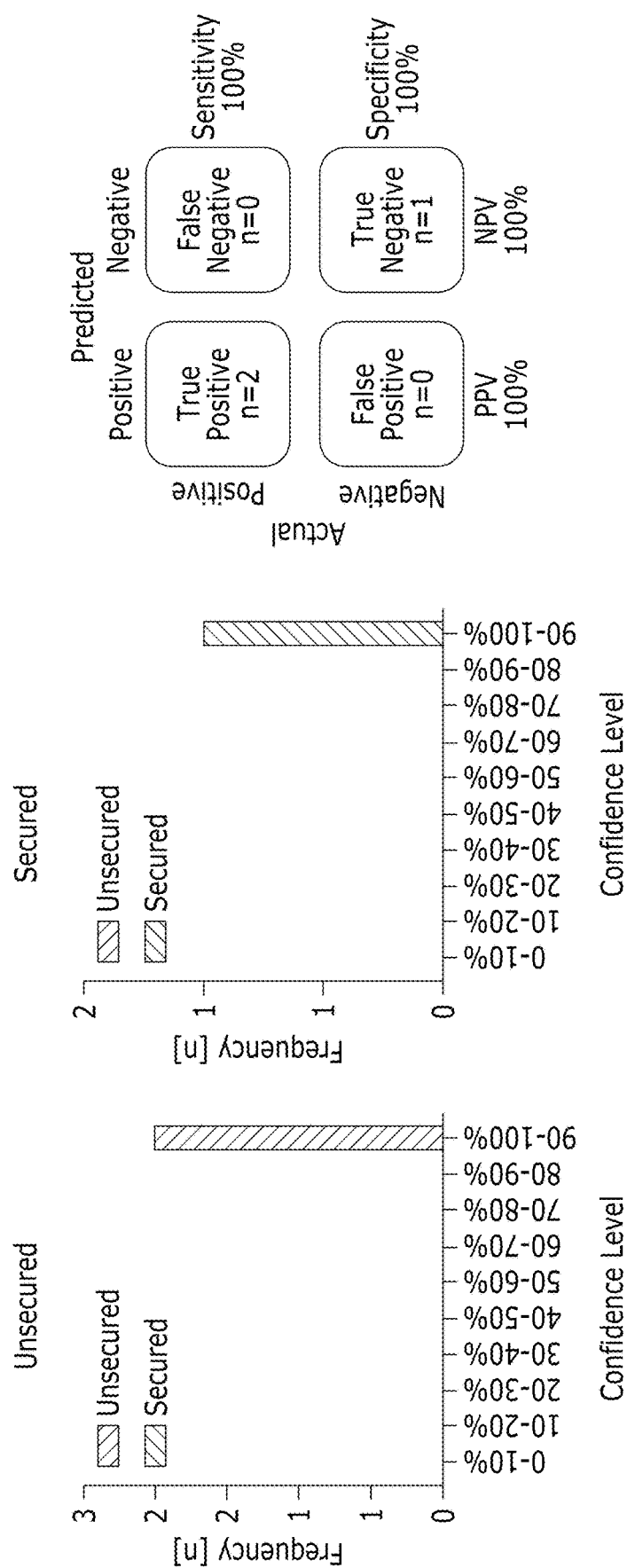
Figure 5G:
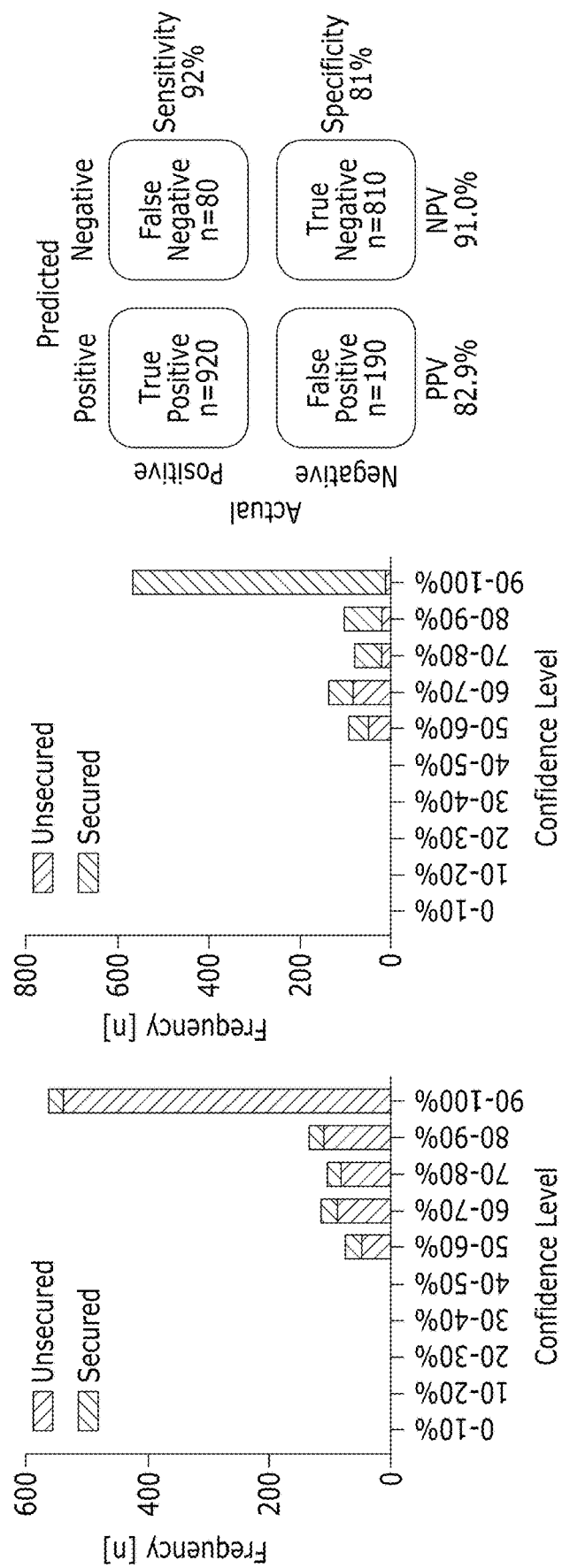
Figure 5H:
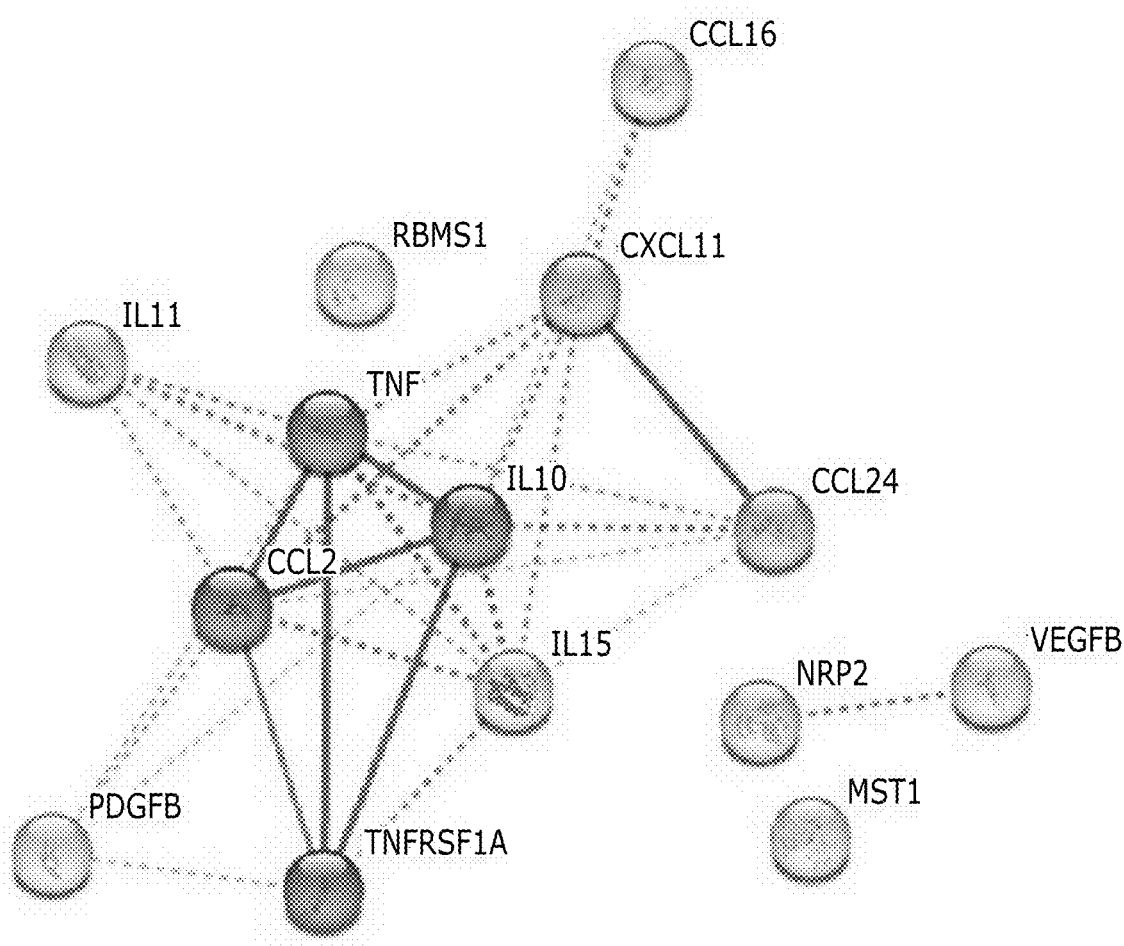

Moreover, diagnostic model performance was determined in a secondary validation cohort that was obtained at a later date and a synthetic patient data set developed in IBM Watsonx. As in seen in FIG. 5F, diagnostic model performance was analyzed in a secondary validation cohort, a completely separate patient data set (n=3), for predicting unsecured cerebral aneurysm presence in patients with previously treated aneurysm (with predictions and confidence level of those predictions), in secured patients with successfully treated aneurysm (with predictions and confidence level of those predictions), and a final confusion matrix with test characteristics (FIG. 5F). Further, as illustrated in FIG. 5G, diagnostic model performance was reviewed in a synthetic patient data set (n=1000) for predicting unsecured cerebral aneurysm presence in patients with previously treated aneurysm (with predictions and confidence level of those predictions), in secured patients with successfully treated aneurysm (with predictions and confidence level of those predictions), and a final confusion matrix with test characteristics (FIG. 5G).

Figure 6A:
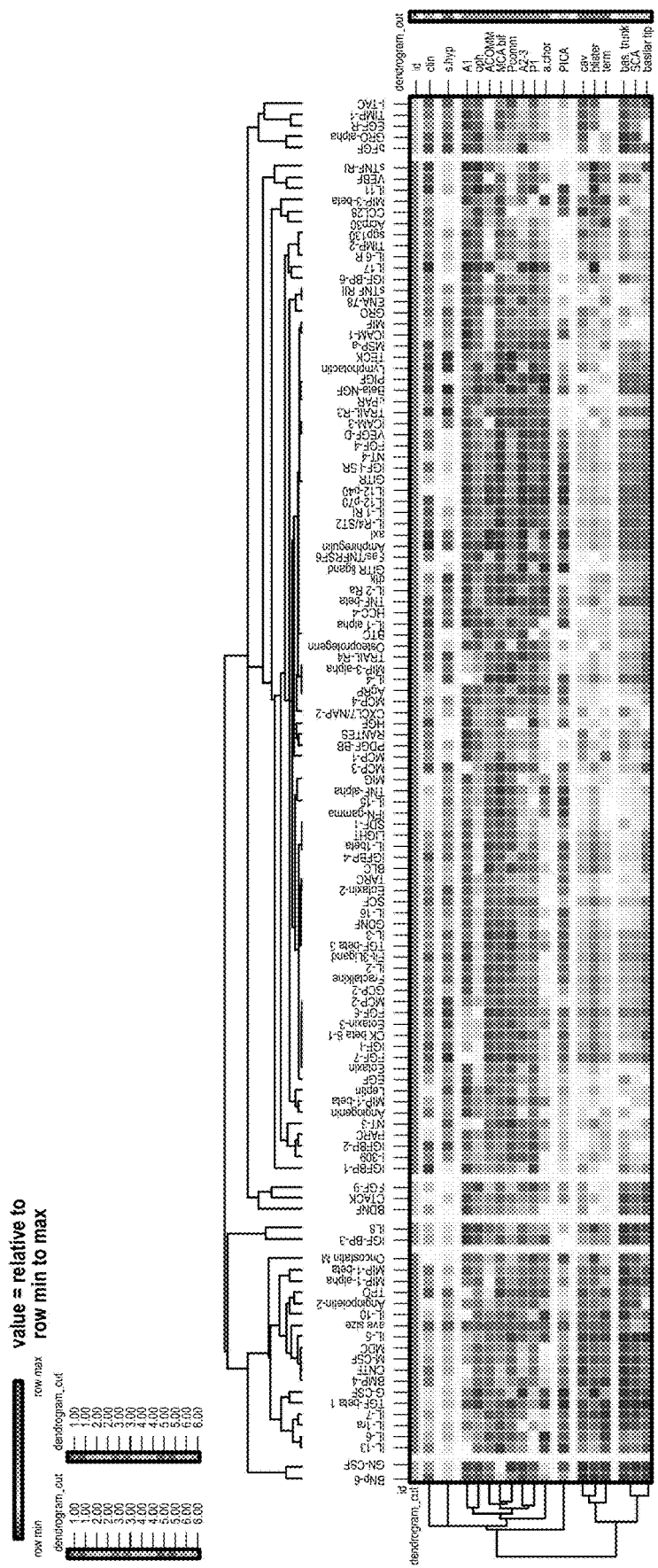
FIGS. 6A-6F illustrate association between inflammatory cytokines and aneurysm location in unruptured cerebral aneurysm patients.
Figure 6B:
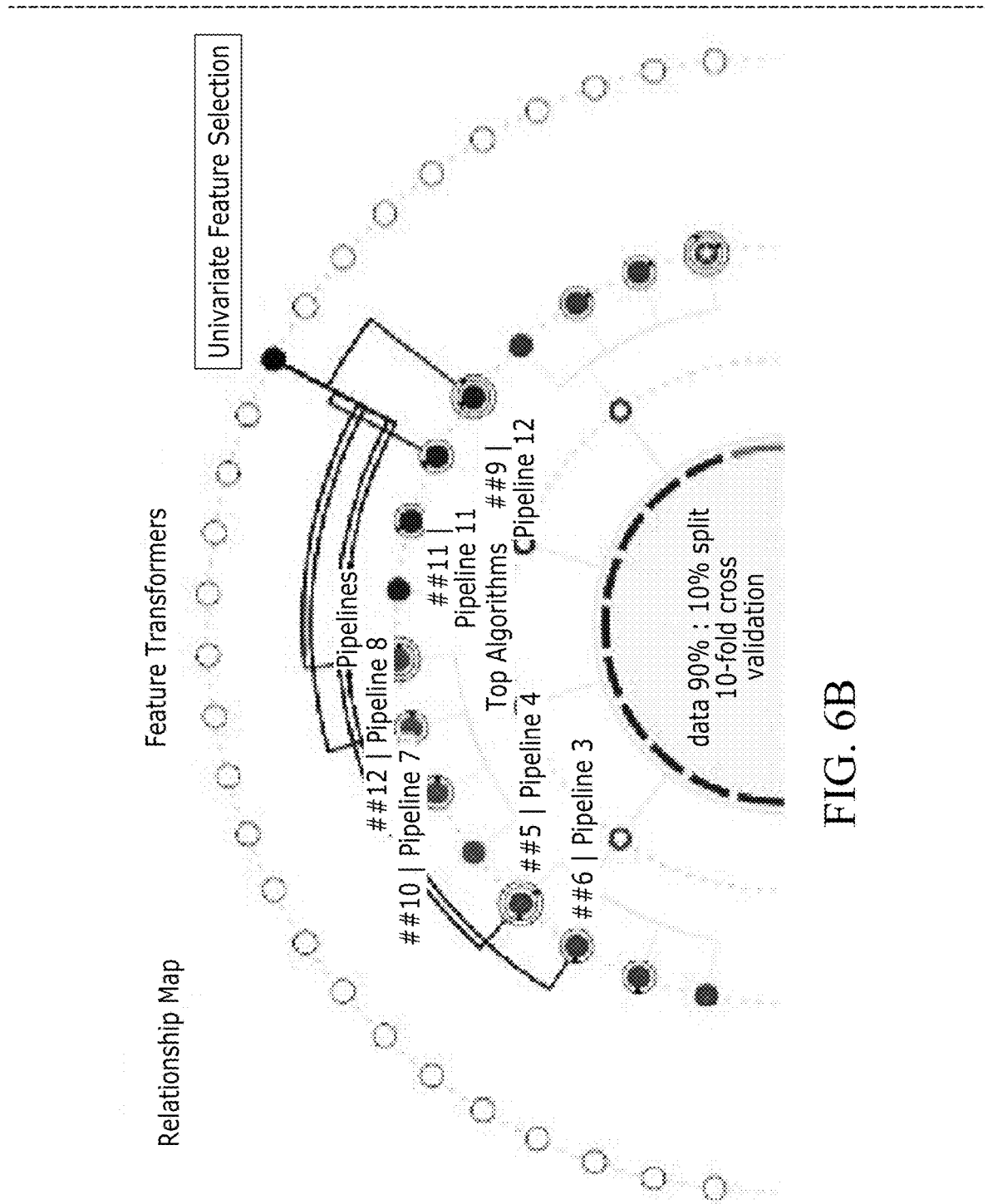
Figure 6B:
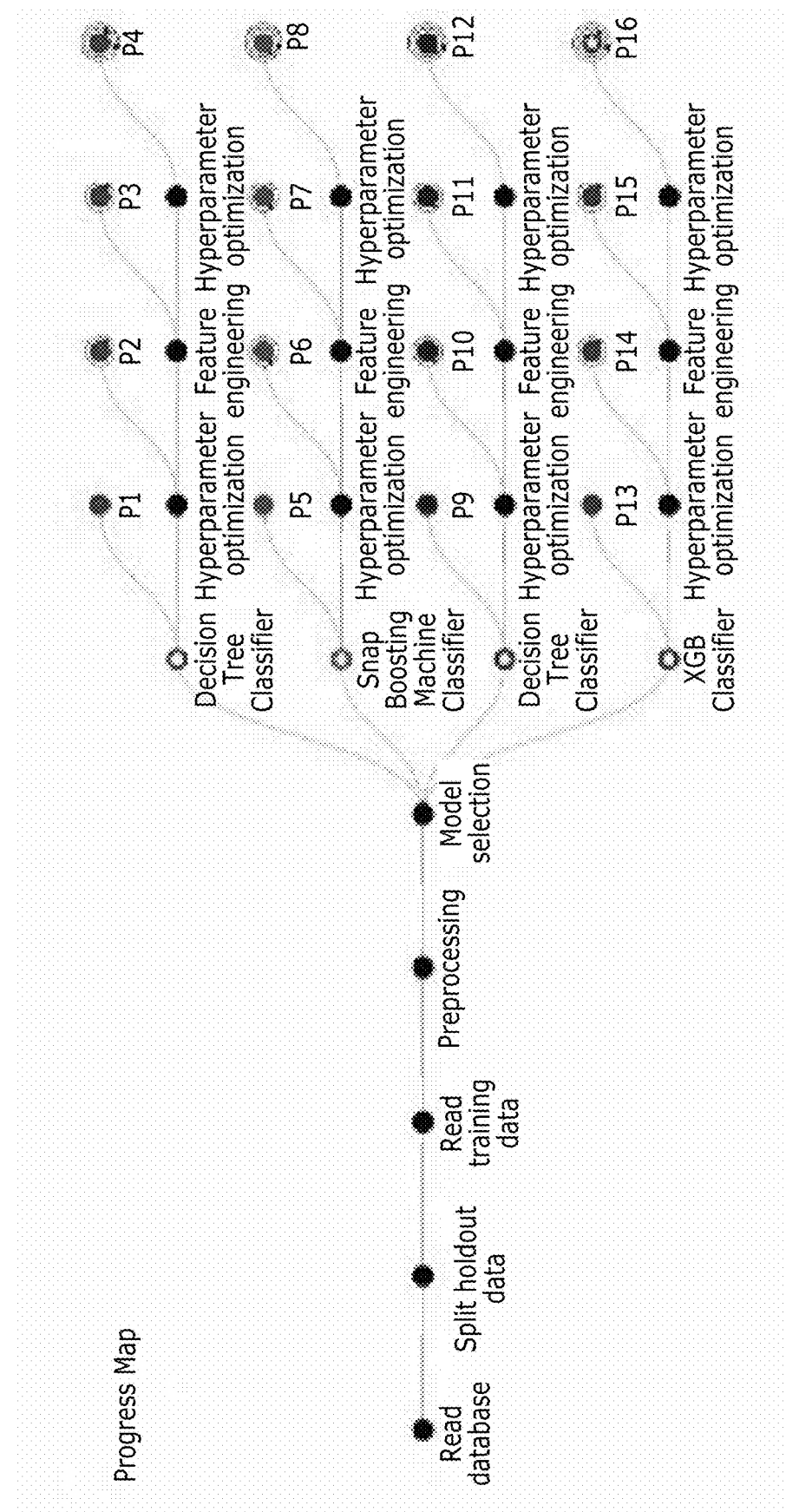
Figure 6C:
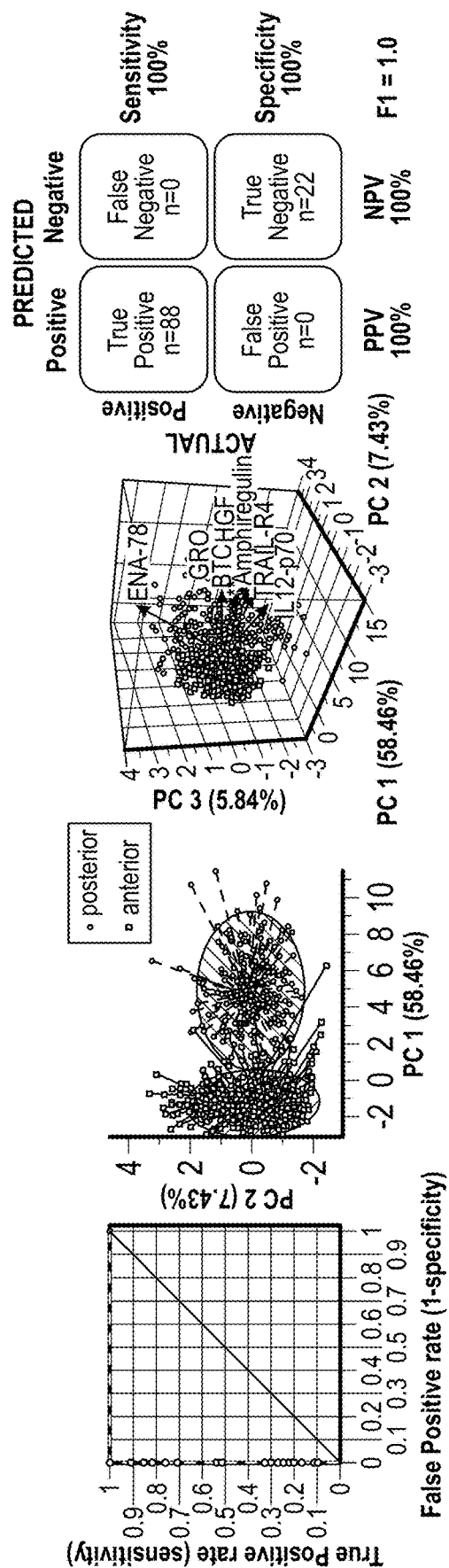
Figure 6D:
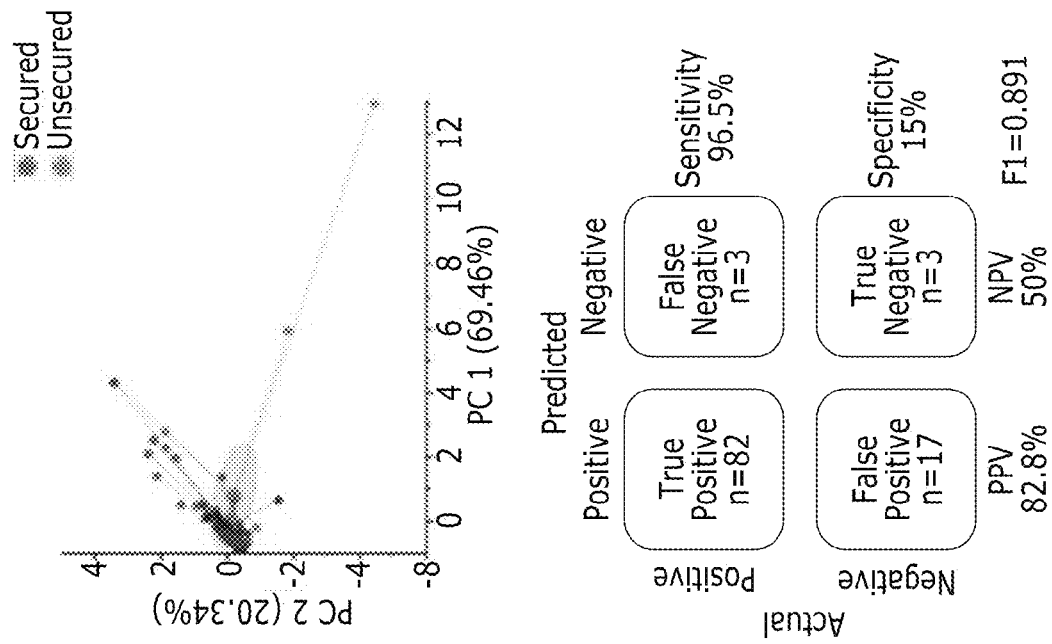
Figure 6D:
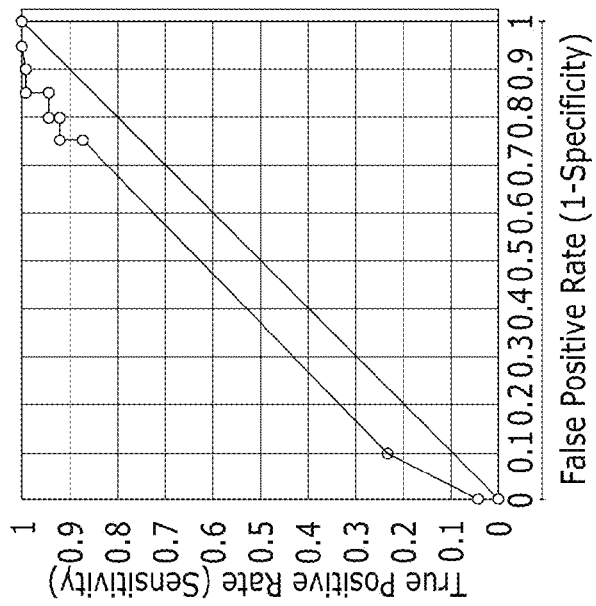
Figure 6D:
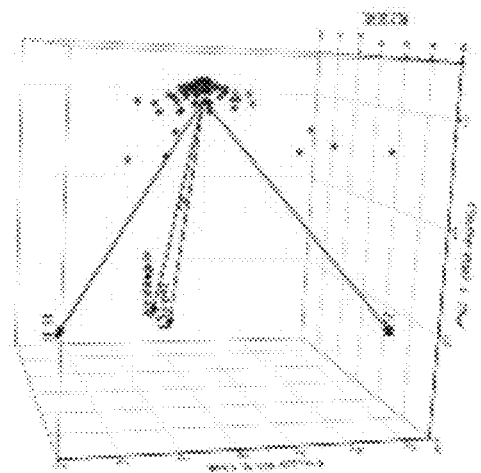
Figure 6D:
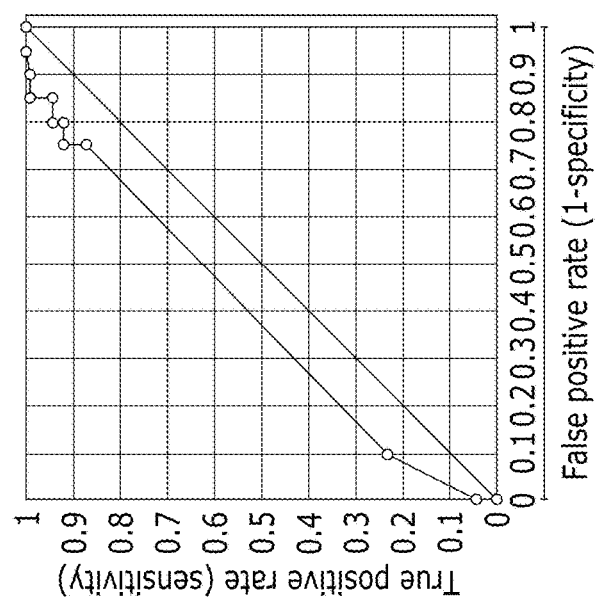
Figure 6D:
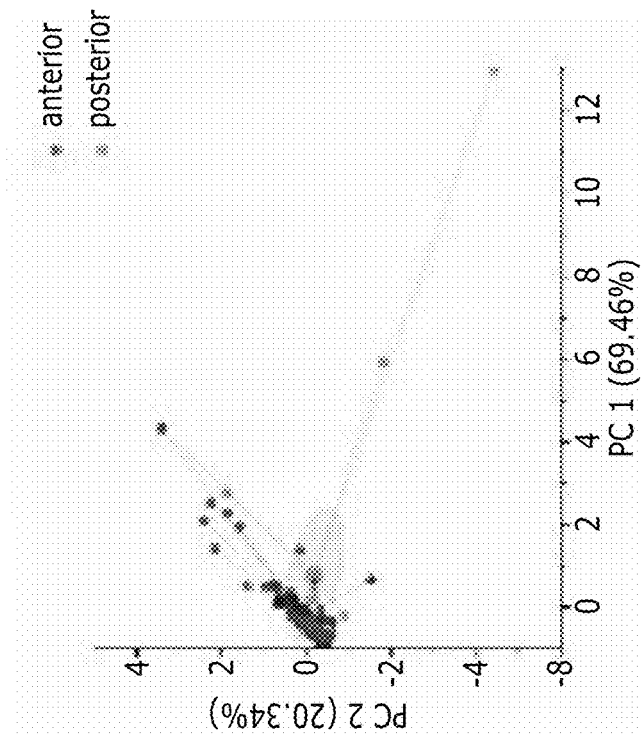
Figure 6D:
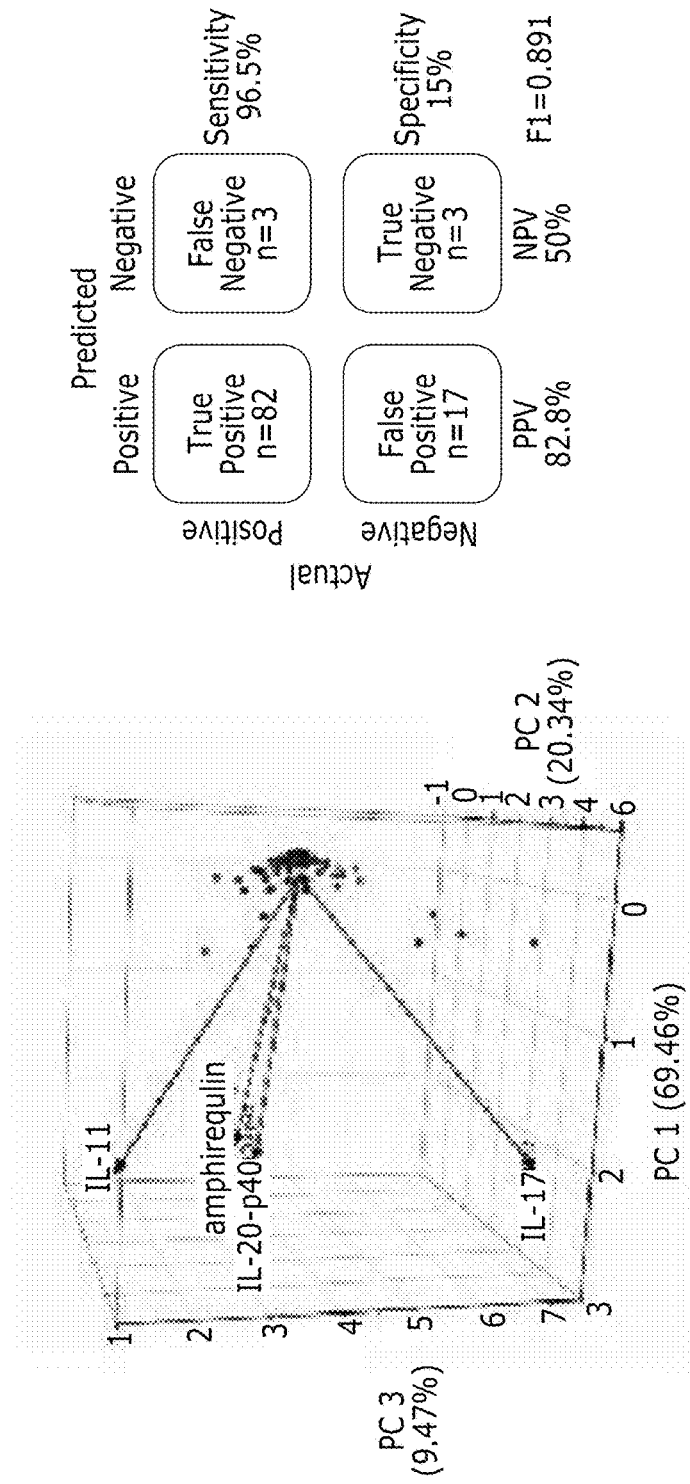
Figure 16A:
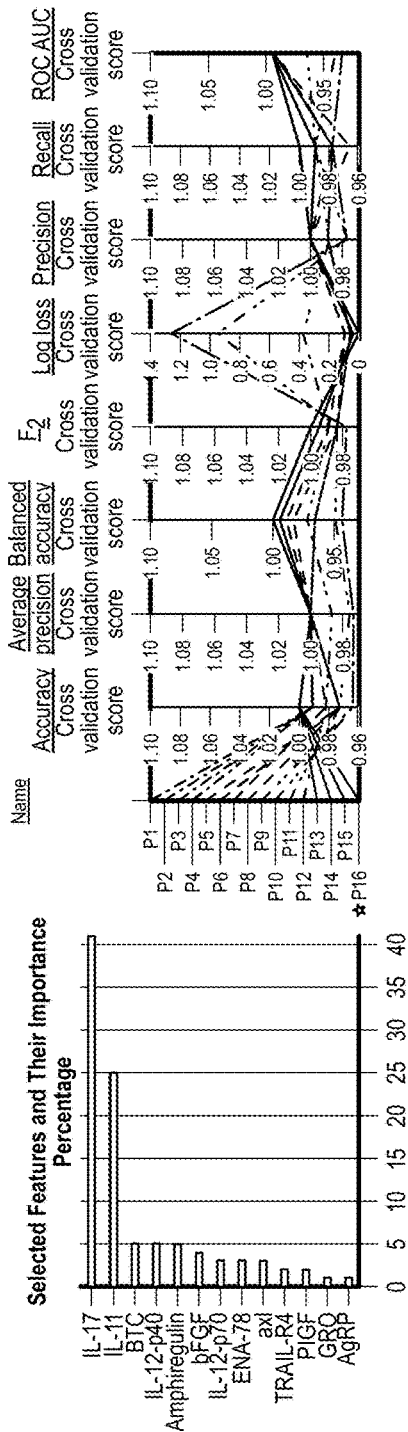
FIGS. 16A-16D show selected features, developed pipelines and top model characteristics for predicting cerebral aneurysm location in unruptured patients. Panels showing selected features (cytokines, optimized features, engineered features, and age if selected), their importance, model characteristics developed for 16 different pipelines, and top model characteristics in both training and holdout sets for predicting anterior vs posterior aneurysm location in bootstrapped data set (n=1100) (FIG. 16A), and full data set (n=110) (FIG. 16B). Panels showing selected features (cytokines, optimized features, engineered features, and age if selected), their importance, model characteristics developed for 16 different pipelines, and top model characteristics in both training and holdout sets for predicting ACA+Acomm vs ICA vs MCA vs Pcomm vs vertebral-basilar-pca aneurysm location bootstrapped data set (n=1120) (FIG. 16C), and full data set (n=112) (FIG. 16D).
Figure 16B:
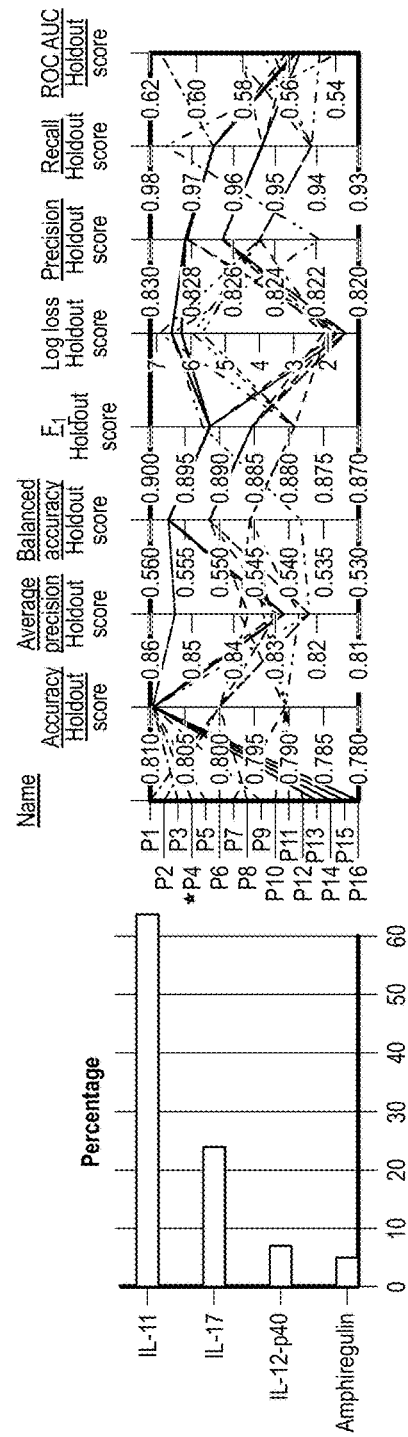

Human Cytokine Arrays—Predicting aneurysm location in unruptured CA patient cohort. A total of n=99 patients were included, with several patients having multiple aneurysms in both locations so n=111 data rows were used in this analysis. FIG. 6A shows relative heatmap for 120 different circulating inflammatory cytokines for unruptured CA patients stratified by parent vessel location. FIG. 6B shows relationship map and progress map (90% to 10% split, 10-fold cross-validation) for models for predicting aneurysm location with pipeline selection, feature transformation, and analysis scheme. FIG. 6C shows ROC, PCA analysis, and confusion matrix for validation cohort (90% to 10% split) in a bootstrapped data set (n=1110) for anterior location CA profile detection model results in a test with validation AUC 100%. Next, FIG. 6D shows ROC, PCA analysis and confusion matrix for differentiating anterior vs posterior location profiles after optimization on bootstrapped data set for training (n=1110) and validated on full set (n=111) results in a poor model with AUC 61.6%, F1-score 0.891, 96.5% sensitivity and specificity of 15%. Model characteristics and features selected are shown in FIGS. 16A and 16B.

Figure 6E:
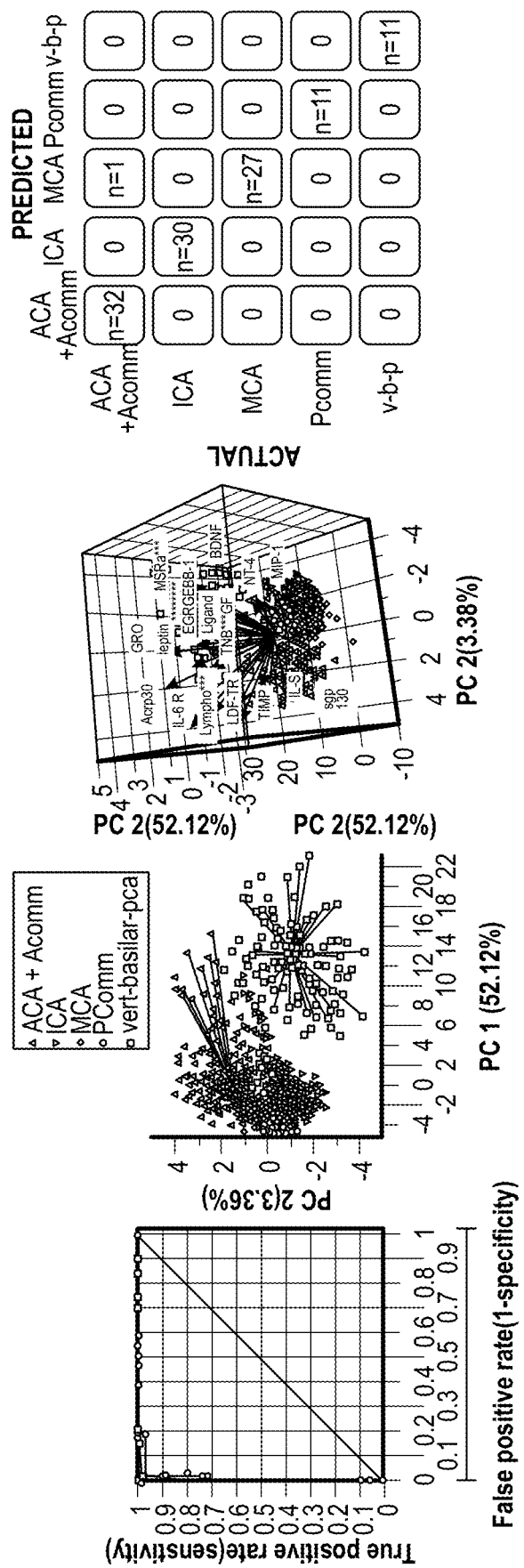
Figure 6F:
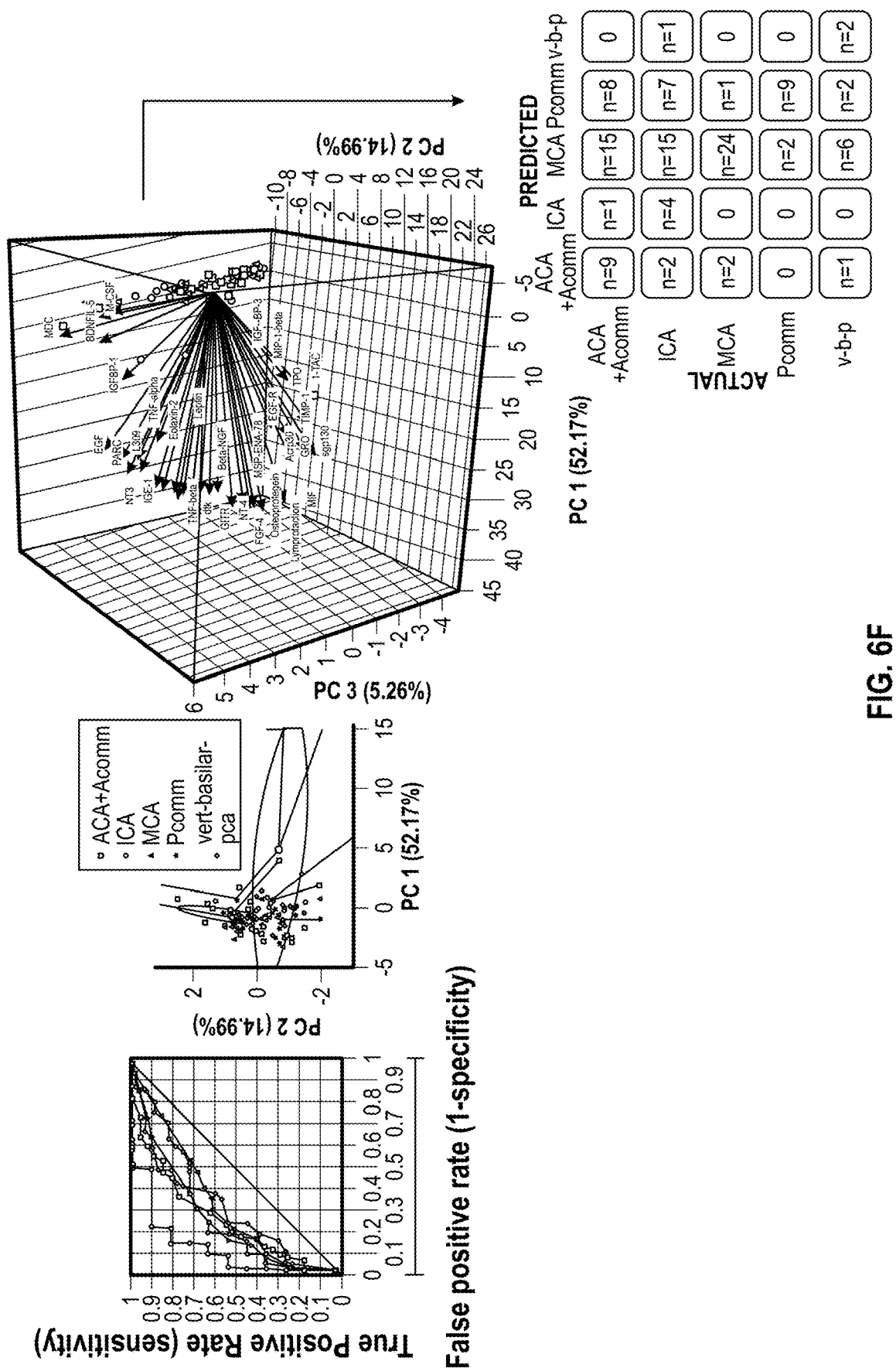
Figure 16C:
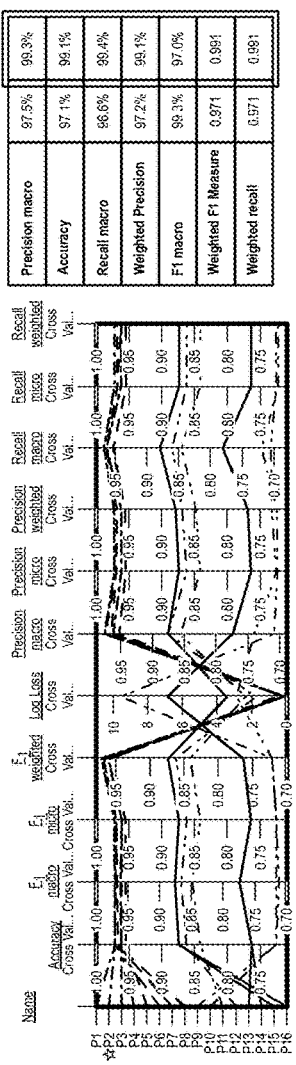
Figure 16C:
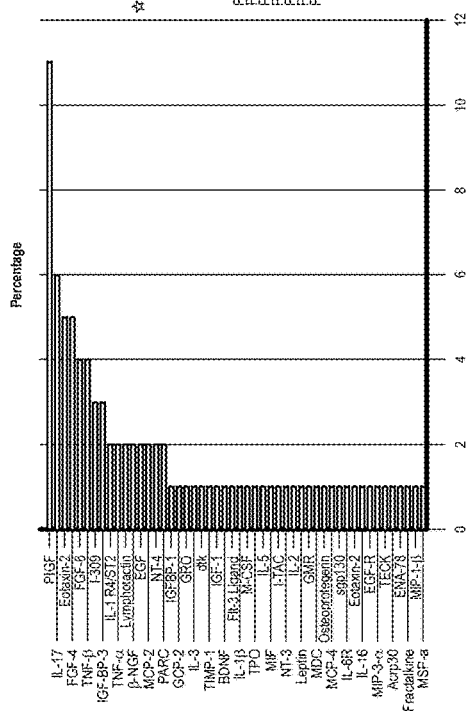
Figure 16D:
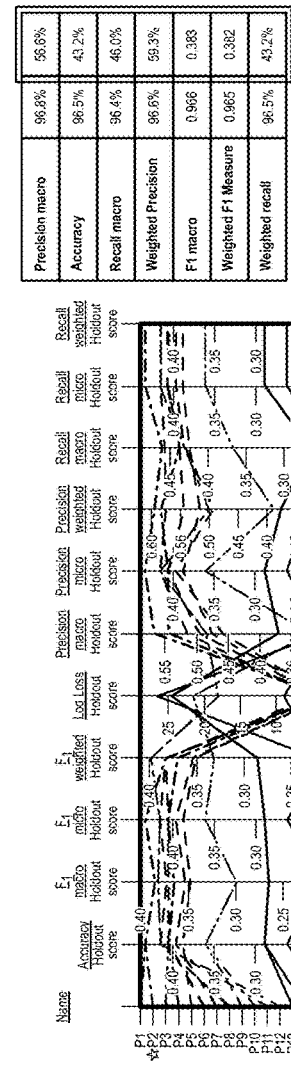
Figure 16D:
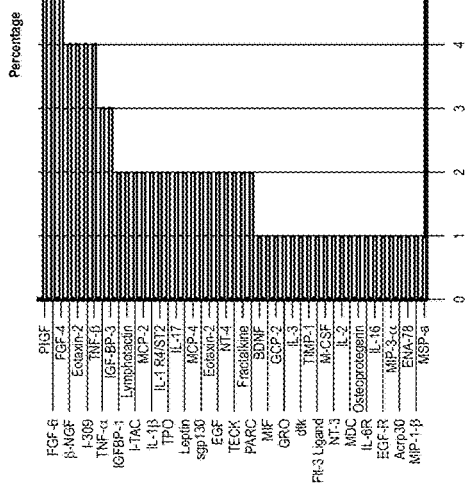

Next, it was explored whether more specific aneurysm location stratification and training of predictive models would result in better test characteristics. Based on cytokine profile clustering in FIG. 5A, aneurysms were grouped into the following groups: 1) ACA+Acomm, 2) ICA, 3) MCA, 4) Pcomm, and 5) vertebral-basilar-pca. FIG. 6E shows ROC, PCA analysis, and confusion matrix for validation cohort (90% to 10% split) in a bootstrapped data set (n=1110) for parent vessel location CA profile detection model results in a test with validation AUC 99%. Next, FIG. 6F shows ROC, PCA analysis and confusion matrix for differentiating parent vessel location profiles after modifications on bootstrapped data set for training (n=1110) and validated on full set (n=111) results in a poor model with F1-macro score 0.383, 43.25% weighted sensitivity and weighted specificity of 59.3%. Model characteristics and features selected are shown in FIGS. 16C and 16D.

Mobile Application. Input and output screens for provisional companion application are shown in FIG. 17.

Figure 18A:
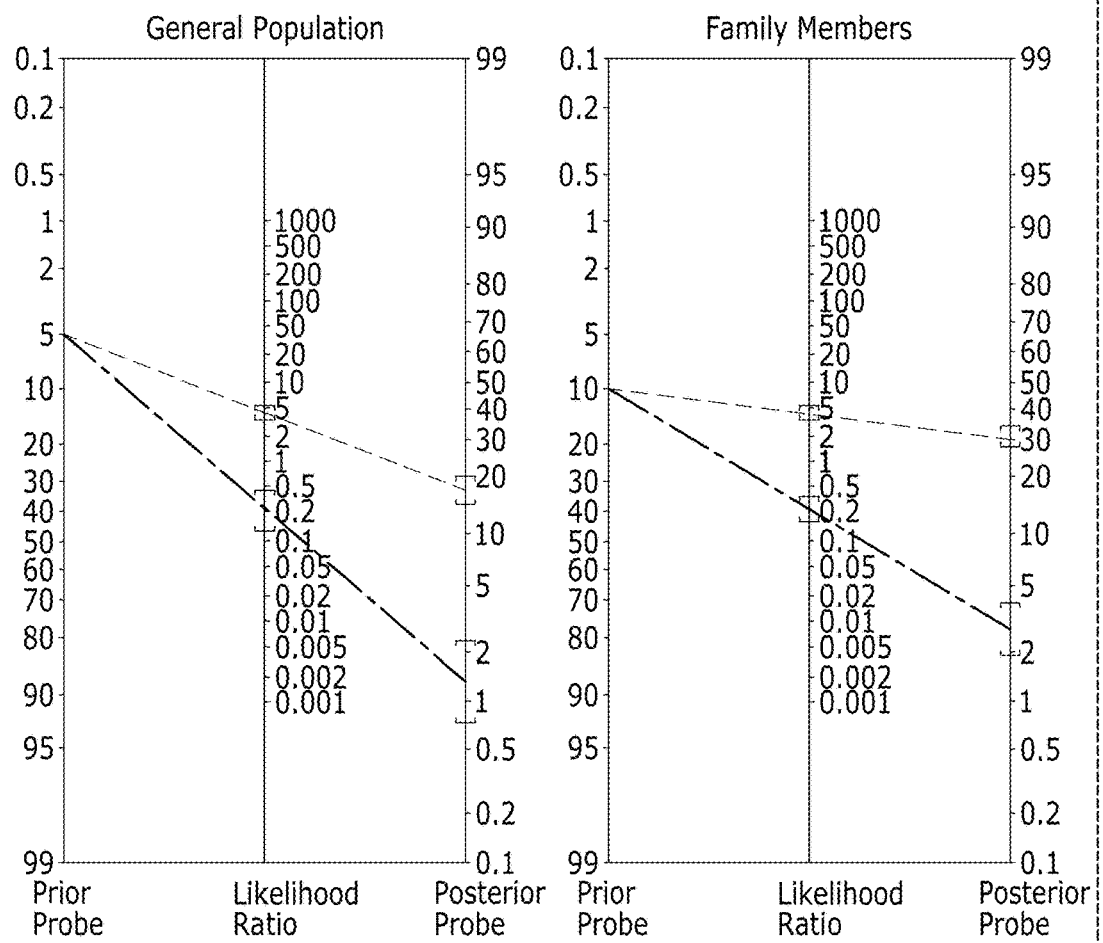
FIGS. 18A-18C show likelihood Ratios and Posterior Probabilities for Predicting Cerebral Aneurysm Presence. Panels showing improved blood test performance with respect to posterior probabilities and positive predictive value as cerebral aneurysm disease prevalence increases in the testing population (CA prevalence of 5%, 10%, 38% and variable tested size, respectively) for age-matched derived algorithm (FIG. 18A), age-matched trained and deployed on full set derived algorithm (FIG. 18B), and bootstrapped-derived algorithm (FIG. 18C).
Figure 18A:
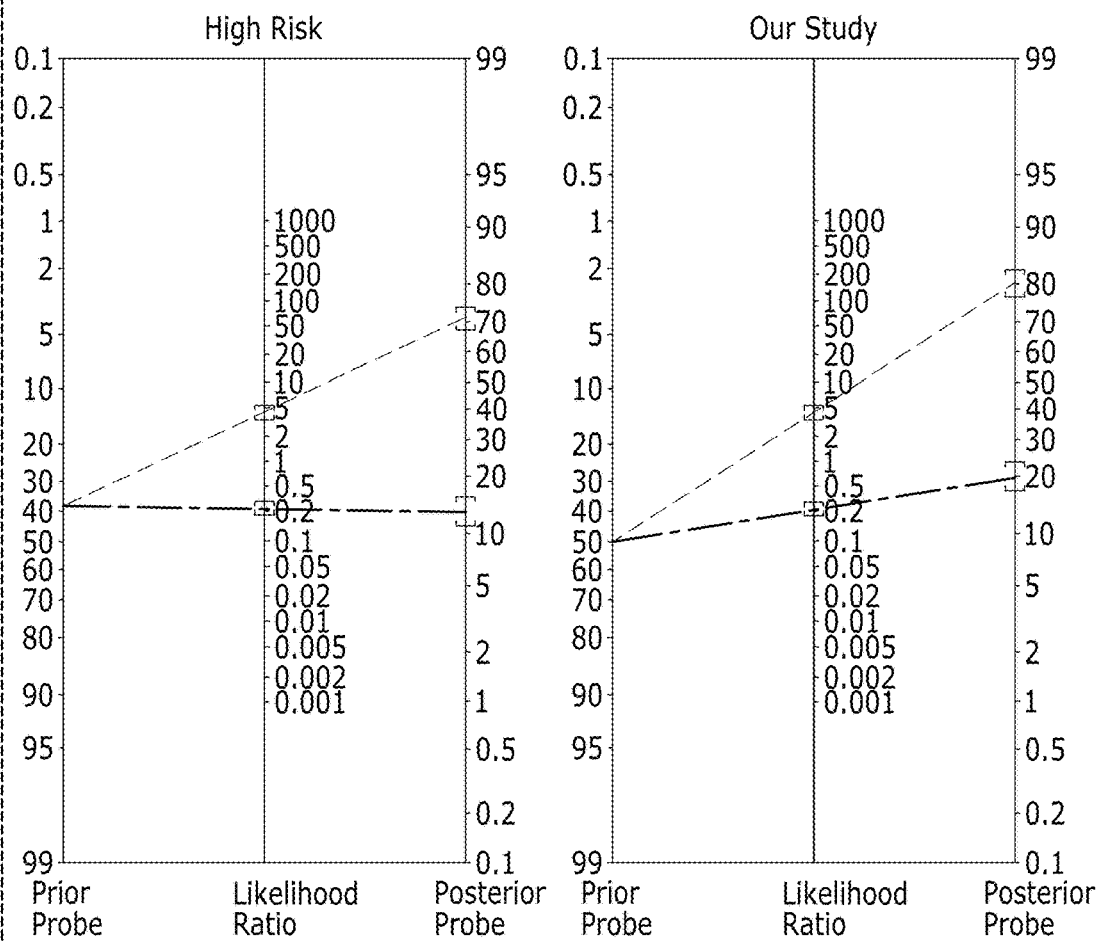
Figure 18B:
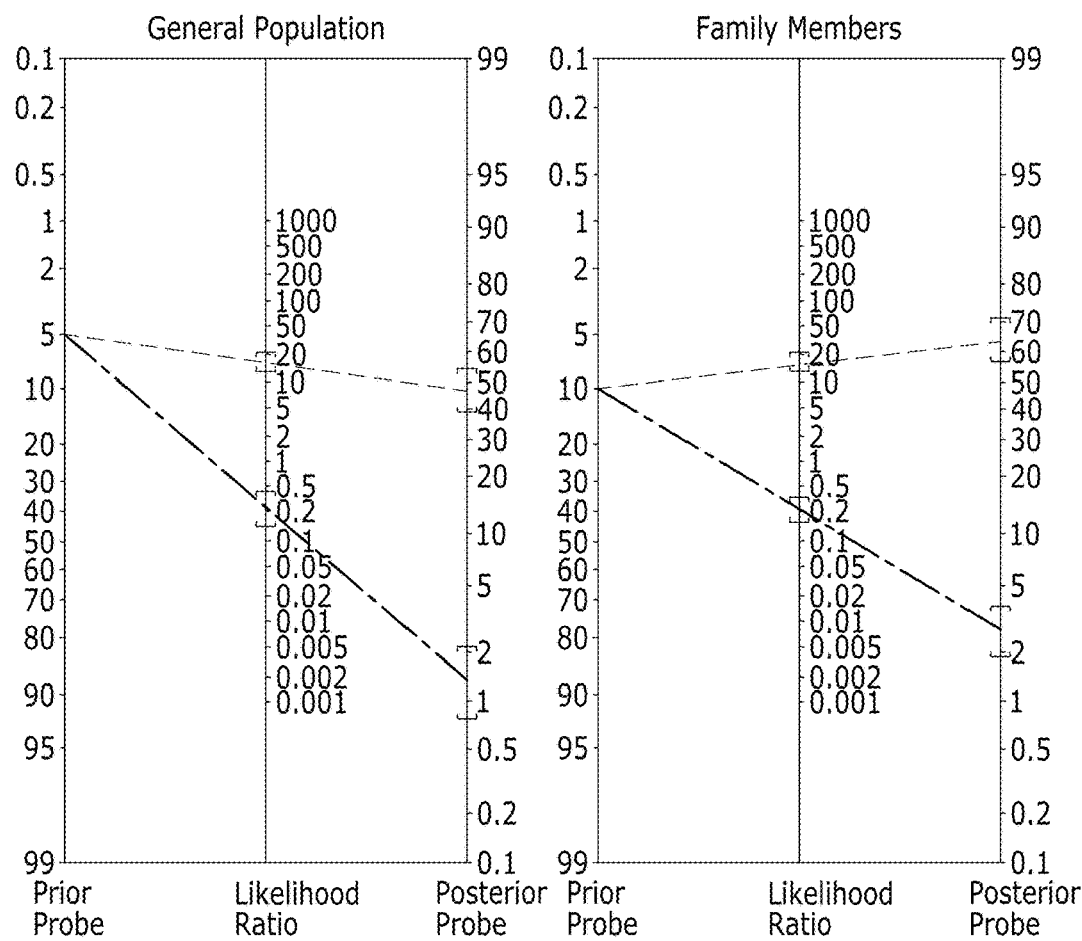
Figure 18B:
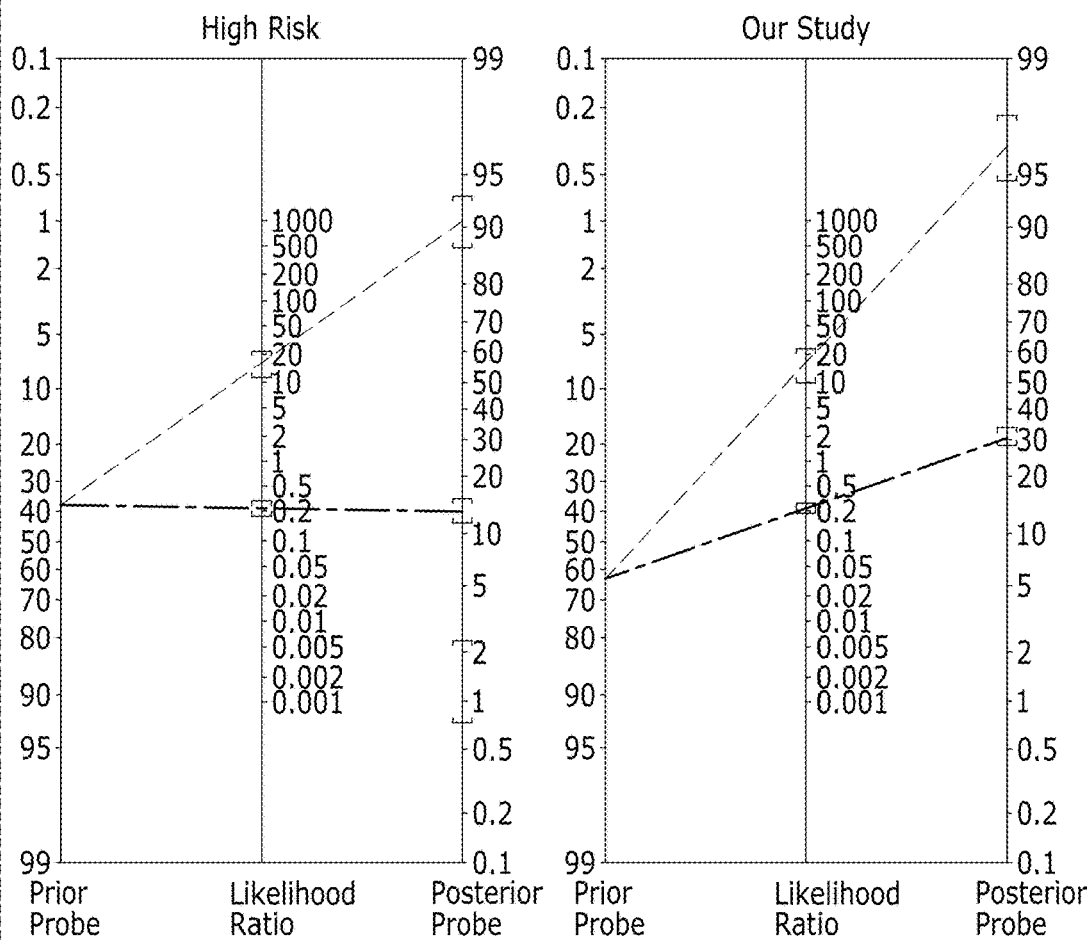
Figure 18C:
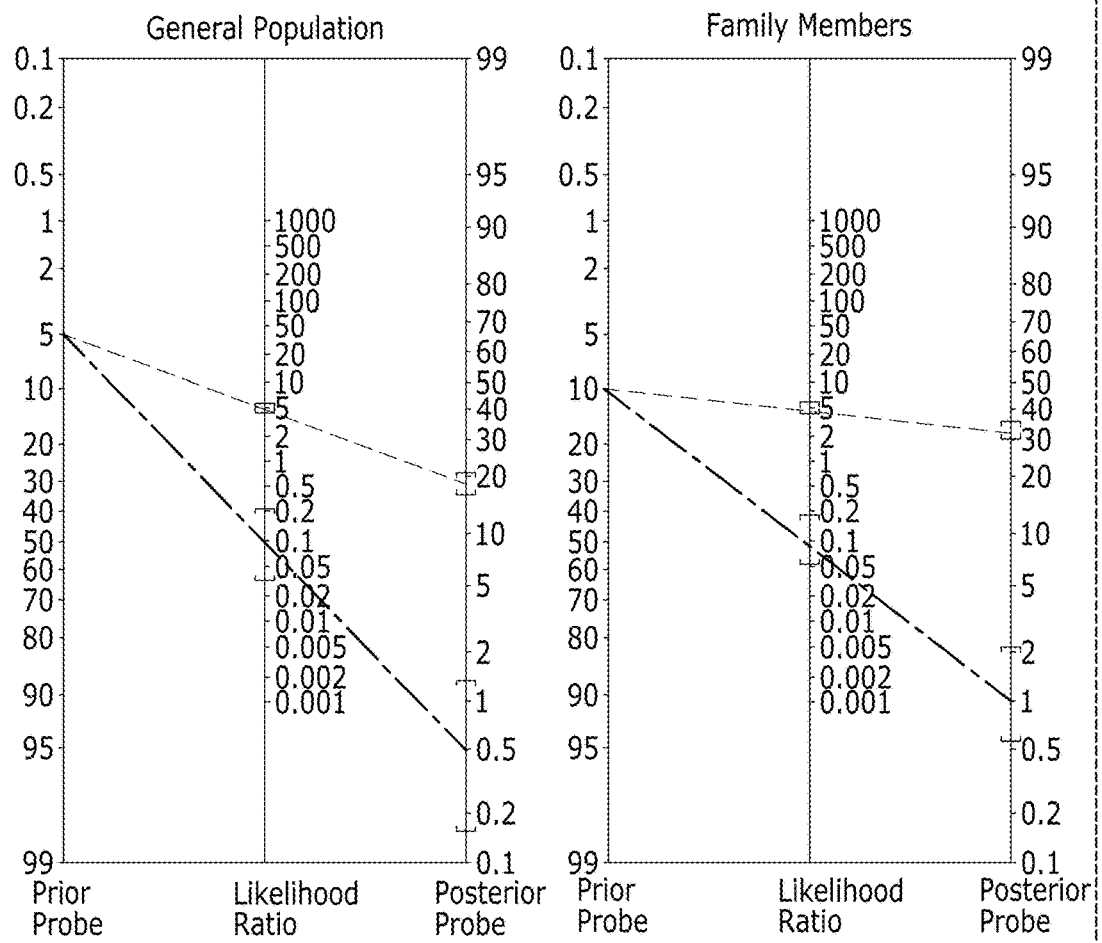
Figure 18C:
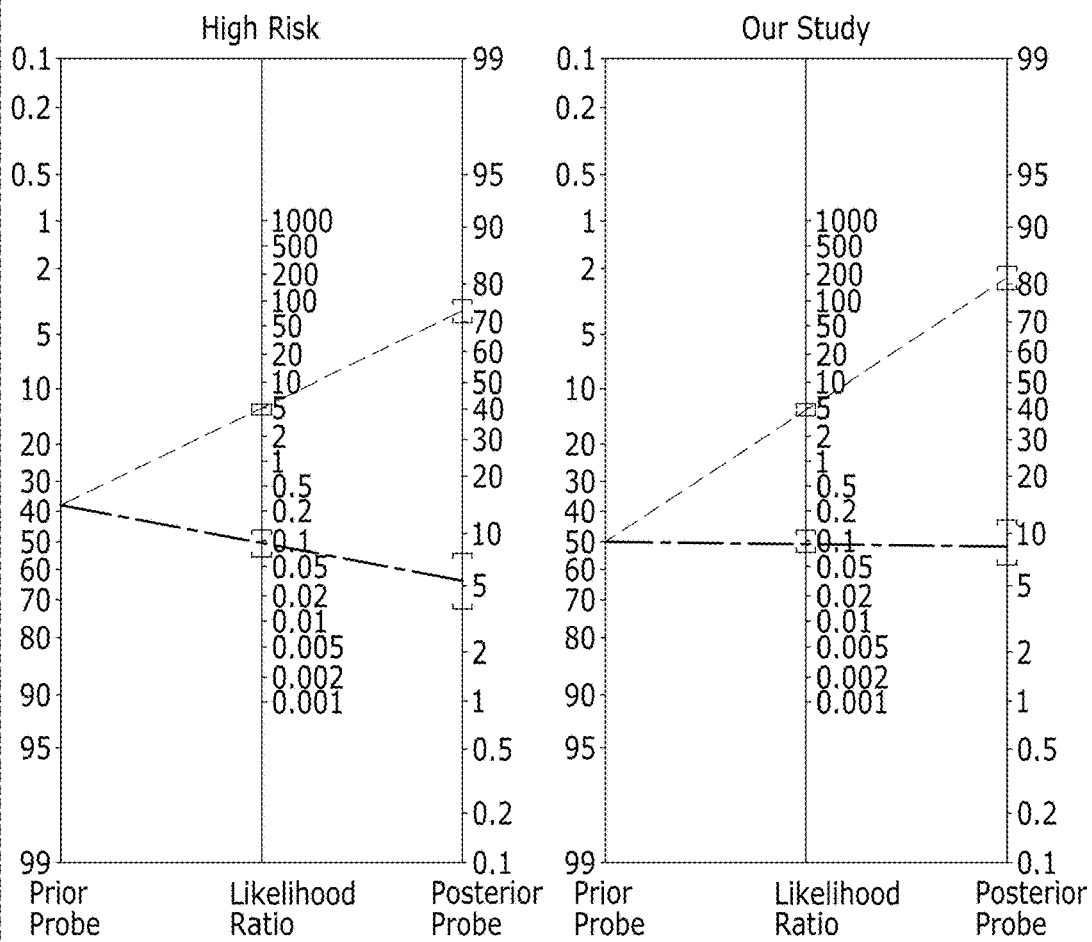
Figure 19A:
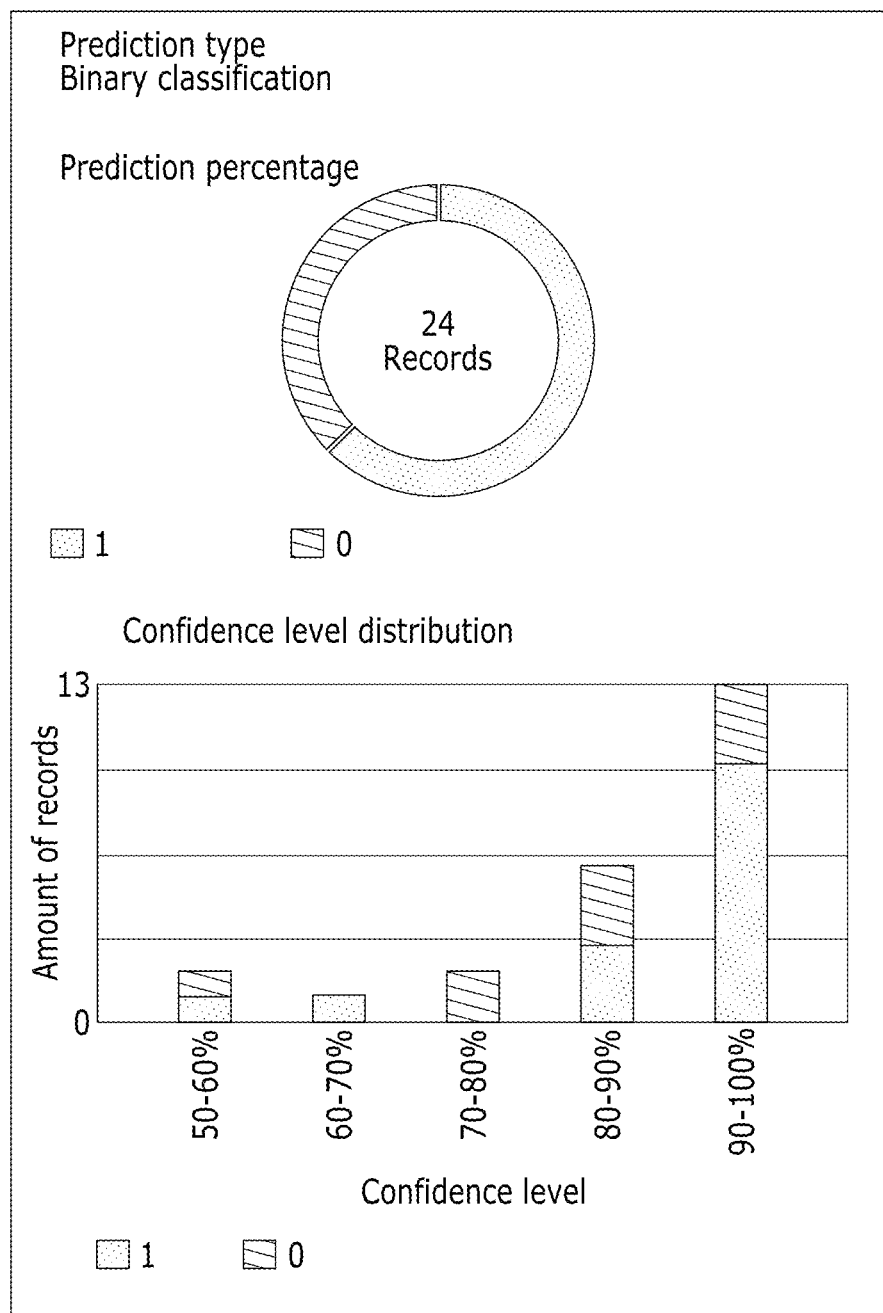
FIGS. 19A-19B illustrate association between inflammatory cytokines and cerebral aneurysm presence in controls and patients with unruptured and ruptured cerebral aneurysms.
Figure 19B:
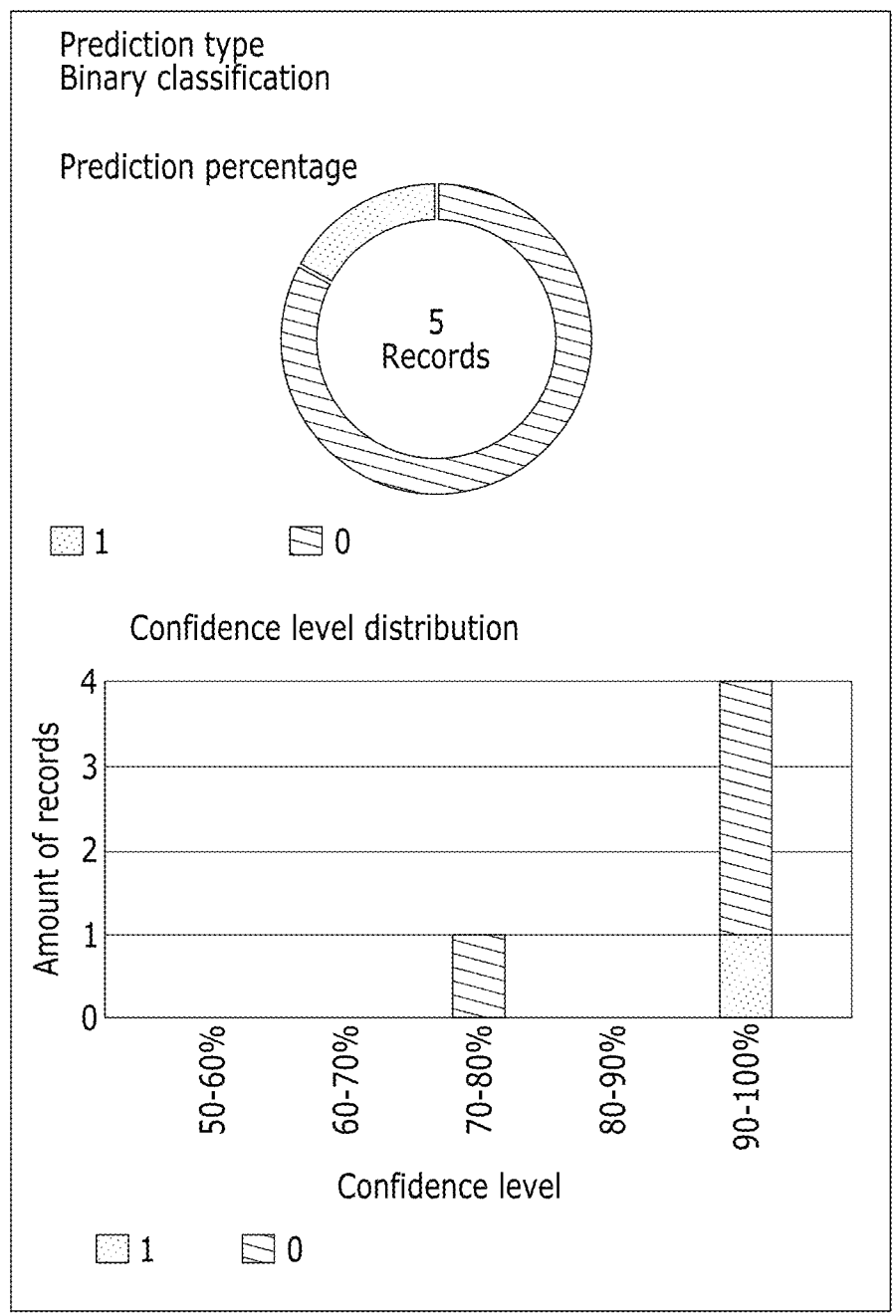

Posterior probabilities, likelihood ratios. Posterior probabilities, likelihood ratios, expected false positives and false negatives in different patient populations with above test performance metrics are shown in FIGS. 18A-18C.

Discussion

Rational Approach to Develop a Blood Test to Detect Cerebral Aneurysm Formation. Strategies for blood test development can vary based on the analyte of interest. Although mRNA-based tests can provide high signal to noise ratio, the short half-life[8] of 8-24 hours and rapid turn-over in whole blood can prevent its wider use in larger populations and in resource scarce environments without local specialized testing facilities. In fact, gene correlation studies show poor association between mRNA- and protein-expression.[9] Therefore, in order to maximize sample stability, the present example chose a mini-proteomic approach for the analytes of interest.

Initially, the presently disclosed approach hinged on the idea to leverage a pre-clinical vertebrate aneurysm model (FIGS. 7A-7E) and a large set of peripheral blood samples from patients with or without CAs, aneurysm dome tissue, and control arteries (FIGS. 2A and 2B). In this approach, it was determined the specific temporal "fingerprint" signatures of CAs of different chronicity within the animal model to develop a combination mini-cytokine panel for detection of CAs in the human general population. Such a combination mini-panel could be superior since it would be able to accurately pick out inflammatory signatures of aneurysms at different stages of the disease. However, application of the derived animal predictive model yielded poor results in human validation cohort. Nevertheless, a predictive model was developed using circulating inflammatory mini-proteomic profiles to detect signatures of CA presence. The present example found significant difference across patient groups and further PCA analysis revealed aneurysm clustering by key cytokines in patients with a CA (FIGS. 2C-2E).

To develop predictive models, the AutoAI function in IBM Watson Studio was used. First, patients were randomly assigned into 90%-10% training-validation cohorts and then machine learning was used to derive cytokines of interests. Predictive models showed good accuracy in the age-matched trained and validated data set (AUC of 84%, sensitivity 80%, specificity 80%, F1 0.800, PPV 80.0%, and NPV 80.0%) and excellent accuracy in age-matched-trained and bootstrapped-validated set (AUC of 92.9%, sensitivity 92.8%, specificity 78%, F1 0.864, PPV 80.8%, and NPV 91.5%). This indicates a machine learning approach to be the ideal predictive statistical application. Predictive model performance was optimized after previously treated aneurysms (either secured vs remnants) were removed from analysis. This indicates that circulating inflammatory profiles can persist over time and that a certain threshold of CA size or biomass can be needed before the signature can be detected.

CA pathogenesis is a dynamic inflammatory disease and detection of CAs progressing to rupture before it happens would be of clinical interest. The predictive models differentiated between ruptured and unruptured aneurysms with good accuracy: validation AUC 90%, sensitivity 100% and specificity 80%. However, bootstrapping was used for initial feature selection due to very low number of ruptured aneurysm patient samples in the analyzed data set (FIGS. 4C and 4D).

Next, an attempt was made to develop predictive models for differentiating secured vs remnant CAs in patients with previously treated lesions and for differentiating aneurysm location, but due to low sample size, the models were overfitted in the training cohort and performed poorly in validation (FIGS. 5A-6F and 14A-16D). Again, a certain threshold of CA size may be needed before the signature can be detected, especially using mini-proteomic approaches.

The analysis of peripheral blood samples and aneurysm tissue domes from patients with both unruptured and ruptured CAs confirmed activation of multiple inflammatory pathways (FIGS. 2C and 2F). Key cytokines involved in CA inflammatory profiles are listed in FIGS. 8A-18C and represent cytokines involved in neutrophil and macrophage activation as well as endothelial distress. Signature cytokines detected in profiles of patients with ruptured CAs are listed in FIGS. 12A-13 and represent cytokines related to macrophage activation and polarization. Discussion of some of the key cytokines involved follows in sections below.

Early Cerebral Aneurysm Formation. Aneurysms are thought to form through an inflammatory mediated hemodynamic process at areas where shear stress is initially high. Then, they continue to grow in dome regions where shear stress is much lower than in surrounding environment.[10,11] IL-8 and its murine functional homologue CXCL1 secreted by endothelial cells are critical in this early process.[12] This early process is thought to be primarily dominated by neutrophil infiltration, and potentiated by IL-1b and NLRP-3 inflammasome.[13] The presently disclosed data suggest that endothelial distress signal ENA-78 (CXCL5) can also have a role in aneurysm formation. Next, low flow conditions set the stage for platelet aggregation, which can lead to further inflammation.

Critical Role of CXCR1/2 Ligands, Platelet Activation, and Vascular Remodeling in Cerebral Aneurysm Formation. Previous work focused on the early events in CA formation. IL-8 is a chemokine that attracts neutrophils to sites of inflammation causing local remodeling.[14-20] IL-8 and CXCL1 are two of five different cytokines capable of activating receptors CXCR1/2. Platelets are a nuclear cell elements with primary role in hemostasis. Activated platelets are capable of secreting C-X-C ligand-7 (CXCL7), which binds to CXCR1/2 and leads to further neutrophil infiltration.[21,22] Thrombosis has been shown to promote infiltration of leukocytes into inflamed tissues through a chemotactic gradient mediated by CXCL7 and receptors CXCR1/2.[21] In this example, the data show additional inflammatory platelet- and vascular remodeling-related cytokines can be involved in aneurysm formation including PDGF-BB, VEGF, and VEGF-D.

Complex Inflammatory Cascade and Macrophage Polarization in Cerebral Aneurysm Pathophysiology. Increased inflammatory response results in myeloid extravasation into local vascular environment, especially neutrophils and macrophages.[23,24] This is thought to occur due to: 1) shift to increased influx of macrophages, 2) vascular wall remodeling, 3) pro-inflammatory M1 macrophage formation[25], 4) weakening of local vessel wall due to loss of vascular smooth muscle cell phenotype and destruction of extracellular matrix components, resulting in 5) rupture. Inflammatory profiles from ruptured patients displayed increased levels of MSP-a (macrophage stimulating protein), which is known to induce macrophage migration and is a negative-regulator of inflammation (PMID: 27609031), and uPAR, which is elevated in atherosclerotic plaques (PMID: 35396143). Levels of IL-10, which is a known pro-M2 polarization cytokine, were increased in ruptured patient cohort, likely due to a negative feedback loop (PMID: 29880489). On the other hand, levels of Flt-3 ligand, which is thought to be protective against atherosclerosis and inflammation (PMID: 22078798), and necessary for hematopoietic progenitor cells proliferation (PMID: 10637491), were decreased in ruptured patients. Similarly, levels of MIP-3-beta (CCL19) were decreased in the ruptured profiles. Although MIP-3-beta activates macrophages, studies have shown that its decrease or inactivation can lead to paradoxical increase in leukocyte infiltration, atherosclerotic lesion formation, and instability (PMID: 25473269).

Cerebral Aneurysm Management. The optimal management of CAs remains an active area of debate among neurosurgeons, interventional radiologists, and interventional neurologists. Based on the knowledge of the natural history of CAs, the management paradigm for unruptured CAs include observation, surgical clipping, or endovascular intervention, while ruptured CAs require intervention in a timely fashion with most recent guidelines suggesting intervention within 24 hrs.[4,26-30] Multiple factors should be taken into consideration when deciding the management strategy for patients with CAs such as the patient's age, clinical status, aneurysm location, number, configuration, size, among others.[27,31] In addition to high-risk features, new measurement parameters have been described in the literature to guide such challenging decision making.[32] A review paper summarizing the rationale for and the currents state of efforts to develop a blood test to detect Cas was recently published.[33] Regardless, the motivating factors include improved clinical outcomes by preventing ruptured state, healthcare savings, improved health equity, as well as new insights into early pathogenesis.

Economics of Introducing a Blood Test to Detect Cerebral Aneurysms. Introduction of a blood test to replace some of the excess imaging done to monitor patients is a cost-effective and lifesaving intervention.[34] Earlier work found among "watchful waiting" patients that a blood test could provide a three-fold reduction in mortality compared to the standard of care.[34] Additionally, this intervention was defined as cost effective based on the most stringent insurance reimbursement standards. A cost-effective blood test opens the door for safe, minimally-invasive screening of high-risk groups.

Diagnostic Test Characteristics and Post-Test Probability. As with any diagnostic test, broad introduction into the general population as a screening test is not advised due to low pre-test probability and low positive predictive value (FIGS. 18A-18C). However, introduction of a blood test to detect cerebral aneurysms in groups where pre-test probability is higher than average such as family members of patients with CAs or high-risk groups with risk-factors would be optimal due to balanced high positive predictive value and negative predictive value (FIGS. 18A-18C).

Other Attempts to Detect Cerebral Aneurysms. Currently, several groups are working on simple tests for CA detection utilizing different markers such as mRNA, protein, or genomic based tests. Some of the earliest efforts focused on developing predictive models based on human mRNA expression[35] or by attempting to narrow down specific genes of interest in animal models[36]. One of the most industrious research groups has published several studies on epigenetic landscape in intracranial aneurysm patients[37] as well as gene expression from blood in the lumen of CAs[38]. Additionally, a mRNA based diagnostic test for CA was developed.[39] Further, a research group has developed a multi-proteomic based diagnostic test, although the data set also required boot-strapping.[40]

CONCLUSIONS

The presently disclosed subject matter developed a small proteomic-based cytokine panel that can be used to detect human CA presence with relatively high accuracy in a broad patient sample with different pathologies. Furthermore, it is possible to differentiate inflammatory profiles of patients with unruptured and ruptured CA profiles, and secured vs unsecured CA profiles, which could potentially guide future clinical therapy by identifying high-risk patients.

REFERENCES

1. Vlak, M. H., Algra, A., Brandenburg, R. & Rinkel, G. J. Prevalence of unruptured intracranial aneurysms, with emphasis on sex, age, comorbidity, country, and time period: a systematic review and meta-analysis. *The Lancet Neurology* 10, 626-636 (2011).
2. Vernooij, M. W., et al. Incidental findings on brain MRI in the general population. *New England Journal of Medicine* 357, 1821-1828 (2007).
3. Brown Jr, R. D. & Broderick, J. P. Unruptured intracranial aneurysms: epidemiology, natural history, management options, and familial screening. *The Lancet Neurology* 13, 393-404 (2014).
4. Wiebers, D. O., et al. Unruptured intracranial aneurysms: natural history, clinical outcome, and risks of surgical and endovascular treatment. *Lancet* 362, 103-110 (2003).
5. Keedy, A. An overview of intracranial aneurysms. *Mcgill J Med* 9, 141-146 (2006).

6. Hosaka, K., Downes, D. P., Nowicki, K. W. & Hoh, B. L. Modified murine intracranial aneurysm model: aneurysm formation and rupture by elastase and hypertension. *Journal of neurointerventional surgery* 6, 474-479 (2014).

7. Hoh, B. L., et al. A novel murine elastase saccular aneurysm model for studying bone marrow progenitor-derived cell-mediated processes in aneurysm formation. *Neurosurgery* 66, 544-550; discussion 550 (2010).

8. Wang, C. & Liu, H. Factors influencing degradation kinetics of mRNAs and half-lives of microRNAs, circRNAs, lncRNAs in blood in vitro using quantitative PCR. *Sci Rep* 12, 7259 (2022).

9. Koussounadis, A., Langdon, S. P., Um, I. H., Harrison, D. J. & Smith, V. A. Relationship between differentially expressed mRNA and mRNA-protein correlations in a xenograft model system. *Sci Rep* 5, 10775 (2015).

10. Sforza, D. M., Putman, C. M. & Cebral, J. R. Hemodynamics of Cerebral Aneurysms. *Annual review of fluid mechanics* 41, 91-107 (2009).

11. Tanoue, T., Tateshima, S., Villablanca, J. P., Vinuela, F. & Tanishita, K. Wall shear stress distribution inside growing cerebral aneurysm. *AJNR. American journal of neuroradiology* 32, 1732-1737 (2011).

12. Nowicki, K. W., et al. Novel high-throughput in vitro model for identifying hemodynamic-induced inflammatory mediators of cerebral aneurysm formation. *Hypertension* 64, 1306-1313 (2014).

13. Zhang, D., et al. Increased Expression of NLRP3 Inflammasome in Wall of Ruptured and Unruptured Human Cerebral Aneurysms: Preliminary Results. *Journal of stroke and cerebrovascular diseases: the official journal of National Stroke Association* 24, 972-979 (2015).

14. Bozic, C. R., et al. The murine interleukin 8 type B receptor homologue and its ligands. Expression and biological characterization. *The Journal of biological chemistry* 269, 29355-29358 (1994).

15. Smith, W. B., Gamble, J. R., Clark-Lewis, I. & Vadas, M. A. Interleukin-8 induces neutrophil transendothelial migration. *Immunology* 72, 65-72 (1991).

16. Leonard, E. J., Yoshimura, T., Tanaka, S. & Raffeld, M. Neutrophil recruitment by intradermally injected neutrophil attractant/activation protein-1. *The Journal of investigative dermatology* 96, 690-694 (1991).

17. Bickel, M. The role of interleukin-8 in inflammation and mechanisms of regulation. *Journal of periodontology* 64, 456-460 (1993).

18. Khanna, N., Mathur, A. & Chaturvedi, U. C. Regulation of vascular permeability by macrophage-derived chemotactic factor produced in Japanese encephalitis. *Immunology and cell biology* 72, 200-204 (1994).

19. Yue, T. L., McKenna, P. J., Gu, J. L. & Feuerstein, G. Z. Interleukin-8 is chemotactic for vascular smooth muscle cells. *European journal of pharmacology* 240, 81-84 (1993).

20. Yue, T. L., et al. Interleukin-8. A mitogen and chemoattractant for vascular smooth muscle cells. *Circulation research* 75, 1-7 (1994).

21 Ghasemzadeh, M., et al. The CXCR1/2 ligand NAP-2 promotes directed intravascular leukocyte migration through platelet thrombi. *Blood* 121, 4555-4566 (2013).

22. Kauskot, A. & Hoylaerts, M. F. Platelet receptors. *Handb Exp Pharmacol*, 23-57 (2012).

23. Mauler, M., et al. Platelet-neutrophil complex formation-a detailed in vitro analysis of murine and human blood samples. *Journal of leukocyte biology* 99, 781-789 (2016).

24. Huo, Y., et al. Circulating activated platelets exacerbate atherosclerosis in mice deficient in apolipoprotein E. *Nature medicine* 9, 61-67 (2003).

25 Nowicki, K. W., Hosaka, K., Walch, F. J., Scott, E. W. & Hoh, B. L. M1 macrophages are required for murine cerebral aneurysm formation. *Journal of neurointerventional surgery* 10, 93-97 (2018).

26 Shehata, M. A., et al. Long-term outcomes of flow diversion for unruptured intracranial aneurysms: a systematic review and meta-analysis. *J Neurointerv Surg* (2022).

27. Malhotra, A., Wu, X. & Gandhi, D. Management of Unruptured Intracranial Aneurysms. *Neuroimaging Clin N Am* 31, 139-146 (2021).

28. Chandra, R. V., et al. A Meta-Analysis of Rupture Risk for Intracranial Aneurysms 10 mm or Less in Size Selected for Conservative Management Without Repair. *Front Neurol* 12, 743023 (2021).

29 Beighley, A., et al. Aneurysmal subarachnoid hemorrhage during pregnancy: a comprehensive and systematic review of the literature. *Neurosurg Rev* 44, 2511-2522 (2021).

30. Hoh, B. L., et al. 2023 Guideline for the Management of Patients With Aneurysmal Subarachnoid Hemorrhage: A Guideline From the American Heart Association/American Stroke Association. *Stroke; a journal of cerebral circulation* (2023).

31. Twitchell, S., et al. Analysis of cerebrovascular aneurysm treatment cost: retrospective cohort comparison of clipping, coiling, and flow diversion. *Neurosurg Focus* 44, E3 (2018).

32. Juvela, S. & Korja, M. Intracranial Aneurysm Parameters for Predicting a Future Subarachnoid Hemorrhage: A Long-Term Follow-up Study. *Neurosurgery* 81, 432-440 (2017).

33. Nowicki, K. W., et al. A Future Blood Test to Detect Cerebral Aneurysms. *Cell Mol Neurobiol* (2023).

34. Friedlander, A. M. M. K. W. N. R. D. A. A. M. M. M. M. J. L. B. A. G. R. M. Survival Benefit and Cost-Effectiveness Analysis of a Future Blood-Based Diagnostic Test to Detect Cerebral Aneurysm Formation: A hypothetical modeling study. in *PREPRINT (Version 1) available at Research Square* (2023).

35. Pera, J., et al. Gene expression profiling of blood in ruptured intracranial aneurysms: in search of biomarkers. *Journal of cerebral blood flow and metabolism: official journal of the International Society of Cerebral Blood Flow and Metabolism* 33, 1025-1031 (2013).

36. Martinez, A. N., et al. Single-Cell Transcriptome Analysis of the Circle of Willis in a Mouse Cerebral Aneurysm Model. *Stroke; a journal of cerebral circulation* 53, 2647-2657 (2022).

37 Poppenberg, K. E., et al. Epigenetic landscapes of intracranial aneurysm risk haplotypes implicate enhancer function of endothelial cells and fibroblasts in dysregulated gene expression. *BMC medical genomics* 14, 162 (2021).

38. Tutino, V. M., et al. Aberrant Whole Blood Gene Expression in the Lumen of Human Intracranial Aneurysms. *Diagnostics (Basel)* 11 (2021).

39 Poppenberg, K. E., et al. Profiling of Circulating Gene Expression Reveals Molecular Signatures Associated with Intracranial Aneurysm Rupture Risk. *Mol Diagn Ther* 27, 115-127 (2023).

40. Kellner, C. P. Elucidating a proteomic signature for the detection of intracerebral aneurysms. (ed. WIPO) (Icahn School Of Medicine At Mount Sinai, USA, 2020).

41. Huang, Y., Cao, H., Qi, X., Guan, C. & Que, S. Circular RNA hsa_circ_0000690 as a potential biomarker for diagnosis and prognosis of intracranial aneurysm: Closely relating to the volume of hemorrhage. *Brain Behav* 13, e2929 (2023).
42. Ge, P., et al. High-Dimensional Immune Profiling by Mass Cytometry Revealed the Circulating Immune Cell Landscape in Patients With Intracranial Aneurysm. *Front Immunol* 13, 922000 (2022).

Example 2

Cerebral aneurysms (CA) are focal dilations of cerebral arteries that occur in 2-5% of the general population. It is thought that more 90% of them occur sporadically while only about 5% are familial. Aneurysms can rupture and result in subarachnoid hemorrhage, leading to 50% mortality and morbidity. Cerebral aneurysms are typically discovered incidentally on advanced cranial imaging or when patients present with rupture. There currently is no FDA-approved blood test available to detect cerebral aneurysms in patients. Current research suggests that aneurysms form through a complex interaction of hemodynamic and inflammatory factors. The present example shows that as aneurysms grow, a unique micro-inflammatory environment develops within the aneurysm, but that inflammatory profile is dynamic and changes over time.

In the present example, a small mini-proteomic cytokine panel deployed on a next-generation ultra-sensitive platform is used to predict human cerebral aneurysm presence with superior accuracy. This panel is used for early detection and to guide clinical therapy.

The present example demonstrates that aneurysms are dynamic and exhibit different cytokine signatures over time. With a carefully selected panel of cytokines and a proprietary model that uses machine learning, these inflammatory signatures can be reliably differentiated in CA patients from control patients (FIGS. 3A-3G and 19A-19B). The present example is also able to differentiate blood samples from unruptured and ruptured aneurysm patients and provides aneurysm location data. Using a mouse model and human CA samples, exceptional sensitivity and specificity was achieved in predicting CA presence. At this time, samples from over 250 patients have been collected. A 26-cytokine blood test was developed with sensitivity of 92.8%, specificity of 78%, accuracy of 85.4%, AUC of 92.9%, PPV of 80.8%, and NPV of 91.5%, which are comparable to CTA and MRA scans. In addition, the presently disclosed test also provides a risk of rupture metric with 100% sensitivity, 80% specificity, 81.8% accuracy, and AUC 90%. In boot-strapped data sets, sensitivity, specificity, and accuracy approach values in mid-to-high 90s ensuring high fidelity.

Multiple different cytokines and inflammatory proteins have been reported to have a role in aneurysm formation. The presently disclosed subject matter has several advantages. First, there is the issue of cost, sample processing, and stability. Indeed, mRNA-based tests would require RNA to be extracted from the blood sample (making it significantly more expensive) and have a short half-life of 8-24 hours (rapid turn-over in whole blood can prevent its wider use in larger populations and in resource scarce environments without local specialized testing facilities). Moreover, gene correlation studies show poor association between mRNA- and protein-expression. Importantly, the presently disclosed subject matter is the only one to provide a risk of rupture metric and aneurysm subgrouping.

To demonstrate the potential of our approach, it was investigated the cost-effectiveness of a blood-based diagnostic test to detect CA formation in the US healthcare model. Markov decision analytic models were created for four different case studies to simulate management of CA diagnosis within the US healthcare system over 50 years, then performed sensitivity analyses to assess robustness. Further analysis was performed for different risk factors, patient groups, and aneurysm size. Interventions analyzed included standard care, thrice-annually blood test monitoring, and annual blood testing among high-risk groups. The results showed that a blood-based diagnostic test is more cost effective in patients undergoing watchful waiting and as a screening tool for high-risk patients. The analysis demonstrated a greater than three-fold reduction in mortality compared to the standard of care (SOC) (15.71% vs 53.10%, respectively). Among patients with one family member with an aneurysm and smokers, it was estimated a near tenfold reduction in mortality compared to the SOC (0.21% vs 2.35%, and 0.27% vs 3.30%, respectively).

The present example further outlines additional approaches taken by the inventors:

(A) Quantitative analysis is performed on previously collected samples derived from patients with unruptured CAs. This allows the development of population-level quantitative data curves for expected ranges of cytokine levels of interest. Next, machine learning (ML) is used to re-train the models, and lastly build and optimize them for cerebral aneurysm detection (using ML again).

Specifically, a developing aneurysm generates a pro-inflammatory environment. It was showed that cerebral aneurysm patients exhibit specific circulating proteomic inflammatory profiles (FIGS. 2A-2F). Moreover, specific proteomic profiles can be used as fingerprints to detect cerebral aneurysm presence (FIGS. 3A-3G and 19A-19B). Under this new experimental conditions, quantitative levels for specific cytokines of interest are obtained from patients with or without cerebral aneurysms. This allows the development of nomograms, e.g., distribution levels, of expected quantitative cytokine levels in healthy control patients and patients with cerebral aneurysms.

(B) Deployment of a blood test on the market requires a specific platform. Ultra-sensitive quantitation of proteins in a multiplex assay format with high specificity and precision (e.g., Codetta® technology platform) is used for cytokine analysis. Next, machine learning (ML) is used to re-train the detection algorithms from semi-quantitative to full quantitative measurements.

Example 3

The present example provides details of the cohorts studied in the Examples.

Aneurysm study population inclusion criteria are the following:

(1) Patients undergoing cerebral angiography with intent to diagnose or re-treat with coil/pipeline/WEB a new or previously treated aneurysm, 18-75 years old, under general anesthesia (both secured and unsecured); and
(2) Samples to be collected: 2×10 mL peripheral IV blood, 2 mL intra-aneurysmal or distal arterial blood (which would otherwise be discarded during normal procedure).

Secondary control study population inclusion criteria are the following (1) General population 18-75 years old with no known cerebral vascular disease; and (2) Samples to be collected: 2×10 mL peripheral IV blood.

For molecular studies including 80 cytokines arrays, 80 mini-panels for both aneurysm and control study populations, the exclusion criteria are:
 (1) Active malignancy or medical condition that would compromise analysis;
 (2) Neurodegenerative disease (including but not limited to Parkinson's, Huntington's, Alzheimer's, dementia);
 (3) Debilitating neuropsychiatric disease (including but not limited to schizophrenia, bipolar disorder; depression is permissible);
 (4) Chronic immunosuppressive state and/or medications (HIV/AIDS, transplant patients, lupus, rheumatoid arthritis, etc); and
 (5) Pregnancy.

The presently disclosed subject matter focuses on defining the inflammatory profiles for different aneurysm locations including 1) a simple anterior vs posterior determination, 2) specific Circle of Willis parent vessel localization, and 3) determination whether a previously treated aneurysm is fully secured or whether it has re-canalized or recurred requiring treatment.

Example 4

A developing aneurysm experiences changing hemodynamic conditions over time which creates a pro-inflammatory environment. Cerebral aneurysm patients exhibit specific circulating proteomic inflammatory profiles (FIGS. 2A-2F). Moreover, specific proteomic profiles can be used as fingerprints to detect cerebral aneurysm presence (FIGS. 3A-3G and 19A-19B). The present example obtained strong data indicating that a blood test panel could also be used to predict aneurysm location (FIGS. 6A-6F). The present example is obtaining specific cytokine profiles from patients with cerebral aneurysms to refine the cytokines selected and models to predict aneurysm location. Initially, 20 specimens for each group will be used for broad screening with semi-quantitative cytokine arrays. Specific cytokines will be confirmed using quantitative glass-based arrays.

Further, the present example performs sub-analysis on collected samples derived from patients with unruptured CAs. Specifically, Principal Component Analysis (PCA) and machine learning (ML) is performed on cytokine array data within the unruptured CA cohort in order to stratify this patient population into one of several location groups based on the parent vessel. Based on PCA stratification, ML is used to select the defining cytokines for each sub-population, and lastly build and optimize models for their detection (using machine learning).

Example 5

The present example collects blood samples from patients with previously treated aneurysms. Data showed that a blood test panel can also be used to predict aneurysm status after treatment (FIGS. 5A-5E). The proteomic cytokine inflammatory data is applied to develop and refine a cytokine panel to detect previously treated cerebral aneurysms that are unsecured due to recanalization or recurrence.

Briefly, sub-analysis is performed on samples derived from patients with previously treated CAs. Principal Component Analysis (PCA) is performed on cytokine array data within the treated and secured vs treated and unsecured CA cohort in order to stratify this patient population into one of two groups. Based on PCA stratification, machine learning (ML) is used to select the defining cytokines for each sub-population, and lastly build and optimize models for their detection (using machine learning).

Although the presently disclosed subject matter and its advantages have been described in detail, it should be understood that various changes, substitutions and alterations can be made herein without departing from the spirit and scope of the application as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

While the foregoing is directed to embodiments described herein, other and further embodiments can be devised without departing from the basic scope thereof. For example, aspects of the present disclosure can be implemented in hardware or software or in a combination of hardware and software. One embodiment described herein can be implemented as a program product for use within a computer system. The program(s) of the program product define functions of the embodiments (including methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

For any patents, patent applications, publications, product descriptions, and protocols are cited throughout this application, the disclosures of all of which are incorporated herein by reference in their entireties for all purposes.

The invention claimed is:

1. A method for treating a cerebral aneurysm in a human subject, the method comprising:
 administering an effective amount of an aneurysm inhibitor to the subject,
 wherein the subject has an increased protein expression level of one or more biomarkers selected from the group consisting of IL-11, IL-17, and Amphiregulin relative to a reference sample of a subject without aneurysm, and
 wherein the one or more biomarkers is determined in a blood sample, a serum sample, or a plasma sample.

2. The method of claim 1, wherein the subject further has an increased expression level of one or more biomarkers selected from the group consisting of Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, and TRAIL-R4 relative to the reference sample.

3. The method of claim 1, wherein the subject further has a decreased expression level of one or more biomarkers selected from the group consisting of BDNF, CNTF, IL-7, Acrp30 (Adiponectin), and MIP-1β (CCL4) relative to the reference sample.

4. The method of claim 1, wherein the subject further has an increased expression level of one or more biomarkers selected from the group consisting of MSP-a, IL-10, and uPAR relative to the reference sample.

5. The method of claim 1, wherein the subject further has a decreased expression level of Flt-3 Ligand and/or MIP-3 β (CCL19) relative to the reference sample.

6. The method of claim 1, wherein the subject further has an increased expression level of one or more biomarkers selected from the group consisting of Eotaxin-2 (CCL24), MCP-1 (CCL2), MSP-a, sTNF-RI, and VEGF relative to the reference sample.

7. The method of claim 1, wherein the subject further has a decreased expression level of one or more biomarkers selected from the group consisting of IL-10, IL-15, PDGF-BB, TNF-α, HCC-4, and I-TAC (CXCL11) relative to the reference sample.

8. The method of claim 1, wherein the subject is known to have or suspected to have an aneurysm.

9. The method of claim 1, wherein the subject has an anterior aneurysm.

10. The method of claim 1, wherein the subject further has
    (a) an increased expression level of one or more biomarkers selected from Eotaxin-1 (CCL11), TARC (CCL17), MSP-a, HCC-4, VEGF-D, PLGF, MCP-1 (CCL2), Amphiregulin, ENA-78 (CXCL5), Lymphotactin (XCL1), IL-6, TRAIL-R3, Dtk (TYRO3), IGFBP-1, MIF, IL-8, EGF, uPAR, CXCL7/NAP-2, G-CSF, Axl, Flt-3 Ligand, or TRAIL-R4 relative to the reference sample;
    (b) an increased expression level of one or more biomarkers selected from MSP-a, IL-10, or uPAR relative to the reference sample; and/or
    (c) an increased expression level of one or more biomarkers selected from Eotaxin-2 (CCL24), MCP-1 (CCL2), IL-11, MSP-a, sTNF-RI, or VEGF relative to the reference sample.

11. The method of claim 1, wherein the subject further has
    (a) a decreased expression level of one or more biomarkers selected from BDNF, CNTF, IL-7, Acrp30 (Adiponectin), or MIP-1β (CCL4) relative to the reference sample;
    (b) a decreased expression level of Flt-3 Ligand and/or MIP-3 β (CCL19) relative to the reference sample; and/or
    (c) a decreased expression level of one or more biomarkers selected from IL-10, IL-15, PDGF-BB, TNF-α, HCC-4, or I-TAC (CXCL11) relative to the reference sample.

12. The method of claim 1, wherein the aneurysm inhibitor is a platelet inhibitor.

13. The method of claim 12, wherein the platelet inhibitor is selected from the group consisting of a glycoprotein IIB/IIIA inhibitor, a CXCL7 inhibitor, a CXCR1/2 inhibitor, and a combination thereof.

14. The method of claim 13, wherein the glycoprotein IIB/IIIA inhibitor is clopidogrel, a salt thereof, or a derivative thereof.

15. The method of claim 13, wherein the CXCL7 inhibitor is an antibody anti-CXCL7.

16. The method of claim 13, wherein the CXCR1/2 inhibitor is reparixin, a salt thereof, or a derivative thereof.

17. The method of claim 1, further comprising administering a therapeutically effective amount of a secondary aneurysm inhibitor.

18. The method of claim 1, wherein the one or more biomarkers is determined in a blood sample.

* * * * *